(12) United States Patent
Johnson et al.

(10) Patent No.: US 10,637,724 B2
(45) Date of Patent: Apr. 28, 2020

(54) MANAGING NETWORK CONNECTED DEVICES

(71) Applicant: Weaved, Inc., Palo Alto, CA (US)

(72) Inventors: Michael W. Johnson, Petaluma, CA (US); Ryo Koyama, Palo Alto, CA (US); Michael J. S. Smith, Palo Alto, CA (US)

(73) Assignee: REMOT3.IT, INC., Palo Alto, CA (US)

( * ) Notice: Subject to any disclaimer, the term of this patent is extended or adjusted under 35 U.S.C. 154(b) by 0 days.

(21) Appl. No.: 15/613,281

(22) Filed: Jun. 5, 2017

(65) Prior Publication Data

US 2017/0272316 A1 Sep. 21, 2017

Related U.S. Application Data

(63) Continuation-in-part of application No. 15/202,489, filed on Jul. 5, 2016, now abandoned, which is a continuation-in-part of application No. 13/918,773, filed on Jun. 14, 2013, now abandoned, application No. 15/202,489, filed on Jul. 5, 2016, which is a continuation-in-part of application No. 14/499,362, (Continued)

(51) Int. Cl.
| | |
|---|---|
| *G06F 13/00* | (2006.01) |
| *H04L 12/24* | (2006.01) |
| *G06Q 10/10* | (2012.01) |
| *H04L 29/06* | (2006.01) |
| *H04L 29/08* | (2006.01) |
| *H04L 29/12* | (2006.01) |
| *H04W 12/06* | (2009.01) |
| *H01L 29/12* | (2006.01) |

(52) U.S. Cl.
CPC ....... *H04L 41/0803* (2013.01); *G06Q 10/103* (2013.01); *H04L 61/301* (2013.01); *H04L 61/305* (2013.01); *H04L 63/0823* (2013.01); *H04L 63/105* (2013.01); *H04L 67/125* (2013.01); *H04L 67/141* (2013.01); *H04L 67/34* (2013.01); *H04W 12/06* (2013.01); *H01L 29/12* (2013.01); *H04L 61/1511* (2013.01); *H04L 63/0861* (2013.01); *H04L 63/168* (2013.01); *H04L 67/025* (2013.01); *Y04S 40/18* (2018.05)

(58) Field of Classification Search
CPC ..... H04L 41/28; H04L 67/141; H04L 61/301; H04L 61/305; H04L 63/105; H04L 67/34; H04L 67/125; H04L 63/0823; H04L 67/025; H04L 61/1511; H04L 63/0861; H04L 63/168; H04W 12/06; G06Q 10/103; H01L 29/12; Y04S 40/18
USPC ......... 709/245, 203, 227–229; 726/9, 20, 21
See application file for complete search history.

(56) References Cited

U.S. PATENT DOCUMENTS

| | | |
|---|---|---|
| 5,787,246 A | 7/1998 | Lichtman et al. |
| 5,887,139 A | 3/1999 | Madison, Jr. et al. |
| (Continued) | | |

OTHER PUBLICATIONS

Cantanzariti, 'Accessing localhost From Anywhere', sitepoint.com, Mar. 14, 2014, pp. 1-15.

(Continued)

*Primary Examiner* — Kenneth R Coulter
(74) *Attorney, Agent, or Firm* — Zilka-Kotab, P.C.

(57) ABSTRACT

Methods, systems, and computer program products for managing Internet of Things (IoT) network-connected devices.

16 Claims, 119 Drawing Sheets

Related U.S. Application Data filed on Sep. 29, 2014, now abandoned, and a continuation-in-part of application No. 14/517,843, filed on Oct. 18, 2014, now abandoned, and a continuation-in-part of application No. 14/520,389, filed on Oct. 22, 2014, now abandoned, and a continuation-in-part of application No. 14/493,278, filed on Sep. 22, 2014, now abandoned, and a continuation-in-part of application No. 14/956,386, filed on Dec. 1, 2015, now Pat. No. 9,712,486, which is a continuation-in-part of application No. 14/589,951, filed on Jan. 5, 2015, now Pat. No. 9,231,904, which is a continuation-in-part of application No. 14/534,155, filed on Nov. 5, 2014, now abandoned, which is a continuation-in-part of application No. 13/865,910, filed on Apr. 18, 2013, now Pat. No. 9,253,031, which is a continuation of application No. 11/860,876, filed on Sep. 25, 2007, now Pat. No. 8,447,843.

(60) Provisional application No. 60/883,637, filed on Jan. 5, 2007, provisional application No. 60/826,887, filed on Sep. 25, 2006.

(56) References Cited

U.S. PATENT DOCUMENTS

| | | |
|---|---|---|
| 6,012,088 A | 1/2000 | Li et al. |
| 6,028,848 A | 2/2000 | Bhatia et al. |
| 6,073,172 A | 6/2000 | Frailong et al. |
| 6,393,484 B1 | 5/2002 | Massarani |
| 6,429,893 B1 | 8/2002 | Xin |
| 6,601,093 B1 | 7/2003 | Peters |
| 6,647,389 B1 | 11/2003 | Fitch et al. |
| 6,686,838 B1 | 2/2004 | Rezvani et al. |
| 6,735,619 B1 | 5/2004 | Sawada |
| 6,938,089 B1 | 8/2005 | Slaby et al. |
| 6,943,681 B2 | 9/2005 | Rezvani et al. |
| 7,079,520 B2 | 7/2006 | Feige et al. |
| 7,124,397 B1 | 10/2006 | Mathur et al. |
| 7,240,106 B2 | 7/2007 | Cochran et al. |
| 7,250,854 B2 | 7/2007 | Rezvani et al. |
| 7,315,886 B1 | 1/2008 | Meenan et al. |
| 7,412,542 B1 | 8/2008 | Newson et al. |
| 7,543,145 B2 | 6/2009 | Olson et al. |
| 7,558,862 B1 | 7/2009 | Tyukasz et al. |
| 7,609,721 B2 | 10/2009 | Rao et al. |
| 7,752,202 B2 | 7/2010 | Kobori et al. |
| 7,774,437 B2 | 8/2010 | Crosier et al. |
| 7,796,023 B2 | 9/2010 | Rezvani et al. |
| 7,808,906 B2 | 10/2010 | Rao et al. |
| 7,895,445 B1 | 2/2011 | Albanese et al. |
| 7,912,046 B2 | 3/2011 | Li et al. |
| 7,974,277 B2 * | 7/2011 | Bao ............... H04L 29/06 370/389 |
| 7,992,209 B1 | 8/2011 | Menoher et al. |
| 8,014,421 B2 | 9/2011 | Rao et al. |
| 8,046,830 B2 | 10/2011 | Rao et al. |
| 8,065,418 B1 | 11/2011 | Abuan et al. |
| 8,086,740 B2 | 12/2011 | Tyukasz et al. |
| 8,099,764 B2 | 1/2012 | Herzog et al. |
| 8,149,851 B2 | 4/2012 | Asnis et al. |
| 8,208,413 B1 | 6/2012 | Bienn et al. |
| 8,266,689 B2 | 9/2012 | Menoher et al. |
| 8,296,437 B2 | 10/2012 | Pankratov |
| 8,351,333 B2 | 1/2013 | Rao et al. |
| 8,353,022 B1 | 1/2013 | Menoher et al. |
| 8,358,635 B2 | 1/2013 | Feige et al. |
| 8,370,907 B1 | 2/2013 | Potter et al. |
| 8,447,843 B2 | 5/2013 | Johnson et al. |
| 8,526,405 B2 | 9/2013 | Curtis et al. |
| 8,601,054 B2 | 12/2013 | Bagwell et al. |
| 8,627,424 B1 | 1/2014 | O'Malley et al. |
| 8,634,420 B2 | 1/2014 | Rao et al. |
| 8,723,664 B2 | 5/2014 | Rezvani et al. |
| 8,769,057 B1 | 7/2014 | Breau et al. |
| 8,831,222 B2 | 9/2014 | Menoher et al. |
| 8,898,227 B1 | 11/2014 | Mraz et al. |
| 8,935,691 B2 | 1/2015 | Ben Ayed |
| 9,231,904 B2 * | 1/2016 | Johnson ............... H04L 67/34 |
| 9,253,031 B2 | 2/2016 | Johnson et al. |
| 9,712,486 B2 * | 7/2017 | Johnson ............... H04W 4/70 |
| 2001/0018697 A1 | 8/2001 | Kunitake et al. |
| 2002/0091791 A1 | 7/2002 | Kang |
| 2002/0143984 A1 | 10/2002 | Hudson Michel |
| 2002/0156917 A1 | 10/2002 | Nye |
| 2003/0040937 A1 | 2/2003 | Gregersen et al. |
| 2003/0065947 A1 | 4/2003 | Song et al. |
| 2003/0217158 A1 | 11/2003 | Datta |
| 2004/0054925 A1 | 3/2004 | Etheridge et al. |
| 2004/0059821 A1 | 3/2004 | Tang et al. |
| 2004/0098507 A1 | 5/2004 | Thubert et al. |
| 2004/0133689 A1 | 7/2004 | Vasisht |
| 2004/0172396 A1 | 9/2004 | Vanska et al. |
| 2004/0199615 A1 | 10/2004 | Philyaw |
| 2005/0063357 A1 | 3/2005 | Wewalaarachchi et al. |
| 2005/0075115 A1 | 4/2005 | Corneille et al. |
| 2005/0114492 A1 | 5/2005 | Arberg et al. |
| 2005/0114653 A1 * | 5/2005 | Sudia ............... H04L 63/0823 713/158 |
| 2005/0147088 A1 * | 7/2005 | Bao ............... H04L 29/06 370/352 |
| 2005/0229238 A1 | 10/2005 | Ollis et al. |
| 2005/0249196 A1 | 11/2005 | Ansari et al. |
| 2006/0039356 A1 | 2/2006 | Rao et al. |
| 2006/0075226 A1 | 4/2006 | Aksu et al. |
| 2006/0120305 A1 | 6/2006 | Van Den Bosch et al. |
| 2006/0155833 A1 | 7/2006 | Matsuda et al. |
| 2006/0168022 A1 | 7/2006 | Levin et al. |
| 2006/0174120 A1 | 8/2006 | Rippy et al. |
| 2006/0288071 A1 | 12/2006 | Bigioi et al. |
| 2007/0022185 A1 | 1/2007 | Hamilton et al. |
| 2007/0067431 A1 | 3/2007 | Yoshihara et al. |
| 2007/0201622 A1 | 8/2007 | Croak et al. |
| 2007/0260738 A1 | 11/2007 | Palekar et al. |
| 2008/0034073 A1 | 2/2008 | McCloy et al. |
| 2008/0046735 A1 | 2/2008 | Nedeltchev et al. |
| 2008/0275997 A1 | 11/2008 | Gavin et al. |
| 2009/0013063 A1 | 1/2009 | Soman |
| 2010/0146110 A1 | 6/2010 | Christensen et al. |
| 2010/0322393 A1 | 12/2010 | Jin et al. |
| 2011/0055322 A1 | 3/2011 | Gregersen |
| 2011/0252116 A1 | 10/2011 | Menoher et al. |
| 2011/0307263 A1 | 12/2011 | Bader et al. |
| 2011/0314011 A1 | 12/2011 | Buehrer et al. |
| 2012/0117649 A1 | 5/2012 | Holloway et al. |
| 2012/0137210 A1 | 5/2012 | Dillon |
| 2012/0137213 A1 | 5/2012 | Hayler et al. |
| 2012/0173610 A1 | 7/2012 | Bleau et al. |
| 2012/0254976 A1 | 10/2012 | Armstrong et al. |
| 2012/0290950 A1 | 11/2012 | Rapaport et al. |
| 2012/0331097 A1 | 12/2012 | Menoher et al. |
| 2013/0031356 A1 | 1/2013 | Prince et al. |
| 2013/0053137 A1 | 2/2013 | Nelson et al. |
| 2013/0097283 A1 | 4/2013 | Menoher et al. |
| 2013/0232243 A1 | 9/2013 | Johnson et al. |
| 2013/0276136 A1 | 10/2013 | Goodwin et al. |
| 2013/0311574 A1 | 11/2013 | Lal |
| 2013/0339509 A1 | 12/2013 | Johnson et al. |
| 2014/0089344 A1 | 3/2014 | Hong et al. |
| 2014/0337407 A1 | 11/2014 | Mraz et al. |
| 2015/0052253 A1 | 2/2015 | Johnson et al. |
| 2015/0052258 A1 | 2/2015 | Johnson et al. |
| 2015/0088982 A1 | 3/2015 | Johnson et al. |
| 2015/0100952 A1 | 4/2015 | Tornow et al. |
| 2015/0113172 A1 | 4/2015 | Johnson et al. |
| 2015/0156162 A1 | 6/2015 | Kaliski, Jr. et al. |
| 2016/0112262 A1 | 4/2016 | Johnson et al. |
| 2016/0140611 A1 | 5/2016 | Schler et al. |

(56) References Cited

U.S. PATENT DOCUMENTS

2016/0315824 A1 10/2016 Johnson et al.
2016/0344745 A1 11/2016 Johnson et al.

OTHER PUBLICATIONS

Eppinger, 'TCP Connections for P2P Apps: A Software Approach to Solving the NAT Problem', Institute for Software Research, 2005, cover page plus pp. 1-8.
https://meetfinch.com/docs/faq, 'Frequently Asked Questions', Finch.com, Nov. 2, 2014, pp. 1-11.
Ford et al., 'Peer-to-Peer Communication Across Network Address Translators', USENIX Association, 2005, pp. 179-192.
https://github.com/progrium/localtunnel, 'progrium/localtunnel', GitHub.com, 2013, Code Version 182, Latest Commit: 08f3ac0f15, Nov. 21, 2013, pp. 1-2.
Guha et al., 'Characterization and Measurement of TCP Traversal through NATs and Firewalls', USENIX Association, 2005, pp. 199-211.
Hao et al., 'Network address translation traversal based on Bernoulli laws of large number in P2P streaming system', High Technology Letters, vol. 17, No. 4, Dec. 2011, pp. 401-406.
Ho et al., 'NAT-Compatibility Testbed: An Environment to Automatically Verify Direct Connection Rate', IEEE Communications Letters, vol. 15, No. 1, Jan. 2011, pp. 4-6.
Ho et al., 'To Call or to Be Called Behind NATs is Sensitive in Solving the Direct Connection Problem', IEEE, vol. 15, No. 1, Jan. 2011, pp. 94-96.
Huang et al., 'Smart Tunnel Union for NAT Traversal', Proceedings of the 2005 Fourth IEEE International Symposium on Network Computing and Applications, 2005, pp. 1-4.
Lebkicher, 'Role Based Access Control', SANS Institute, Nov. 30, 2000, pp. 1-11.
Levkowetz et al., 'Mobile IP Traversal of Network Address Translation (NAT) Devices', The Internet Society, Apr. 2003, pp. 1-16.
Levkowetz et al., 'Mobile IP Traversal of Network Address Translation (NAT) Devices', The Internet Society, Apr. 2003, pp. 17-34.
Lindsay, 'Localtunnel Protocol', GitHub.com, 2012, pp. 1-3.
Lindsay, 'Where did Localtunnel come from?', Progrium.com, 2014, pp. 1-3.
Microsoft, 'Teredo Overview', Microsoft, Jan. 1, 2003, pp. 1-18.
http://msdn.microsoft.com/en-us/library/dtkwfdky(v=vs.90).aspx, 'Walkthrough: Encrypting Configuration Information Using Protected Configuration', Microsoft.com, Oct. 4, 2016, pp. 1-7.
Muller et al., 'Behavior and Classification of NAT devices and implications for NAT Traversal', IEEE Network Special Issue on Implications and Control of Middleboxes, Oct. 2008, pp. 1-6.
Muller et al., 'On the Applicability of knowledge based NAT-Traversal for Home Networks', 2008, pp. 1-12.
Muller et al., 'Autonomous NAT Traversal', Network Architectures and Services, Mar. 2010, pp. 1-4.
https://pagekite.net/wiki/Floss/PageKiteProtocol/, 'The PageKite Protocol', PageKite.net, Mar. 17, 2011, pp. 1-12.
International Search Report and Written Opinion of PCT Application No. PCT/US07/20750, dated Mar. 7, 2008, 7 pages.
International Preliminary Report of PCT Application No. PCT/US07/20750, dated Oct. 22, 2008, 6 pages.
Perreault et al., 'Traversal Using Relays around NAT (TURN) Extensions for TCP Allocations', Internet Engineering Task Force (IETF), Nov. 2010, pp. 1-13.
Rosenberg et al., 'STUN—Simple Traversal of User Datagram Protocol (UDP) Through Network Address Translators (NATs)', The Internet Society, 2003, pp. 1-15.
Rosenberg et al., 'STUN—Simple Traversal of User Datagram Protocol (UDP) Through Network Address Translators (NATs)', The Internet Society, 2003, pp. 16-30.
Rosenberg et al., 'STUN—Simple Traversal of User Datagram Protocol (UDP) Through Network Address Translators (NATs)', The Internet Society, 2003, pp. 31-44.
Rosenberg et al., 'Session Traversal Utilities for NAT (STUN)', IEEE, Oct. 2008, pp. 1-17.
Rosenberg et al., 'Session Traversal Utilities for NAT (STUN)', IEEE, Oct. 2008, pp. 18-34.
Rosenberg et al., 'Session Traversal Utilities for NAT (STUN)', IEEE, Oct. 2008, pp. 35-51.
Rosenberg et al., 'Traversal Using Relays around NAT (TURN) Extensions for TCP Allocations', Nov. 2010, pp. 1-13.
Rosenberg et al., 'Interactive Connectivity Establishment (ICE): A Protocol for Network Address Translator (NAT) Traversal for Offer/Answer Protocols', Internet Engineering Task Force, Feb. 25, 2013, pp. 1-20.
Rosenberg et al., 'Interactive Connectivity Establishment (ICE): A Protocol for Network Address Translator (NAT) Traversal for Offer/Answer Protocols', Internet Engineering Task Force, Feb. 25, 2013, pp. 21-40.
Rosenberg et al., 'Interactive Connectivity Establishment (ICE): A Protocol for Network Address Translator (NAT) Traversal for Offer/Answer Protocols', Internet Engineering Task Force, Feb. 25, 2013, pp. 41-60.
Rosenberg et al., 'Interactive Connectivity Establishment (ICE): A Protocol for Network Address Translator (NAT) Traversal for Offer/Answer Protocols', Internet Engineering Task Force, Feb. 25, 2013, pp. 61-80.
Rosenberg et al., 'Interactive Connectivity Establishment (ICE): A Protocol for Network Address Translator (NAT) Traversal for Offer/Answer Protocols', Internet Engineering Task Force, Feb. 25, 2013, pp. 81-89.
Savin, 'Digging Tunnels', red-badger.com, May 12, 2014, pp. 1-7.
Sheehan, 'A Survey of the Localhost Proxying Landscape', johnsheehan.com, Aug. 5, 2013, pp. 1-4.
Shreve, 'ngrok tunnels: better, faster, stronger', inconshreveable.com, Sep. 25, 2013, pp. 1-7.
http://stackoverflow.com/questions/7621341/how-can-i-programmatically-generate-heroku-like-subdomain-names, 'How can I programmatically generate Heroku-like subdomain names?', Stackoverflow.com, Sep. 8, 2011, pp. 1-2.
Stiemerling et al., 'NAT and Firewall Traversal Issues of Host Identity Protocol (HIP) Communication', Apr. 2008, pp. 1-13.
Tamberg, 'Yaler Protocol Documentation', Yaler.net, Sep. 11, 2012, pp. 1-5.
Tsai, 'A Study of P2P Traversal Through Symmetric Nat' VDM Publishing, 2010, pp. 1-76.
International Preliminary Report & Written Opinion of PCT Application No. PCT/US2013/046004, dated Jan. 10, 2014, 7 pages total.
Wacker et al., 'A NAT Traversal Mechanism for Peer-To-Peer Networks', IEEE Eight International Conference on Peer-to-Peer Computing, Sep. 2008, pp. 81-83.
Wang et al., 'Research on Symmetric NAT Traversal in P2P applications', Computing in the Global Information Technology, Aug. 2006, pp. 1-6.
Xu et al., 'Research and implementation of P2P communications scheme based on NAT-traversal technologies' (English Abstract Only), Computer Engineering and Design, vol. 28, No. 7, Apr. 2007, pp. 1559-1603.
https://news.ycombinator.com/item?id=7585056, Localtunnel.me, Ycombinator.com, Nov. 2, 2014, pp. 1-6.
https://news.ycombinator.com/item?id=7763688, 'Finch-local port forwarding', Ycombinator.com, Nov. 2, 2014, pp. 1-7.
Yoshimi et al., 'NAT Traversal Technology of Reducing Load on Relaying Server for P2P Connections', IEEE, Jan. 2007, pp. 100-104.
USPTO Office Action for U.S. Appl. No. 11/860,876 dated Nov. 3, 2009 (18 pages).
USPTO Office Action for U.S. Appl. No. 11/860,876 dated May 12, 2010 (24 pages).
USPTO Office Action for U.S. Appl. No. 11/860,876 dated Aug. 14, 2012 (33 pages).
USPTO Notice of Allowance for U.S. Appl. No. 11/860,876 dated Jan. 18, 2013 (12 pages).
USPTO Office Action for U.S. Appl. No. 13/865,910 dated Dec. 4, 2013 (12 pages).

(56) References Cited

OTHER PUBLICATIONS

USPTO Office Action for U.S. Appl. No. 13/865,910 dated Jul. 16, 2014 (18 pages).
USPTO Office Action for U.S. Appl. No. 13/865,910 dated Jun. 11, 2015 (15 pages).
USPTO Notice of Allowance for U.S. Appl. No. 13/865,910 dated Nov. 12, 2015 (5 pages).
USPTO Office Action for U.S. Appl. No. 13/918,773 dated Jun. 18, 2015 (17 pages).
USPTO Office Action for U.S. Appl. No. 13/918,773 dated Feb. 3, 2016 (8 pages).
USPTO Office Action for U.S. Appl. No. 14/493,278 dated Mar. 30, 2016 (13 pages).
USPTO Office Action for U.S. Appl. No. 14/493,278 dated Oct. 18, 2016 (14 pages).
USPTO Office Action for U.S. Appl. No. 14/499,362 dated Jul. 1, 2016 (9 pages).
USPTO Office Action for U.S. Appl. No. 14/517,843 dated May 6, 2016 (13 pages).
USPTO Office Action for U.S. Appl. No. 14/520,389 dated Oct. 4, 2016 (19 pages).
USPTO Office Action for U.S. Appl. No. 14/534,155 dated Sep. 7, 2016 (12 pages).
USPTO Notice of Allowance for U.S. Appl. No. 14/589,951 dated May 22, 2015 (12 Pages).
USPTO Notice of Allowance for U.S. Appl. No. 14/589,951 dated Oct. 23, 2015 (8 pages).
USPTO Office Action for U.S. Appl. No. 15/202,489 dated Sep. 23, 2016 (17 pages).

\* cited by examiner

| Owner | Address | Application | Manufacturer | Type |
|---|---|---|---|---|
| DEMO | 00:00:00:91:00:00:69:F4 | Video | Company A | 00:0F:00:01:00:02:00:50 |
| DEMO | 00:06:28:CB:67:F2:CD:08 | HTTPS | Company B | 00:08:00:00:00:1B:00:6B:00:00 |
| DEMO | 00:95:31:1D:06:B6:CD:08 | Photo Folder | Company C | 00:11:00:00:00:1B:00:6B:00:00 |
| DEMO | 00:CE:BE:0A:06:B6:CD:08 | VNC | Company D | 00:04:00:00:00:1B:00:6B:00:00 |

3Y-700

| External IP | Internal IP | Alias | State | Server Port | CreateDate | LastContact |
|---|---|---|---|---|---|---|
| 24.6.52.245:3174 | 192.168.11.48:3174 | HomeSurveillance | active | 10.151.1.8 5964 | 1/27/2008 11:58:56 AM | 7/27/2011 2:21:26 PM |
| 24.6.52.245:63634 | 192.168.11.40:63634 | gMote | active | 10.151.1.9 5964 | 6/6/2011 1:50:13 PM | 7/27/2011 2:15:03 PM |
| 24.6.52.245:63630 | 192.168.11.40:63630 | My Pictures | active | 10.151.1.9 5964 | 3/21/2011 5:39:52 PM | 7/27/2011 2:15:05 PM |
| 24.6.52.245:57761 | 192.168.11.40:57761 | My Desktop | active | 10.151.1.5 5963 | 3/21/2011 5:39:20 PM | 7/27/2011 2:14:43 PM |

FIG. 32

General Information

| | | |
|---|---|---|
| Owner User ID | | 3Y-800 |
| Device Type | 3A517D03-226A-4592-AFC7-5F57BC | |
| Device Address | 00:0F:00:01:00:02:00:50 | |
| Last Contacted | 00:00:00:91:00:00:69:F4 | |
| Device State | 7/27/2001 2:21:26 PM | |
| Web Viewer URL | active | |
| Client Download | | |
| Viewer Registration URL | | |
| Secured | | |
| Supports UDP | | |
| UDP Port | | |
| Supports TCP | 0 | |
| Chat Server Port | | |
| Supports Reflector | 5964 | |
| Enabled | | |
| Chat Server | | |
| Security Key | 10.151.1.8 | |
| Device Last IP | 8E:F3:5C:E5:99:B1:0F:0F:13:A7:D2:c9:B0:B7:DD:2F:E1:CB: | |
| Device Alias | 24.6.52.245:3174 | |
| Server Encryption | HomeSurveillance | |
| Encryption Flag | 1 | |
| Minimum Encryption | 3 | |
| Is Global | 1 | |
| Last State Changed | | |
| | 7/27/2011 2:21:26 PM | |

Access List
Friends contact sharing

| | |
|---|---|
| 123@xyz.com | Type of change |
| 456@xyz.com | view |
| 789@xyz.com | change |
| ABC@xyz.com | view |

FIG. 33

Install Weaved's Connectd Daemon and Service

Once you've downloaded the installer, execute the following to get install and start your Weaved VPN Service:

```
chmod +x Weaved_RPIInstaller.sh
sudo ./Weaved_RPIInstaller.sh ## Do not execute using "sh" as Raspbian
utilizes dash, which does not support all of the installer features
```

3-2500
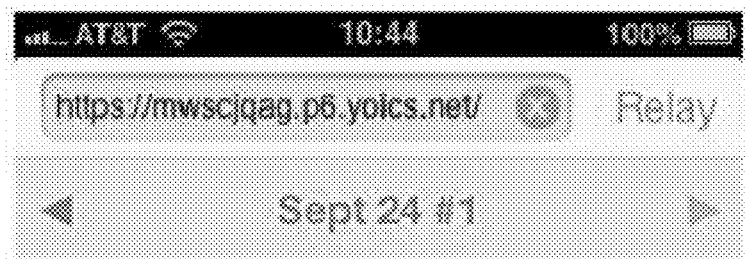
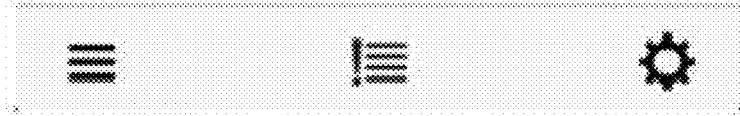
FIG. 80

3-2600

3-2700

3-2800

3-2900

3-3000

3-3100

3-3200

3-3300

4-4C00

| General Information | |
|---|---|
| Owner User ID | 3A517D03-226A-4592-AFC7-5F57BC |
| Device Type | 00:0F:00:01:00:02:00:50 |
| Device Address | 00:00:00:91:00:00:69:F4 |
| Last Contacted | 7/27/2001 2:21:26 PM |
| Device State | active |
| Web Viewer URL | |
| Client Download | |
| Viewer Registration URL | |
| Secured | |
| Supports UDP | |
| UDP Port | 0 |
| Supports TCP | |
| Chat Server Port | 5964 |
| Supports Reflector | |
| Enabled | |
| Chat Server | 10.151.1.8 |
| Security Key | 8E:F3:5C:E5:99:B1:0F:0F:13:A7:D2:c9:B0:B7:DD:2F:E1:CB: |
| Device Last IP | 24.6.52.245:3174 |
| Device Alias | HomeSurveillance |
| Server Encryption | 1 |
| Encryption Flag | 3 |
| Minimum Encryption | 1 |
| Is Global | |
| Last State Changed | 7/27/2011 2:21:26 PM |

FIG. 99

MANAGING NETWORK CONNECTED DEVICES

RELATED APPLICATIONS

The present application is a continuation-in-part of co-pending U.S. patent application Ser. No. 15/202,489 filed Jul. 5, 2005, entitled "NETWORKING SYSTEMS" (now abandoned), which is a continuation-in-part of, and claims the benefit to U.S. patent application Ser. No. 13/918,773, filed Jun. 14, 2013, entitled "NETWORKING SYSTEMS" (now abandoned), which in turn claims priority to U.S. Provisional Patent Application No. 61/660,619, filed Jun. 5, 2012, entitled "NETWORKING SYSTEMS" (now expired) .The foregoing applications and/or patents are herein incorporated by reference in their entirety for all purposes.

Additionally, this application is a continuation-in-part of, and claims the benefit to U.S. patent application Ser. No. 14/493,278, filed Sep. 22, 2014, entitled "MULTI-SERVER FRACTIONAL SUBDOMAIN DNS PROTOCOL" (now abandoned) The foregoing application and/or patent is herein incorporated by reference in their entirety for all purposes.

Additionally, this application is a continuation-in-part of, and claims the benefit to U.S. patent application Ser. No. 14/499,362, filed Sep. 29, 2014, entitled "DIRECT MAP PROXY SYSTEM AND PROTOCOL" (now abandoned). The foregoing application and/or patent is herein incorporated by reference in their entirety for all purposes.

Additionally, this application is a continuation-in-part of, and claims the benefit to U.S. patent application Ser. No. 14/517,843, filed Oct. 18, 2014, entitled "INSTALLATION AND CONFIGURATION OF CONNECTED DEVICES" (now abandoned) The foregoing application and/or patent is herein incorporated by reference in their entirety for all purposes.

Additionally, this application is a continuation-in-part of, and claims the benefit to U.S. patent application Ser. No. 14/520,389, filed Oct. 22, 2014, entitled "METHOD AND PROTOCOL FOR SECURE DEVICE DEPLOYMENT USING A PARTIALLY-ENCRYPTED PROVISIONING FILE" (now abandoned), which in turn is a continuation-in-part of U.S. patent application Ser. No. 13/865,910, filed Apr. 18, 2013, now U.S. Pat. No. 9,253,031, entitled "SYSTEM, METHOD AND COMPUTER PROGRAM PRODUCT FOR IDENTIFYING, CONFIGURING AND ACCESSING A DEVICE ON A NETWORK," which in turn is a continuation of U.S. patent application Ser. No. 11/860,876, filed Sep. 25, 2007, now U.S. Pat. No. 8,447,843, entitled "SYSTEM, METHOD AND COMPUTER PROGRAM PRODUCT FOR IDENTIFYING, CONFIGURING AND ACCESSING A DEVICE ON A NETWORK," which claims the benefit of priority from U.S. Provisional Patent Application No. 60/883,637, filed Jan. 5, 2007, entitled "SYSTEM, METHOD AND COMPUTER PROGRAM PRODUCT FOR ACCESSING A DEVICE ON A NETWORK UTILIZING A UNIVERSAL DEVICE LOCATOR" (now expired) and U.S. Provisional Patent Application No. 60/826,887, filed Sep. 25, 2006, entitled "SYSTEM, METHOD AND COMPUTER PROGRAM PRODUCT FOR AUTOMATICALLY IDENTIFYING AND CONFIGURING A DEVICE" (now expired). The foregoing applications and/or patents are herein incorporated by reference in their entirety for all purposes.

Additionally, this application is a continuation-in-part of, and claims the benefit to U.S. patent application Ser. No. 14/534,155, filed Nov. 5, 2014, entitled "LOAD BALANCED INTER-DEVICE MESSAGING" (now abandoned) which in turn is a continuation-in-part of U.S. patent application Ser. No. 13/865,910, filed Apr. 18, 2013, now U.S. Pat. No. 9,253,031, entitled "SYSTEM, METHOD AND COMPUTER PROGRAM PRODUCT FOR IDENTIFYING, CONFIGURING AND ACCESSING A DEVICE ON A NETWORK," which in turn is a continuation of U.S. patent application Ser. No. 11/860,876, filed Sep. 25, 2007, now U.S. Pat. No. 8,447,843, entitled "SYSTEM, METHOD AND COMPUTER PROGRAM PRODUCT FOR IDENTIFYING, CONFIGURING AND ACCESSING A DEVICE ON A NETWORK," which claims the benefit of U.S. Provisional Patent Application No. 60/883,637, filed Jan. 5, 2007, entitled "SYSTEM, METHOD AND COMPUTER PROGRAM PRODUCT FOR ACCESSING A DEVICE ON A NETWORK UTILIZING A UNIVERSAL DEVICE LOCATOR" (now expired) and U.S. Provisional Patent Application No. 60/826,887, filed Sep. 25, 2006, entitled "SYSTEM, METHOD AND COMPUTER PROGRAM PRODUCT FOR AUTOMATICALLY IDENTIFYING AND CONFIGURING A DEVICE" (now expired). The foregoing applications and/or patents are herein incorporated by reference in their entirety for all purposes.

Additionally, this application is a continuation-in-part of, and claims the benefit to U.S. patent application Ser. No. 14/956,386, filed Dec. 1, 2015 now U.S. Pat. No. 9,712,486, entitled "TECHNIQUES FOR THE DEPLOYMENT AND MANAGEMENT OF NETWORK CONNECTED DEVICES," which in turn is a continuation-in-part of U.S. patent application Ser. No. 14/589,951, filed Jan. 5, 2015 now U.S. Pat. No. 9,231,904, entitled "DEPLOYING AND MANAGING NETWORKED DEVICES," which in turn is a continuation-in-part of U.S. patent application Ser. No. 14/534,155, filed Nov. 5, 2014, entitled "LOAD BALANCED INTER-DEVICE MESSAGING" (now abandoned), which in turn is a continuation-in-part of U.S. patent application Ser. No. 13/865,910, filed Apr. 18, 2013, now U.S. Pat. No. 9,253,031, entitled "SYSTEM, METHOD AND COMPUTER PROGRAM PRODUCT FOR IDENTIFYING, CONFIGURING AND ACCESSING A DEVICE ON A NETWORK," which in turn is a continuation of U.S. patent application Ser. No. 11/860,876, filed Sep. 25, 2007, now U.S. Pat. No. 8,447,843, entitled "SYSTEM, METHOD AND COMPUTER PROGRAM PRODUCT FOR IDENTIFYING, CONFIGURING AND ACCESSING A DEVICE ON A NETWORK," which claims the benefit of U.S. Provisional Patent Application No. 60/883,637, filed Jan. 5, 2007, entitled "SYSTEM, METHOD AND COMPUTER PROGRAM PRODUCT FOR ACCESSING A DEVICE ON A NETWORK UTILIZING A UNIVERSAL DEVICE LOCATOR" (now expired) and U.S. Provisional Patent Application No. 60/826,887, filed Sep. 25, 2006, entitled "SYSTEM, METHOD AND COMPUTER PROGRAM PRODUCT FOR AUTOMATICALLY IDENTIFYING AND CONFIGURING A DEVICE" (now expired). The foregoing applications and/or patents are herein incorporated by reference in their entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of network-connected devices and more particularly to techniques for deploying and maintaining Internet-connected networked devices. Embodiments of the present disclosure generally relate to improvements to computing devices and, more specifically, to efficient use of CPUs in various devices.

BACKGROUND

The present disclosure relates to networked devices, IoT devices, and more particularly to deployment, automatic configuration, identification and access of IoT devices. Embodiments of the present disclosure generally relate to improvements to networking systems including, but not limited to, networking of IoT devices.

The Internet of Things (IoT) is the network of physical objects, devices, or "things" embedded with electronics, software, sensors, and network connectivity, which enables these objects, devices, etc. to collect and exchange data. The IoT, for example, allows objects to be sensed and controlled remotely across existing network infrastructure, creating opportunities for more direct integration between the physical world and computer-based systems, and resulting in improved efficiency, accuracy, and economic benefit. Each IoT thing is uniquely identifiable through its embedded computing system but is able to interoperate within the existing Internet infrastructure. Experts estimate that the IoT will consist of almost 50 billion objects by 2020.

Typically, IoT is expected to offer advanced connectivity of devices, systems, and services that goes beyond machine-to-machine communications (M2M) and covers a variety of protocols, domains, and applications. The interconnection of these embedded devices (including smart objects), is expected to usher in automation in nearly all fields, while also enabling advanced applications like a Smart Grid and expanding to the areas such as smart cities.

"Things," in the IoT sense, may refer to a wide variety of devices, including but not limited to, devices such as heart monitoring implants, biochip transponders on farm animals, electric clams in coastal waters, automobiles with built-in sensors, or field operation devices that assist firefighters in search and rescue operations, etc. These devices collect useful data with the help of various existing technologies and then autonomously flow the data between other devices. Consumer market examples include, but are not limited to, devices such as smart thermostat systems and washer/dryers that use Wi-Fi for remote monitoring, etc.

Besides the wide variety of new application areas for Internet connected automation to expand into, IoT is also expected to generate large amounts of data from diverse locations that is aggregated very quickly, thereby increasing the need to better index, store, network, and process such data.

As increasingly more devices (e.g., servers, computers, phones, equipment, appliances, etc.) are connected to the Internet, the need to connect them in a meaningful, fast, secure, and cost-effective way becomes increasingly difficult. Specific scalability challenges related to Domain Name System (DNS) capability and Secure Sockets Layer (SSL) certificate deployment are evident. The function of the DNS, carried out by one or more DNS servers, is to associate various information with Internet domain names. More specifically, it translates more easily memorized domain names (e.g., www.example.com) to their associated numerical IP addresses (e.g., IPv4 or IPv6 addresses) needed for the purpose of locating computer services and devices worldwide. DNS servers resolve (e.g., translate to an IP address) a domain name (e.g., www.example.com) in a hierarchical manner, looking first at the top level domain or TLD (e.g., ".com"), then the domain name (e.g., "example"), and then the sub domain (e.g., "www"). More sub domains (e.g., a second sub domain, a third sub domain) can be included in the URL (e.g., m.www.example.com), limited by a maximum of 123 levels, and a maximum of 253 characters for the entire domain name.

An SSL certificate is a digital certificate that authenticates the identity of a website, application, or device and encrypts exchanged information (e.g., 256-bit encryption) using SSL technology. SSL certificates can secure a single domain name with a single domain certificate (e.g., www.example.com), secure multiple domain names with a multi-name certificate (e.g., both www.example.com and mail.example.com), and secure multiple subdomains of a domain with a wildcard digital security certificate, for example, (e.g., *.example.com). There is an annual cost (e.g., USD$150-$300) and setup resources required (e.g., for generating the CSR, private key, renewal, etc.) when deploying wildcard certificates.

Legacy DNS capability in consideration of SSL certificate limitations presents challenges to secure and cost-effective Internet device scalability. In particular, the handling of wildcards in both the DNS and SSL certificates impacts scalability. For example, legacy DNS capability (e.g., as outlined in Network Working Group RFC 4592, and RFC 1034 sections 4.3.2 and 4.3.3) will only accept wildcards in the left-most subdomain (e.g., *.example.com). To have multiple subdomains translate to two different servers (e.g., servers s1 and s2 to manage resource loading), multiple wildcard DNS records unique to each server (e.g., *.s1.example.com and *.s2.example.com) are required. Likewise, a wildcard SSL certificate can only serve one subdomain level (e.g., *.s1.example.com), so a separate certificate for each server would be required, given the aforementioned DNS addressing limitation. The restrictions of these legacy protocols and systems therefore limit the scaling of devices on the Internet (e.g., adding servers, subdomains, etc.) in a secure and cost-effective manner (e.g., minimizing the deployment of SSL certificates, managing server loading, etc.).

Furthermore, legacy networking environments and systems often include a web server (e.g., Apache web server) that receives mapping directives such as:

ProxyPass/foo/http://s1.example.com/

This directive, for example, will direct a request for "http://example.com/foo/device1" to be mapped into a proxy request to "http://s1.example.com/device1". This mapping can, for example, direct a user request to host server at "example.com" for connection to "device1" to be redirected to a remote server at "s1.example.com" associated with (e.g., physically co-located with) "device1" to complete the connection. Similarly, the reverse mapping, ProxyPassReverse/foo/http://s1.example.com/ converts or maps, for example, "http://s1.example.com/device1" back to "http://example.com/foo/device1" before forwarding the response from the server at "s1.example.com" back to the user. From the user or client side, the request satisfied by the server at "s1.example.com" appears to have been satisfied by "example.com".

While the aforementioned legacy structure (e.g., syntax and semantics) for proxy server mapping provides some simplification of addressing multiple network servers and devices, the structure has limits to scaling of devices on the Internet (e.g., adding devices, servers, subdomains, etc.) in a flexible and efficient manner. Techniques are needed to address the problem of flexibly and efficiently mapping to a large number of devices connected to the Internet using domain names.

The above scenario is further complicated by the fact that many sorts of devices can be connected via the Internet. However, applications pertaining to certain types of connected devices rely on characteristics of the connected network that can be set up during the course of installation and configuration. Legacy installation and configuration fails to account for the specifics of certain connected devices, and in some cases, legacy installation and configuration relies on pre-existing network component configurations that may not fully serve the needs of the aforementioned connected devices. Further, techniques are needed to address the problem of deployment and ongoing management of internet connected devices. The hereinabove problems with deployment are exacerbated since Device deployers and manufacturers need a way to identify deployed devices to the Internet in a way that provides security and authentication. Legacy techniques as are used by applications such as Dropbox and YouTube have offered developers app identification codes ("id's") and/or shared keys that were typically embedded in the app or device. Unfortunately, legacy use of such keys did not include security such as authentication and encryption. Implementation of security was left up to the user. In many cases, identification codes ("id's") and/or shared keys and were often left open in plain text (e.g., unencrypted), and accessible in plain text at or from the device, and/or embedded in plain text in various components of the application (e.g., in plain text embedded in the binary modules of the application).

Techniques are needed to address the security problems that developers and manufactures face, namely how to identify their deployed devices to Internet edge services in a way that provides a specified level of security and authentication. Security and authentication becomes increasingly more important as increasingly more devices (e.g., servers, computers, phones, equipment, cameras, appliances, etc.) are connected to the Internet. The need to connect them in a meaningful, fast, secure, and cost-effective way becomes increasingly difficult. Specific scalability challenges related to managing the messaging between devices are evident.

There are legacy approaches that enable inter-device communication (e.g., between a home security camera and a homeowner's smartphone, etc.). However, these legacy techniques are not well suited to quickly and cost-effectively enable communications from a large number of devices (e.g., all security cameras of a multi-national corporation, etc.). Specific challenges arise in balancing the connection and messaging load on the communication system servers. Techniques are therefore needed to address the problem of cost-effectively scaling the communications with an increasing number of devices connected to the Internet.

None of the aforementioned legacy approaches achieve the capabilities of the herein-disclosed techniques for deploying and maintaining Internet-connected networked devices. There is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for deploying and maintaining Internet-connected networked devices. The claimed embodiments address the problem of deploying and managing Internet-connected devices. The disclosure and claims thereto advance the technical fields for addressing the problem of deploying and managing Internet-connected devices, as well as advancing peripheral technical fields. Some claims improve the functioning of multiple systems within the disclosed environments.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

So that the features of various embodiments of the present disclosure can be understood, a more detailed description, briefly summarized above, may be had by reference to various embodiments, some of which are illustrated in the accompanying drawings. It is to be noted, however, that the accompanying drawings illustrate only embodiments and are therefore not to be considered limiting of the scope of the various embodiments of the disclosure, for the embodiment(s) may admit to other effective embodiments. The following detailed description makes reference to the accompanying drawings that are now briefly described.

The drawings described below are for illustration purposes only. The drawings are not intended to limit the scope of the present disclosure.

Figure 1A:
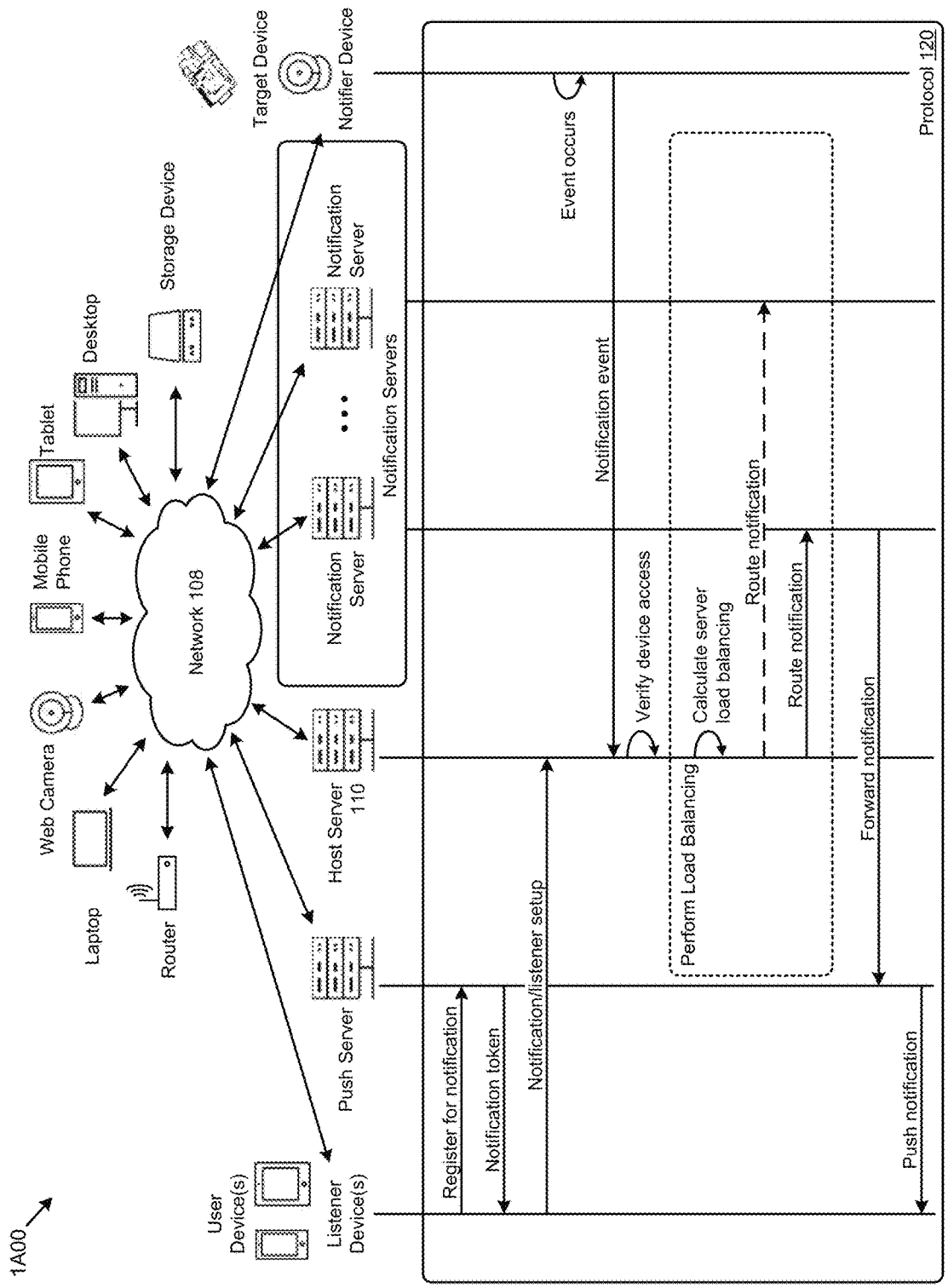

One or more of the various embodiments of the disclosure are susceptible to various modifications, combinations, and alternative forms, various embodiments thereof are shown by way of example in the drawings and will herein be described in detail. It should be understood, however, that the accompanying drawings and detailed description are not intended to limit the embodiment(s) to the particular form disclosed, but on the contrary, the intention is to cover all modifications, combinations, equivalents and alternatives falling within the spirit and scope of the various embodiments of the present disclosure as defined by the relevant claims.

FIG. 1A presents an environment and computing infrastructure suited for deploying and maintaining Internet-connected networked devices.

FIG. 1B through FIG. 1H presents embodiments that include infrastructure suited for deploying and maintaining Internet-connected networked devices.

Figure 2:
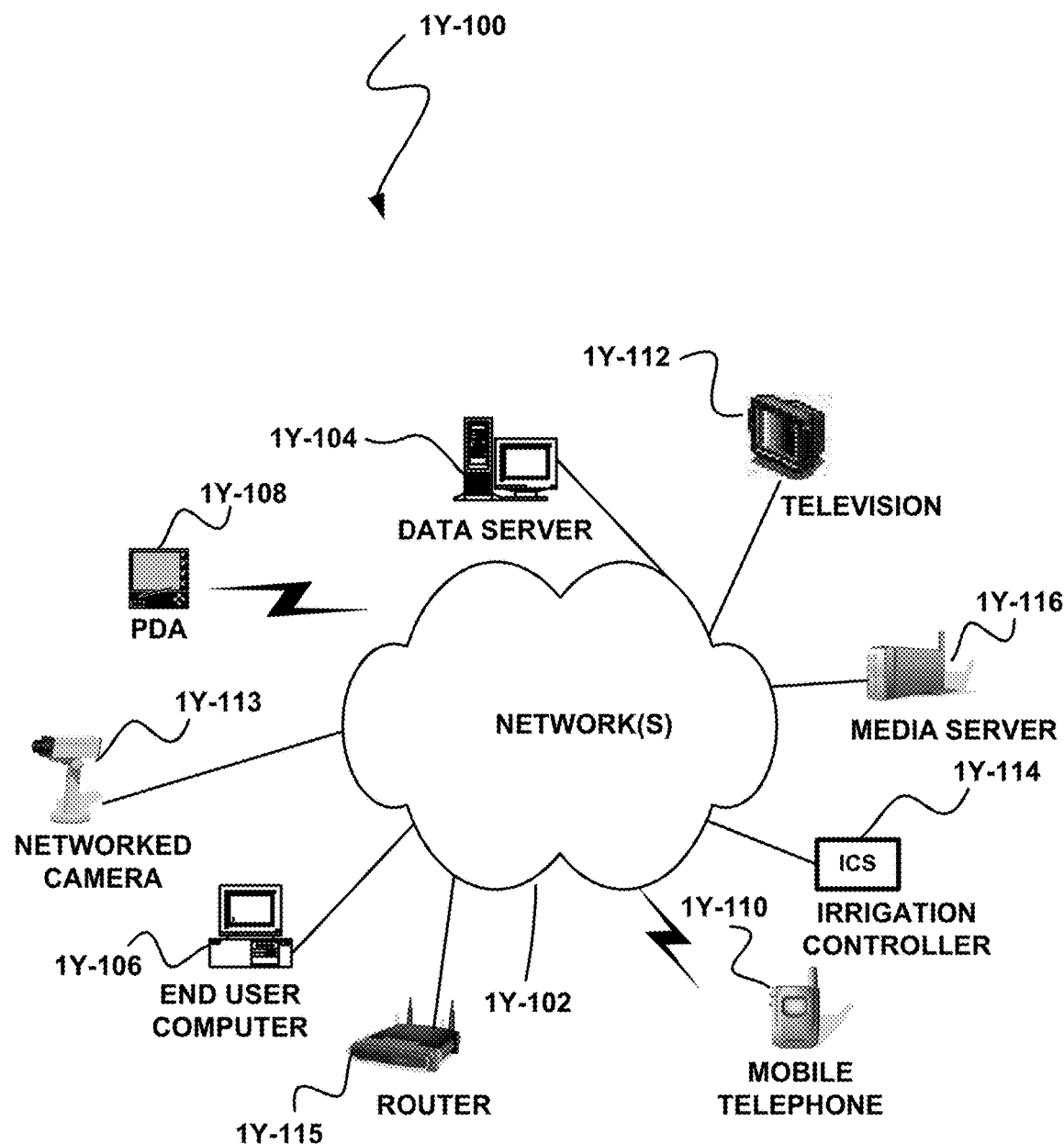

FIG. 2 illustrates a network architecture, in accordance with one embodiment.

Figure 3:
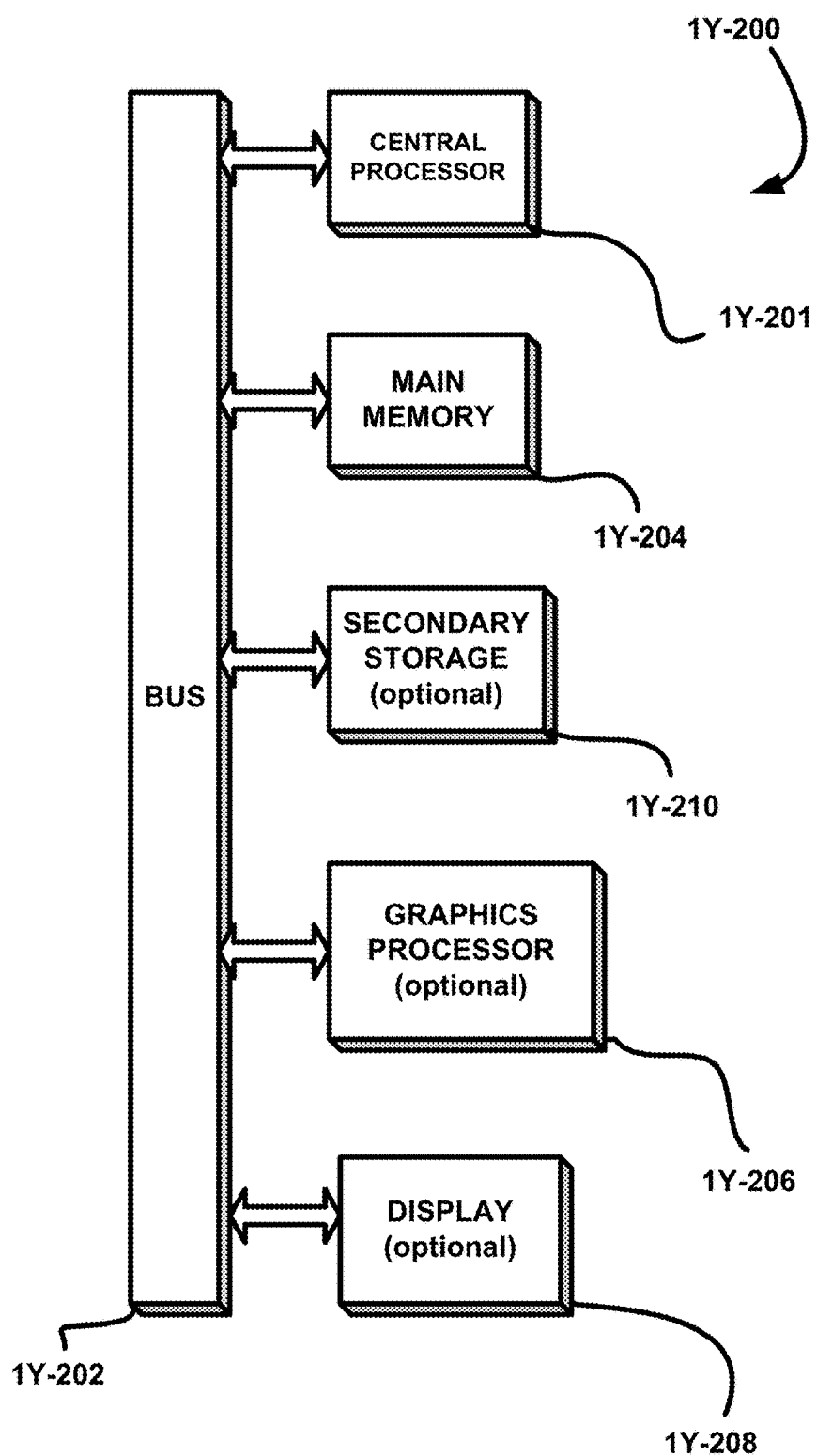

FIG. 3 illustrates an exemplary computer system, in accordance with one embodiment.

Figure 4:
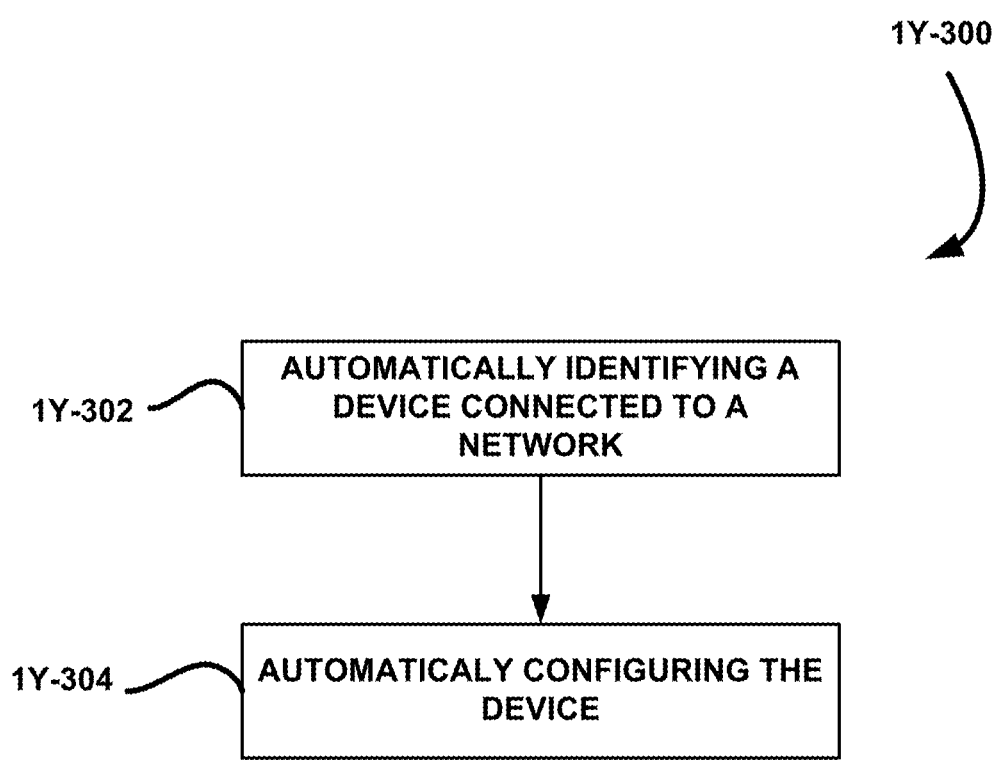

FIG. 4 shows a method for automatically configuring a device connected to a network, in accordance with one embodiment.

Figure 5:
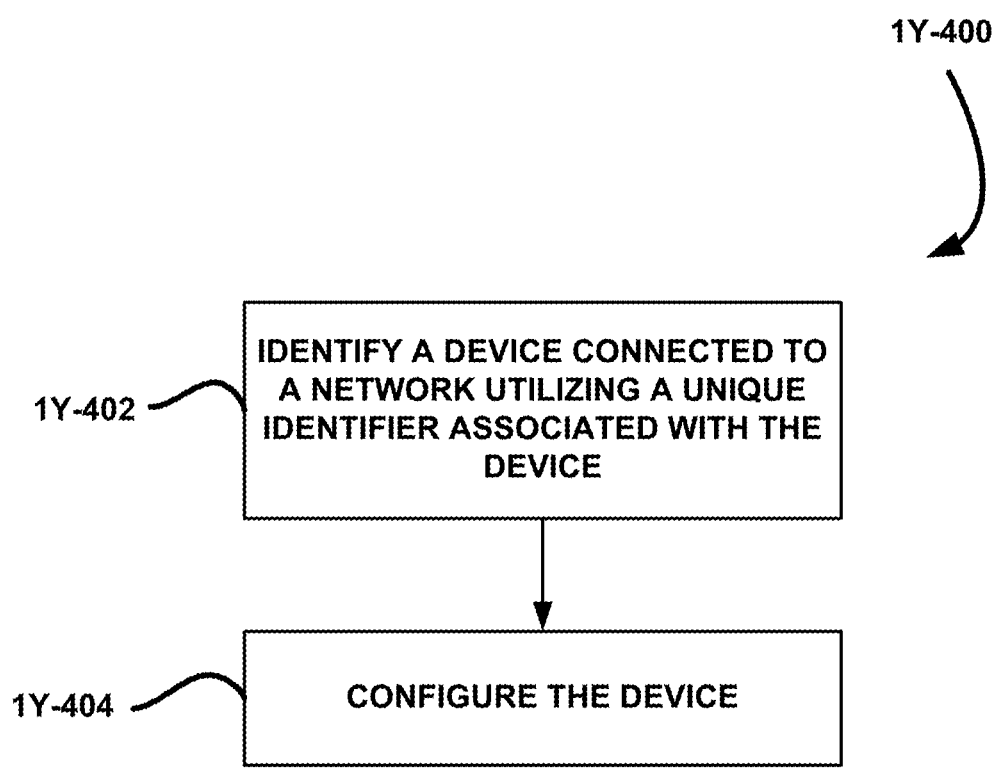

FIG. 5 shows a method for identifying a device on a network, in accordance with one embodiment.

Figure 6:
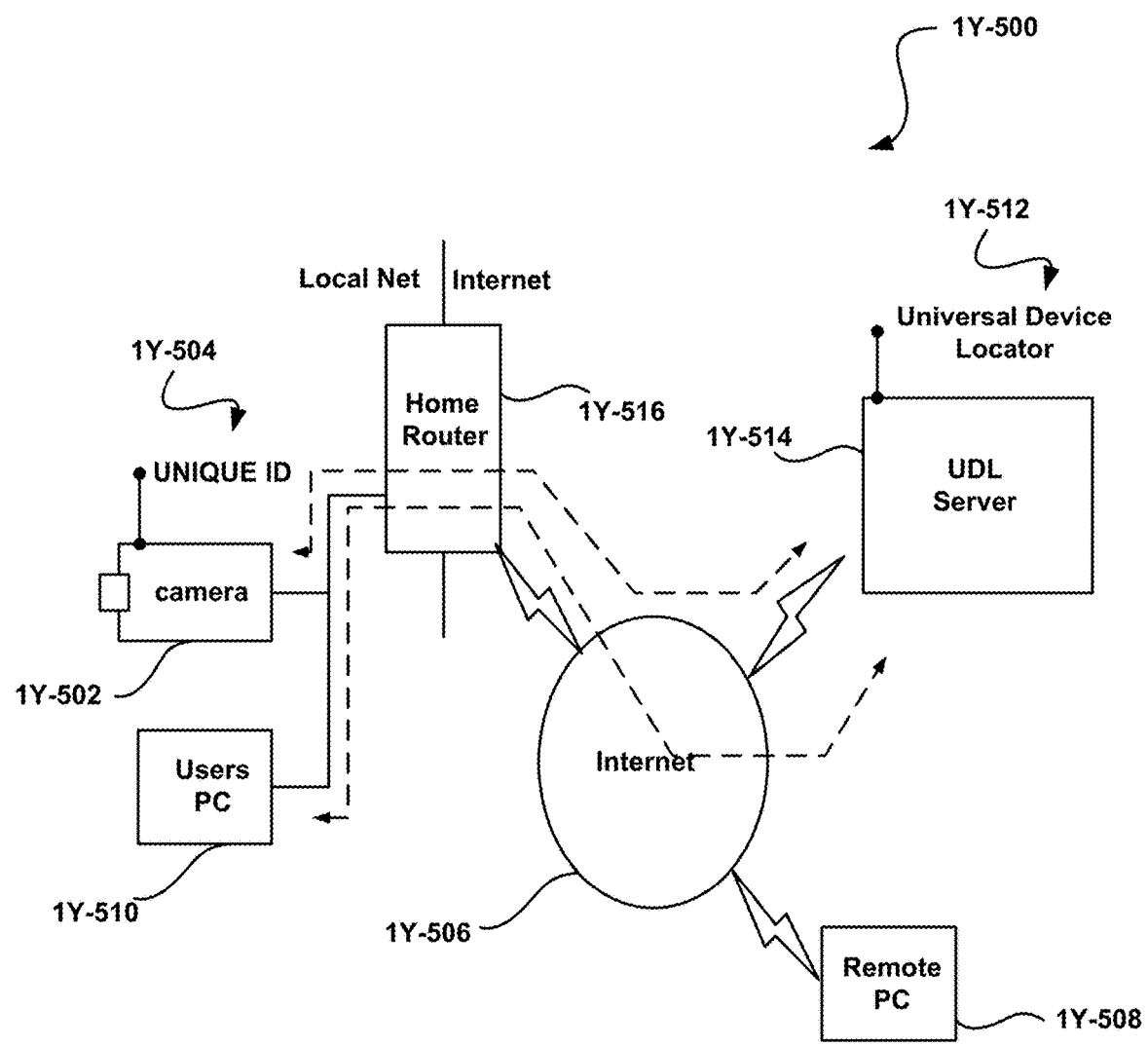

FIG. 6 shows a system for accessing a device on a network and/or automatically configuring a device connected to the network, in accordance with another embodiment.

Figure 7:
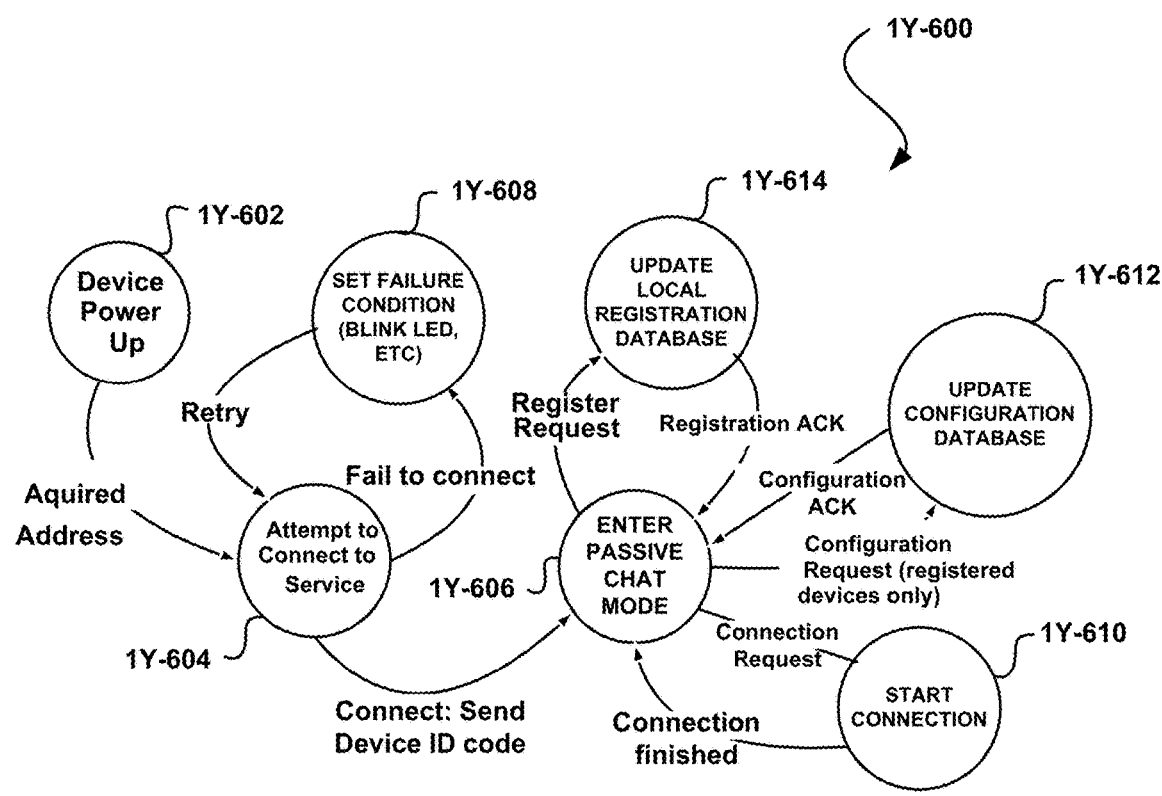

FIG. 7 illustrates an automatic identification method, in accordance with another embodiment.

Figure 8:
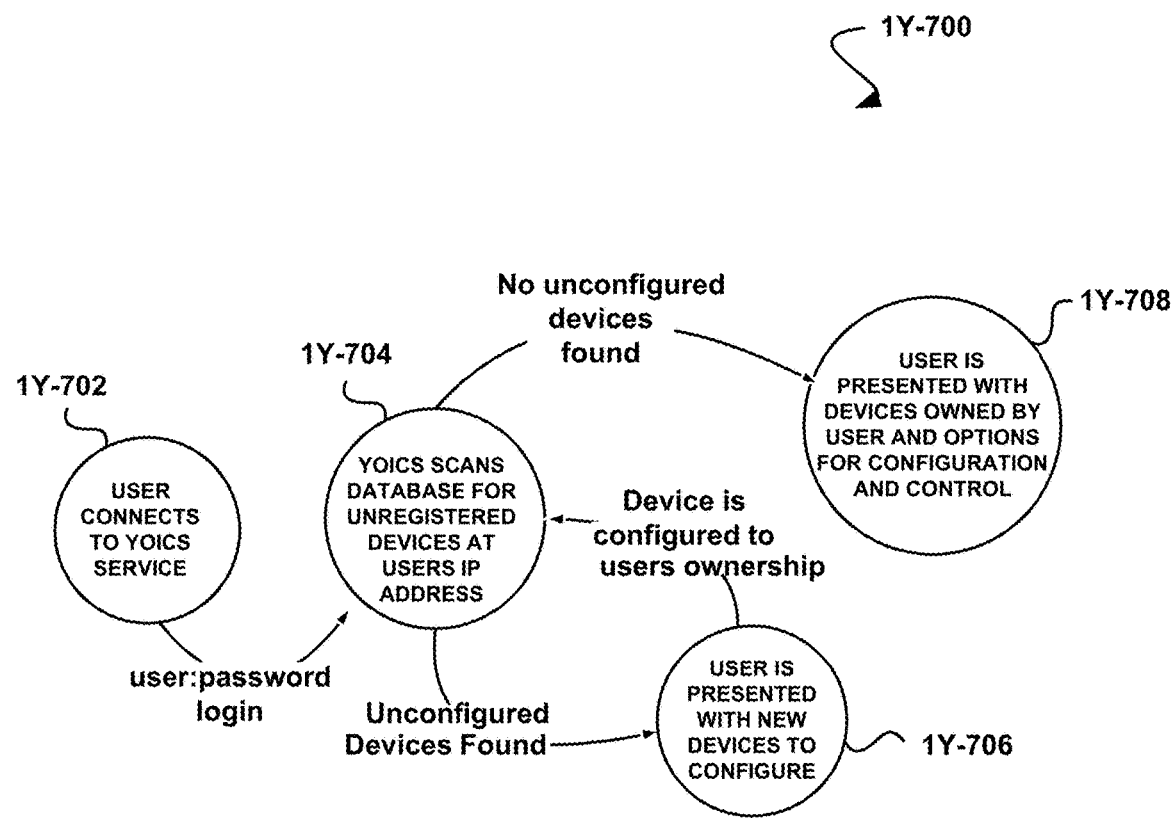

FIG. 8 illustrates an automatic identification method, in accordance with another embodiment.

Figure 9:
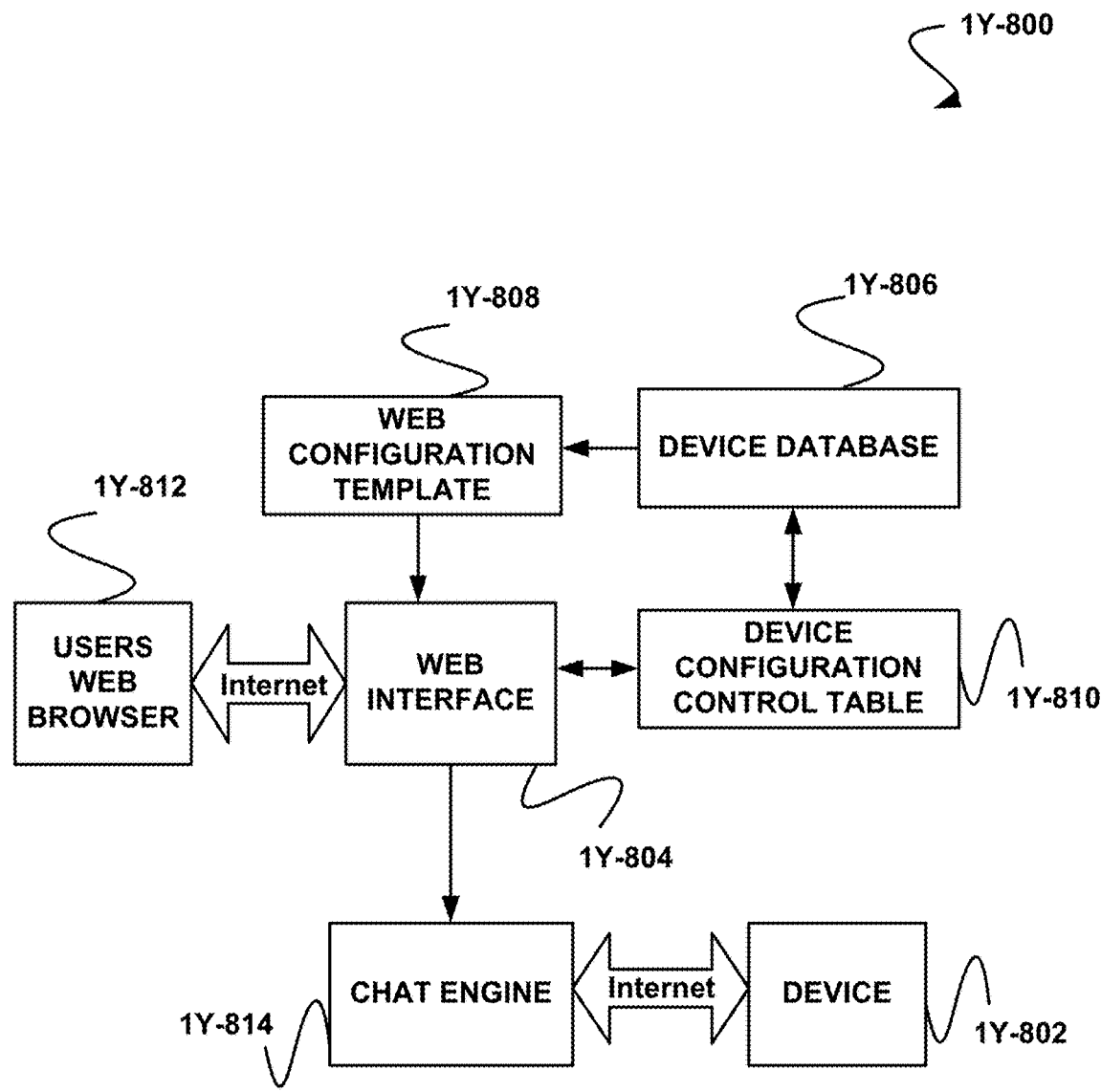

FIG. 9 illustrates an abstracted device configuration, in accordance with another embodiment.

Figure 10:
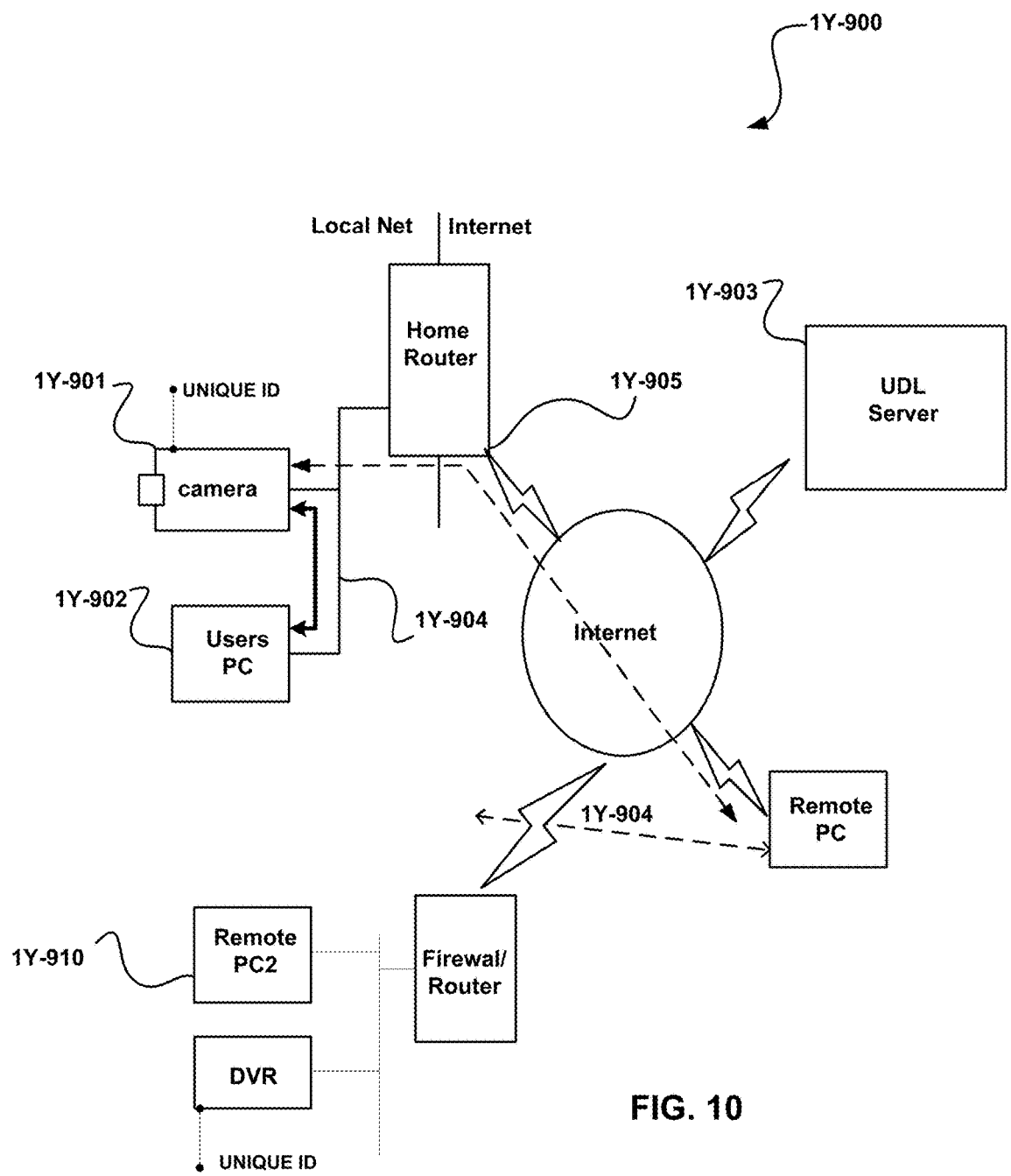

FIG. 10 illustrates a system for establishing a peer-to-peer connection between devices on a network, in accordance with another embodiment.

Figure 11:
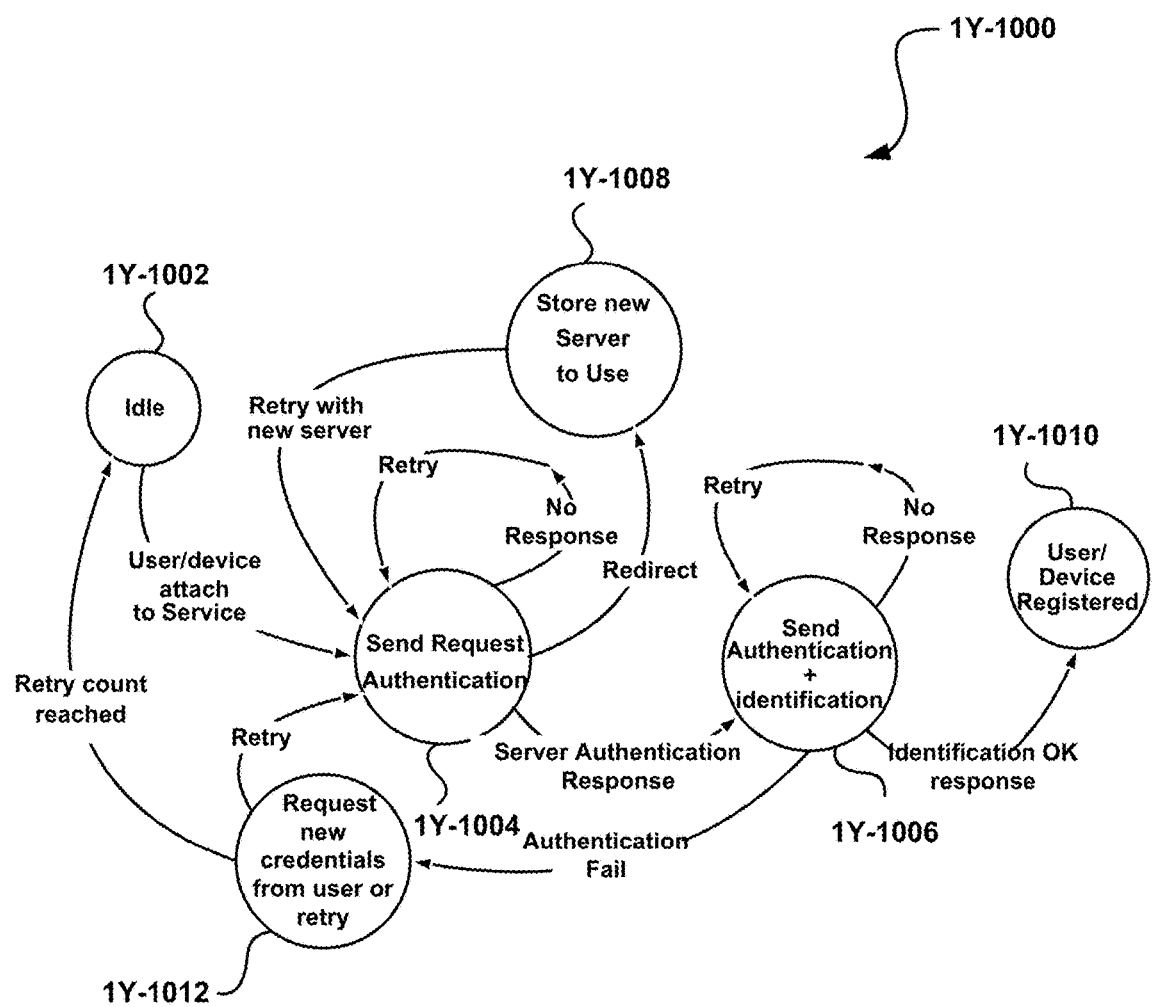

FIG. 11 illustrates a method for registering a device with a service server, in accordance with another embodiment.

Figure 12:
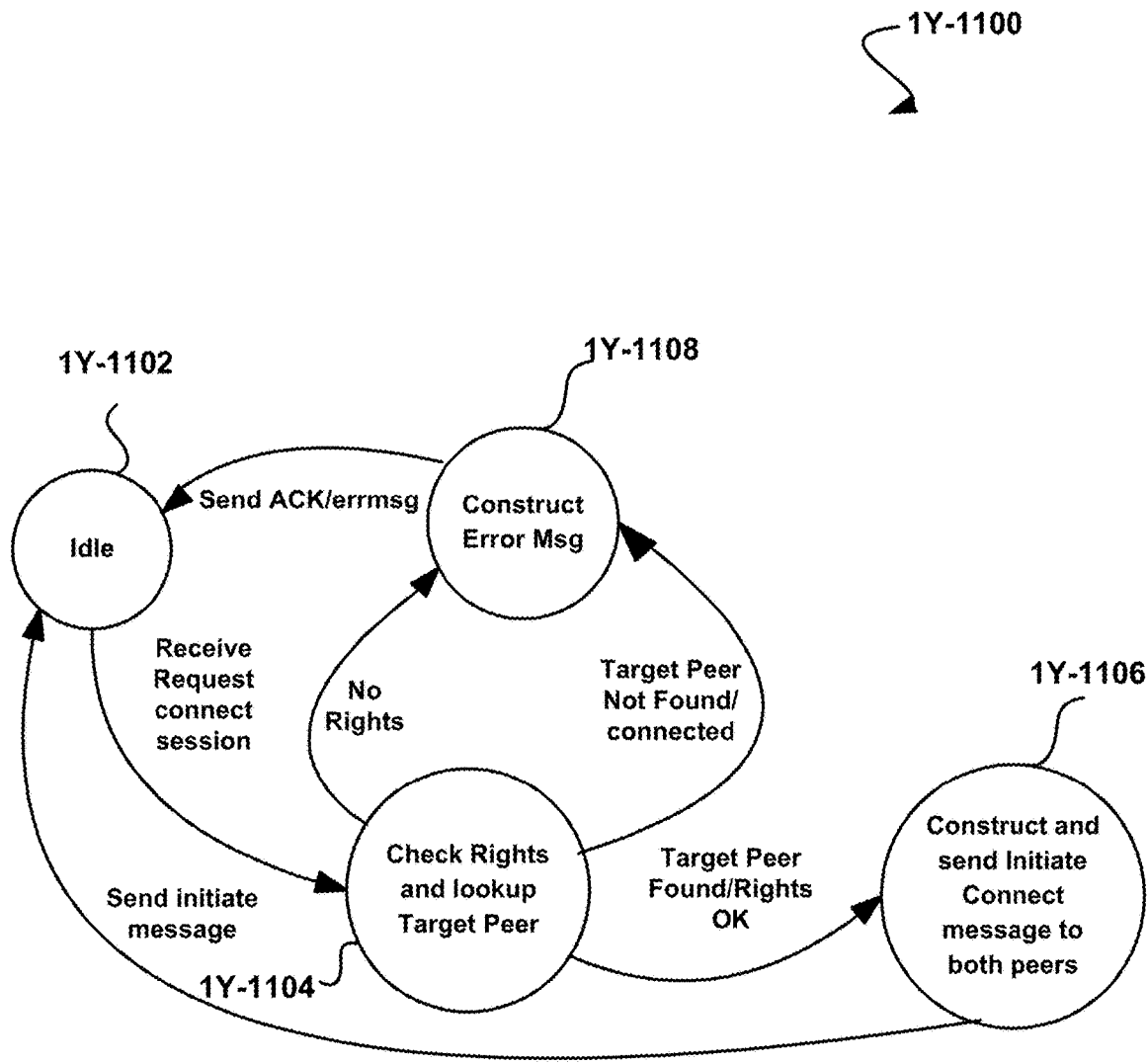

FIG. 12 illustrates a method for allowing a connection between devices using a service server, in accordance with another embodiment.

Figure 13:
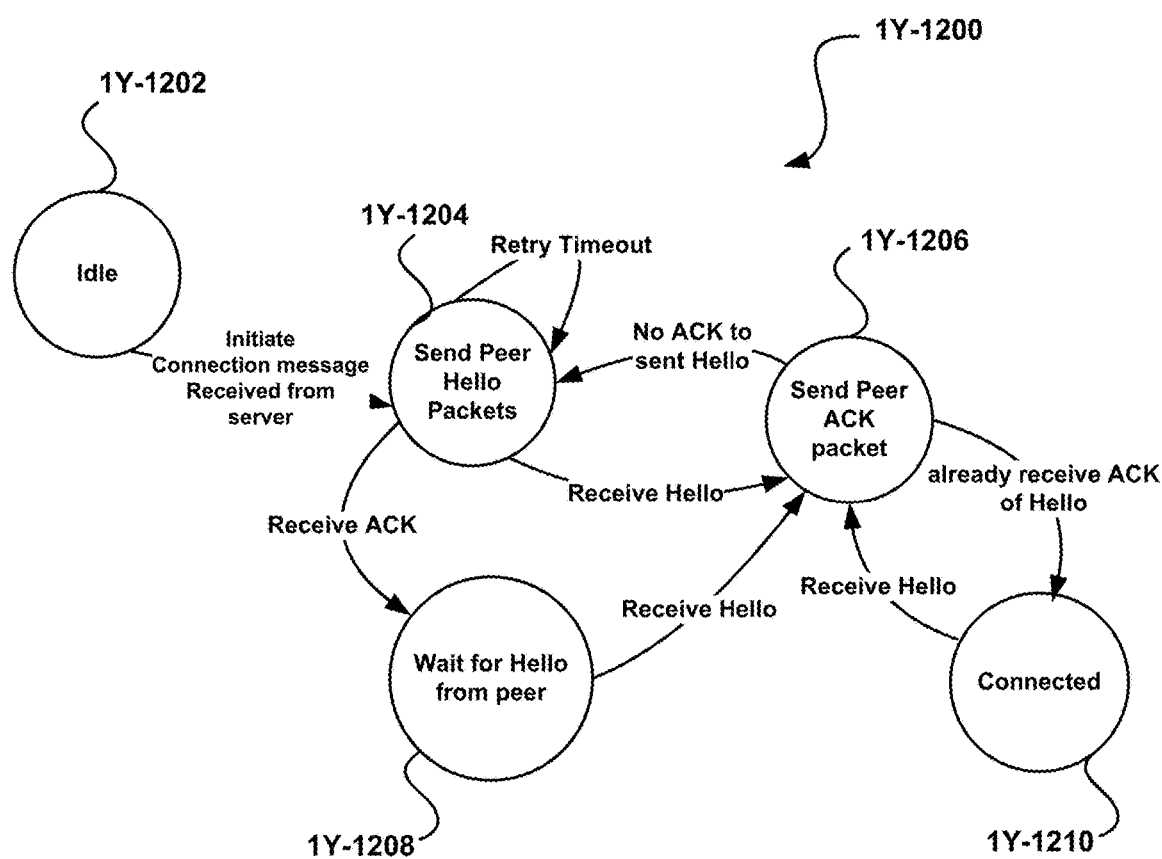

FIG. 13 illustrates a method for generating a session between peer devices, in accordance with another embodiment.

Figure 14:
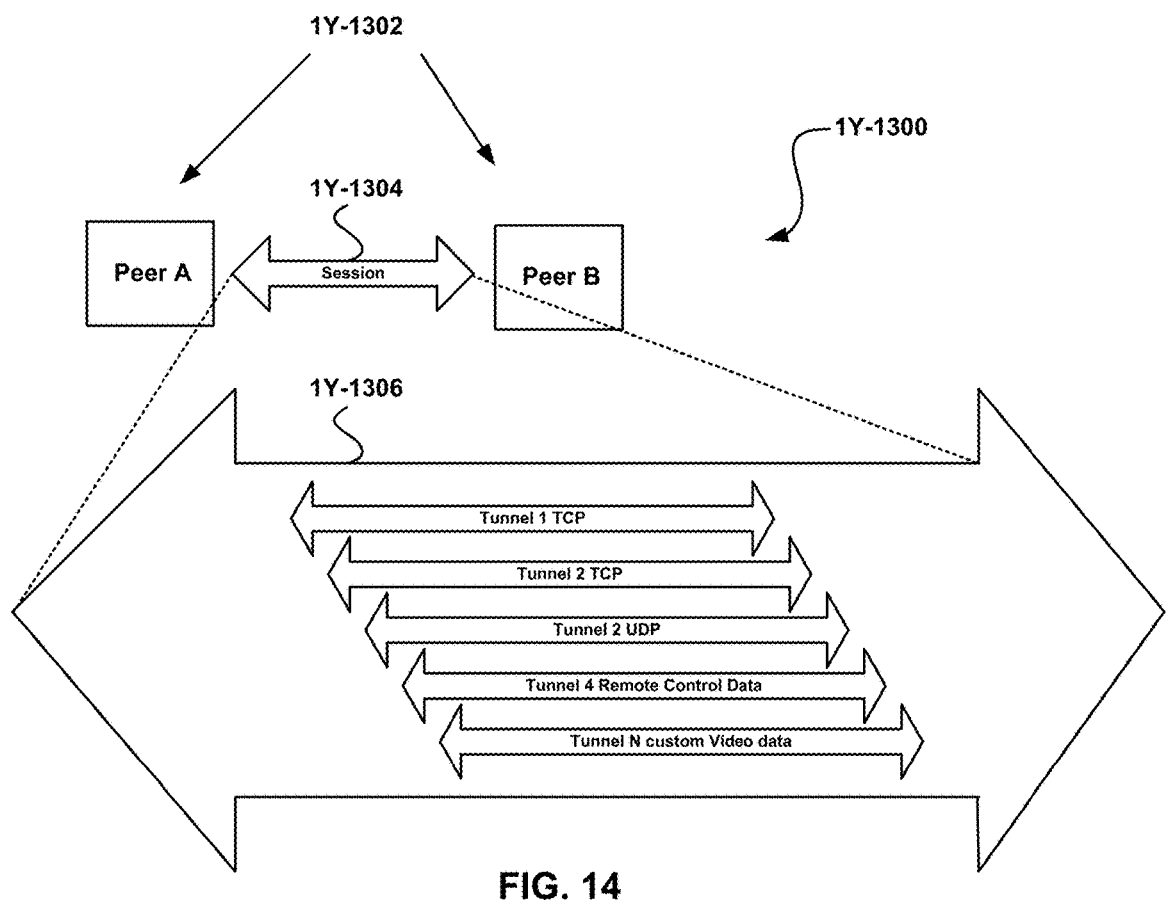

FIG. 14 illustrates a session containing different types of tunnels, in accordance with another embodiment.

Figure 15:
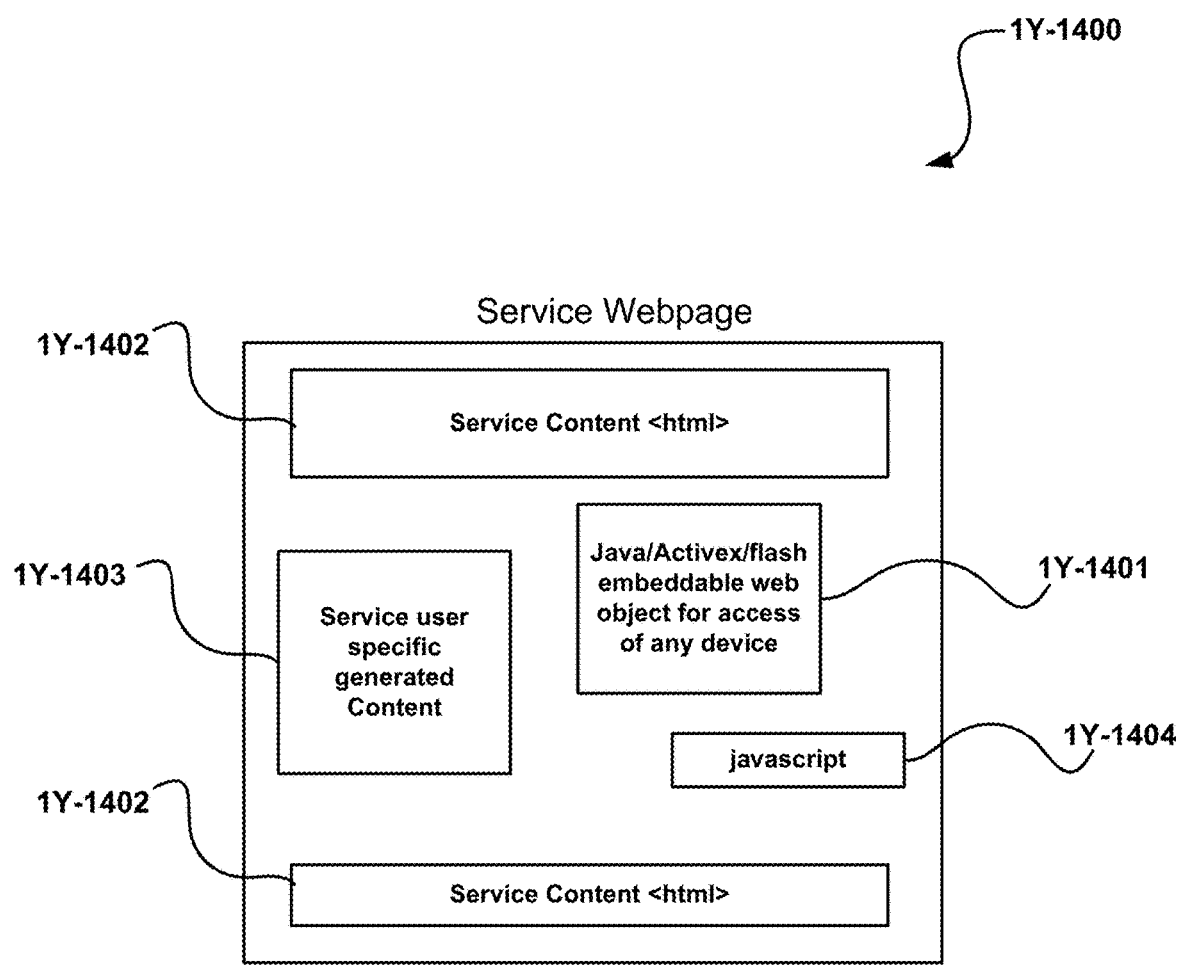

FIG. 15 illustrates a service web page for remotely accessing a device over a network, in accordance with another embodiment.

Figure 16:
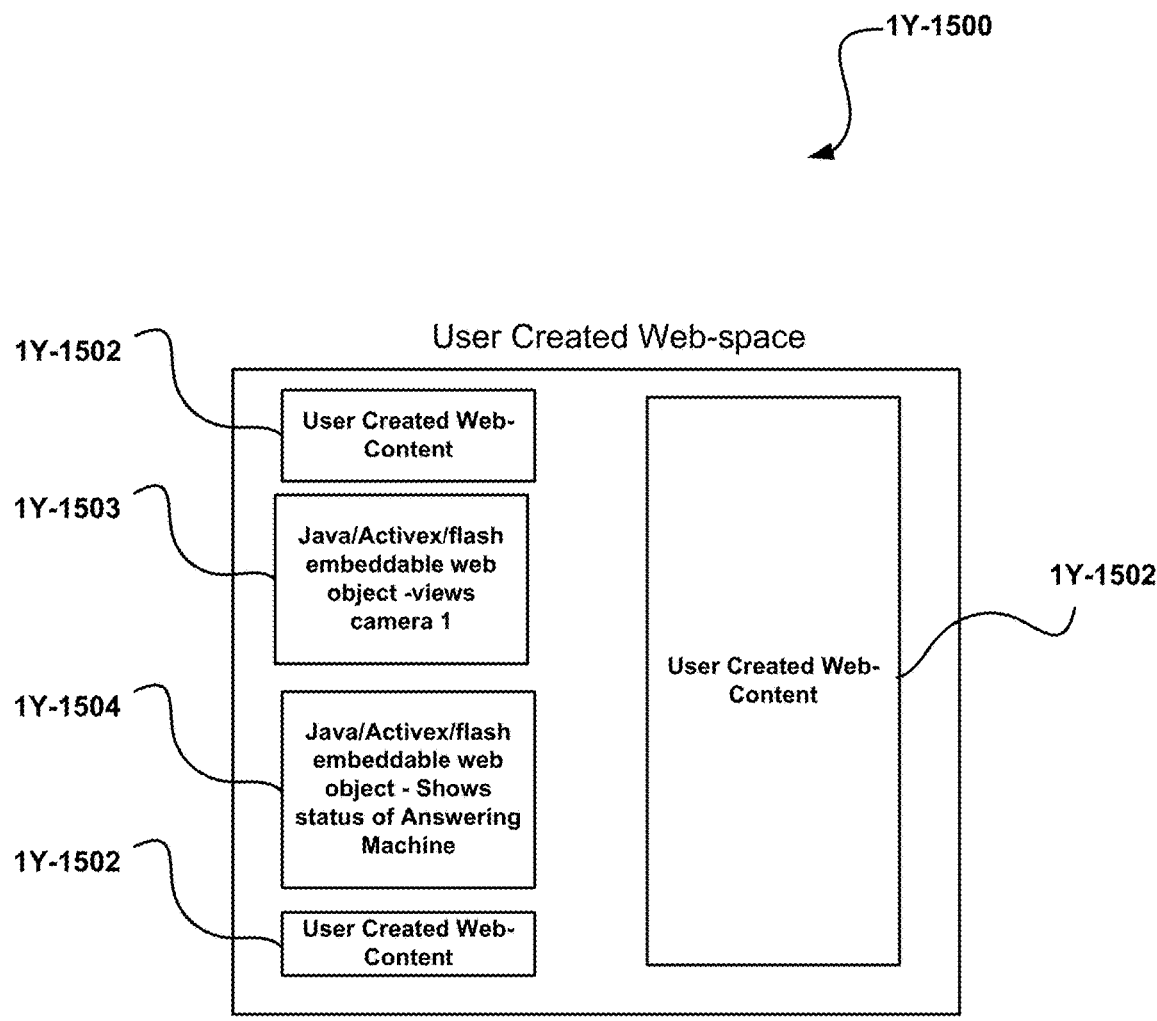

FIG. 16 illustrates a user-created web space for remotely accessing a device over a network, in accordance with another embodiment.

Figure 17:
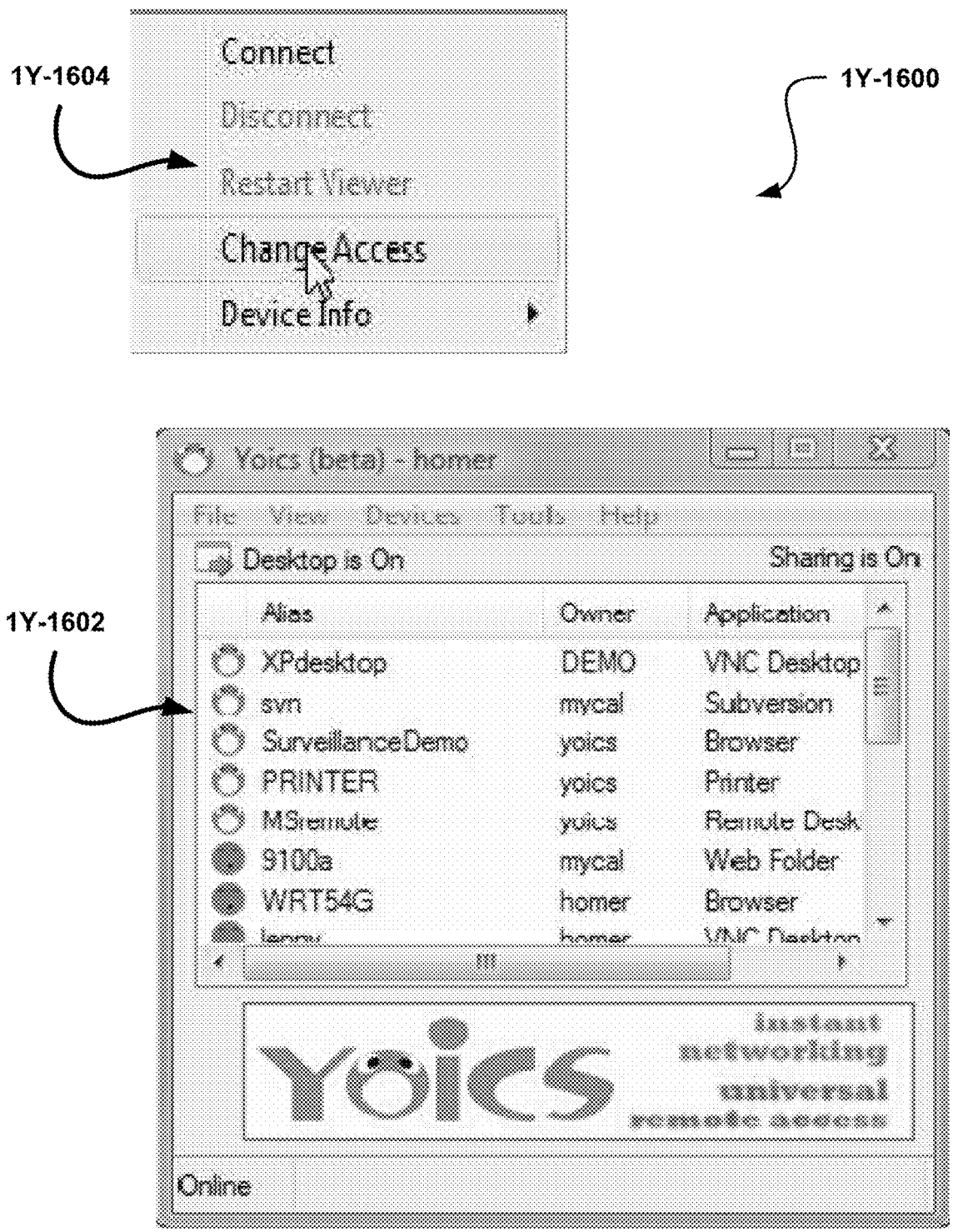

FIG. 17 illustrates a web space for remotely accessing a device over a network, in accordance with another embodiment.

Figure 18:
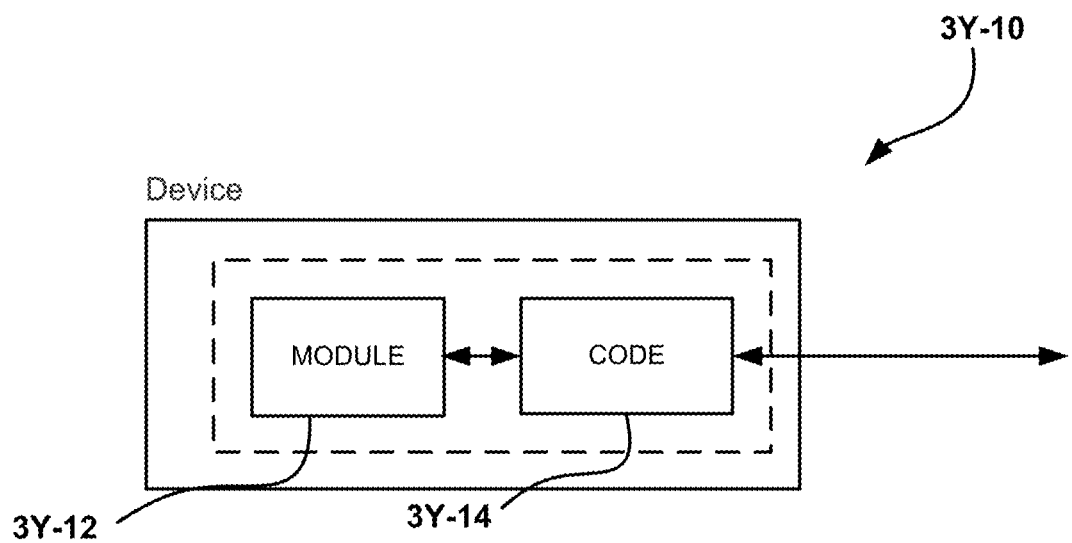

FIG. 18 shows a system consisting of a virtual device in accordance with one embodiment.

Figure 19:
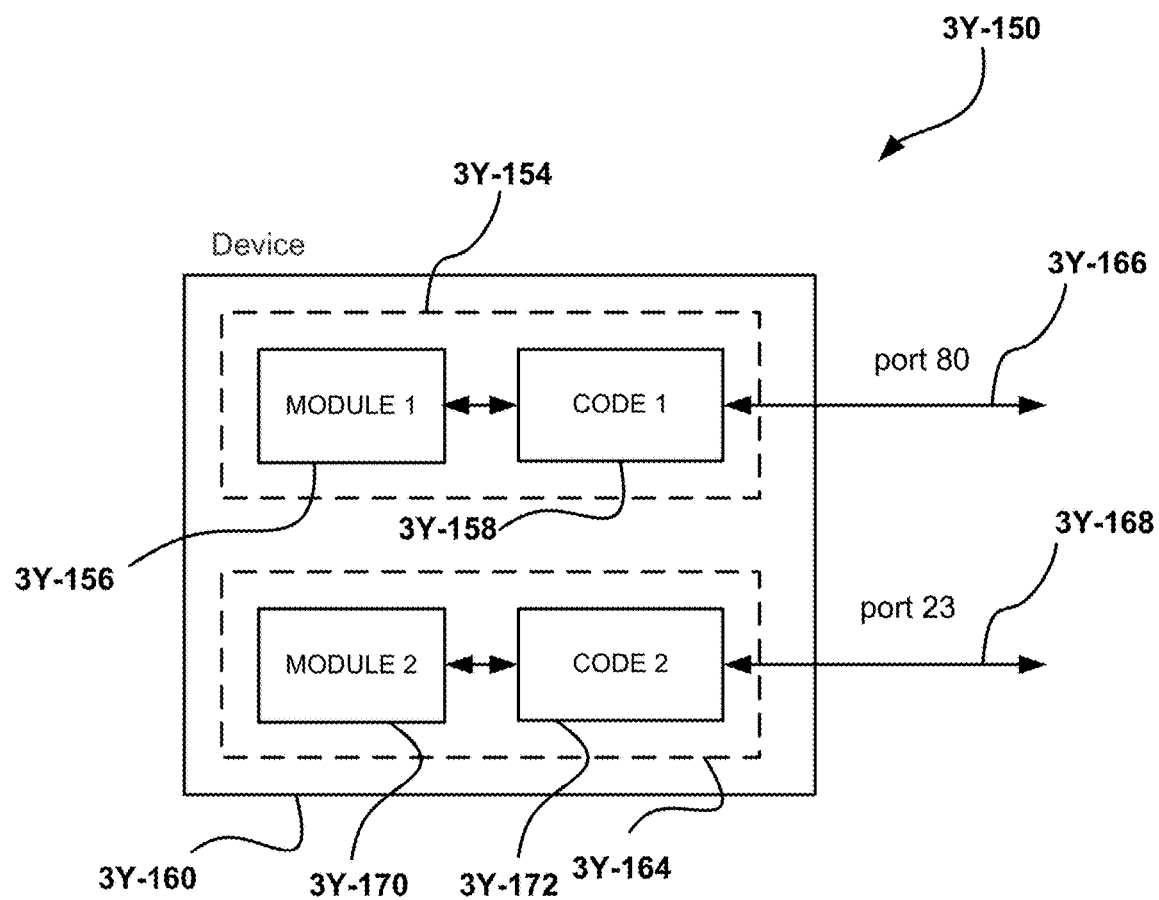

FIG. 19 shows a system comprising a plurality of virtual devices, in accordance with one embodiment.

Figure 20:
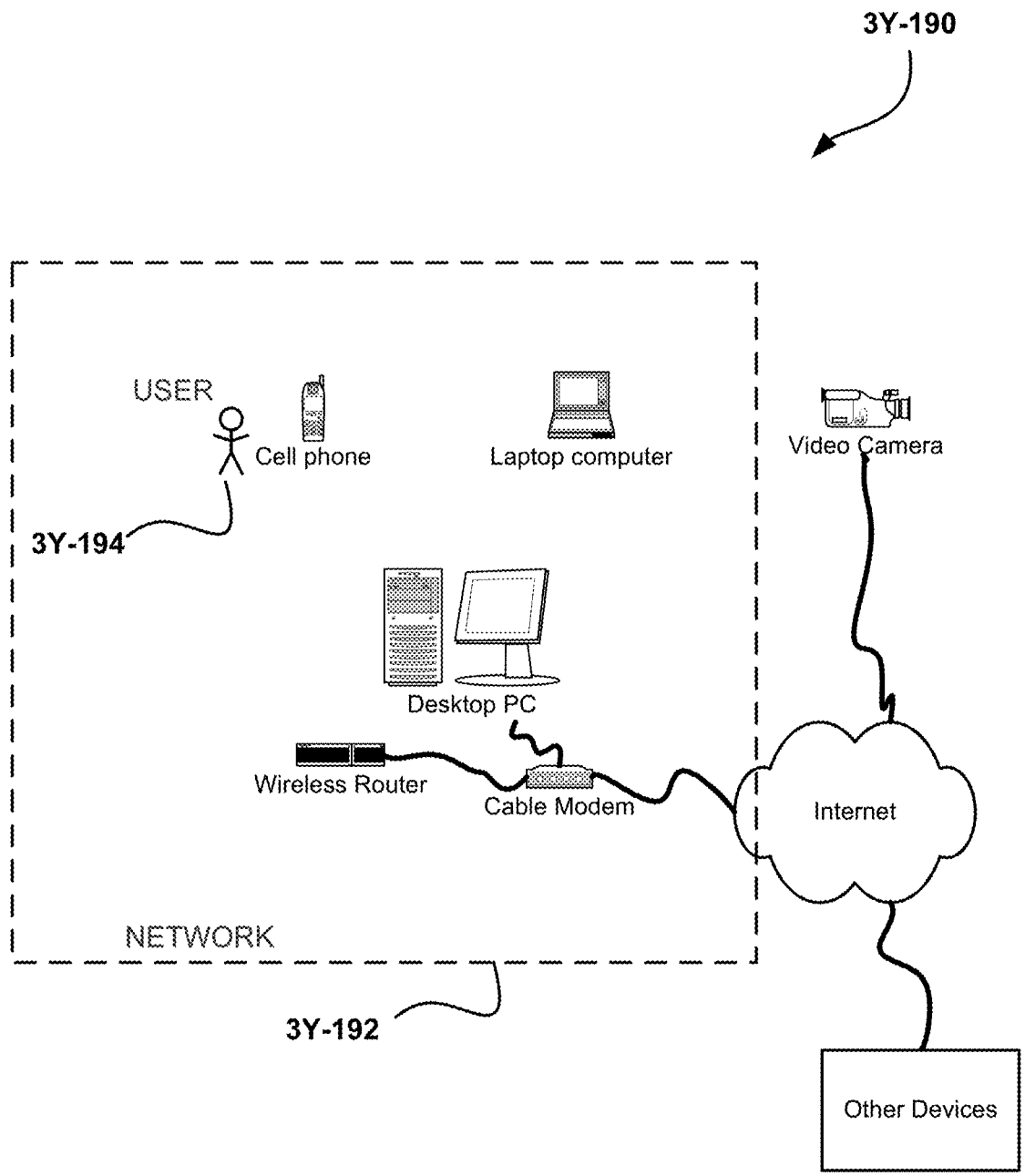

FIG. 20 shows a system comprising a plurality of consumer devices, in accordance with one embodiment.

Figure 21:
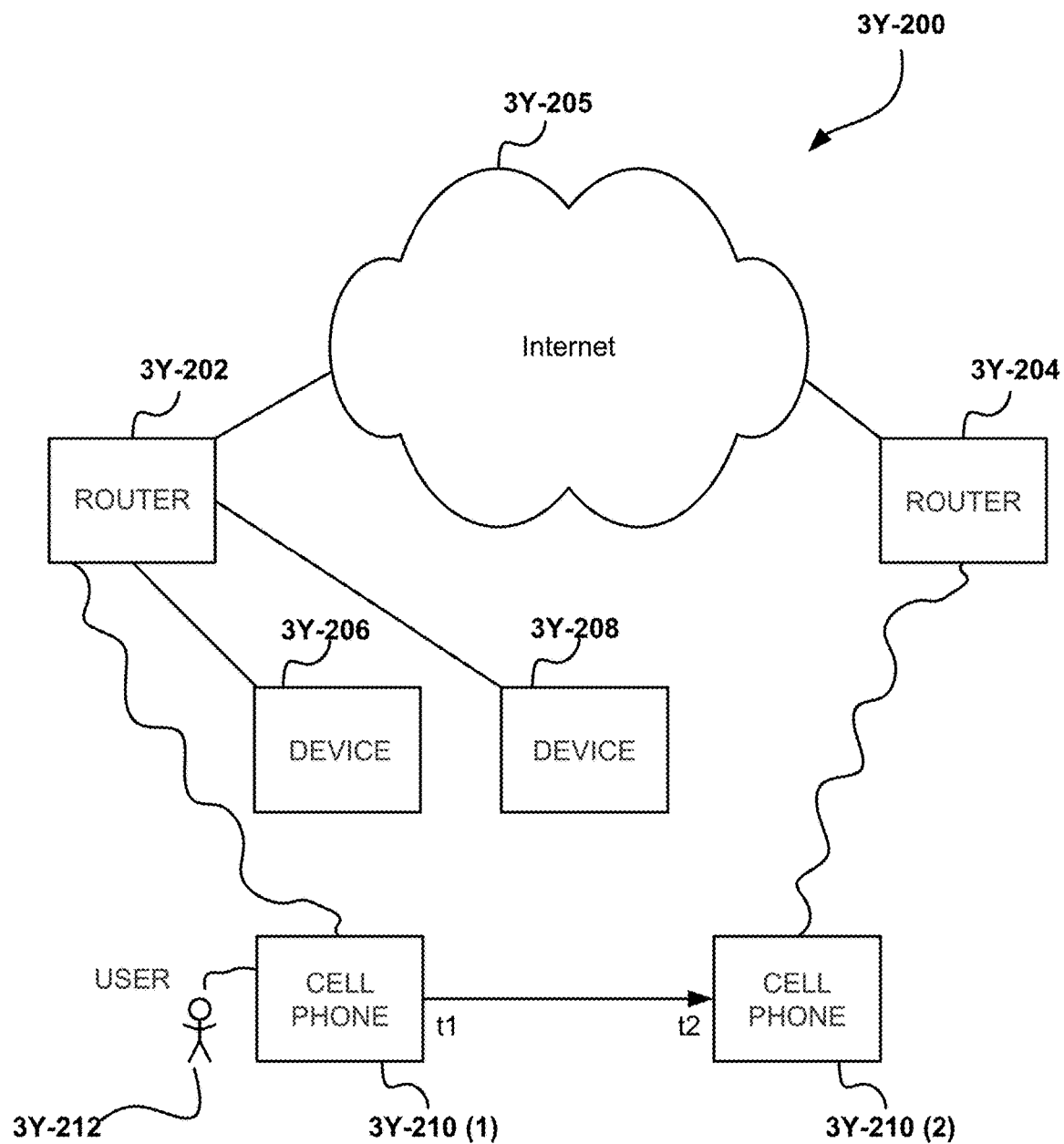

FIG. 21 shows a network system comprising a personal published channel, in accordance with one embodiment.

Figure 22:
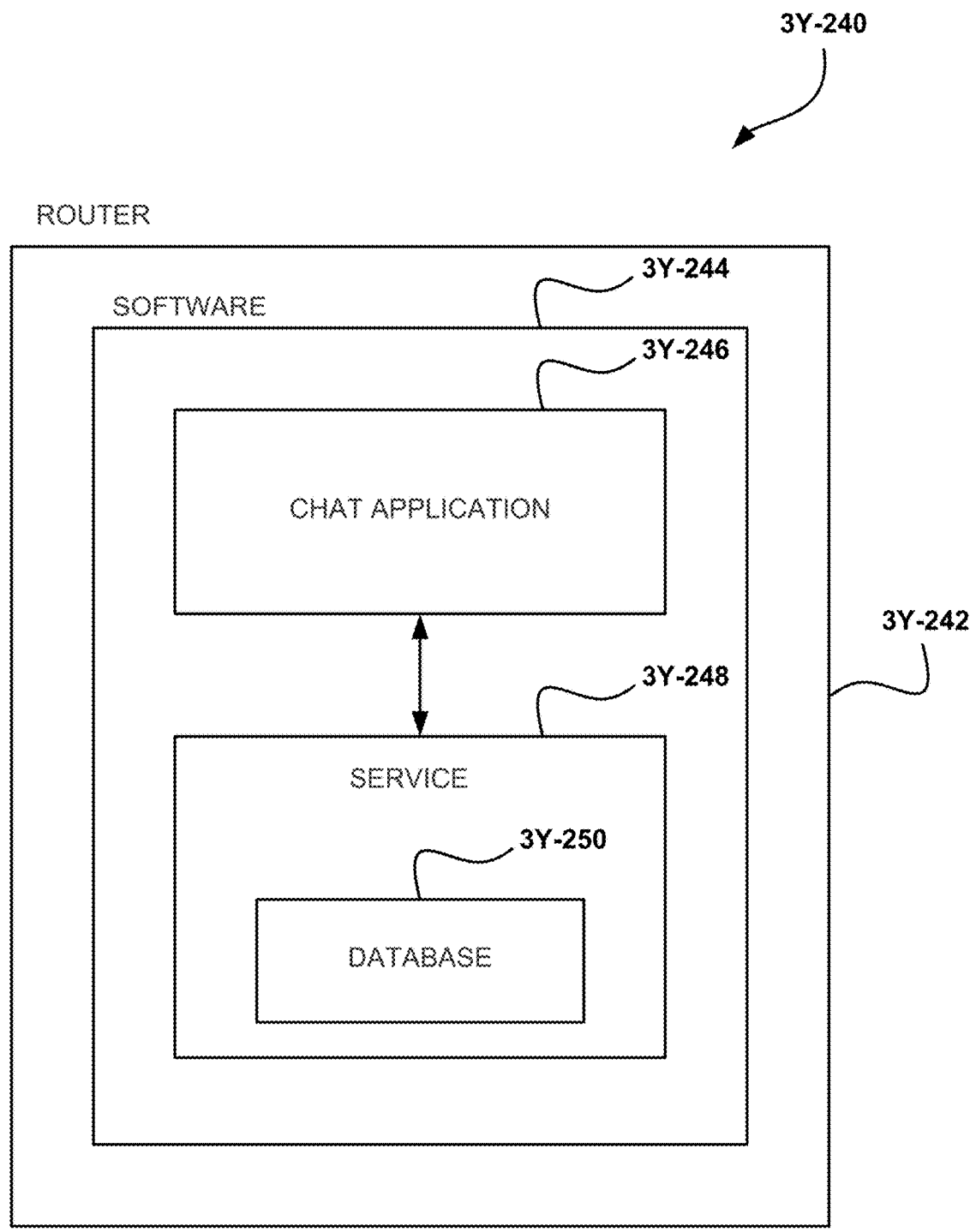

FIG. 22 shows a system containing software for establishing a personal published channel, in accordance with one embodiment.

Figure 23:
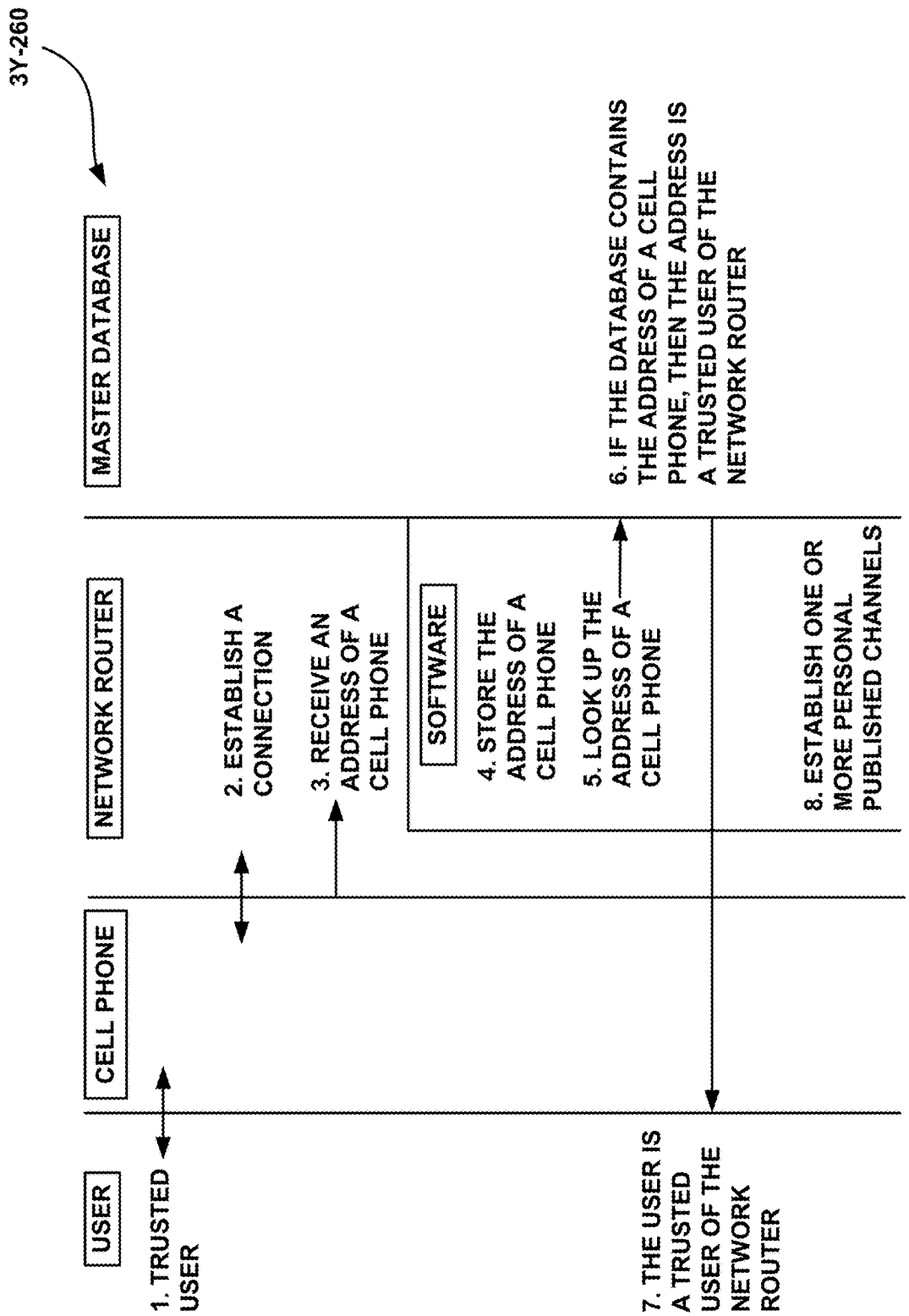
Figure 24:
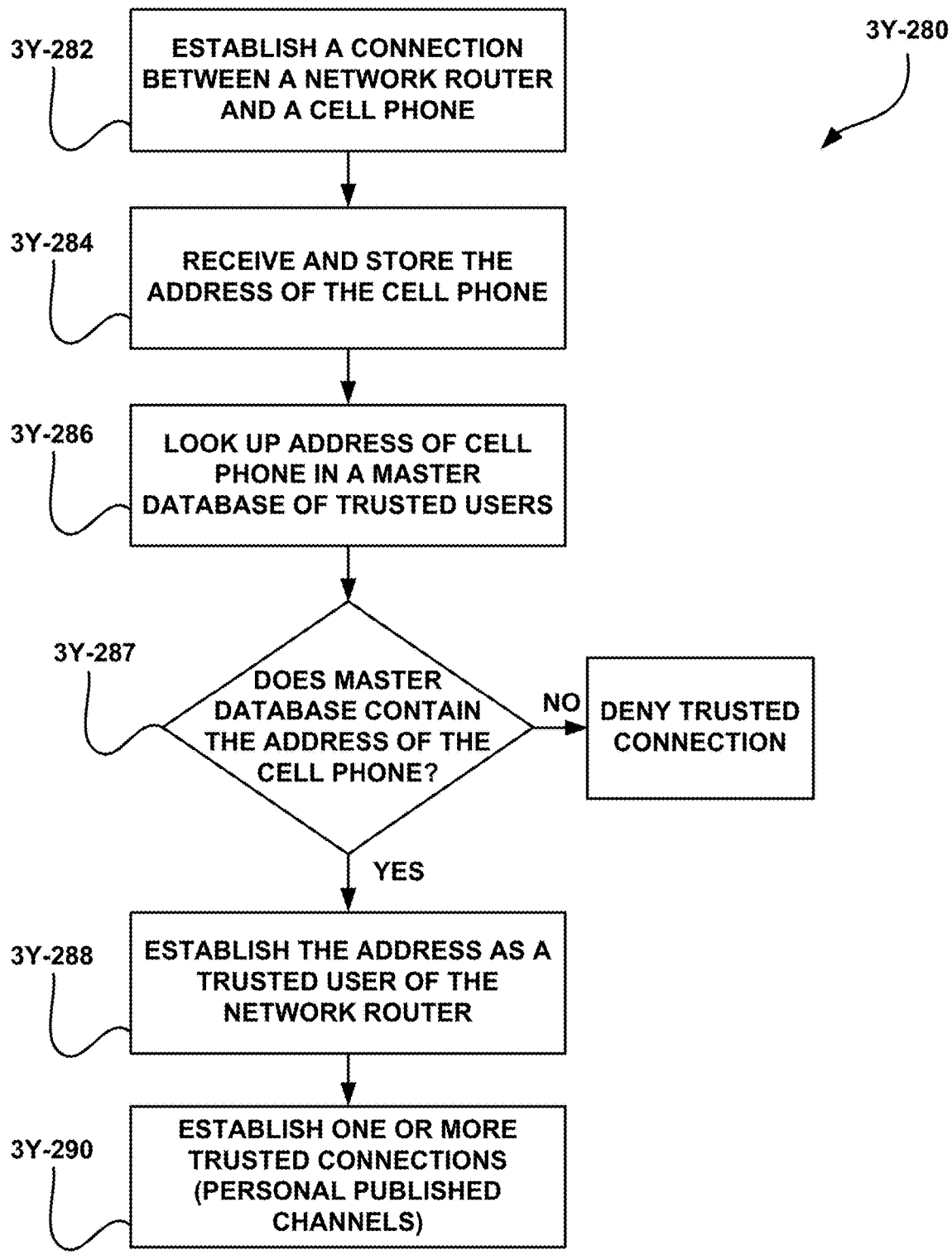

FIG. 23 shows a method for establishing a personal published channel, in accordance with one embodiment, FIG. 24 shows a method for establishing a personal published channel, in accordance with one embodiment.

Figure 25:
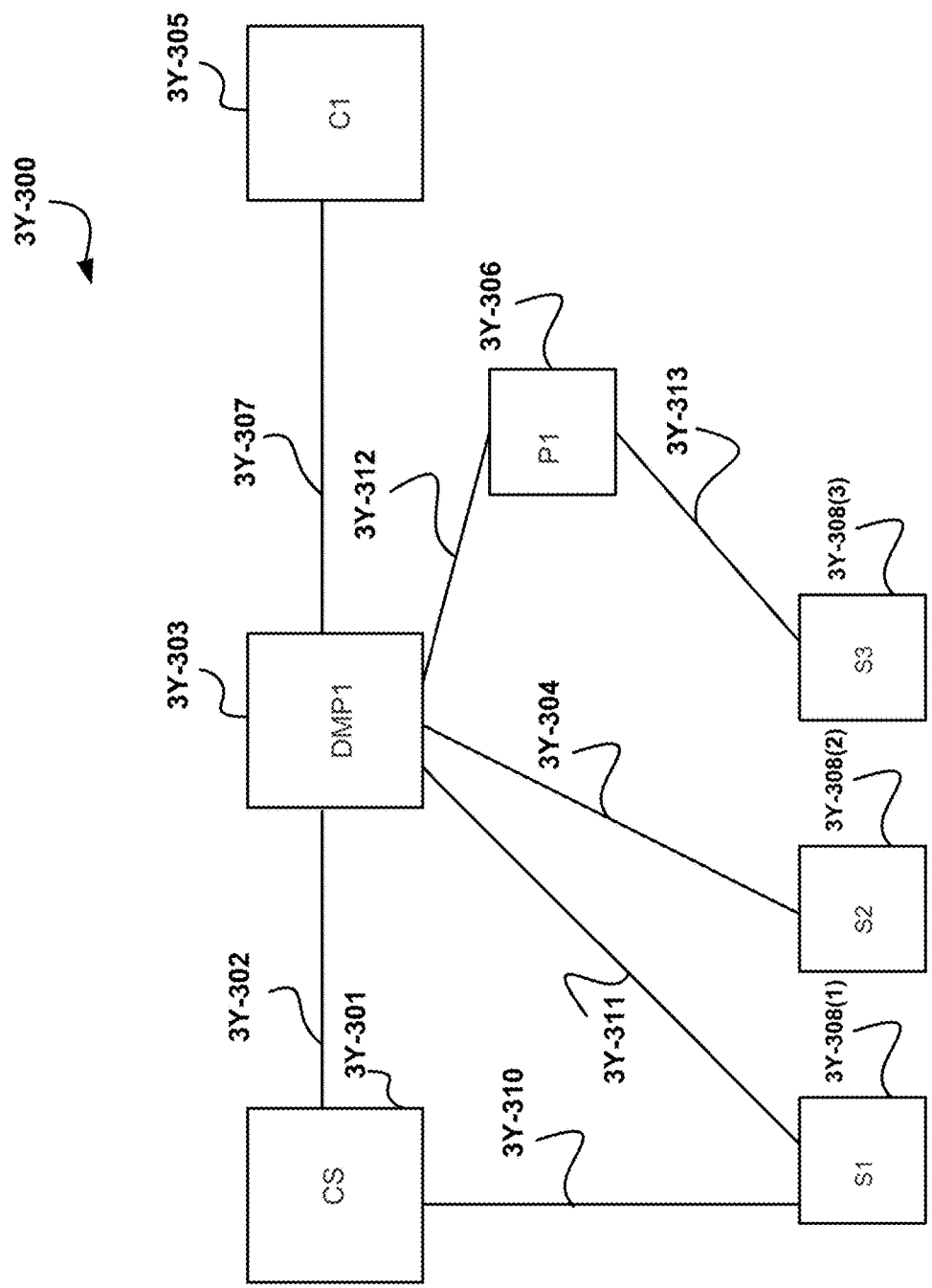

FIG. 25 shows a system comprising a mapping proxy, in accordance with one embodiment.

Figure 26:
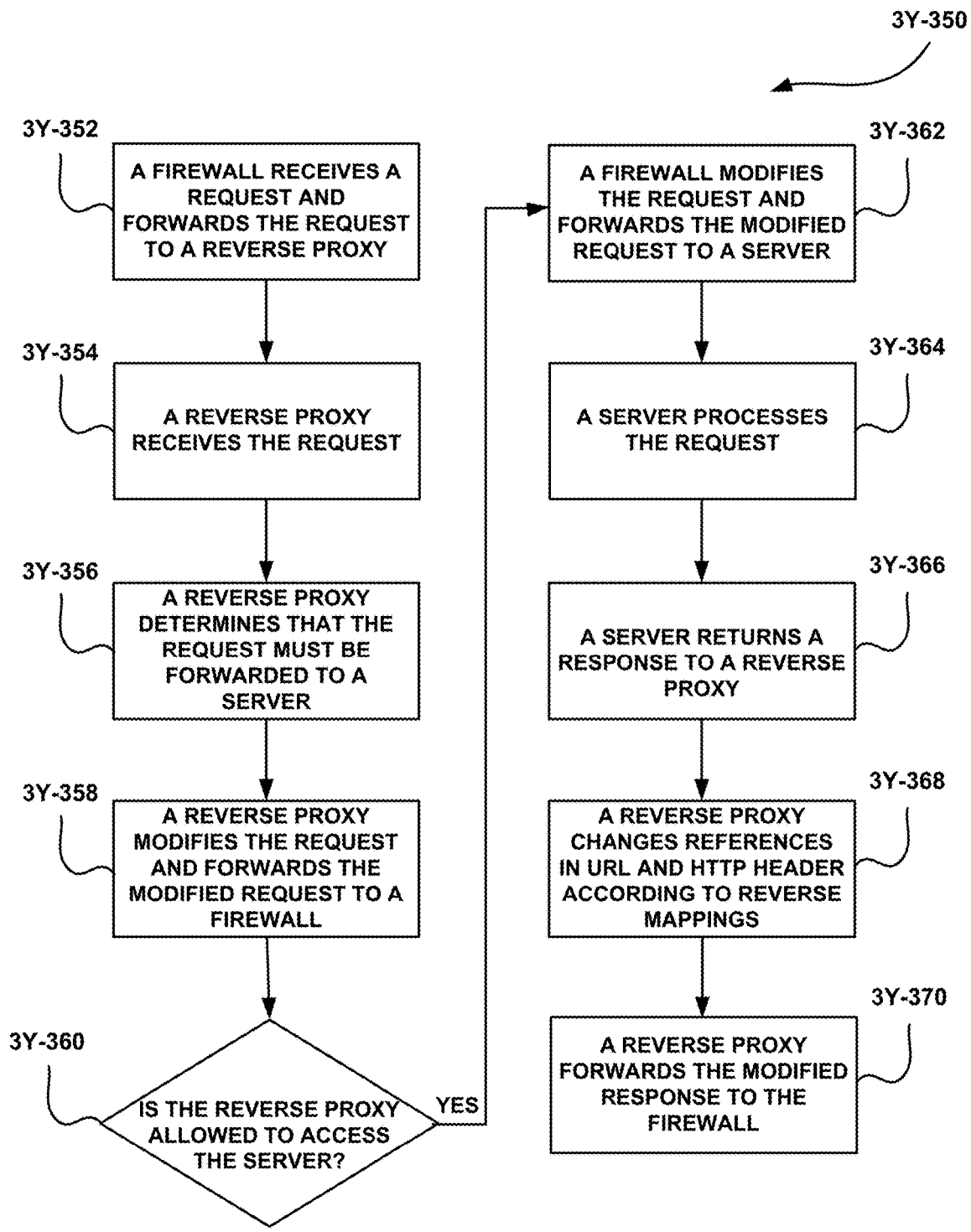

FIG. 26 shows a method for establishing a mapping proxy, in accordance with one embodiment.

Figure 27:
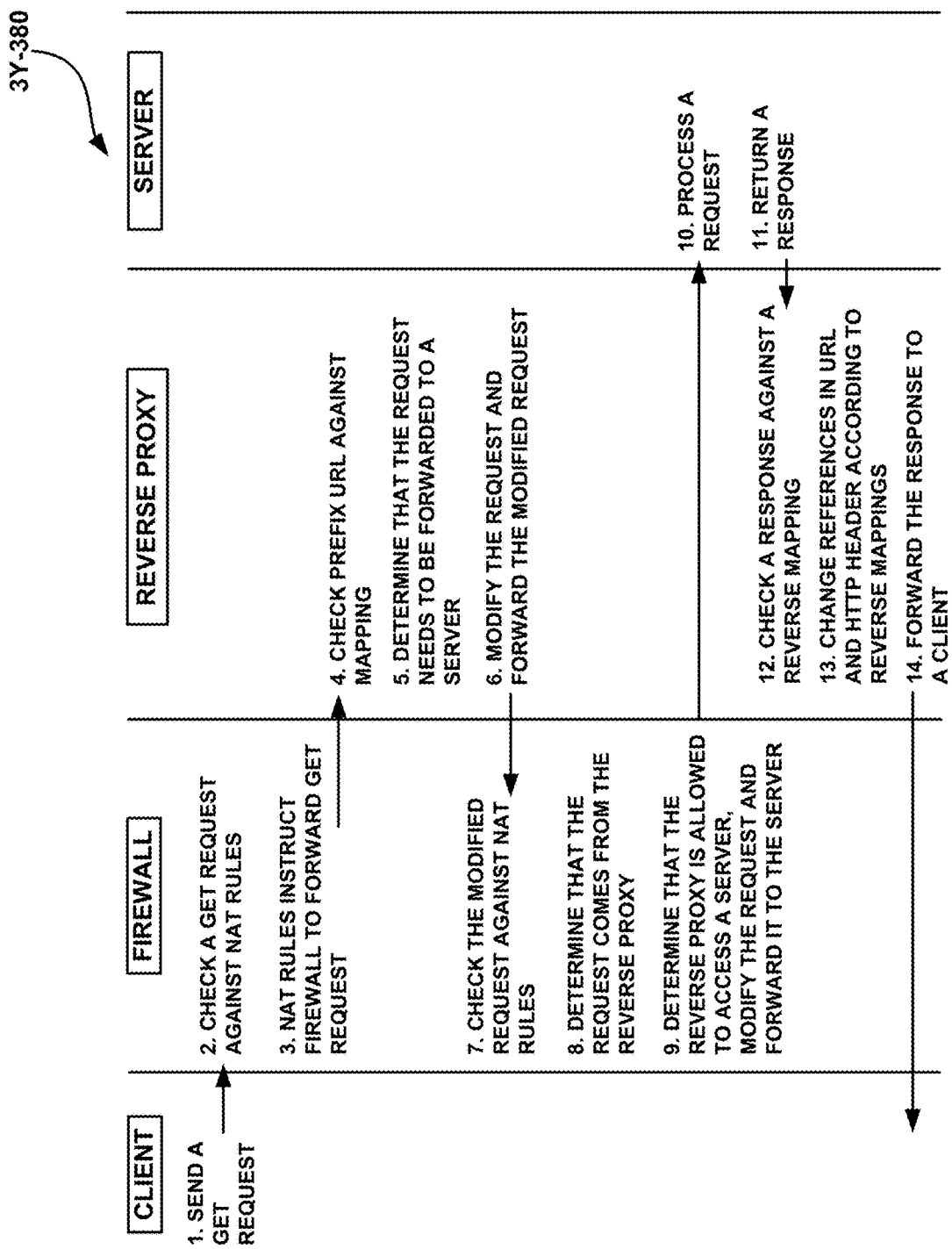

FIG. 27 shows a method for establishing a mapping proxy, in accordance with one embodiment.

Figure 28:
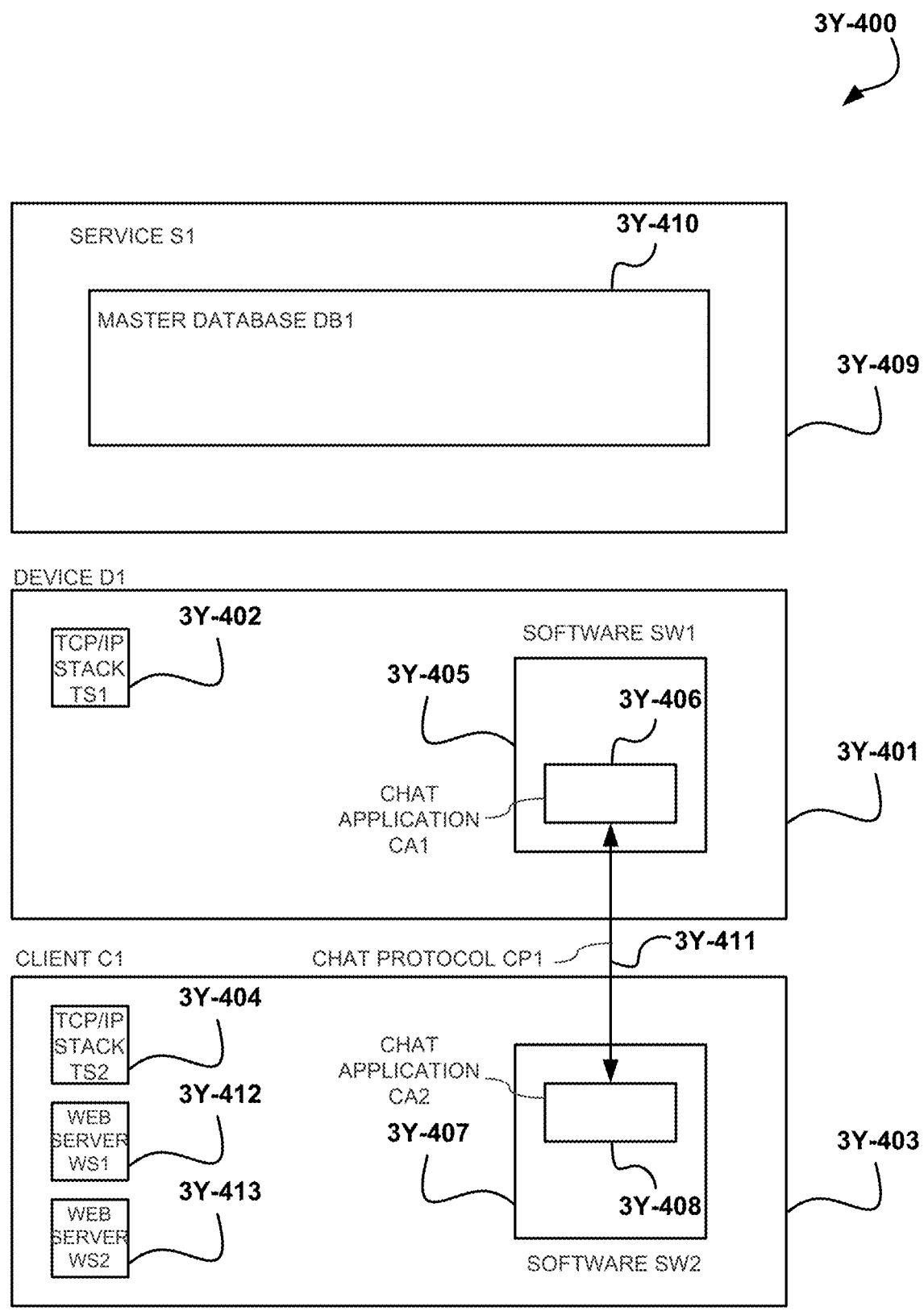

FIG. 28 shows a computer system comprising a client and a device which include software for establishing a multiple virtual proxy, in accordance with one embodiment.

Figure 29:
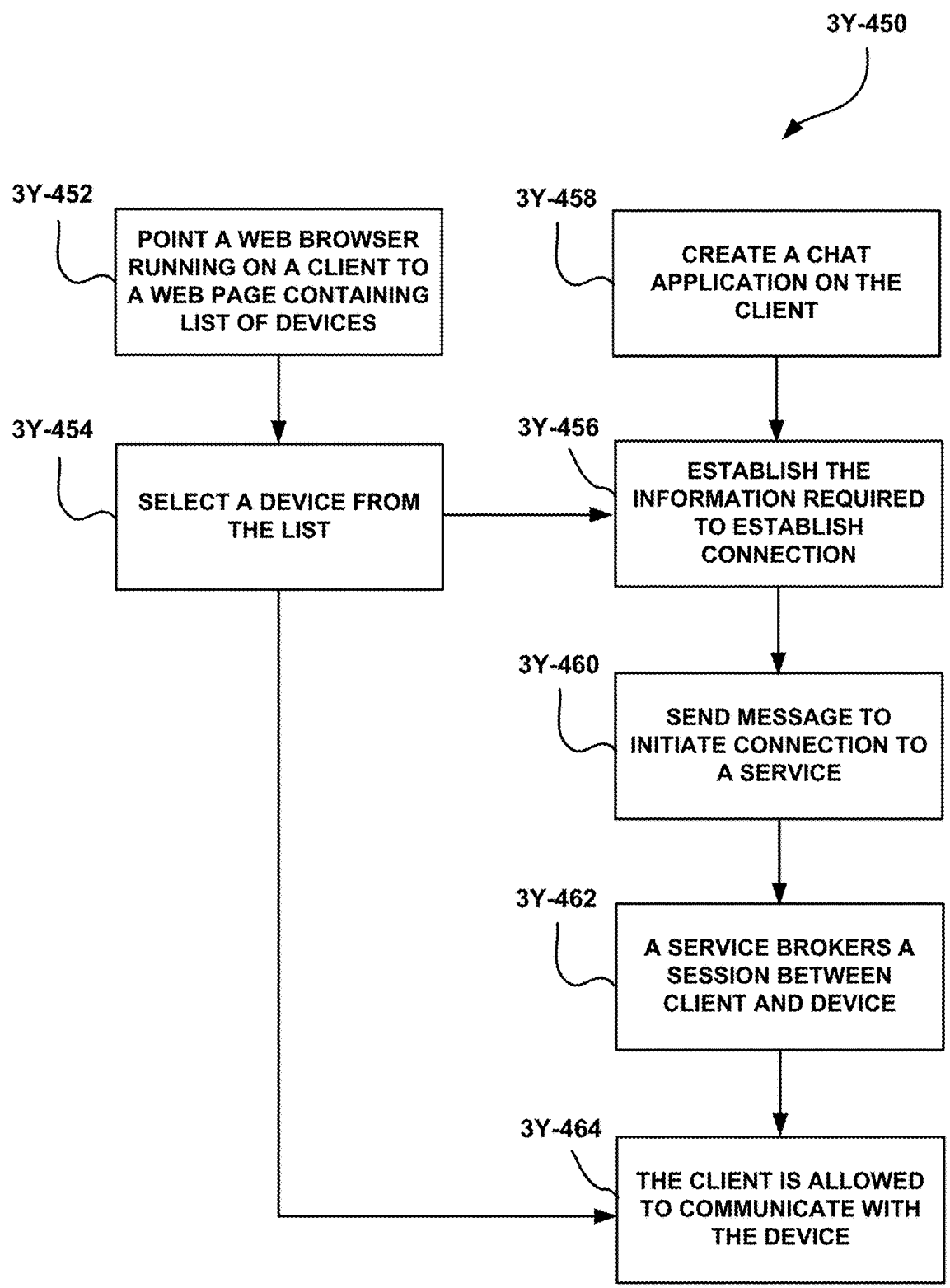
Figure 30:
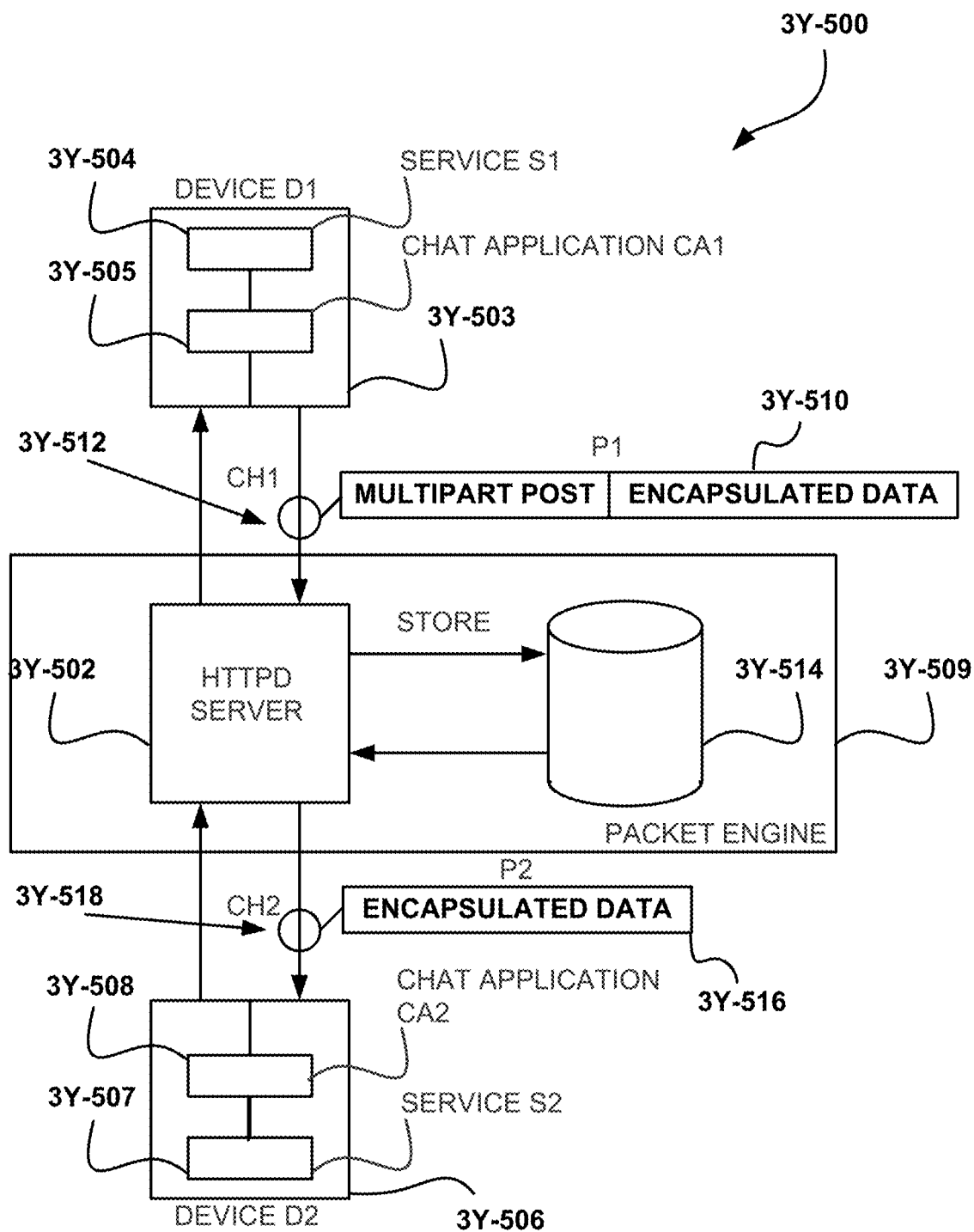

FIG. 29 shows a method for establishing a multiple virtual proxy, in accordance with one embodiment, FIG. 30 shows a computer system including an HTTP packet engine, in accordance with one embodiment.

Figure 31:
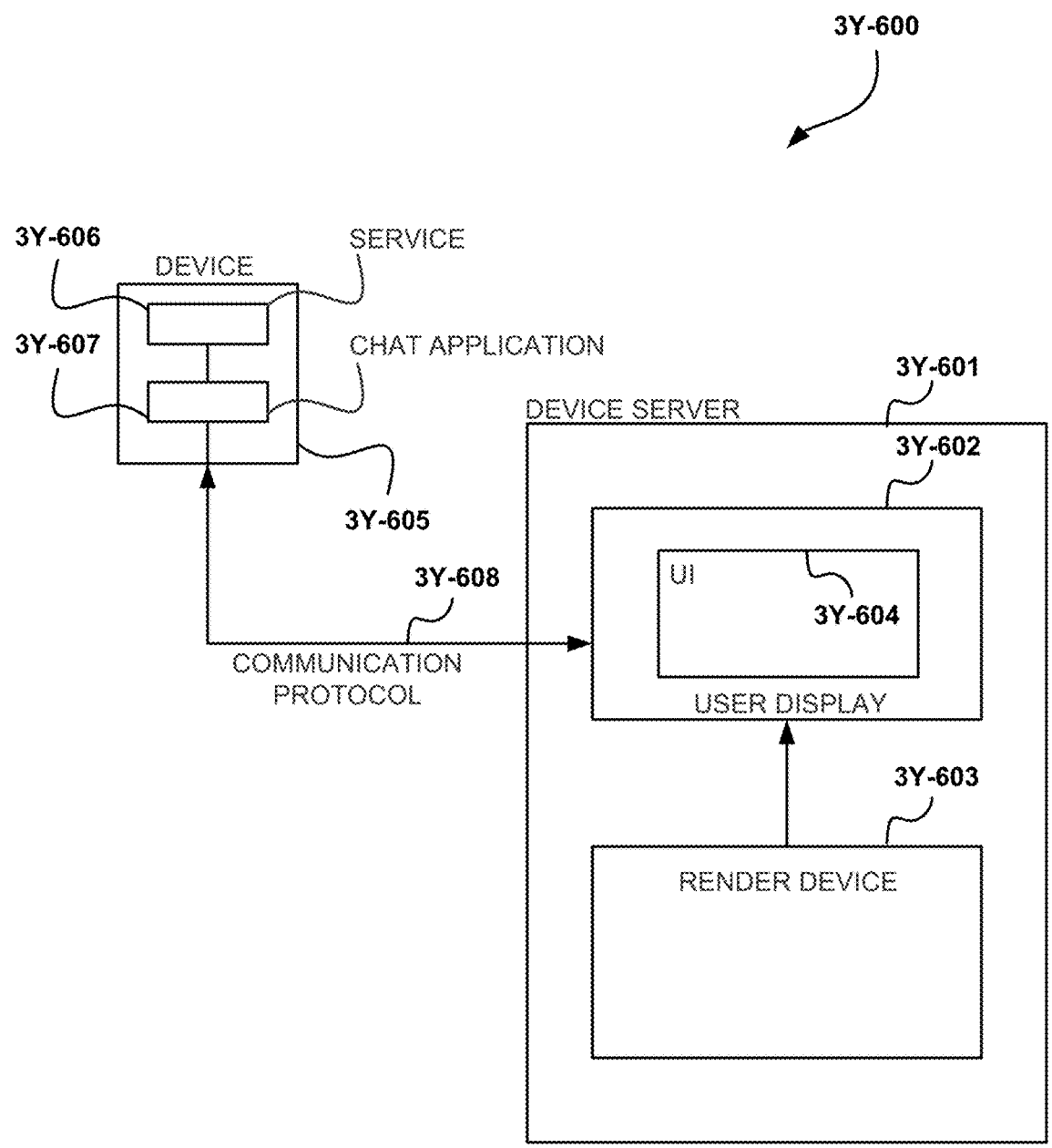

FIG. 31 shows a system comprising an abstract user interface to communicate to a device, in accordance with one embodiment.

FIG. 32 shows the content of a computer program comprising a master database, in accordance with one embodiment.

FIG. 33 shows the contents of a computer program containing device information, in accordance with one embodiment.

Figure 34:
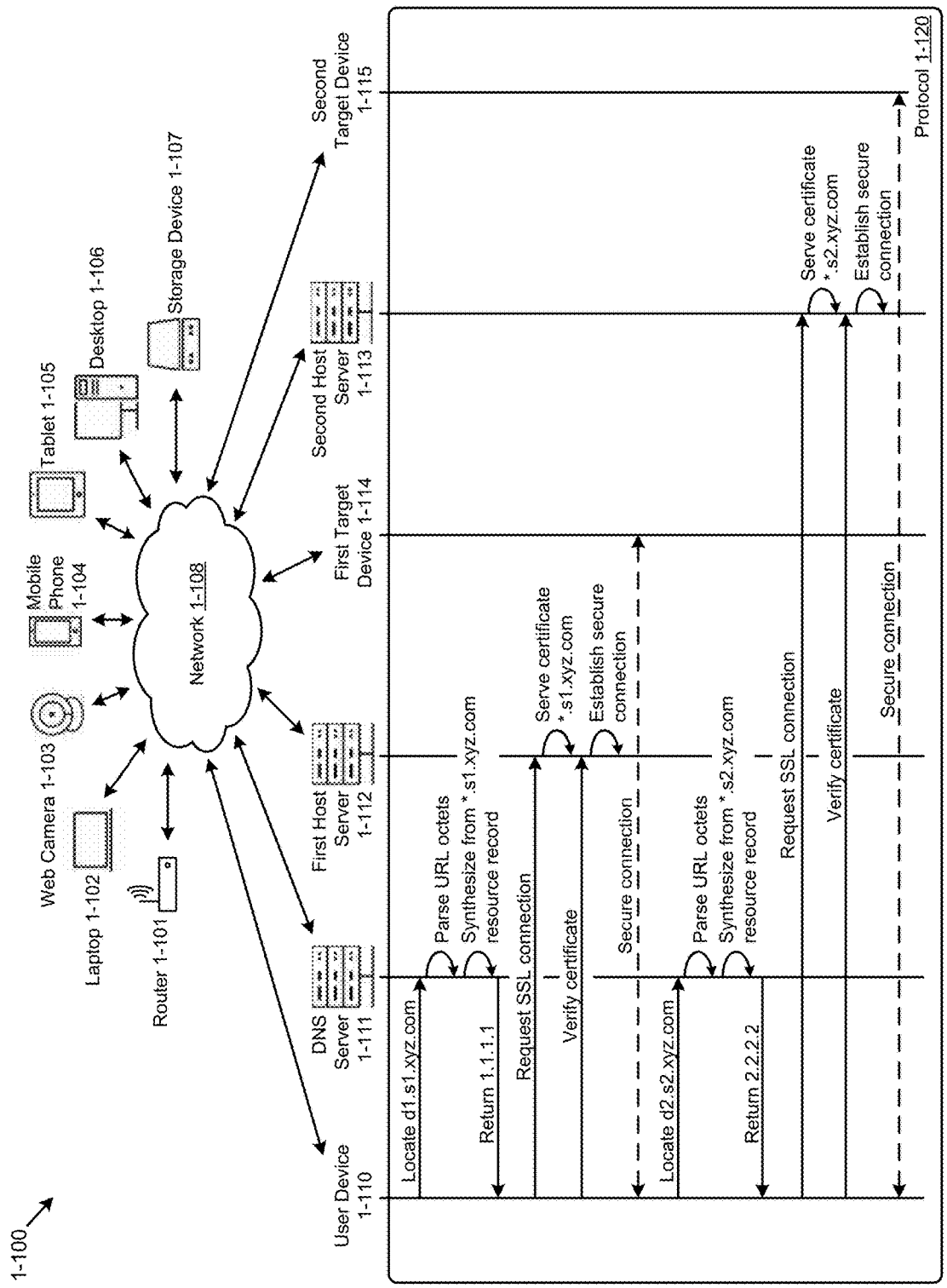

FIG. 34 is an environment that exemplifies the need for a multi-server fractional subdomain DNS protocol.

Figure 35:
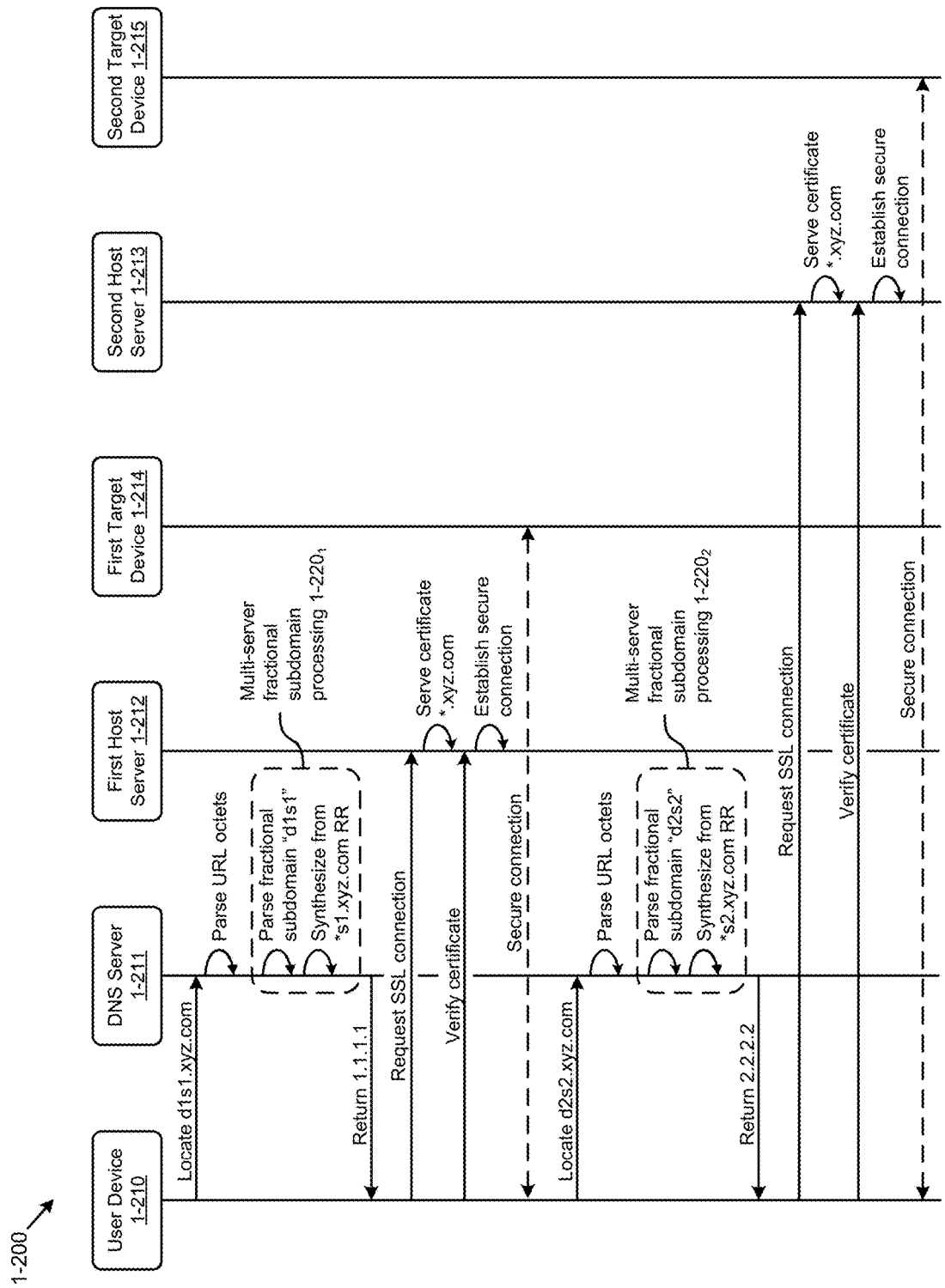

FIG. 35 depicts a protocol for DNS processing of multi-server fractional subdomains, according to some embodiments.

Figure 36:
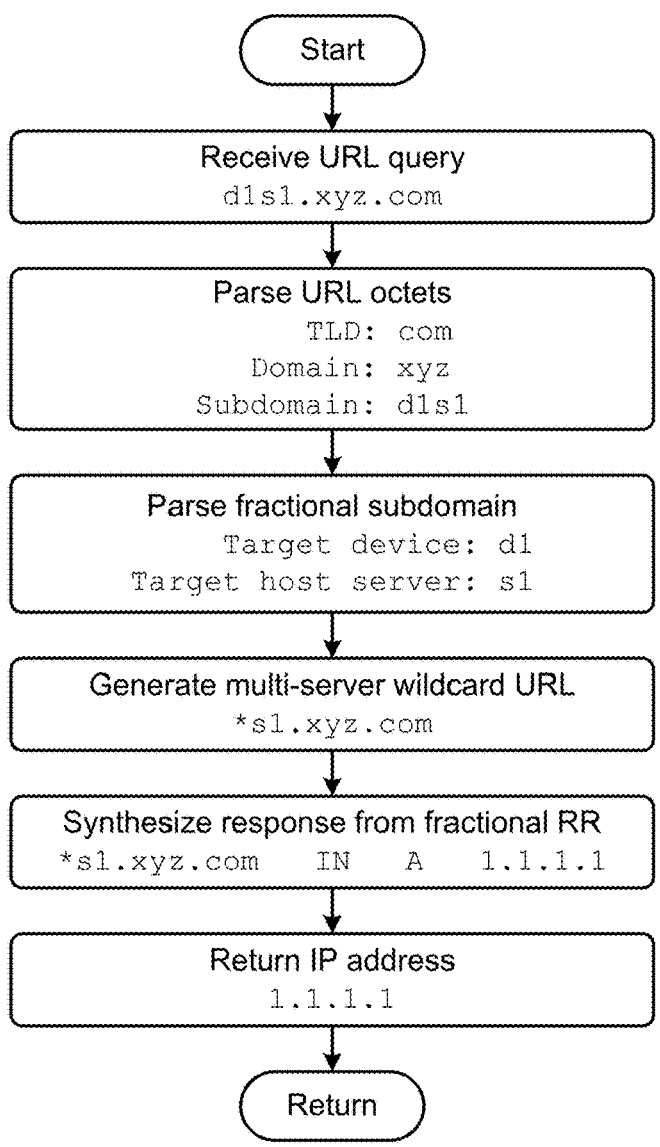

FIG. 36 represents a flowchart of a method for processing of multi-server fractional subdomains, according to one embodiment.

Figure 37:
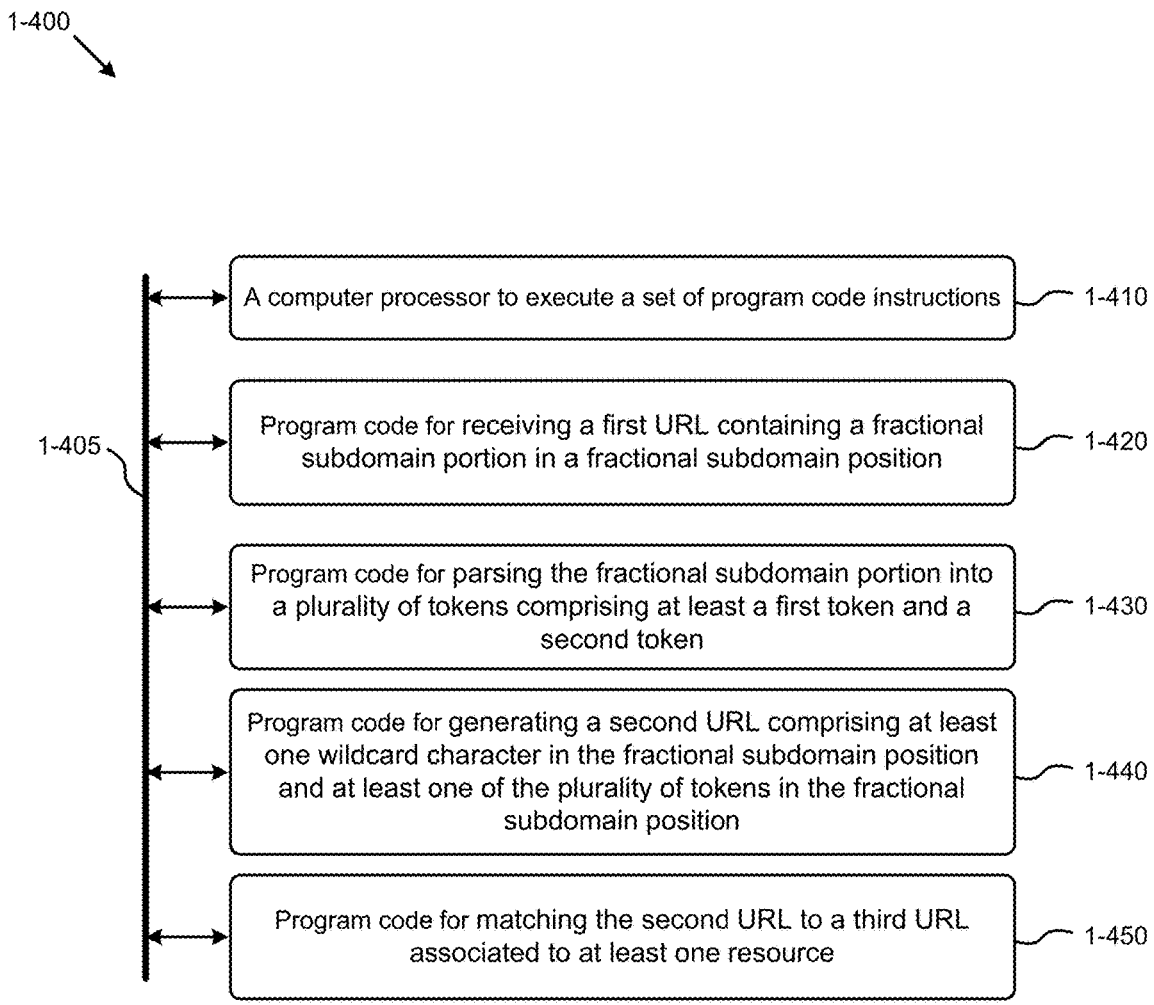

FIG. 37 is a block diagram of a system for implementing all or portions of any of the embodiments described herein, according to some embodiments.

Figure 38:
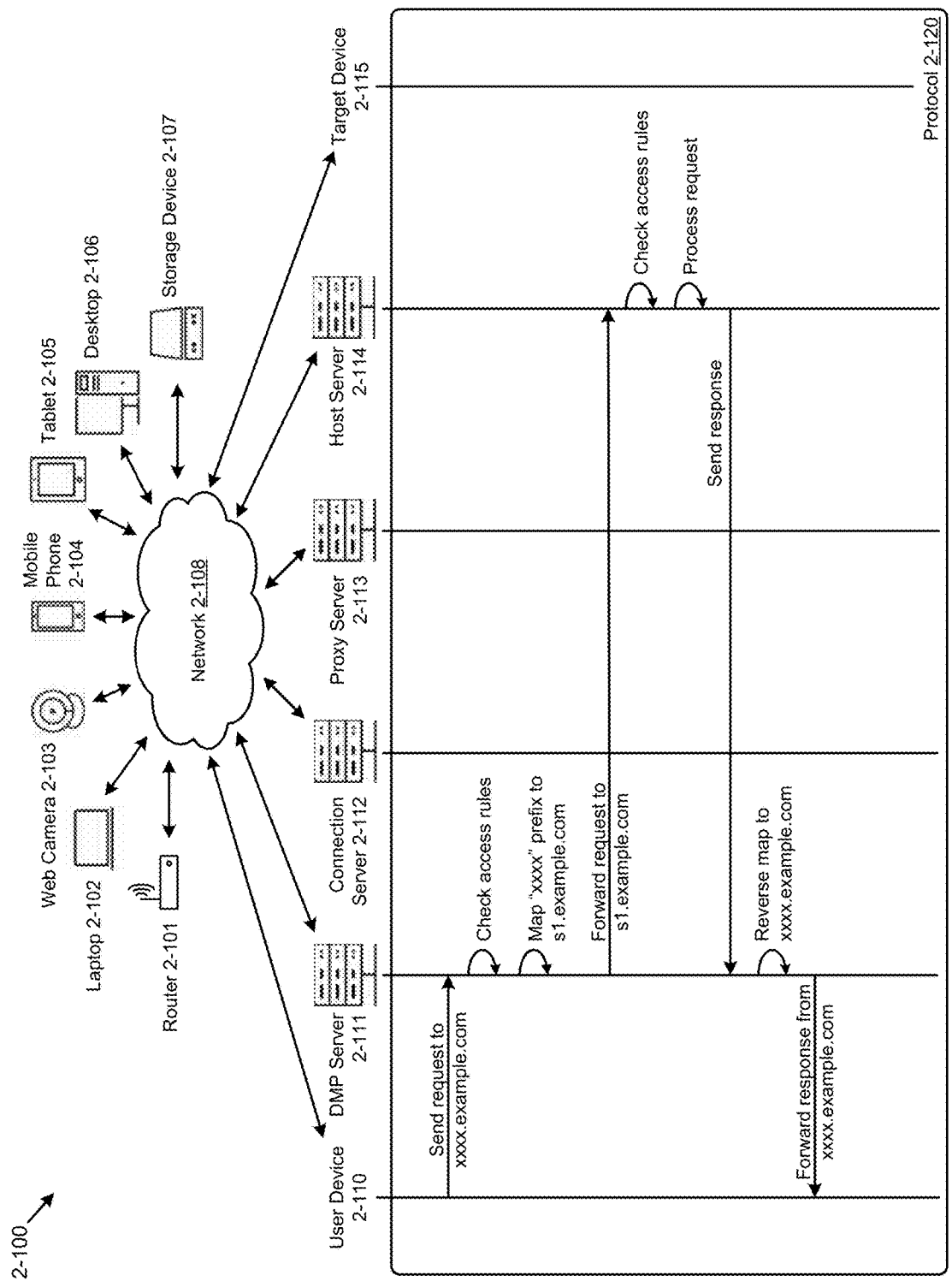

FIG. 38 depicts an environment in which embodiments of a direct map proxy system and protocol can operate.

Figure 39:
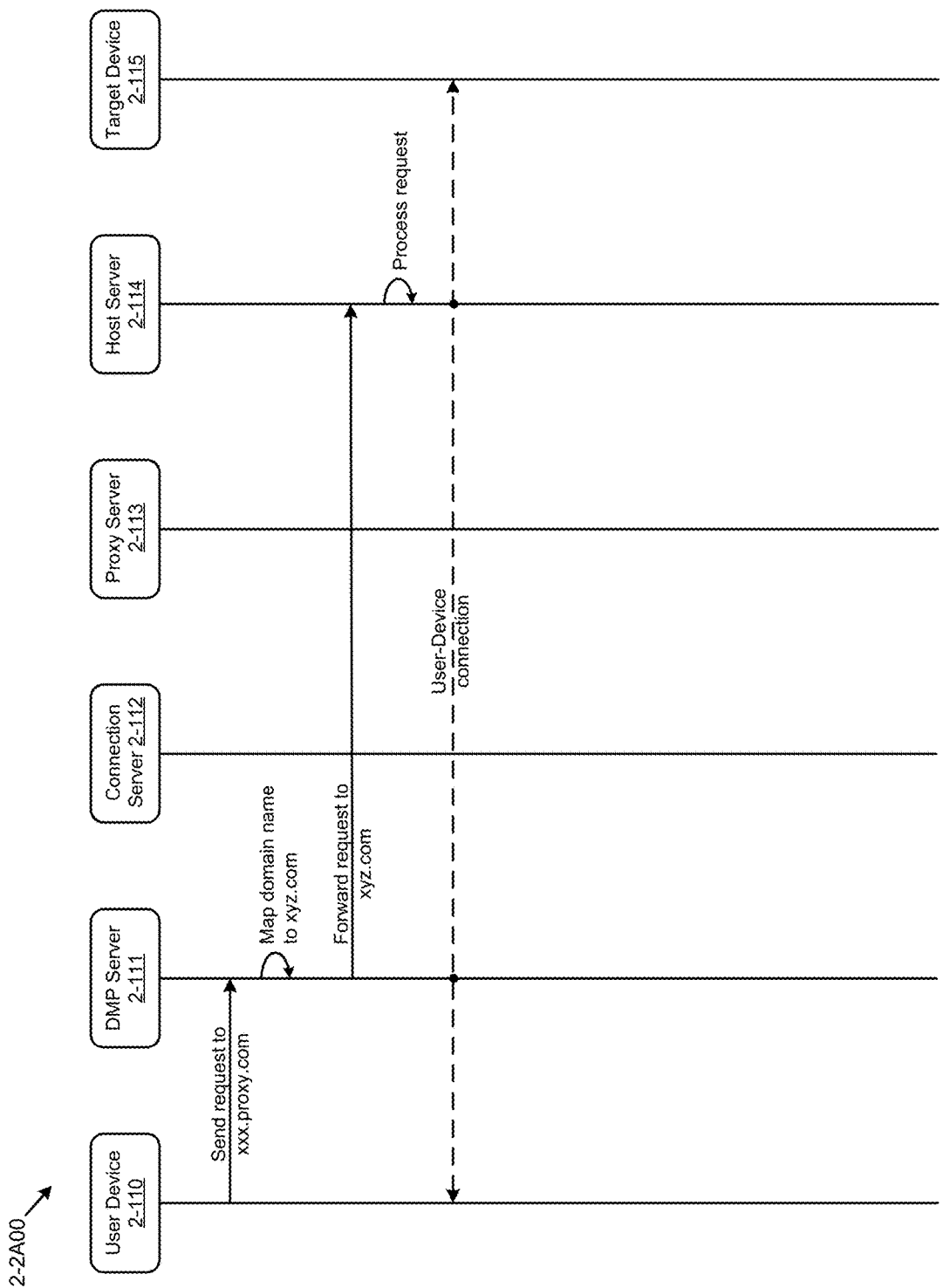

FIG. 39 depicts a communication network showing communications using a domain name map in a direct map proxy system and protocol, according to some embodiments.

Figure 40:
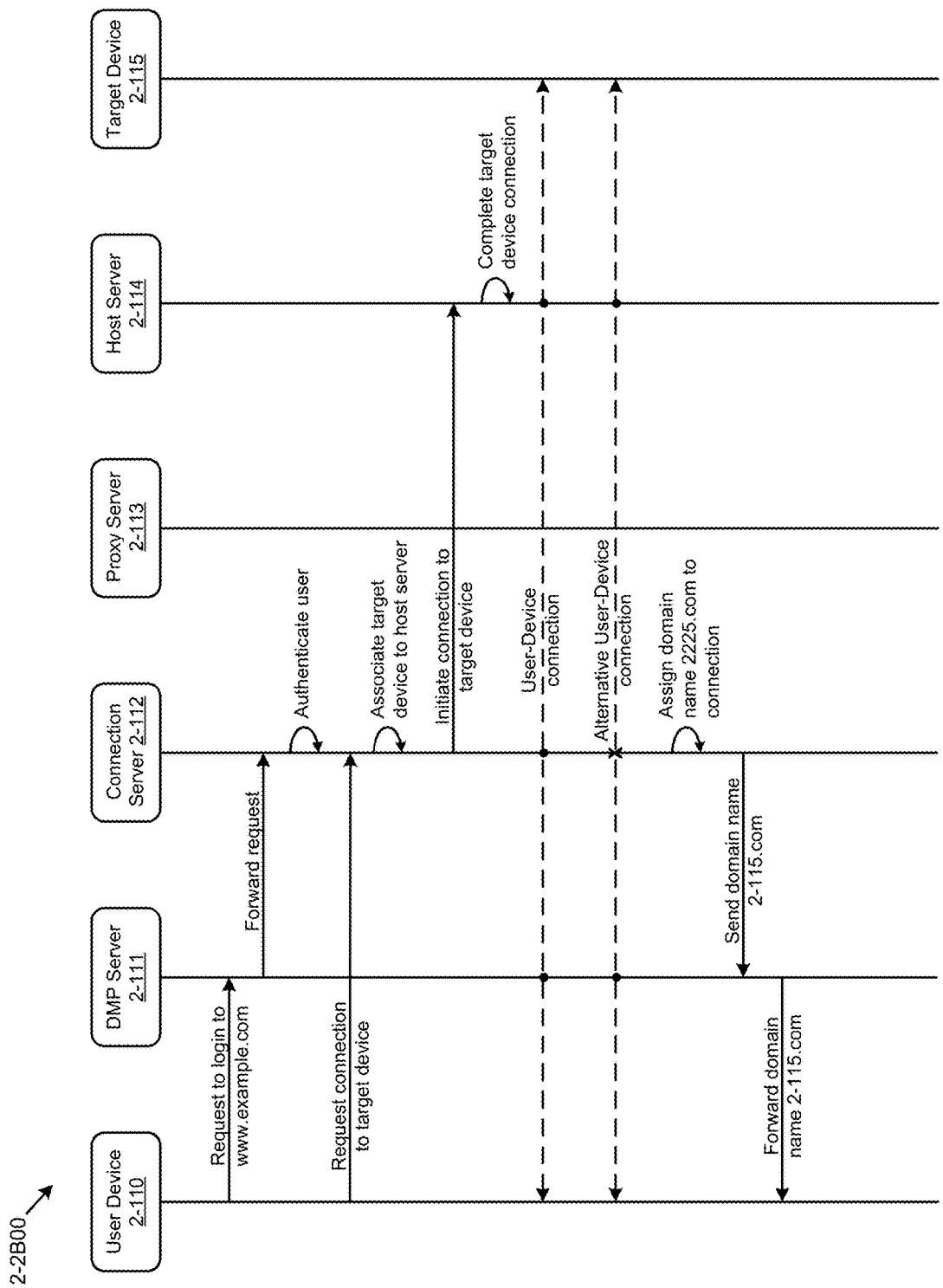

FIG. 40 depicts a communication network showing communications using a connection service in a direct map proxy system and protocol, according to some embodiments.

Figure 41:
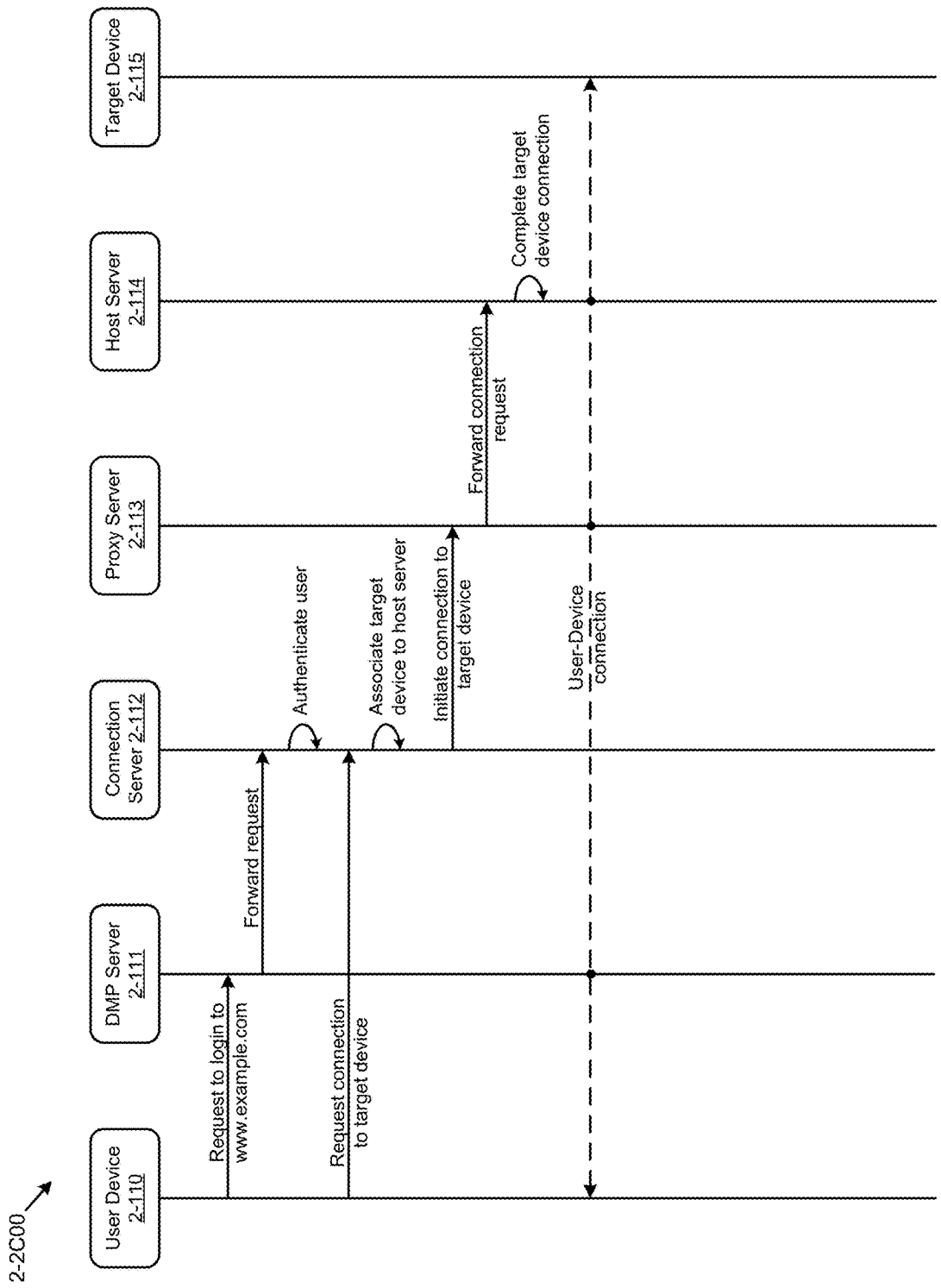

FIG. 41 depicts a communication network showing communications using a connection service and indirect link in a direct map proxy system and protocol, according to some embodiments.

Figure 42:
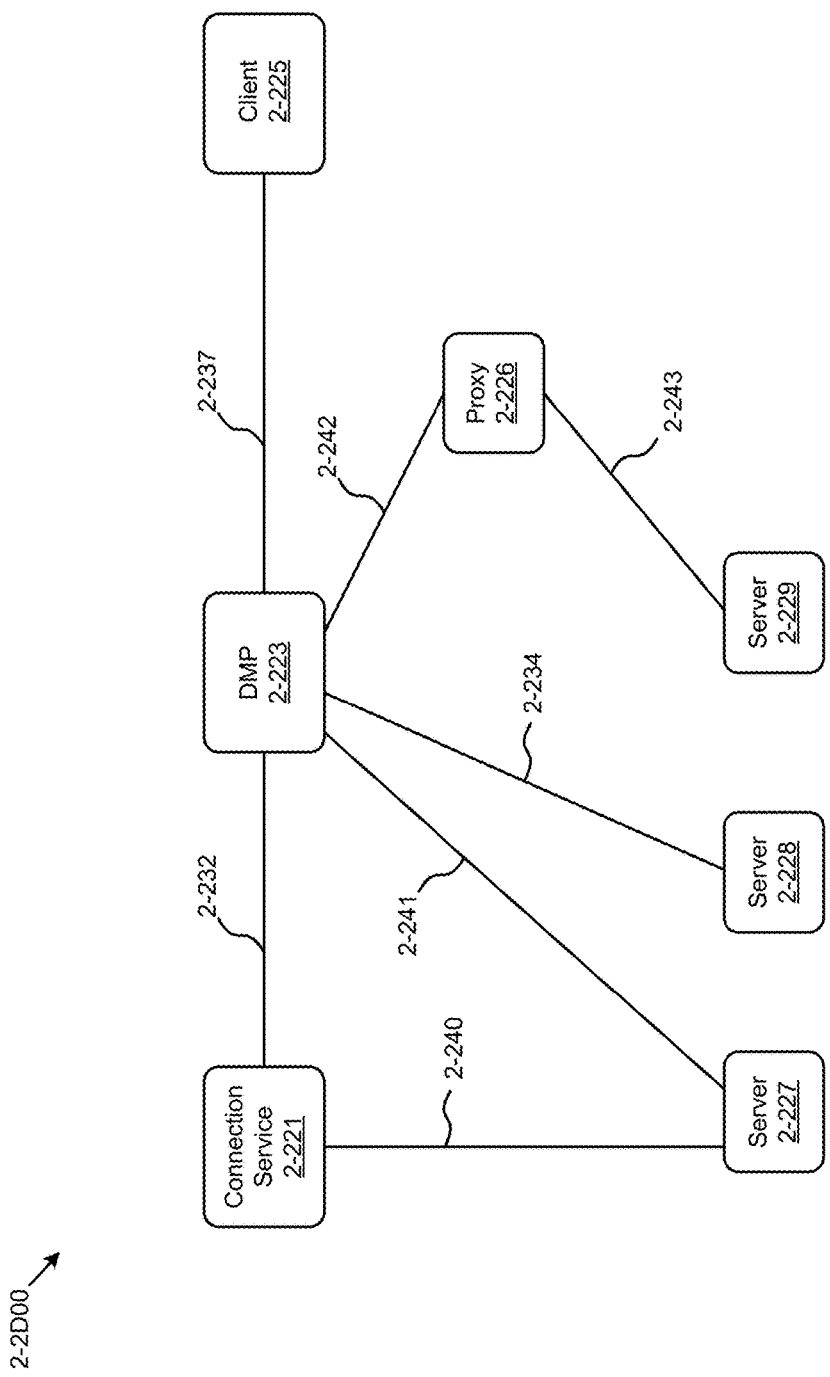

FIG. 42 shows a system including a direct map proxy server, according to some embodiments.

Figure 43:
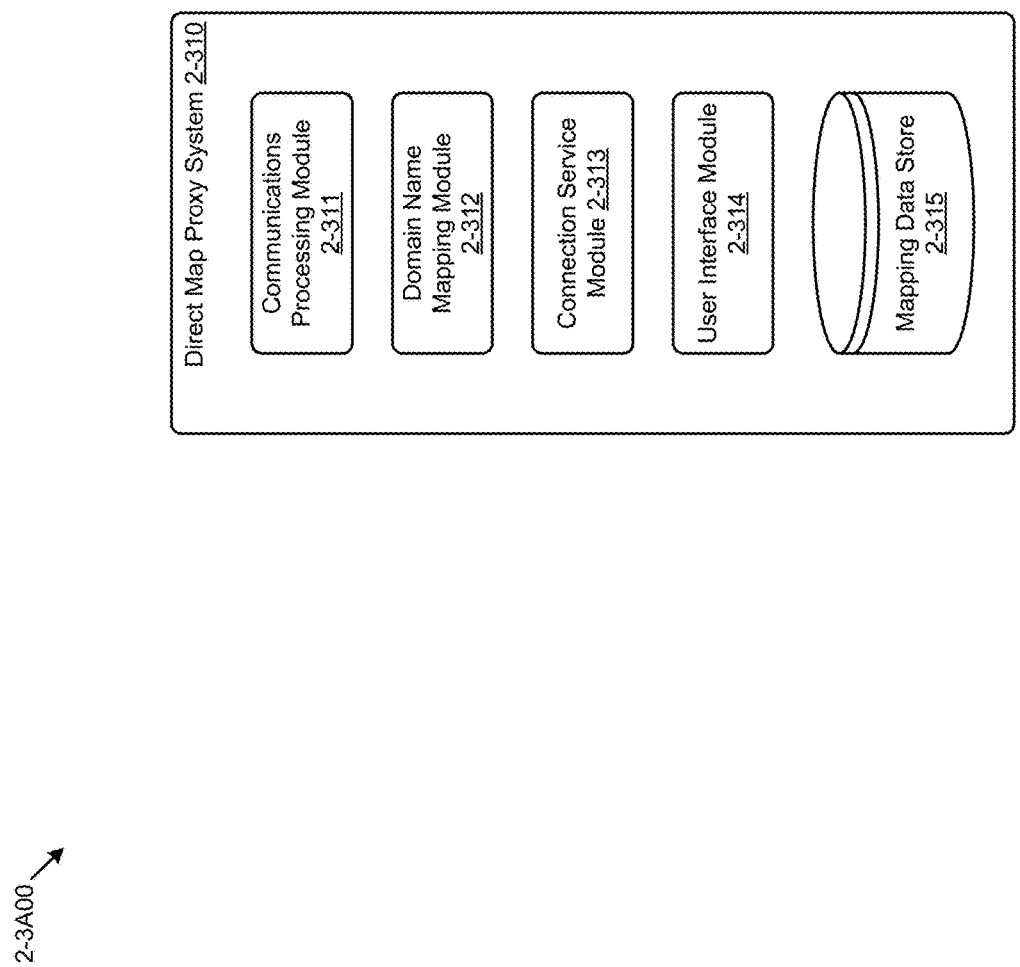

FIG. 43 is a block diagram of a direct map proxy system, according to some embodiments.

Figure 44:
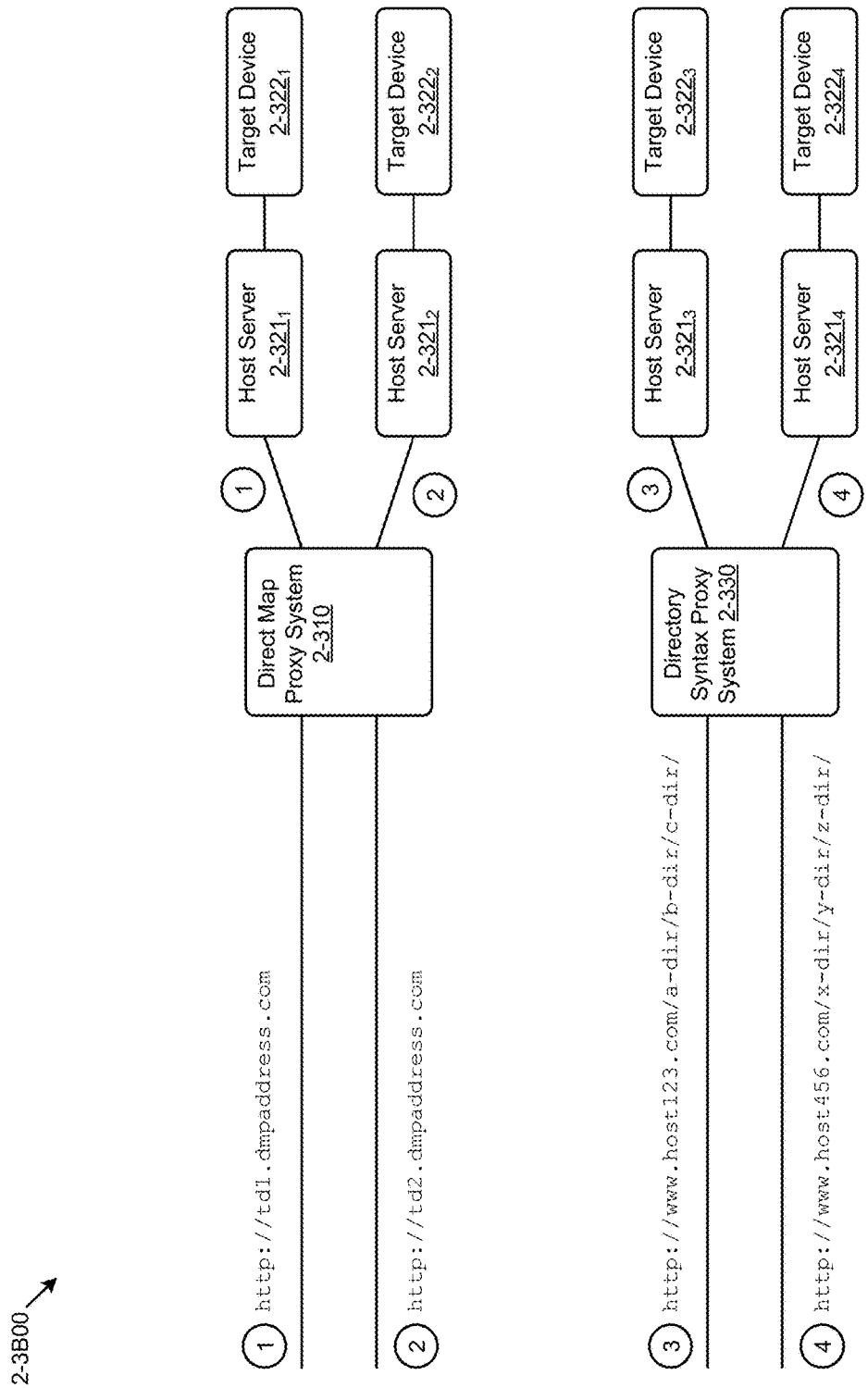

FIG. 44 illustrates mapping scenarios of a direct map proxy system and a directory syntax structure proxy system for comparison, according to some embodiments.

Figure 45:
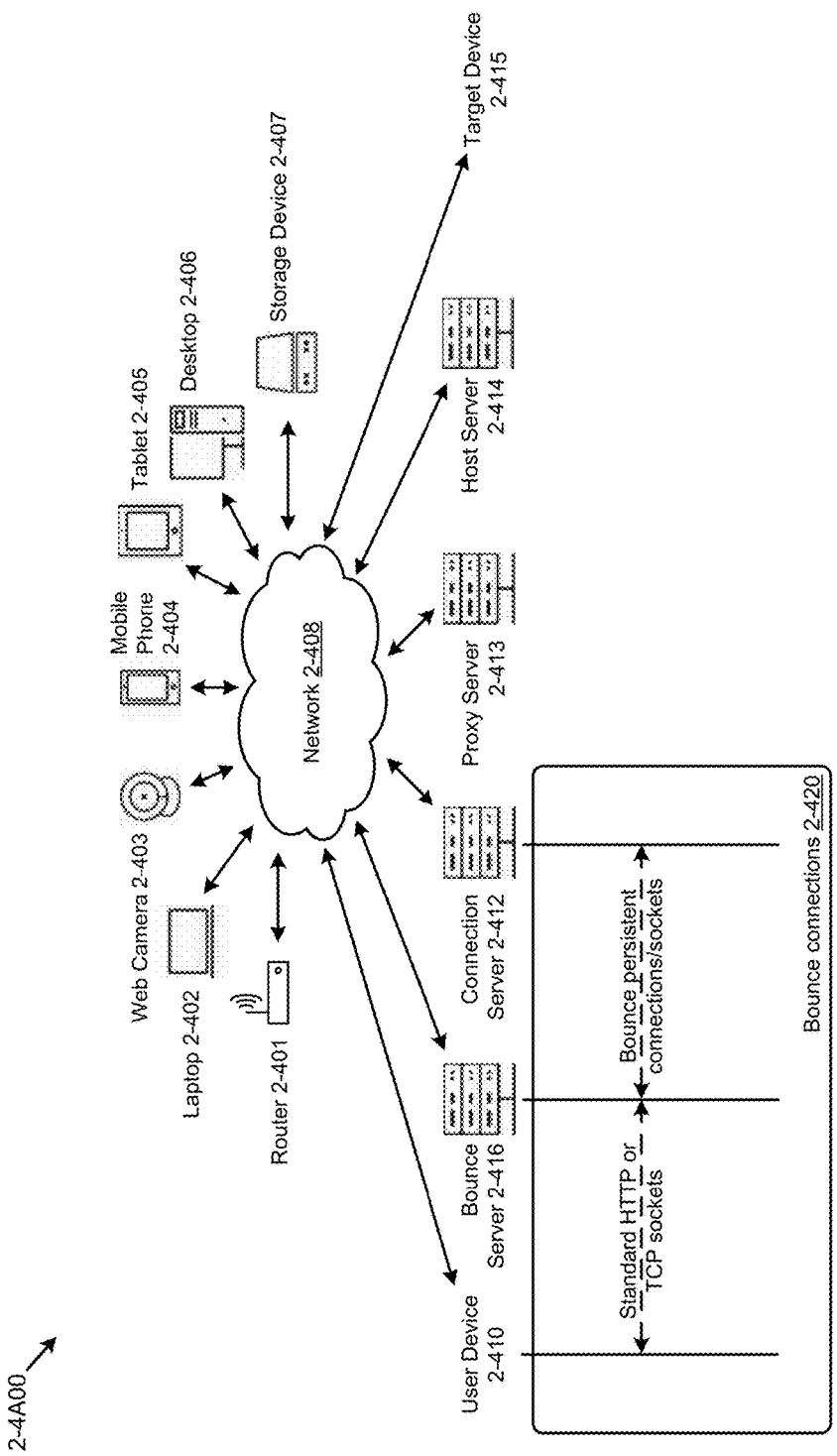

FIG. 45 depicts an environment including a bounce server implemented in a direct map proxy system and protocol, according to some embodiments.

Figure 46:
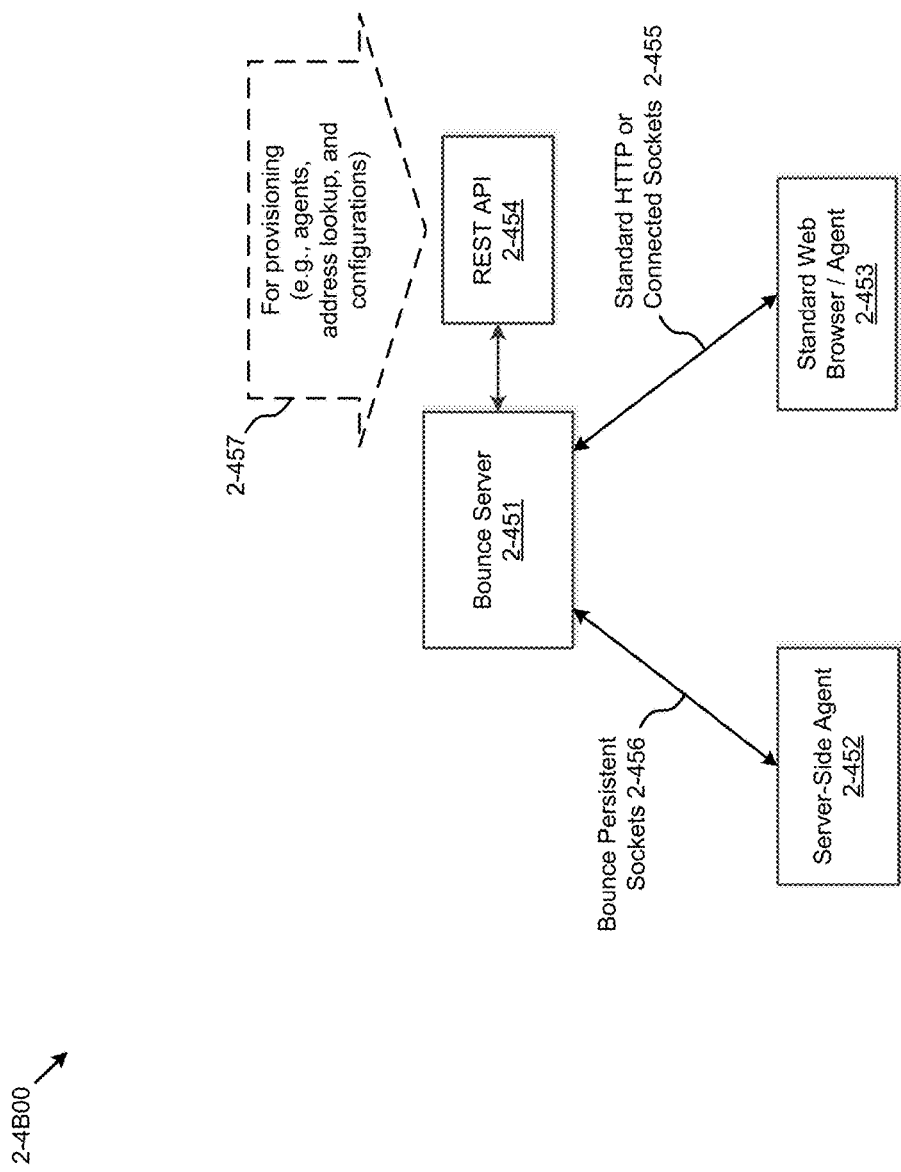

FIG. 46 is a network including a bounce server implemented in a direct map proxy system and protocol, according to some embodiments.

Figure 47:
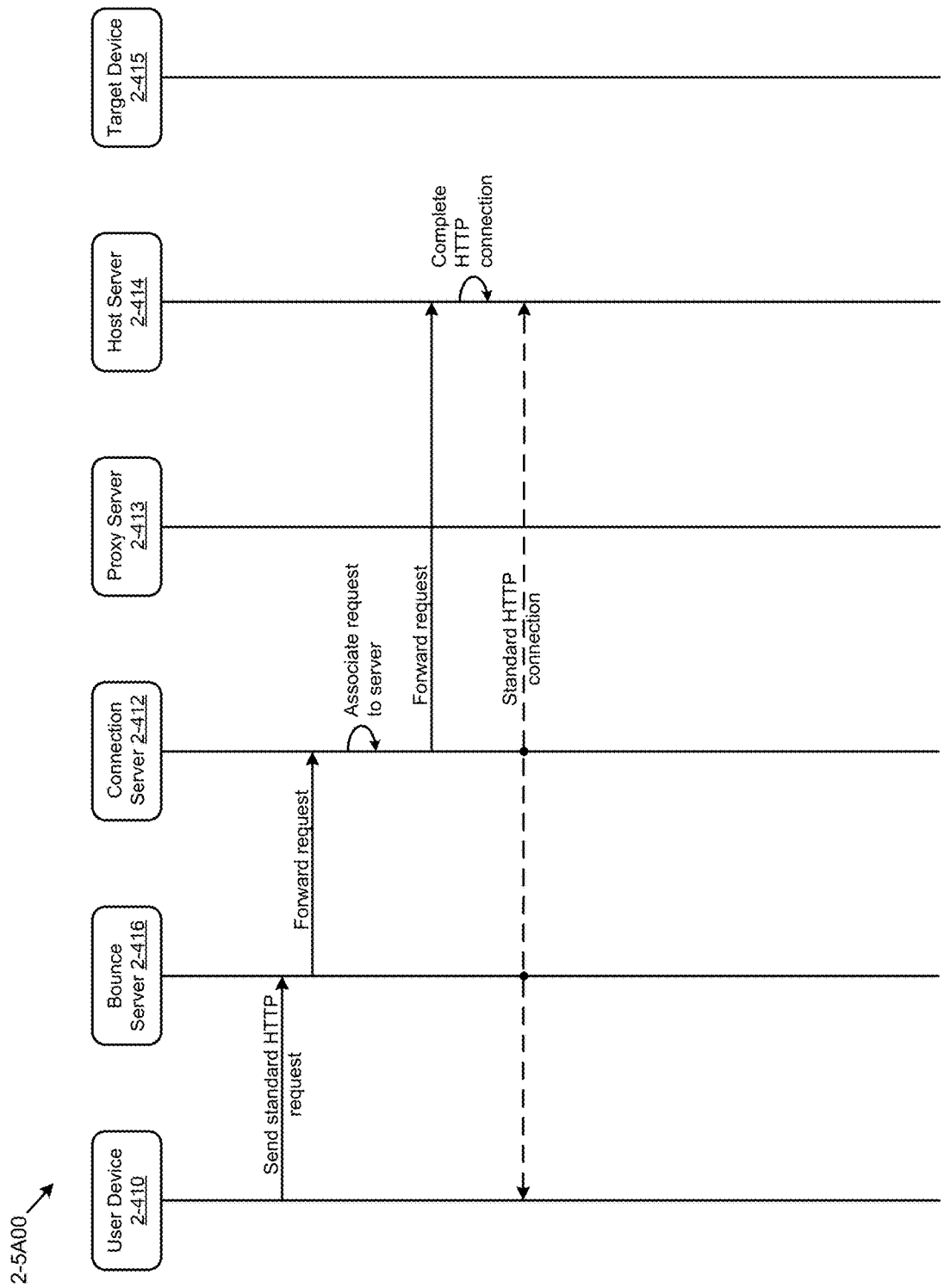

FIG. 47 is a diagram showing a bounce server communicating with standard HTTP clients as used in a direct map proxy system and protocol, according to some embodiments.

Figure 48:
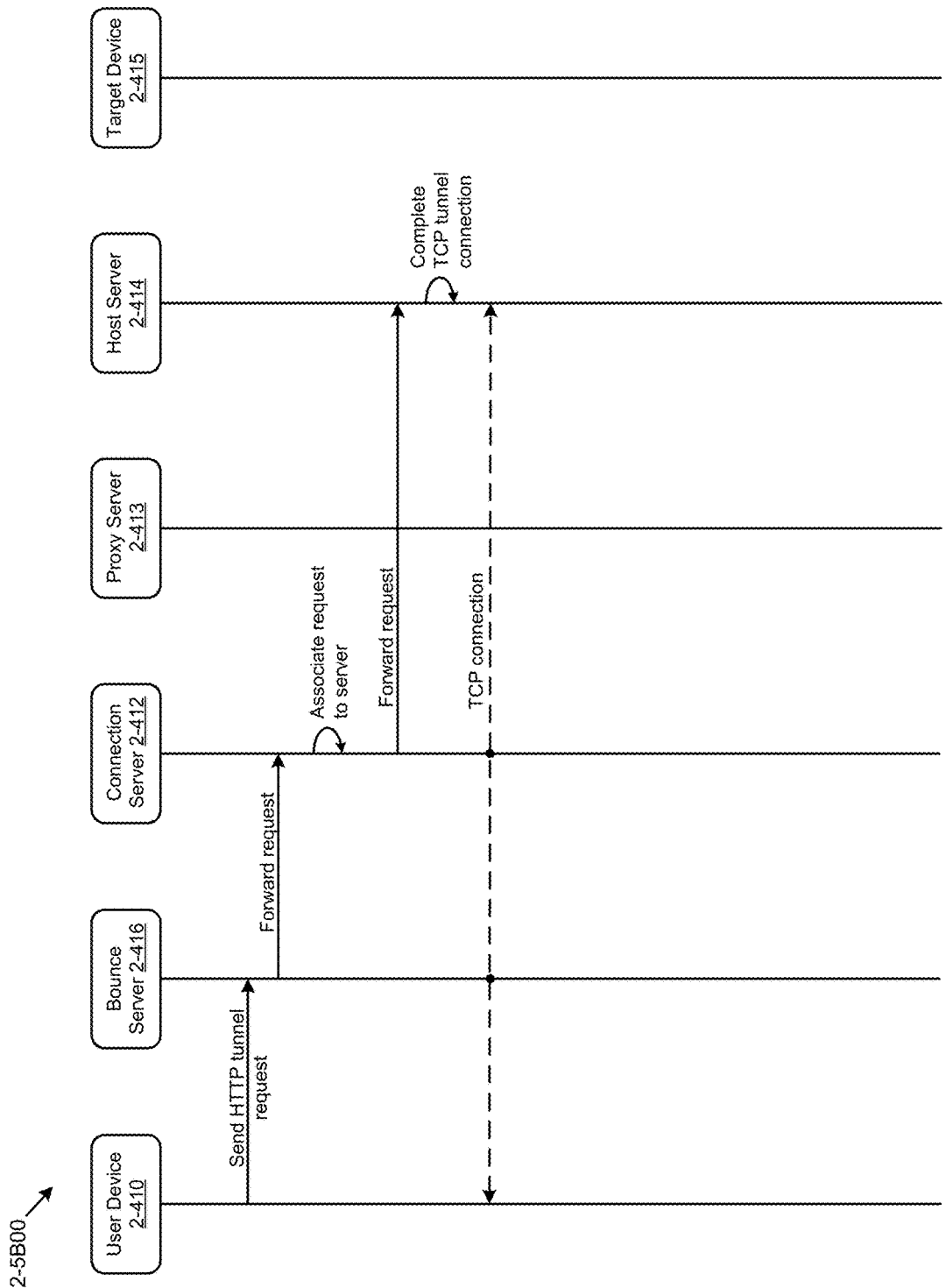

FIG. 48 is a diagram showing a bounce server communicating with TCP clients as implemented in a direct map proxy system and protocol, according to some embodiments.

Figure 49:
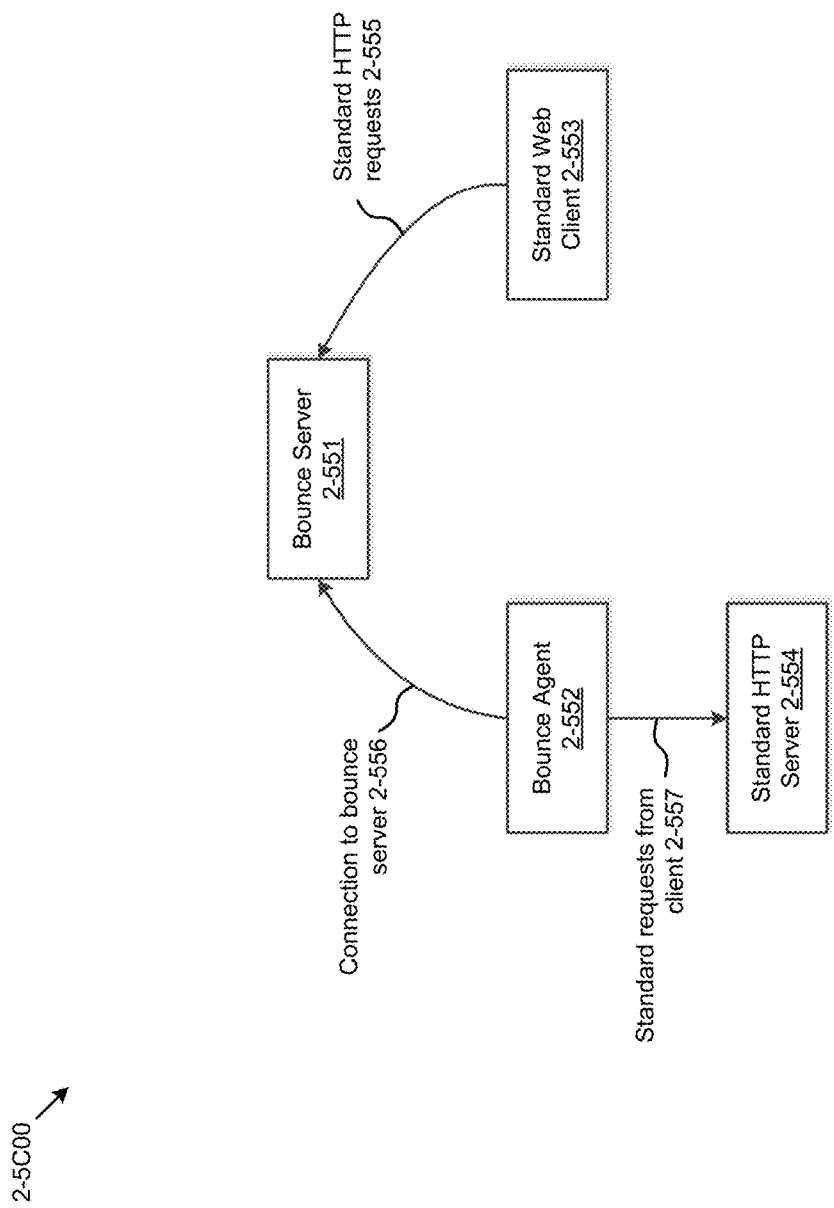

FIG. 49 is a network showing bounce server connections with standard HTTP clients and services as implemented in a direct map proxy system and protocol, according to some embodiments.

Figure 50:
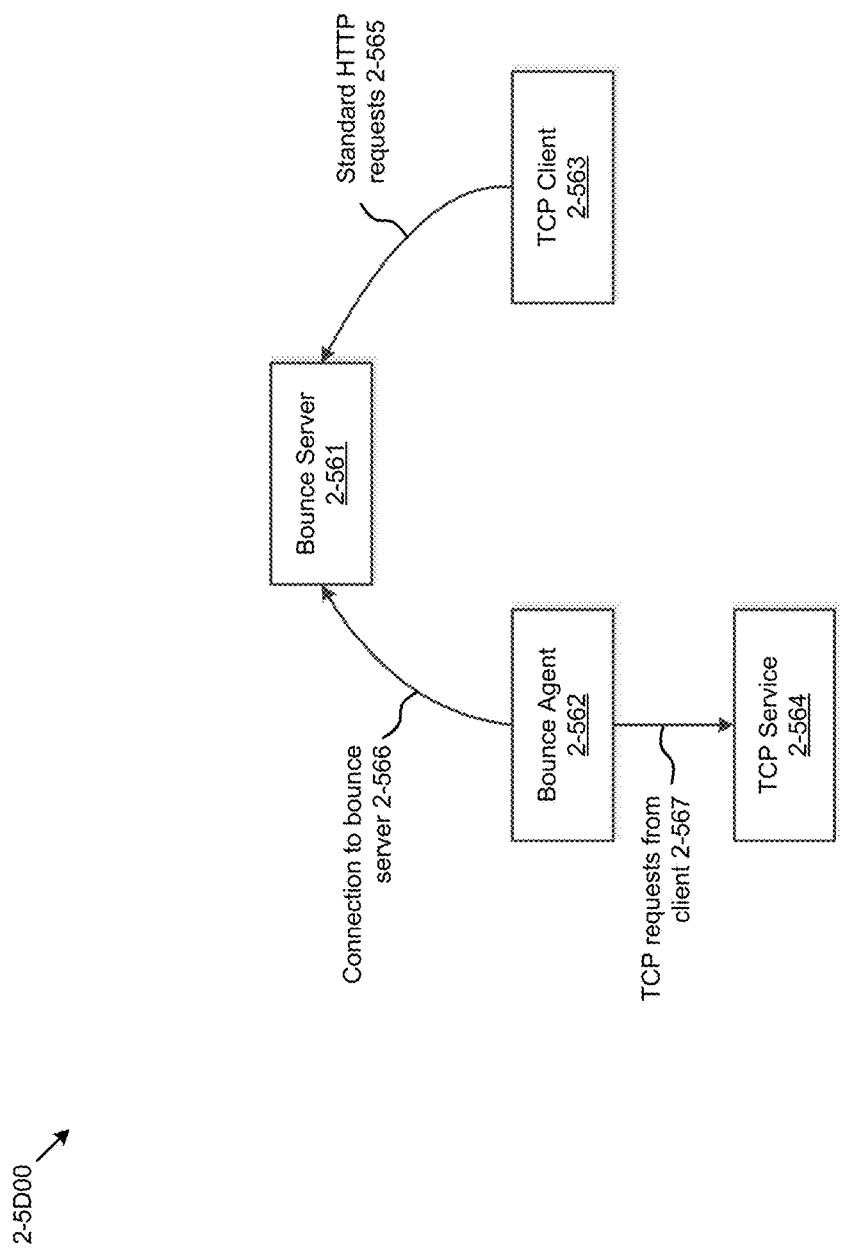

FIG. 50 is a network showing bounce server connections with TCP clients and services as implemented in a direct map proxy system and protocol, according to some embodiments.

Figure 51:
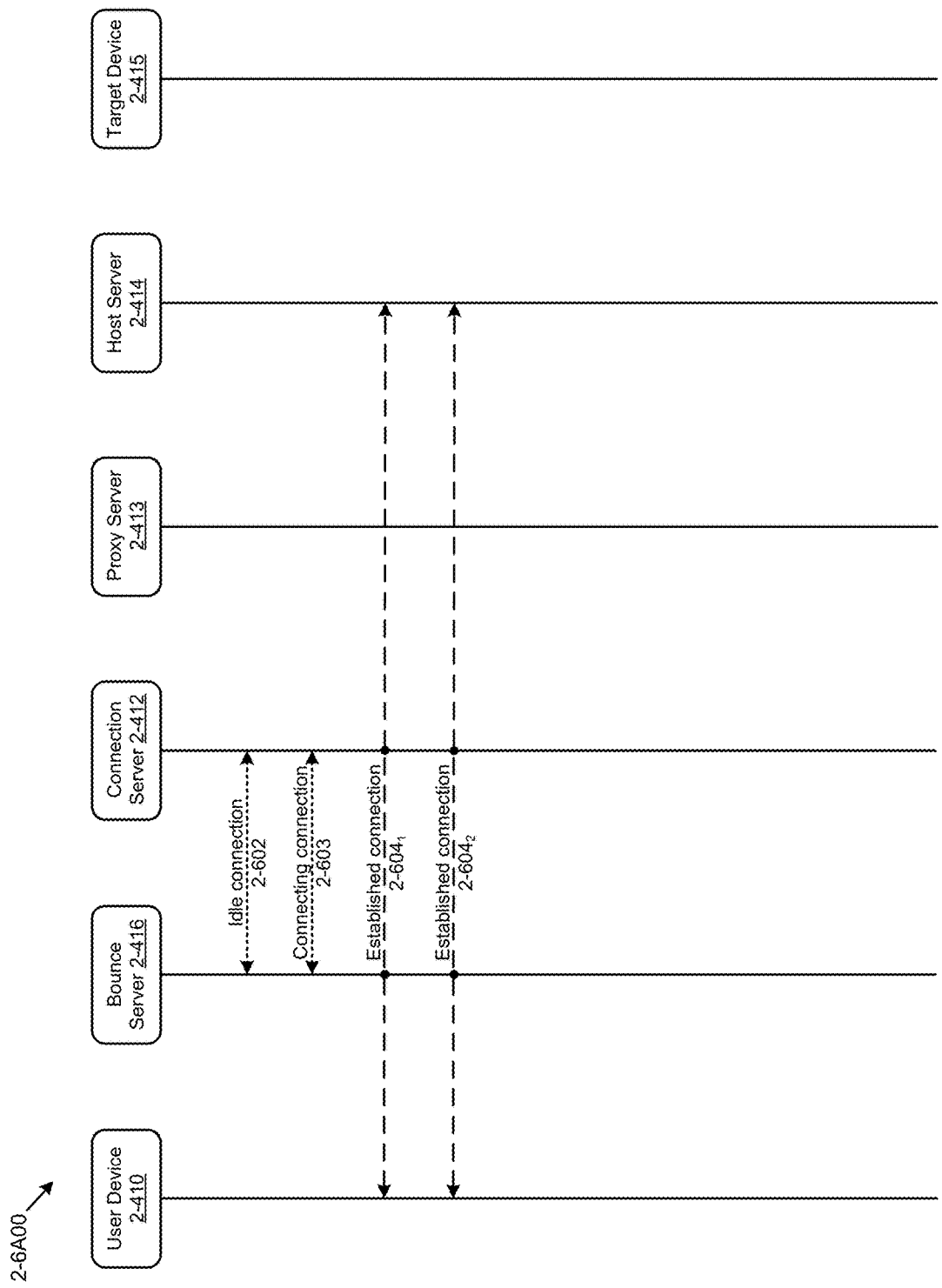

FIG. 51 is a diagram showing techniques for bounce server connection handling as implemented using a direct map proxy system and protocol, according to some embodiments.

Figure 52:
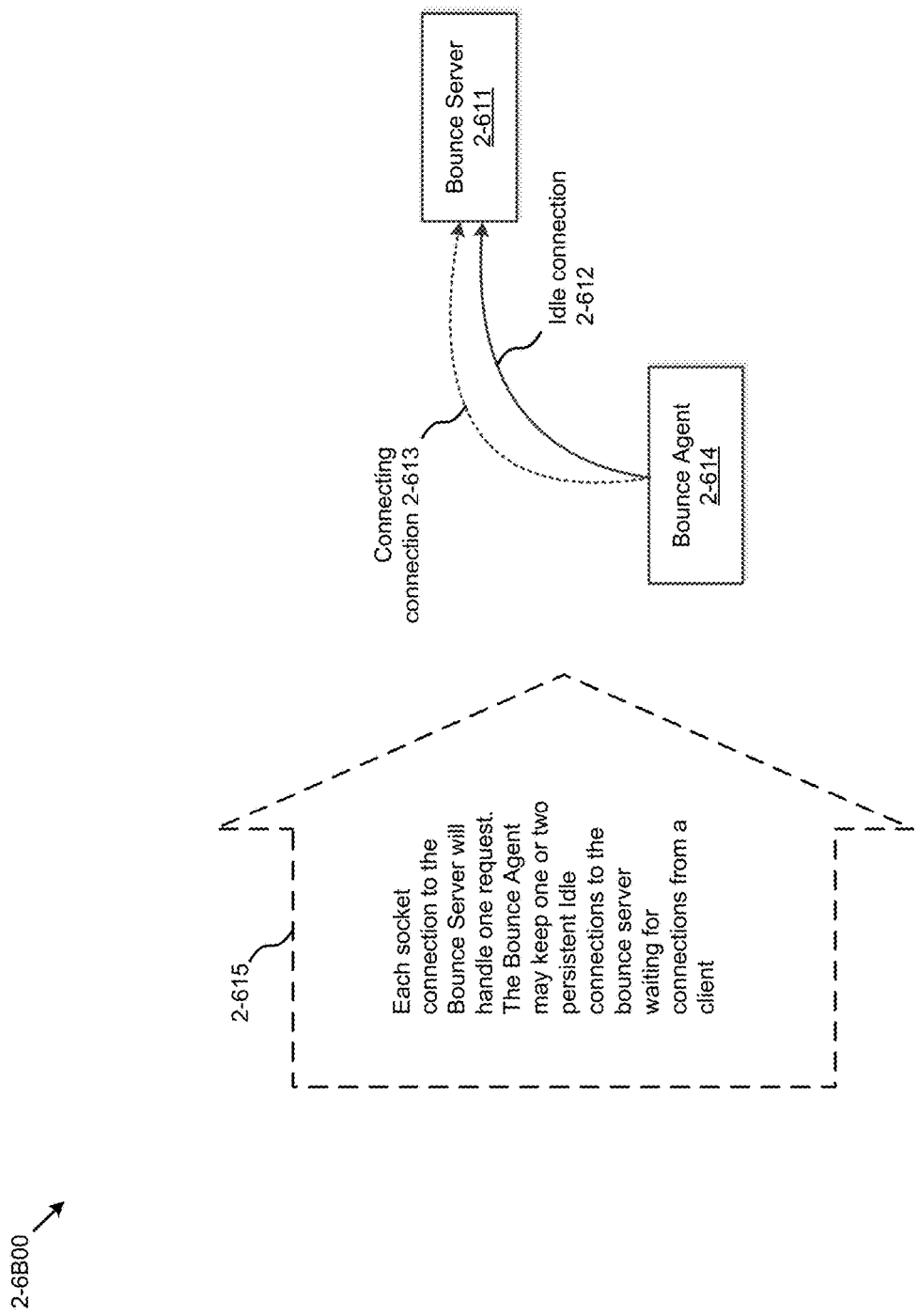

FIG. 52 is a diagram showing a bounce server with persistent idle connections as implemented in a direct map proxy system and protocol, according to some embodiments.

Figure 53:
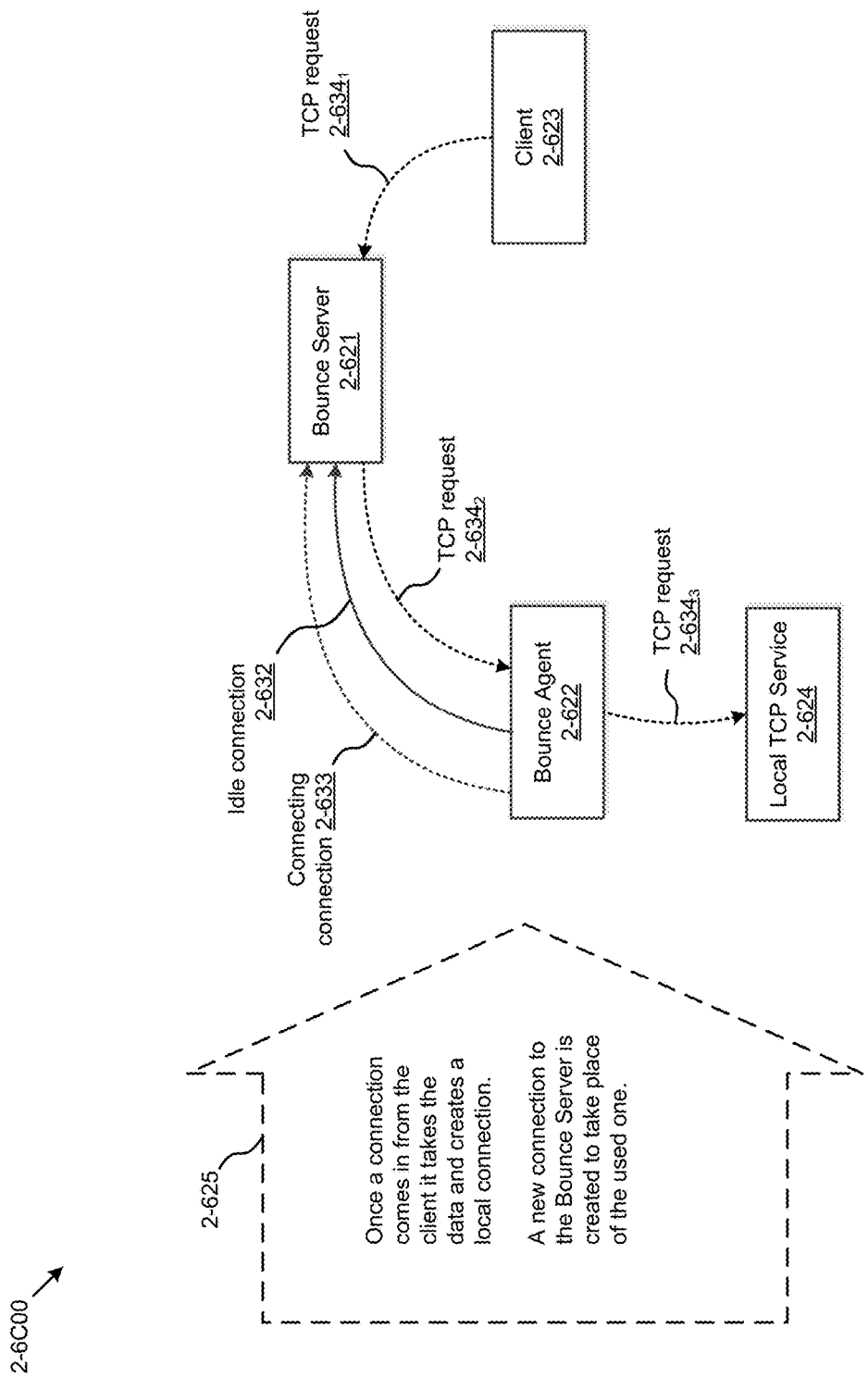

FIG. 53 is a diagram showing a bounce server capable of making one or more connections as implemented in a direct map proxy system and protocol, according to some embodiments.

Figure 54:
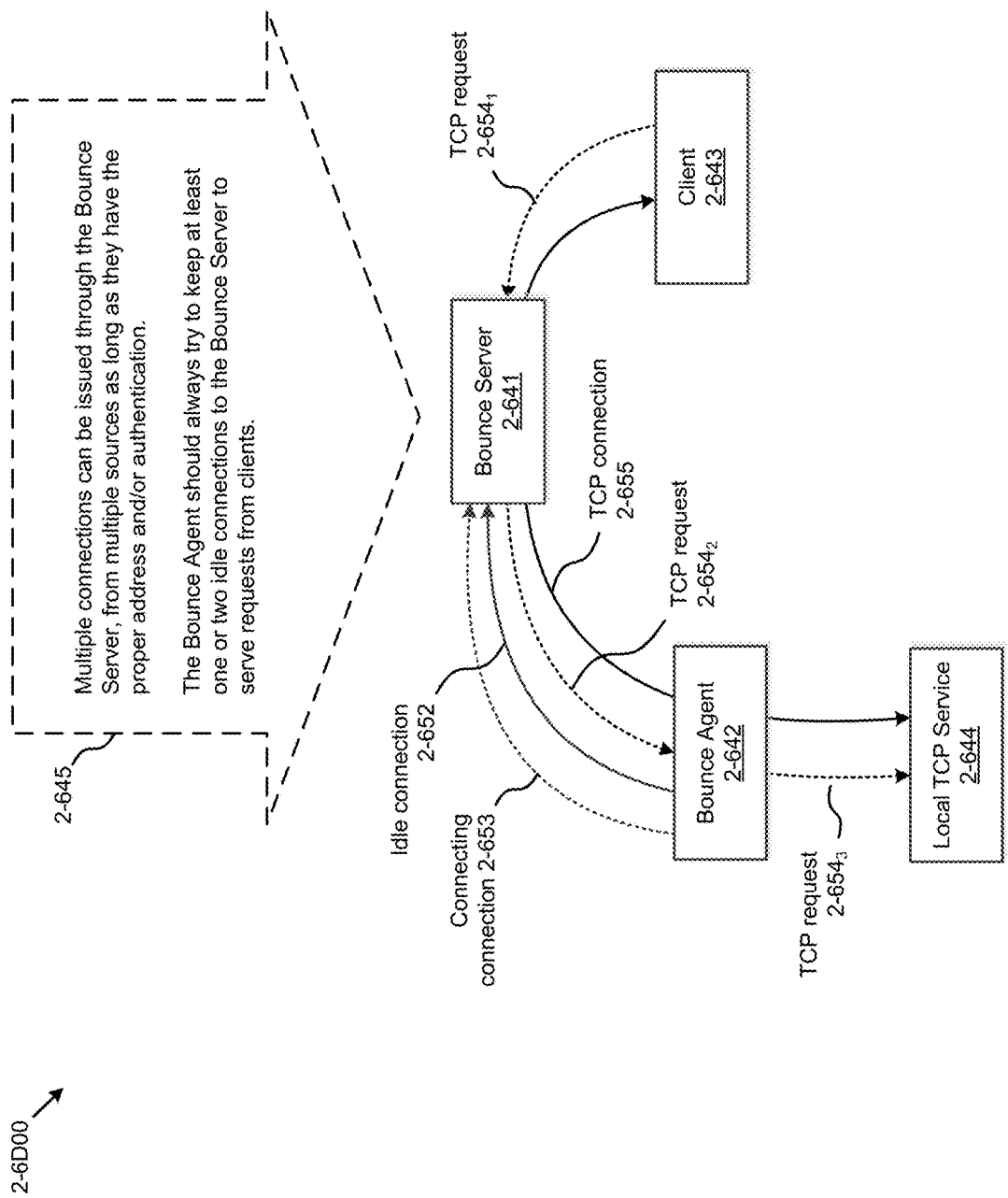

FIG. 54 is a diagram showing a bounce server capable of handling multiple connections as implemented in a direct map proxy system and protocol, according to some embodiments.

Figure 55:
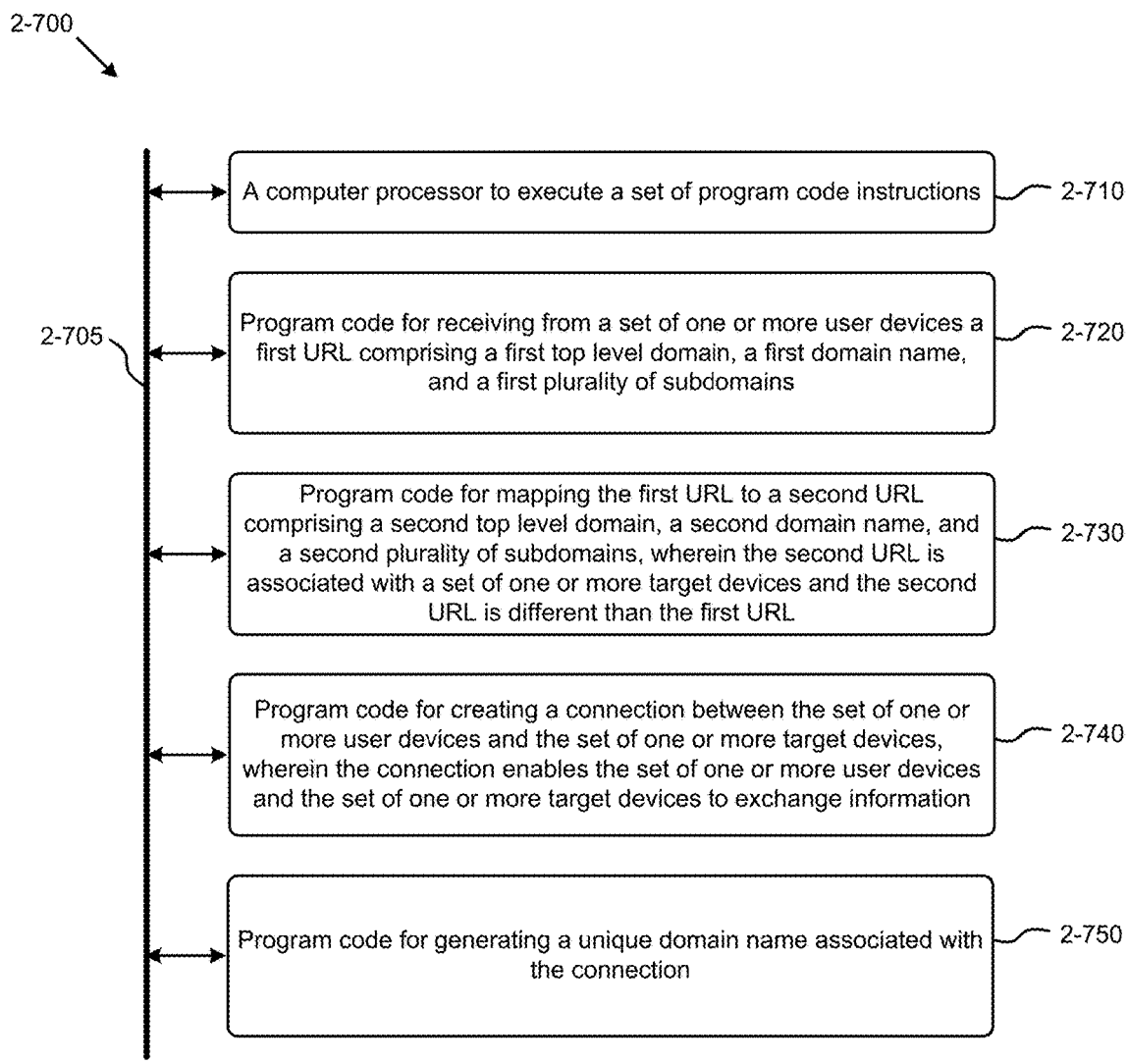

FIG. 55 is a block diagram of a system, according to some embodiments.

Figure 56:
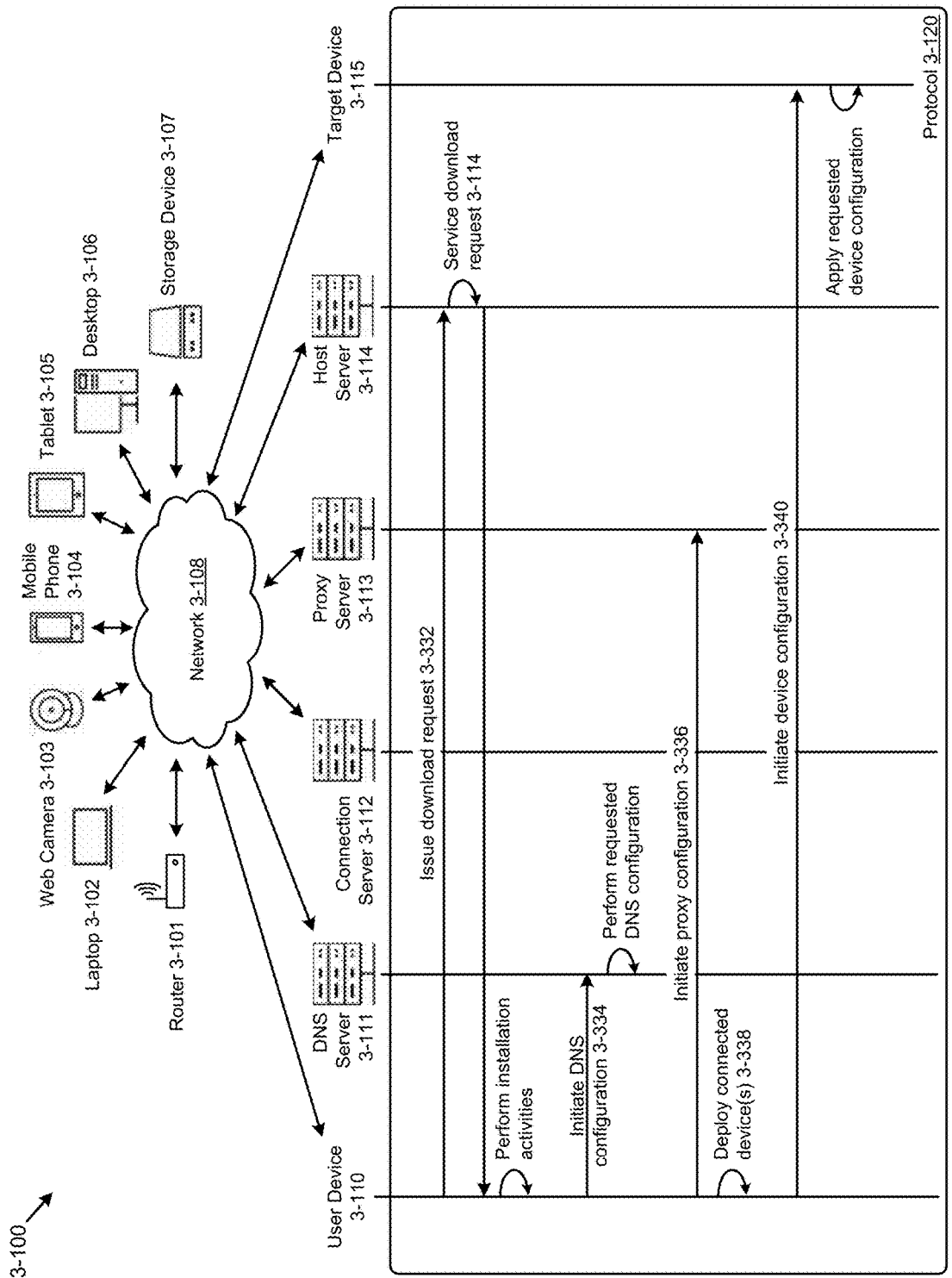

FIG. 56 exemplifies an environment for supporting connections and servers as used in the installation and configuration of connected devices, according to one embodiment.

Figure 57:
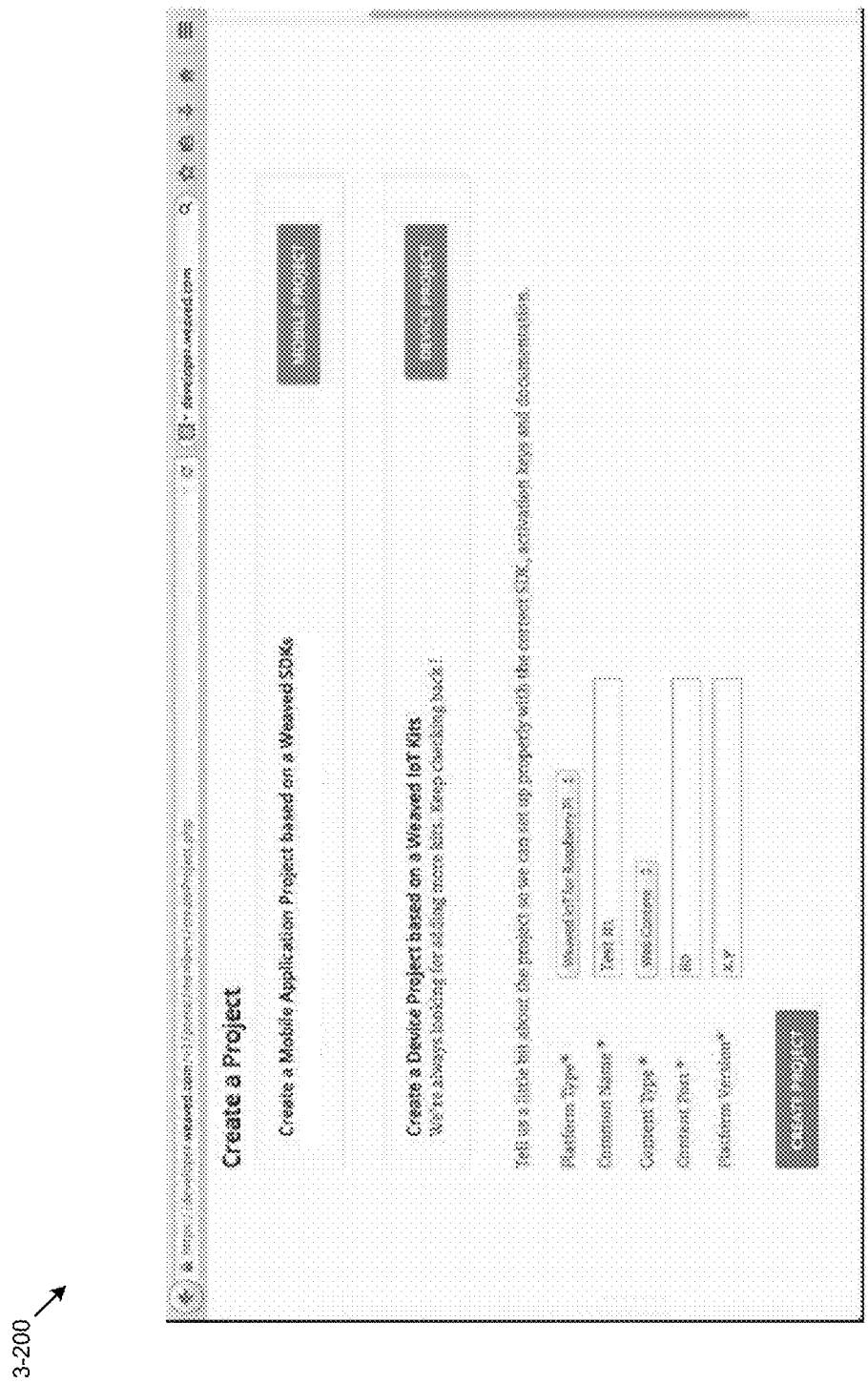

FIG. 57 depicts a project setup user interface as used in the installation and configuration of connected devices, according to one embodiment.

Figure 58:
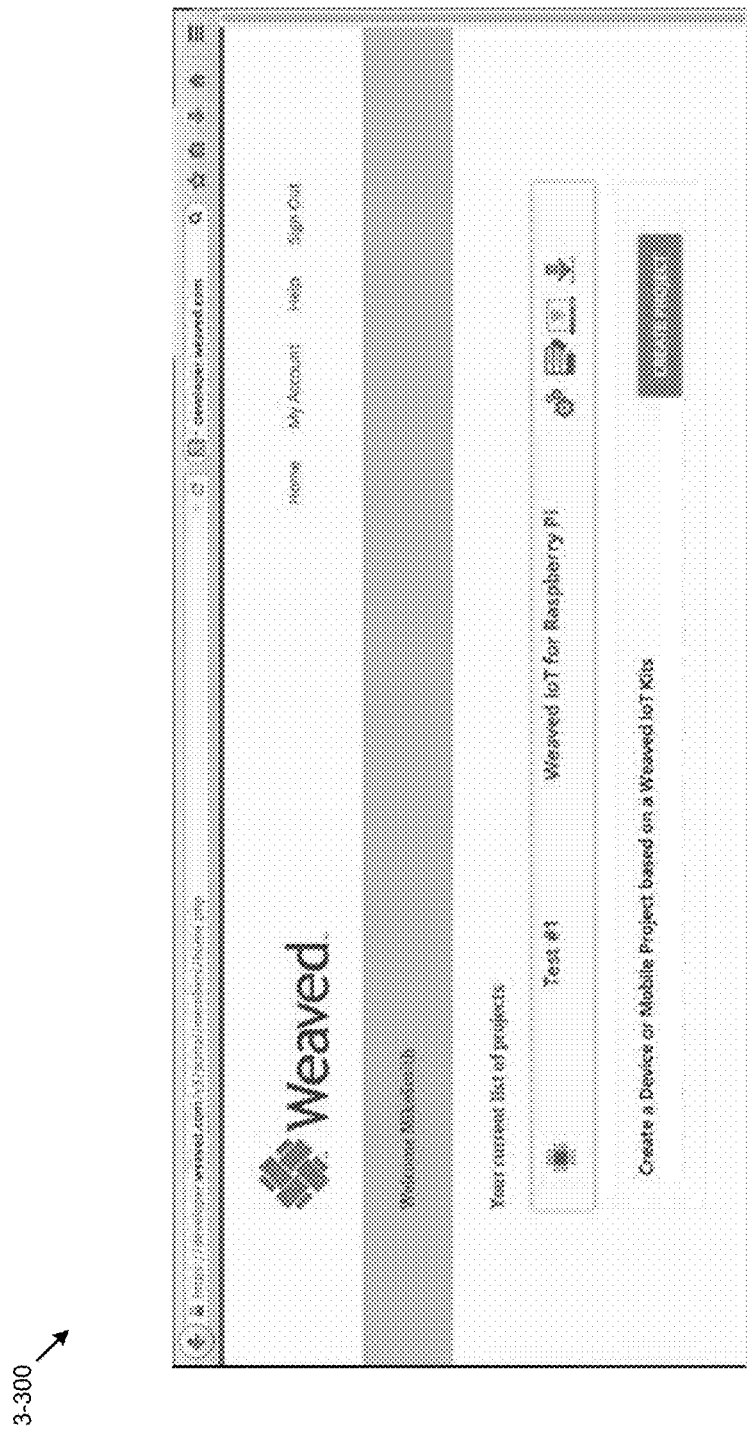

FIG. 58 depicts a project creation user interface as used in the installation and configuration of connected devices, according to one embodiment.

Figure 59:
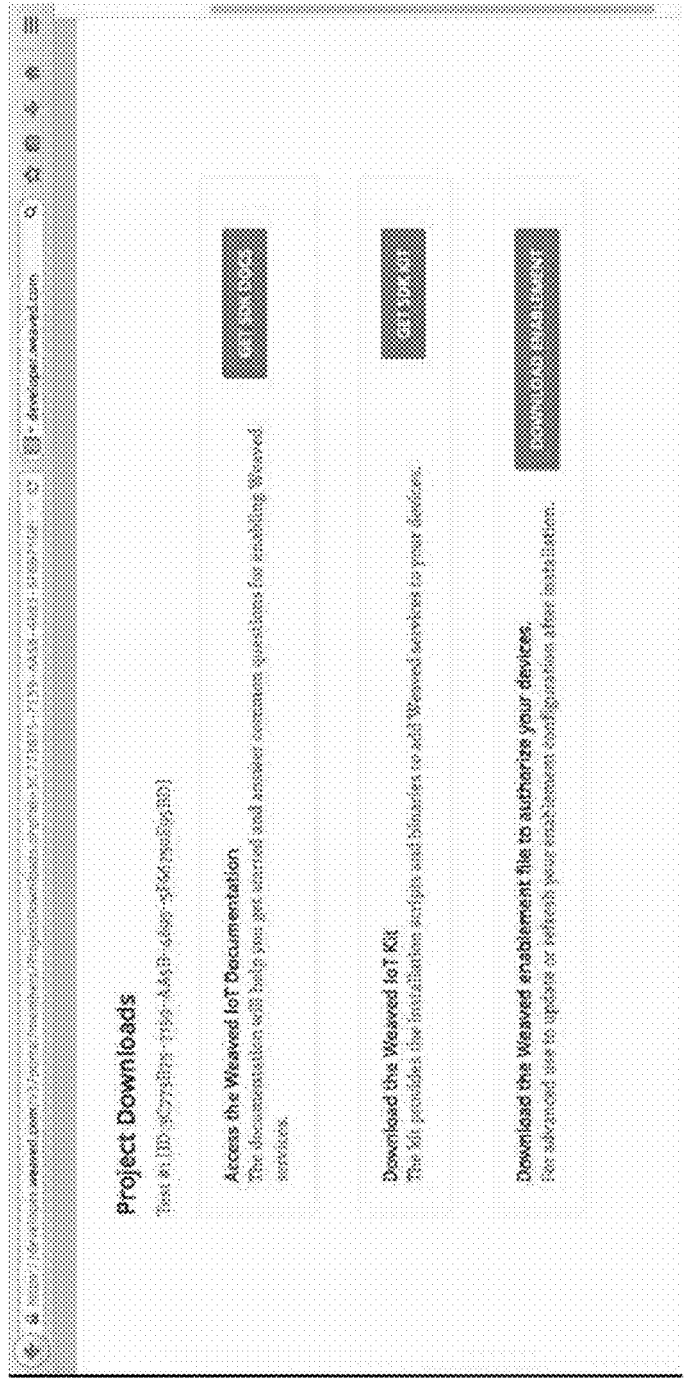

FIG. 59 depicts a project download user interface as used in the installation and configuration of connected devices, according to one embodiment.

Figure 60:
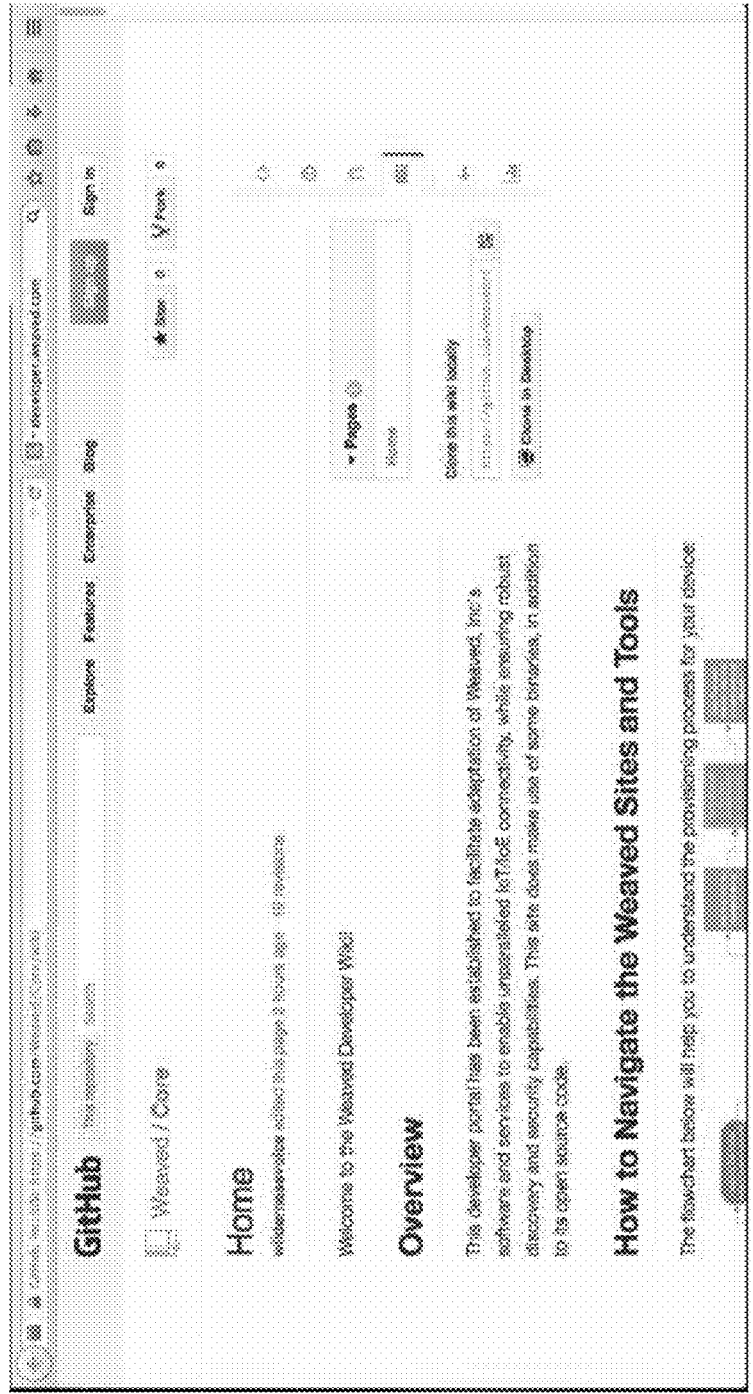

FIG. 60 depicts a core navigation user interface as used in the installation and configuration of connected devices, according to one embodiment.

Figure 61:
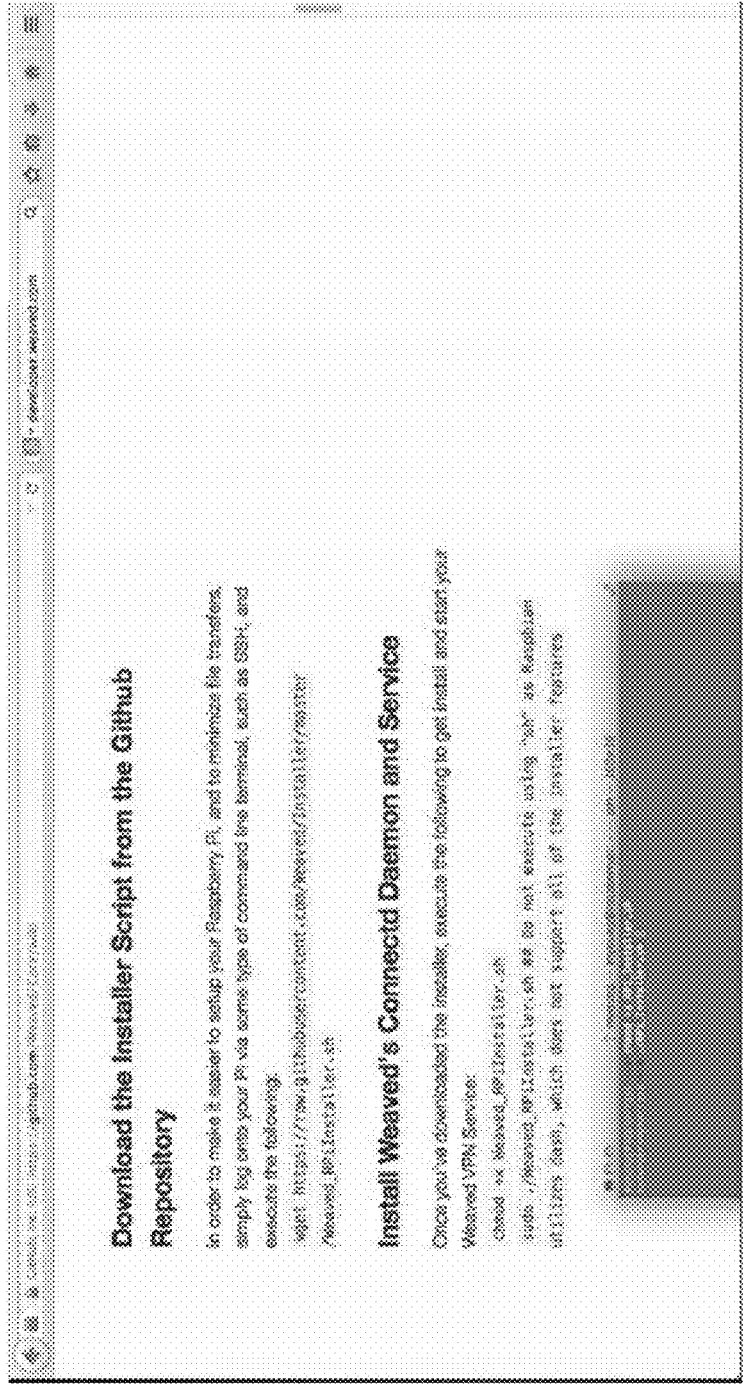

FIG. 61 depicts a daemon service installation user interface as used in the installation and configuration of connected devices, according to one embodiment.

Figure 62:
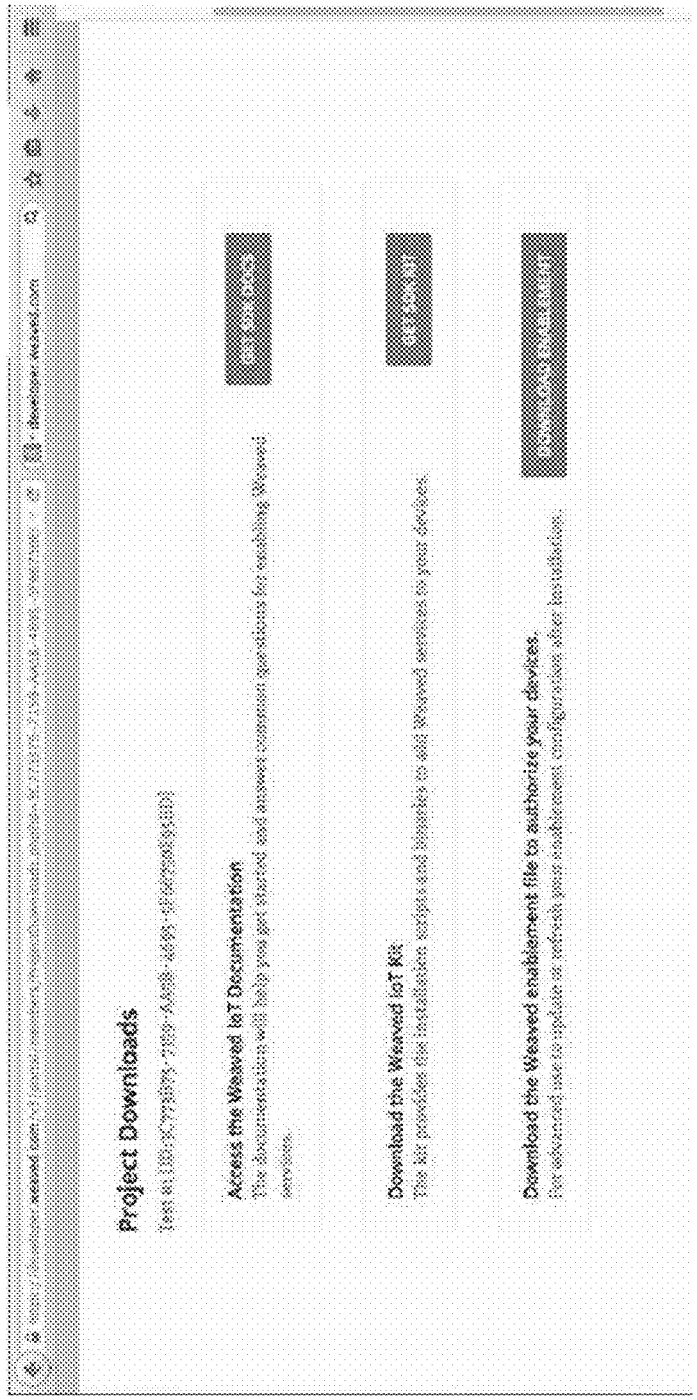

FIG. 62 depicts a device authorization user interface as used in the installation and configuration of connected devices, according to one embodiment.

Figure 63:
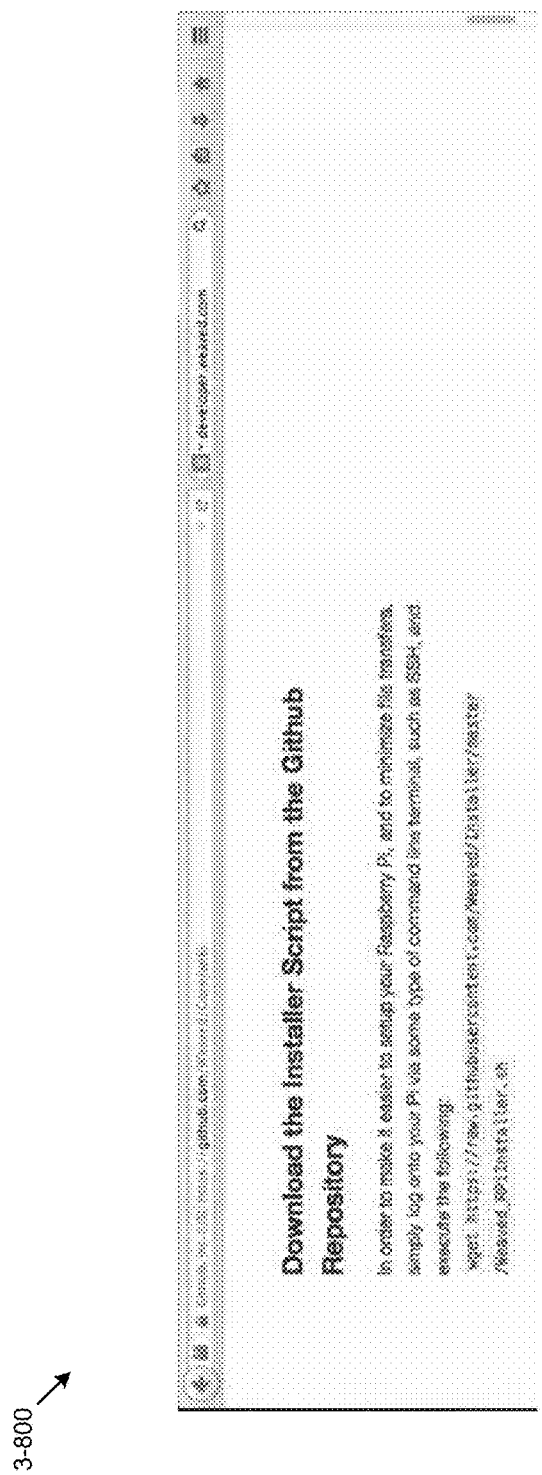

FIG. 63 depicts a script access user interface as used in the installation and configuration of connected devices, according to one embodiment.

FIG. 64 depicts a daemon startup user interface as used in the installation and configuration of connected devices, according to one embodiment.

Figure 65:
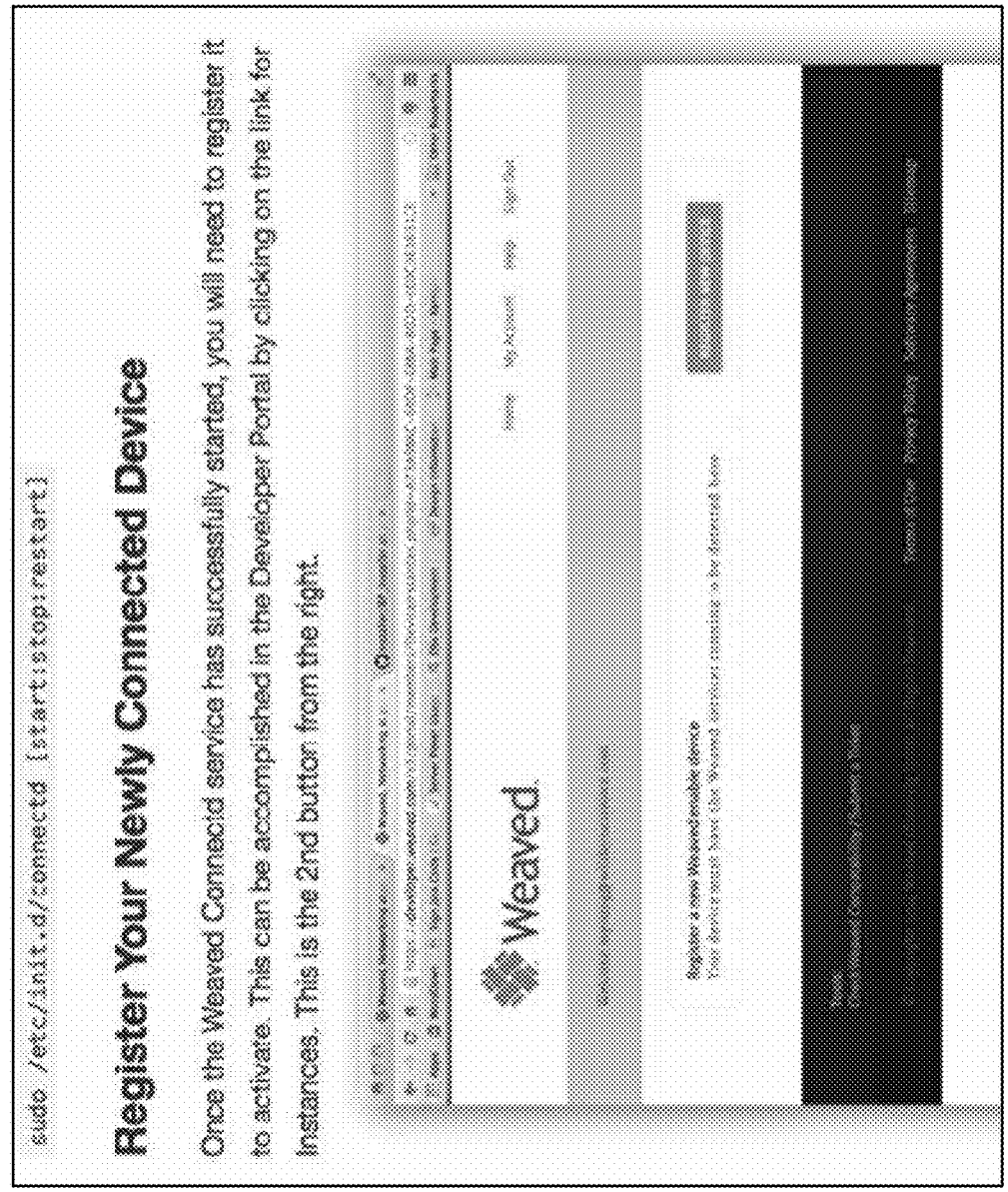

FIG. 65 depicts a connected device registration user interface as used in the installation and configuration of connected devices, according to one embodiment.

Figure 66:
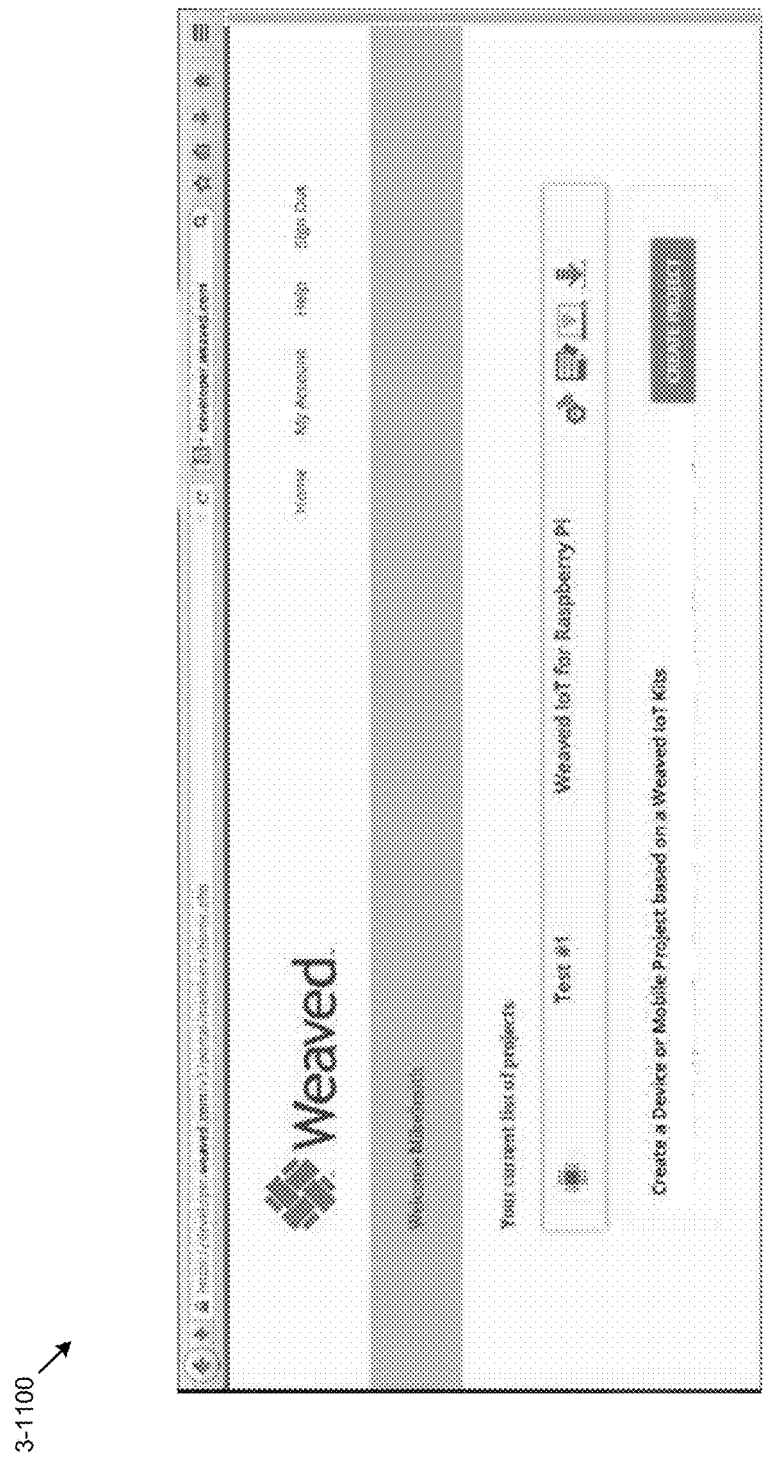

FIG. 66 depicts a project listing user interface as used in the installation and configuration of connected devices, according to one embodiment.

Figure 67:
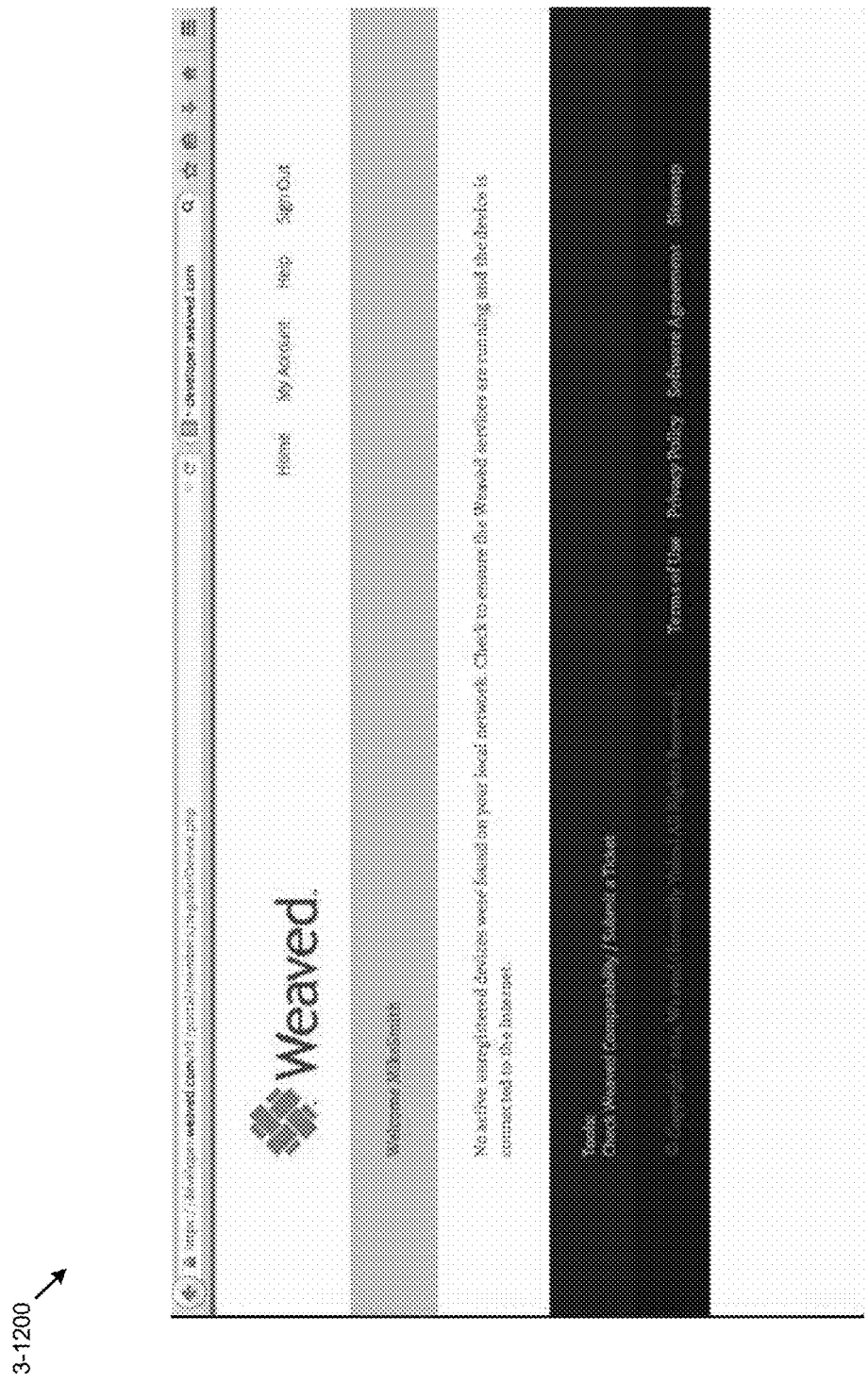

FIG. 67 depicts a startup page user interface as used in the installation and configuration of connected devices, according to one embodiment.

Figure 68:
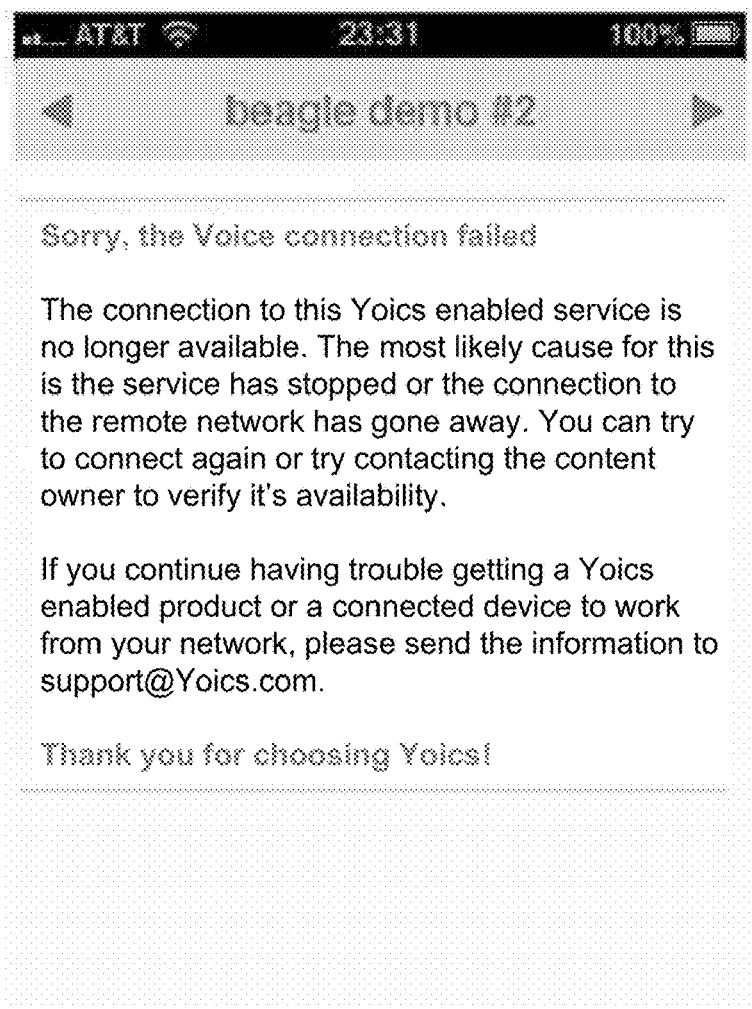

FIG. 68 depicts a display terminal status page as used in the installation and configuration of connected devices, according to one embodiment.

Figure 69:

FIG. 69 depicts a display terminal upgrade prompt user interface as used in the installation and configuration of connected devices, according to one embodiment.

Figure 70:
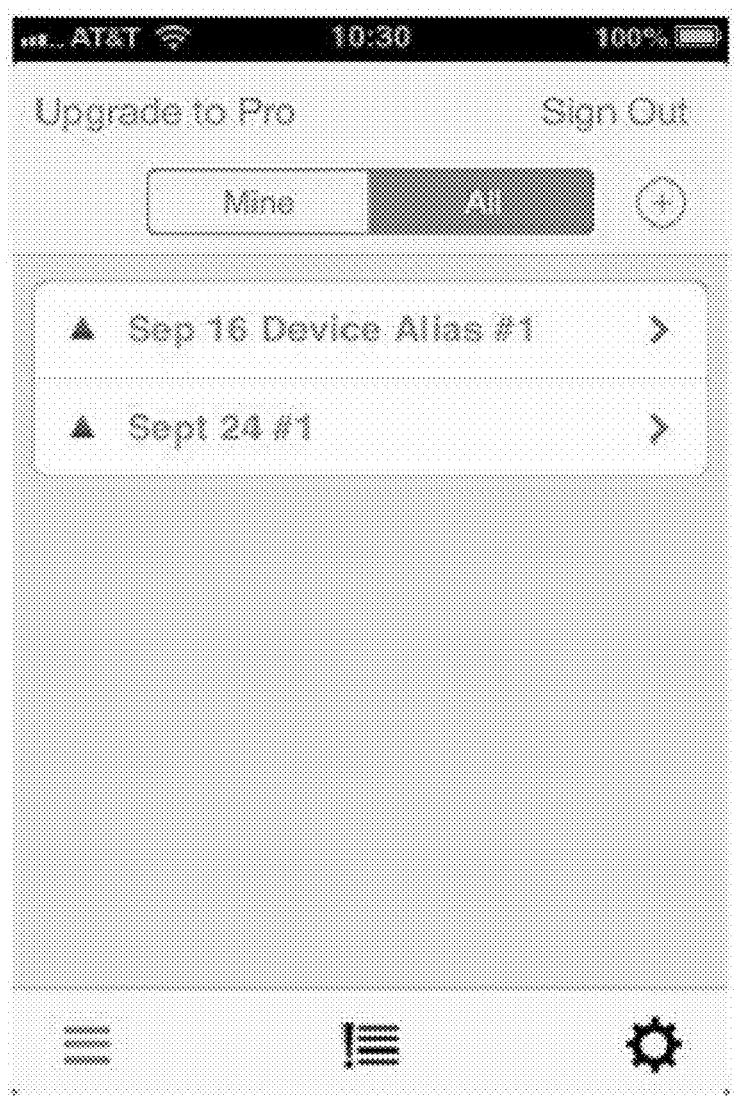

FIG. 70 depicts a display terminal upgrade status user interface as used in the installation and configuration of connected devices, according to one embodiment.

Figure 71:

FIG. 71 depicts a display terminal device error user interface as used in the installation and configuration of connected devices, according to one embodiment.

Figure 72:
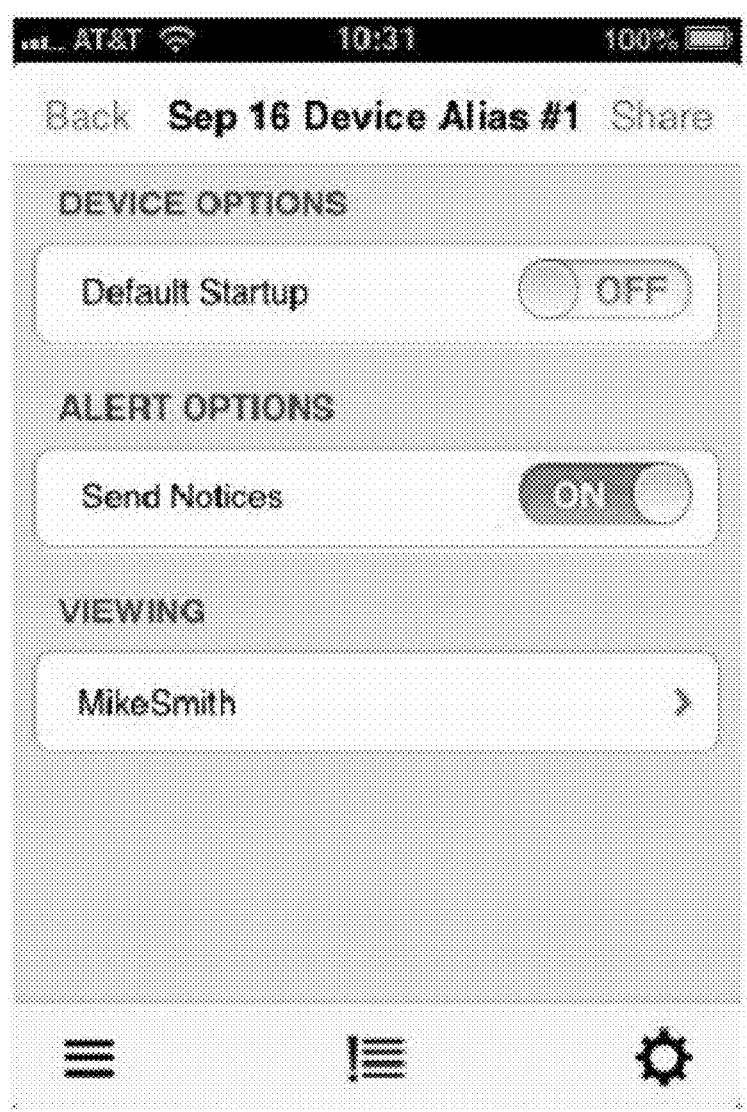

FIG. 72 depicts a display terminal option setup user interface as used in the installation and configuration of connected devices, according to one embodiment.

Figure 73:
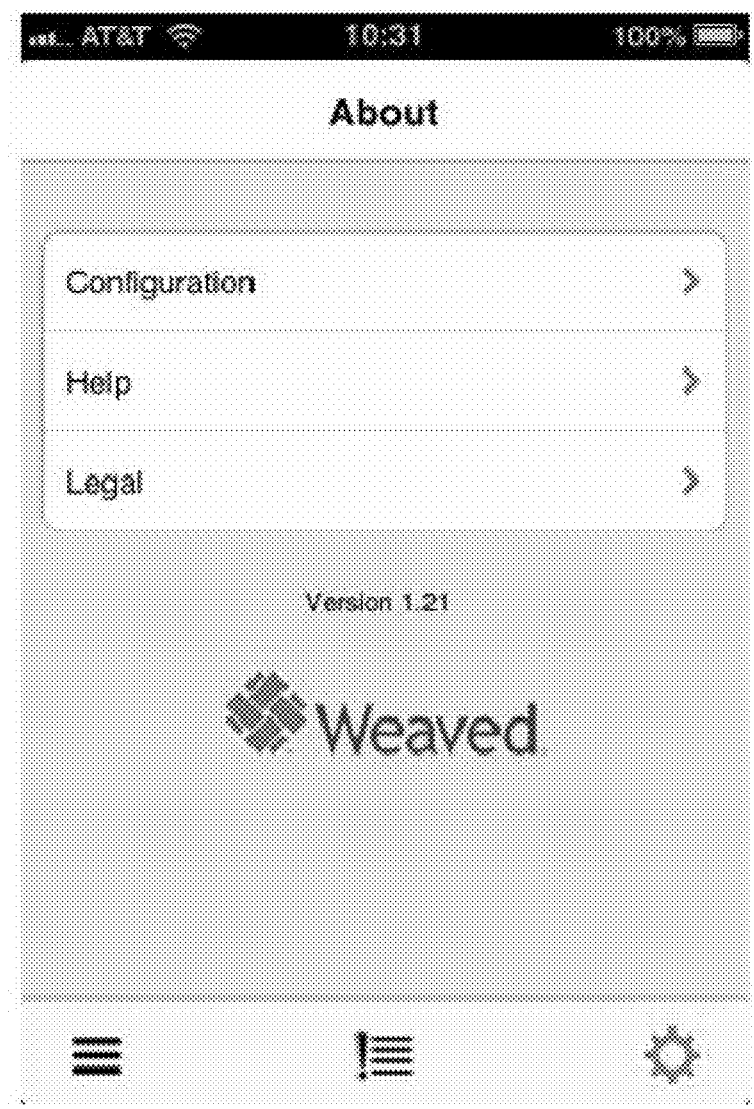

FIG. 73 depicts a display terminal information display user interface as used in the installation and configuration of connected devices, according to one embodiment.

Figure 74:
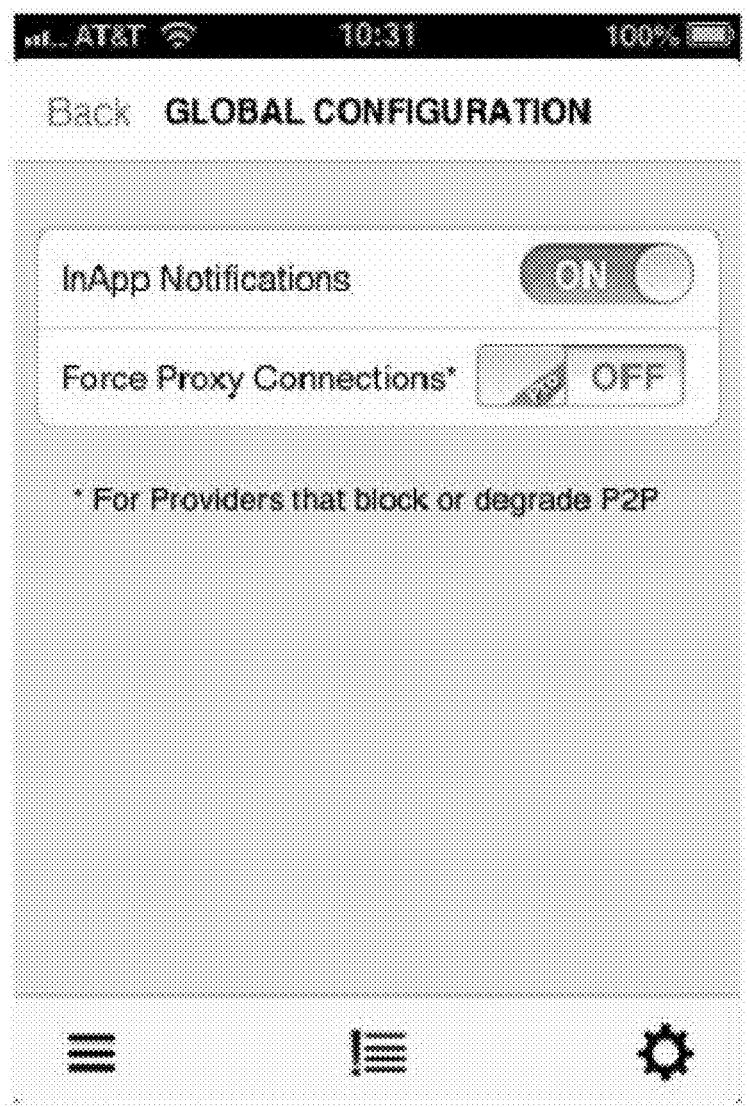

FIG. 74 depicts a display terminal global configuration user interface as used in the installation and configuration of connected devices, according to one embodiment.

Figure 75:
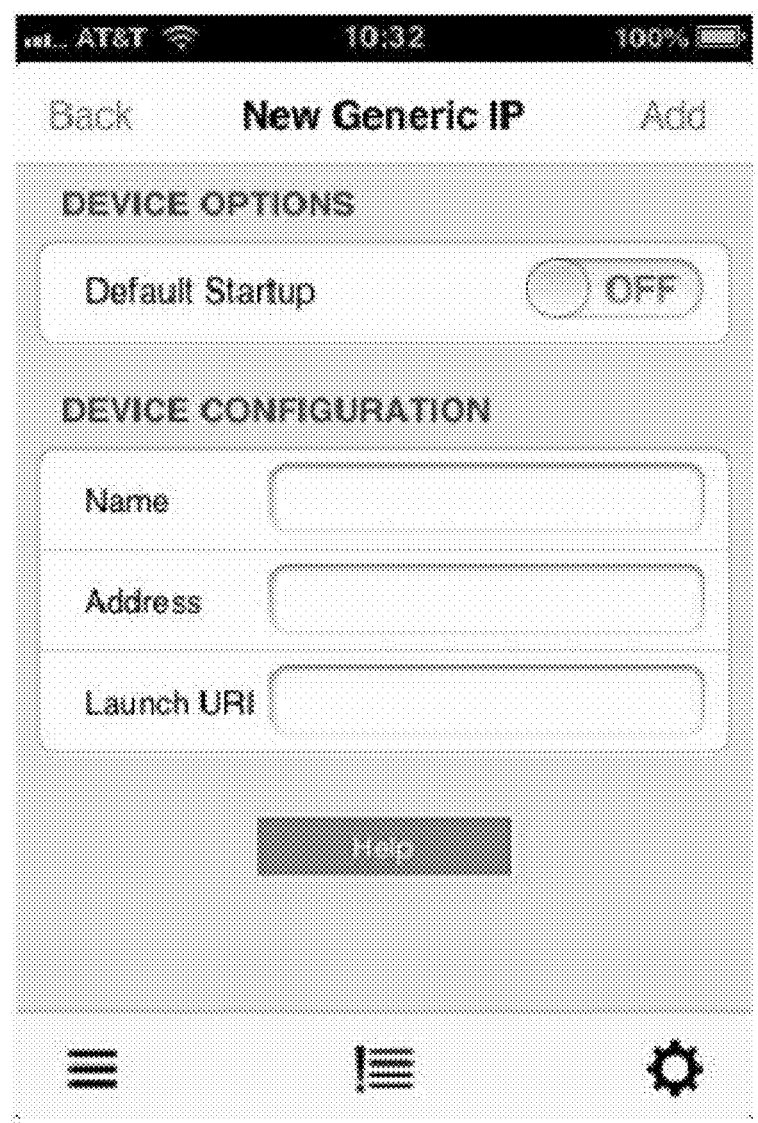

FIG. 75 depicts a display terminal device options user interface as used in the installation and configuration of connected devices, according to one embodiment.

Figure 76:
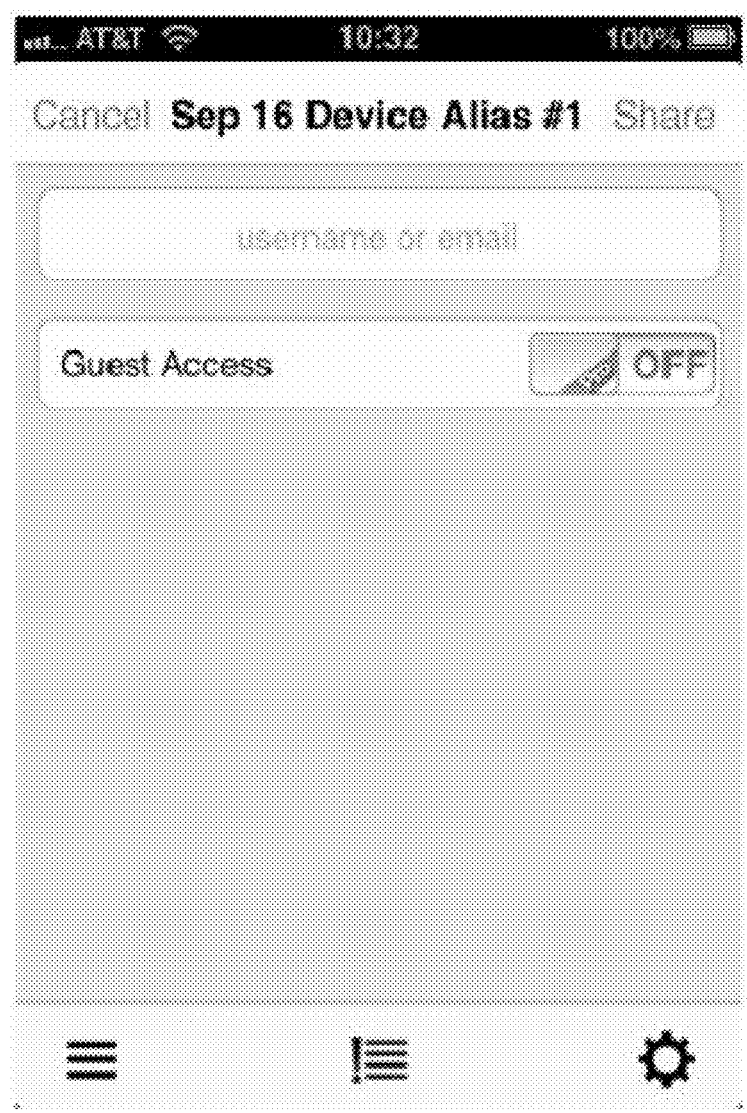

FIG. 76 depicts a display terminal guest access setup user interface as used in the installation and configuration of connected devices, according to one embodiment.

Figure 77:
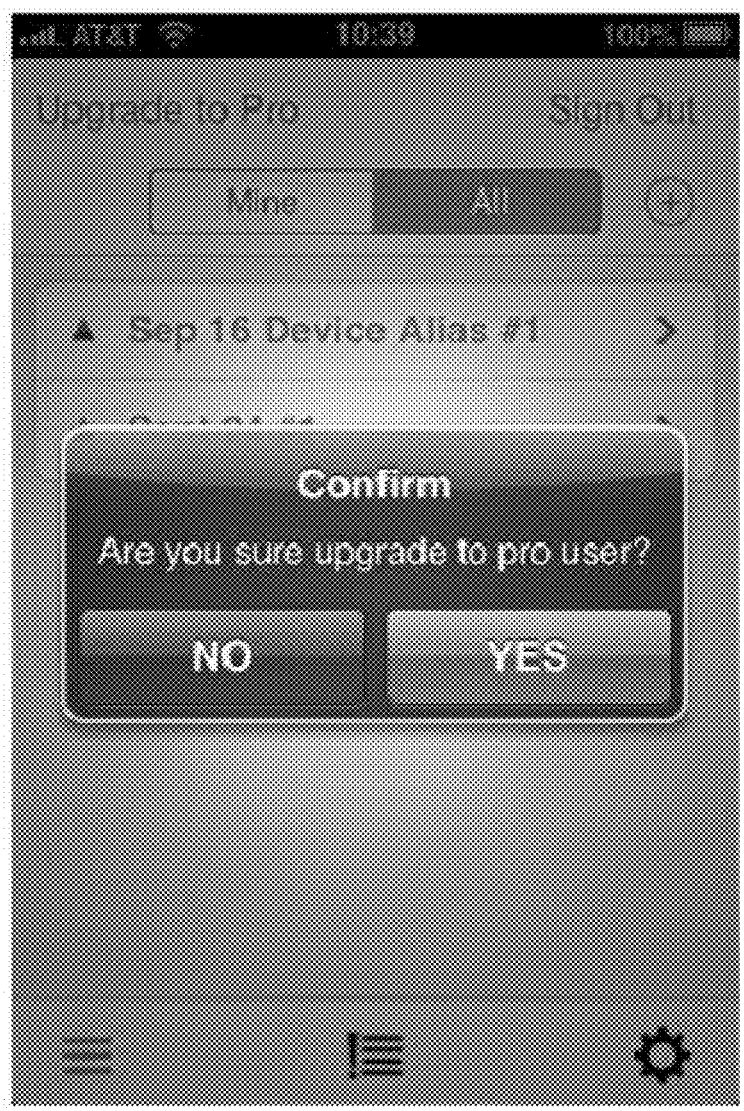

FIG. 77 depicts a display terminal confirmation user interface as used in the installation and configuration of connected devices, according to one embodiment.

Figure 78:
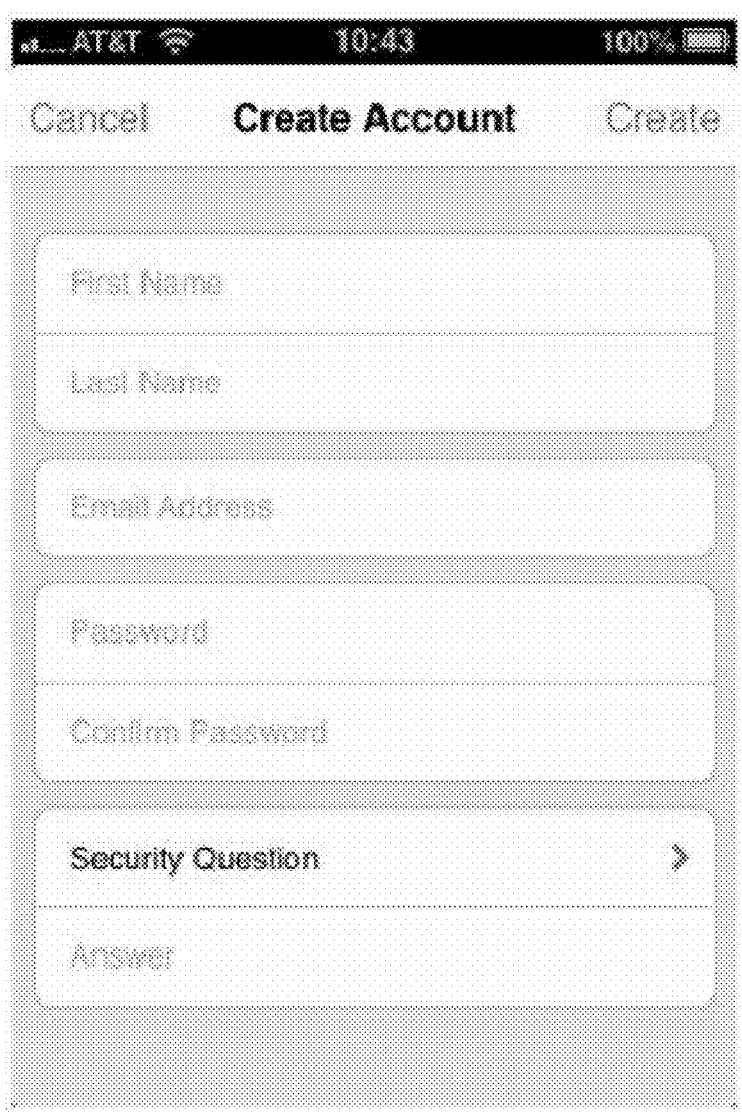

FIG. 78 depicts a display terminal account creation user interface as used in the installation and configuration of connected devices, according to one embodiment.

Figure 79:

FIG. 79 depicts a display terminal browser-oriented user interface as used in the installation and configuration of connected devices, according to one embodiment.

FIG. 80 depicts a display terminal device-specific browser rendering user interface as used in the installation and configuration of connected devices, according to one embodiment.

Figure 81:
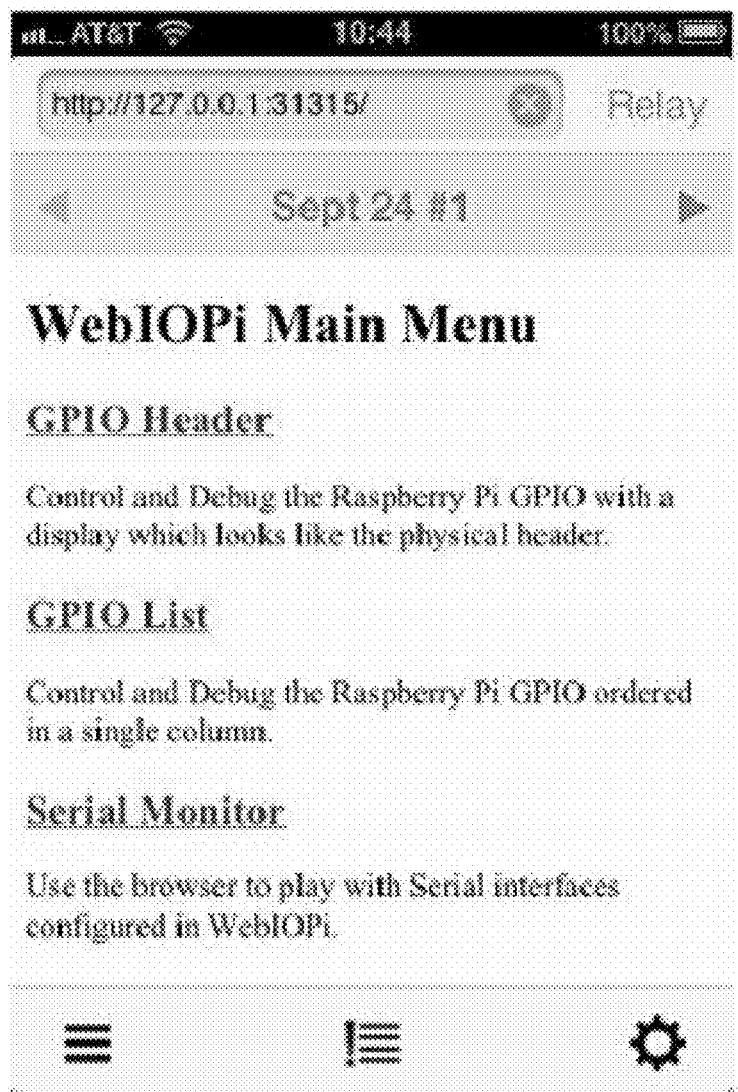

FIG. 81 depicts a display terminal port-addressable device-specific browser-oriented user interface as used in the installation and configuration of connected devices, according to one embodiment.

Figure 82:

FIG. 82 depicts a display terminal account setup interview user interface as used in the installation and configuration of connected devices, according to one embodiment.

Figure 83:
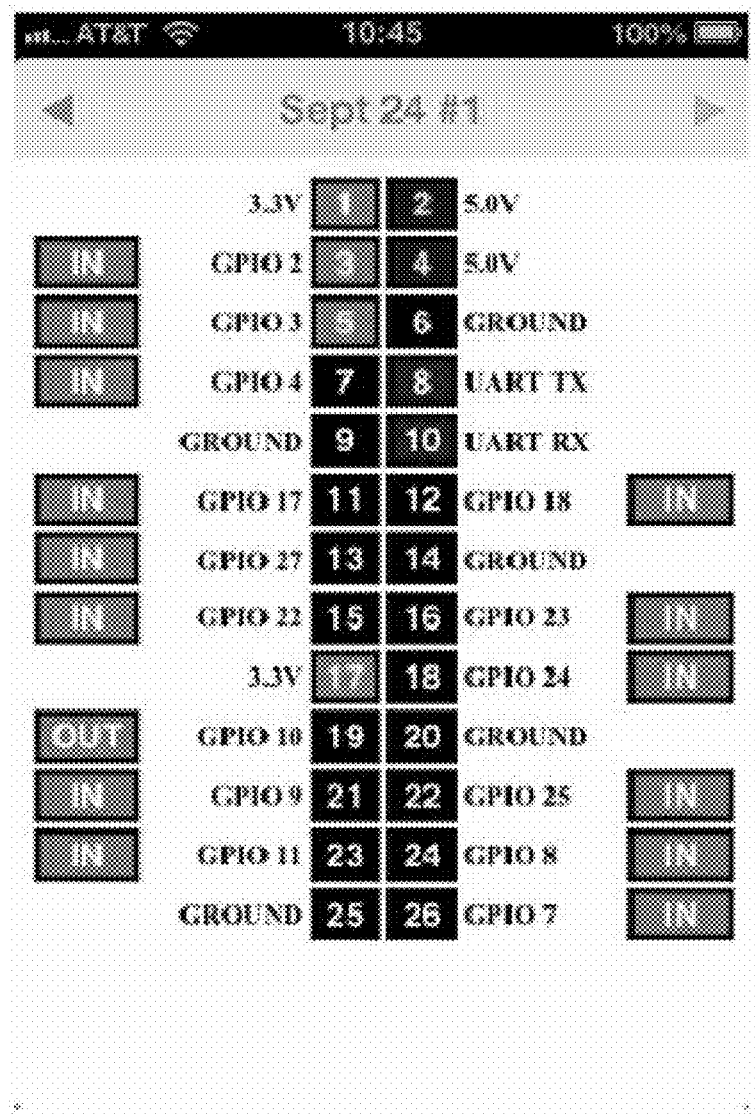

FIG. 83 depicts a display terminal device-specific signal configuration user interface as used in the installation and configuration of connected devices, according to one embodiment.

Figure 84:
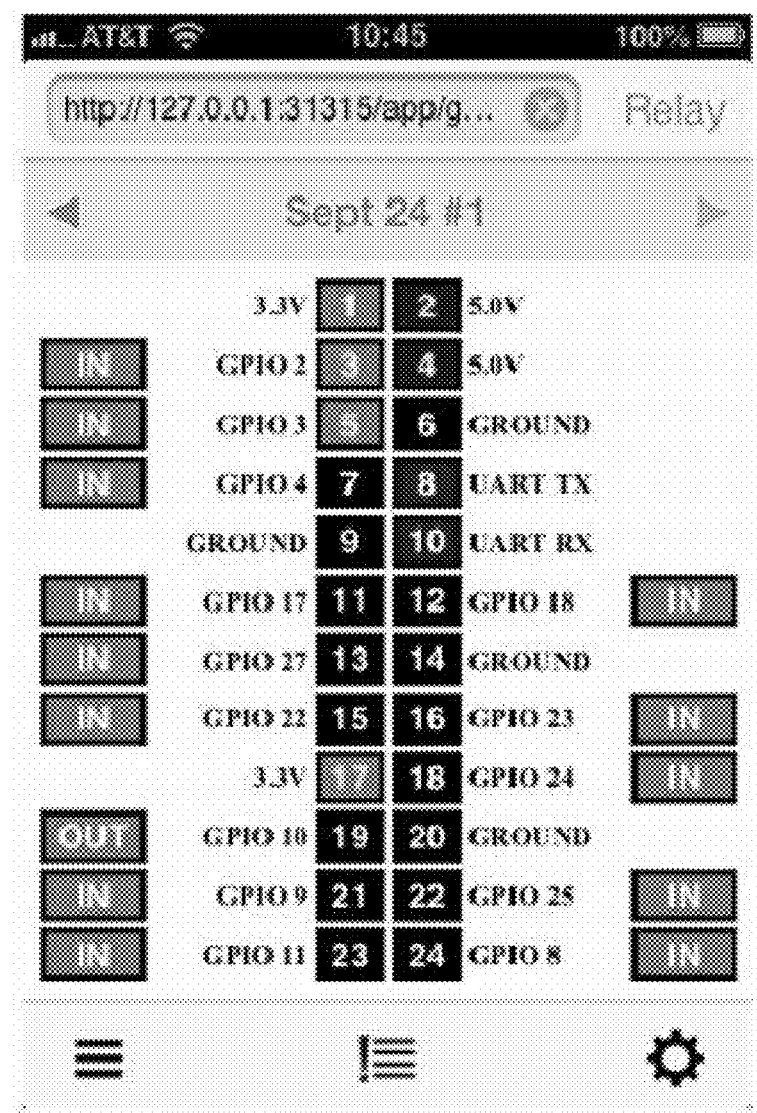

FIG. 84 depicts a display terminal instance-specific signal configuration user interface as used in the installation and configuration of connected devices, according to one embodiment.

Figure 85:

FIG. 85 depicts a display terminal signal configuration editor interface as used in the installation and configuration of connected devices, according to one embodiment.

Figure 86:
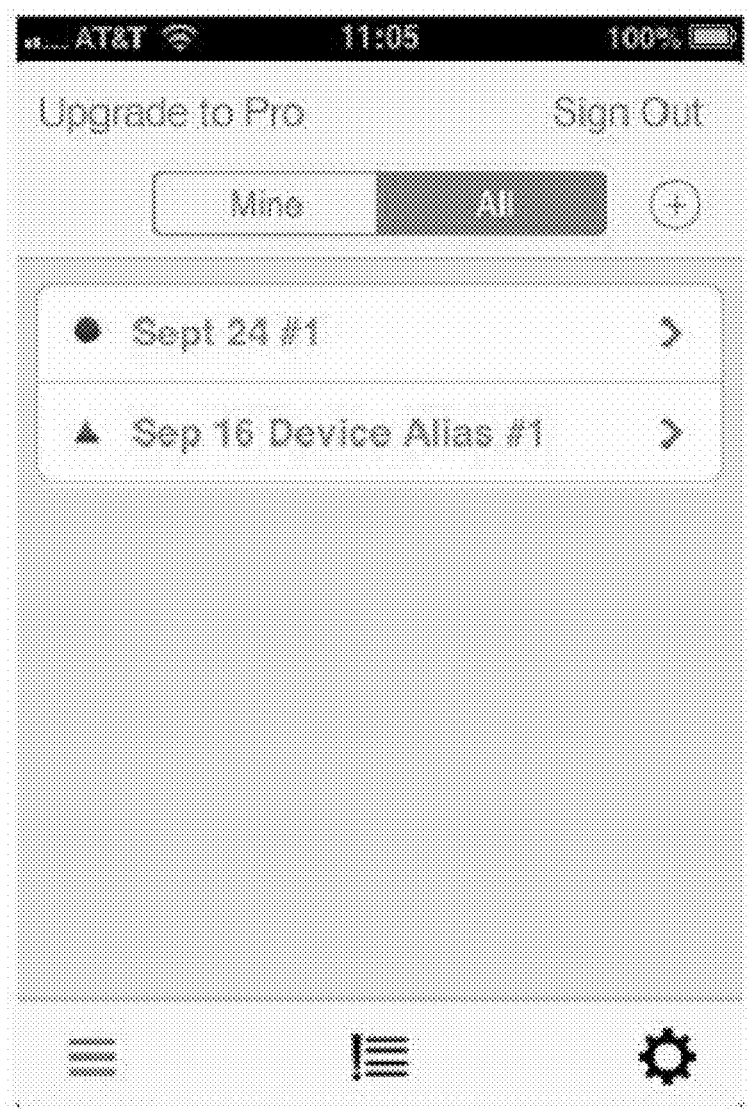

FIG. 86 depicts a display terminal device enumeration user interface as used in the installation and configuration of connected devices, according to one embodiment.

Figure 87:

FIG. 87 depicts a display terminal device timeout status user interface as used in the installation and configuration of connected devices, according to one embodiment.

Figure 88:
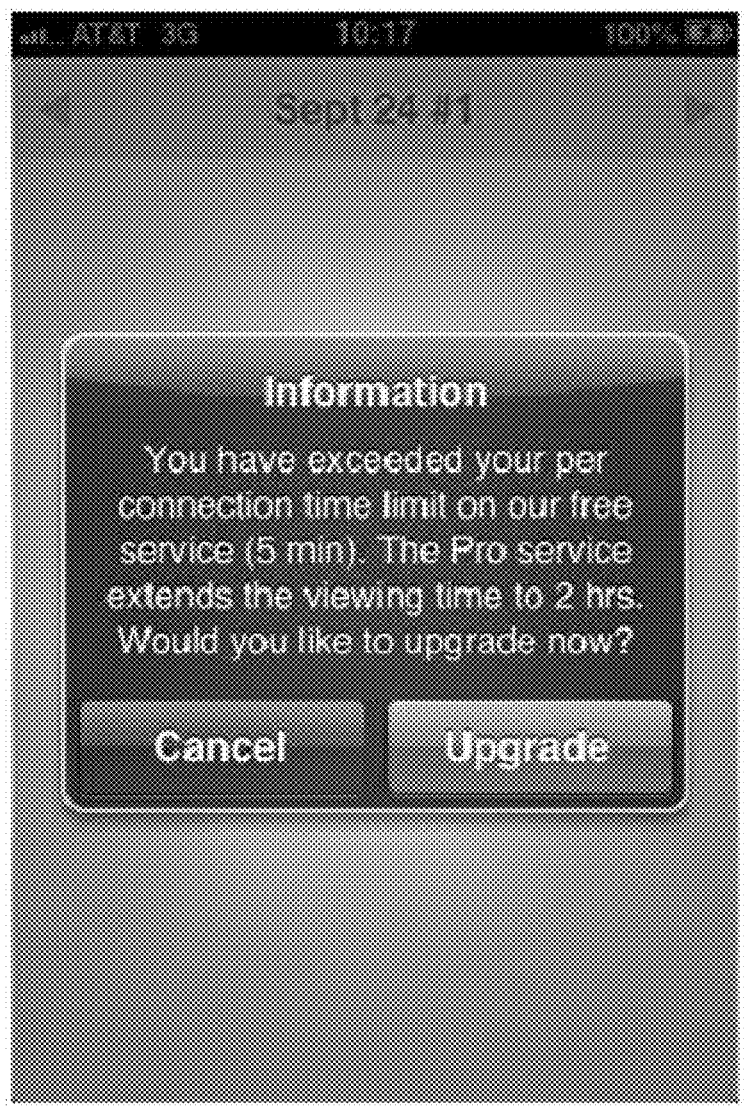

FIG. 88 depicts a display terminal device limit status user interface as used in the installation and configuration of connected devices, according to one embodiment.

Figure 89:
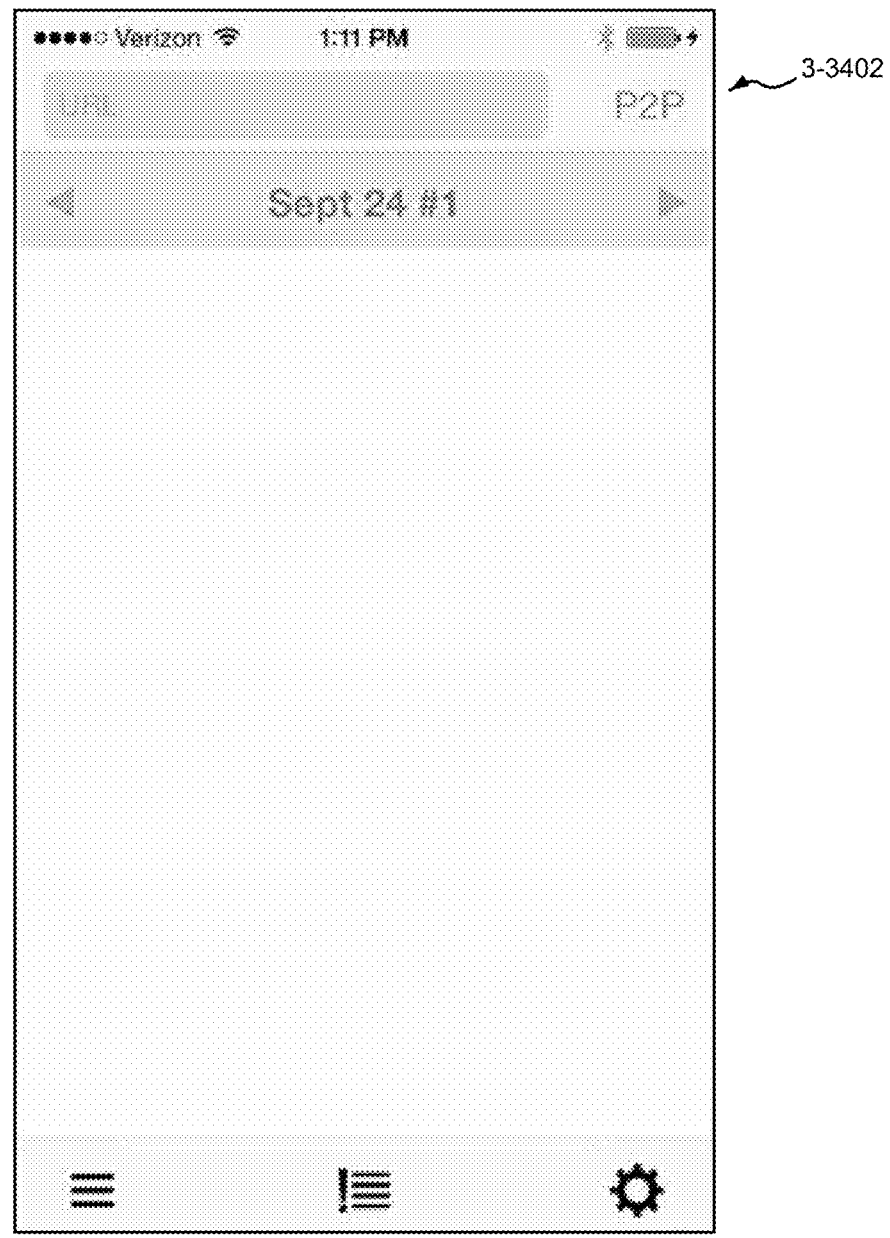

FIG. 89 depicts a display terminal peer-to-peer status user interface as used in the installation and configuration of connected devices, according to one embodiment.

Figure 90:
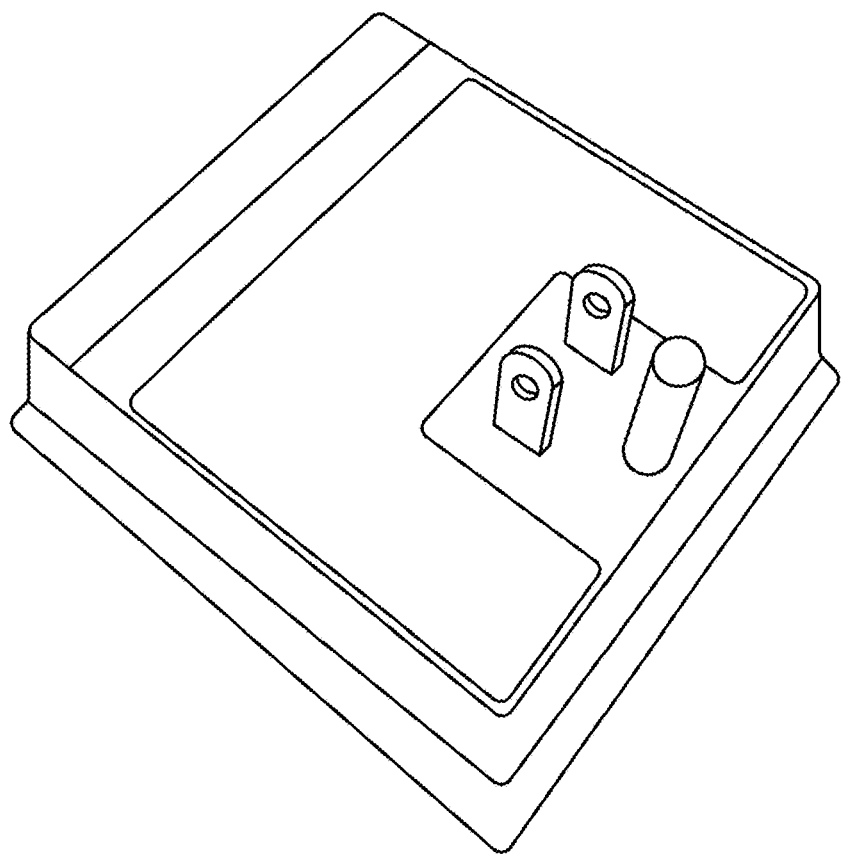

FIG. 90 presents an image of a connected device as used in the installation and configuration of connected devices, according to one embodiment.

Figure 91:
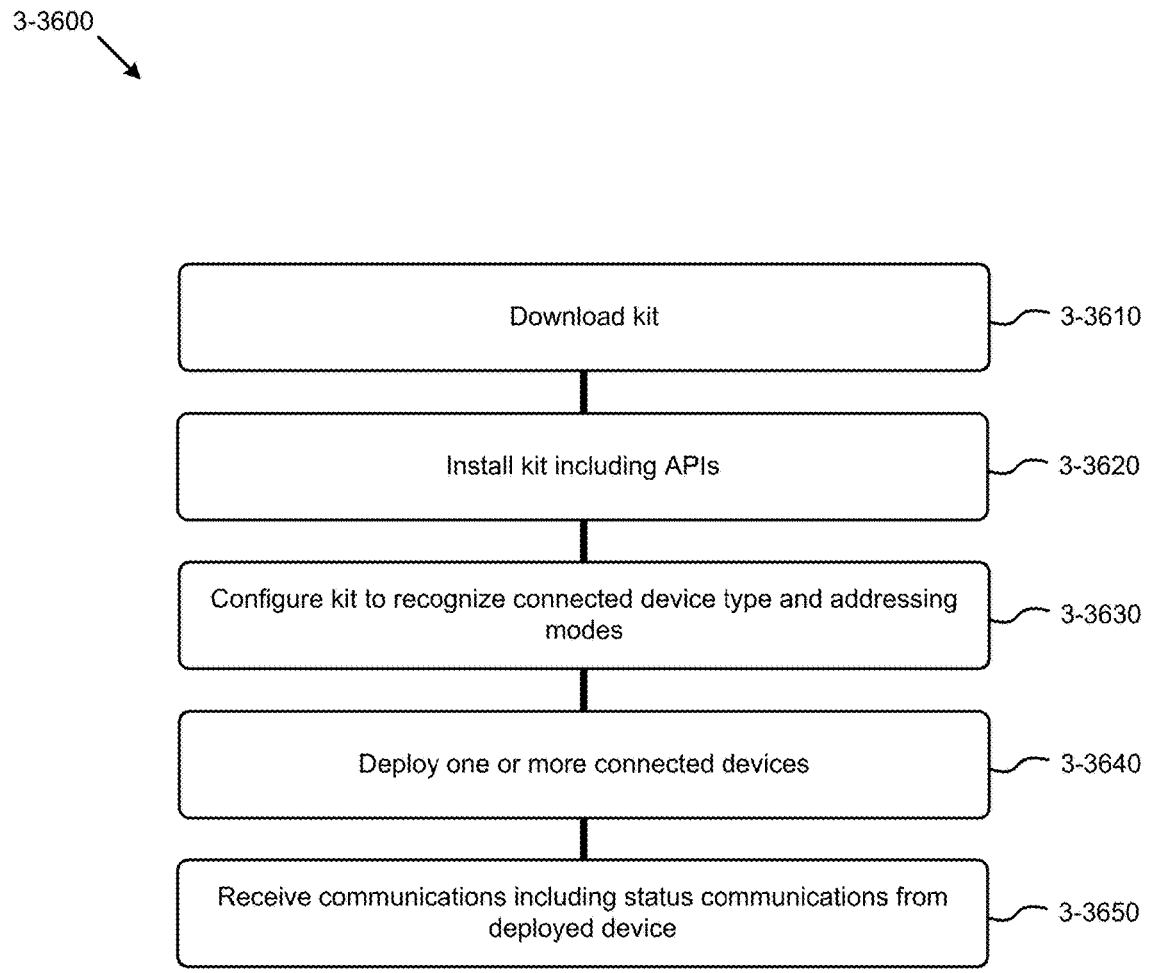

FIG. 91 depicts a process flow from initial download through status check performed after installation and configuration of connected devices, according to one embodiment.

Figure 92:
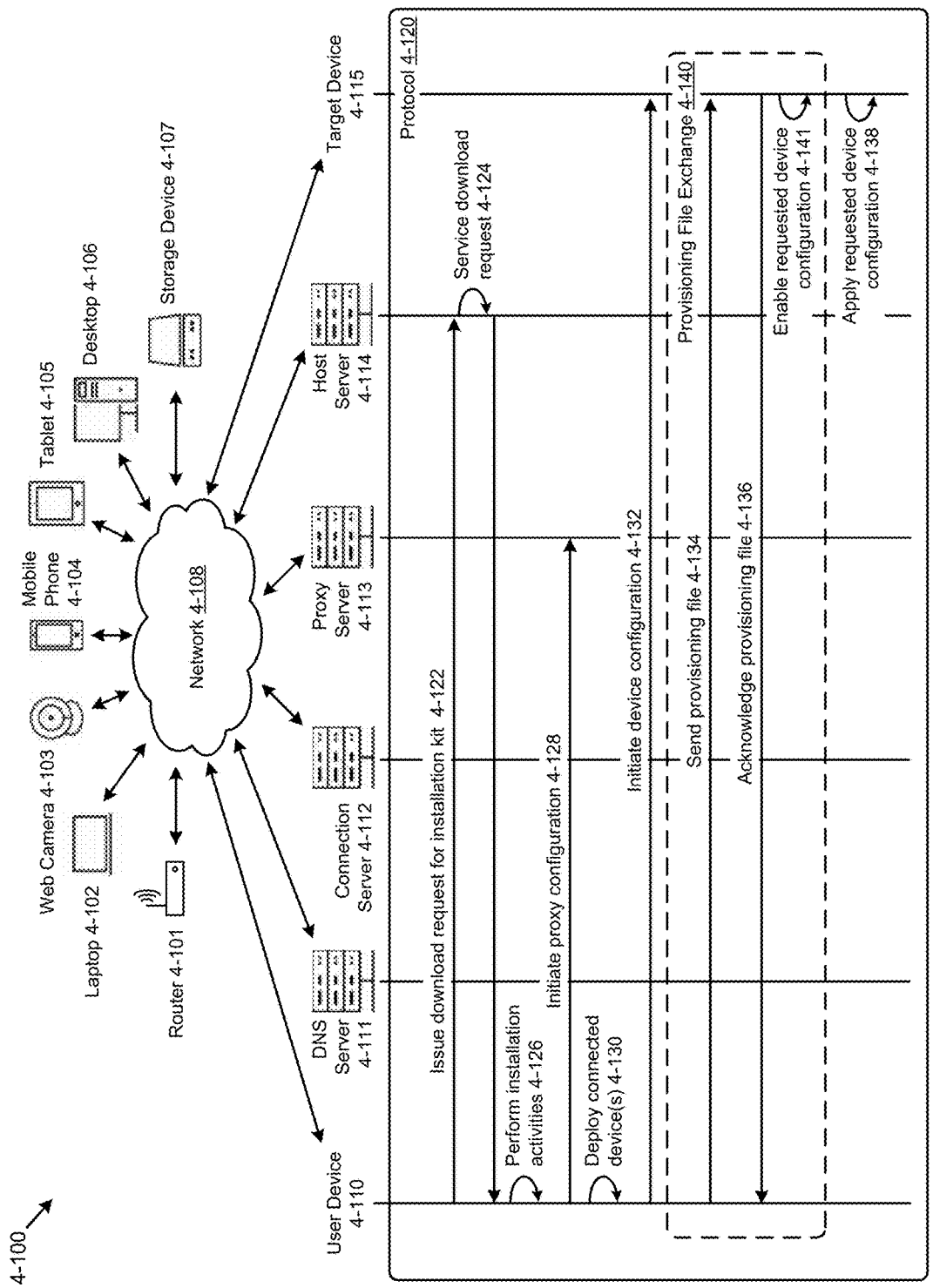

FIG. 92 depicts an environment in which devices using a partially-encrypted provisioning file can be deployed, according to one embodiment.

Figure 93:
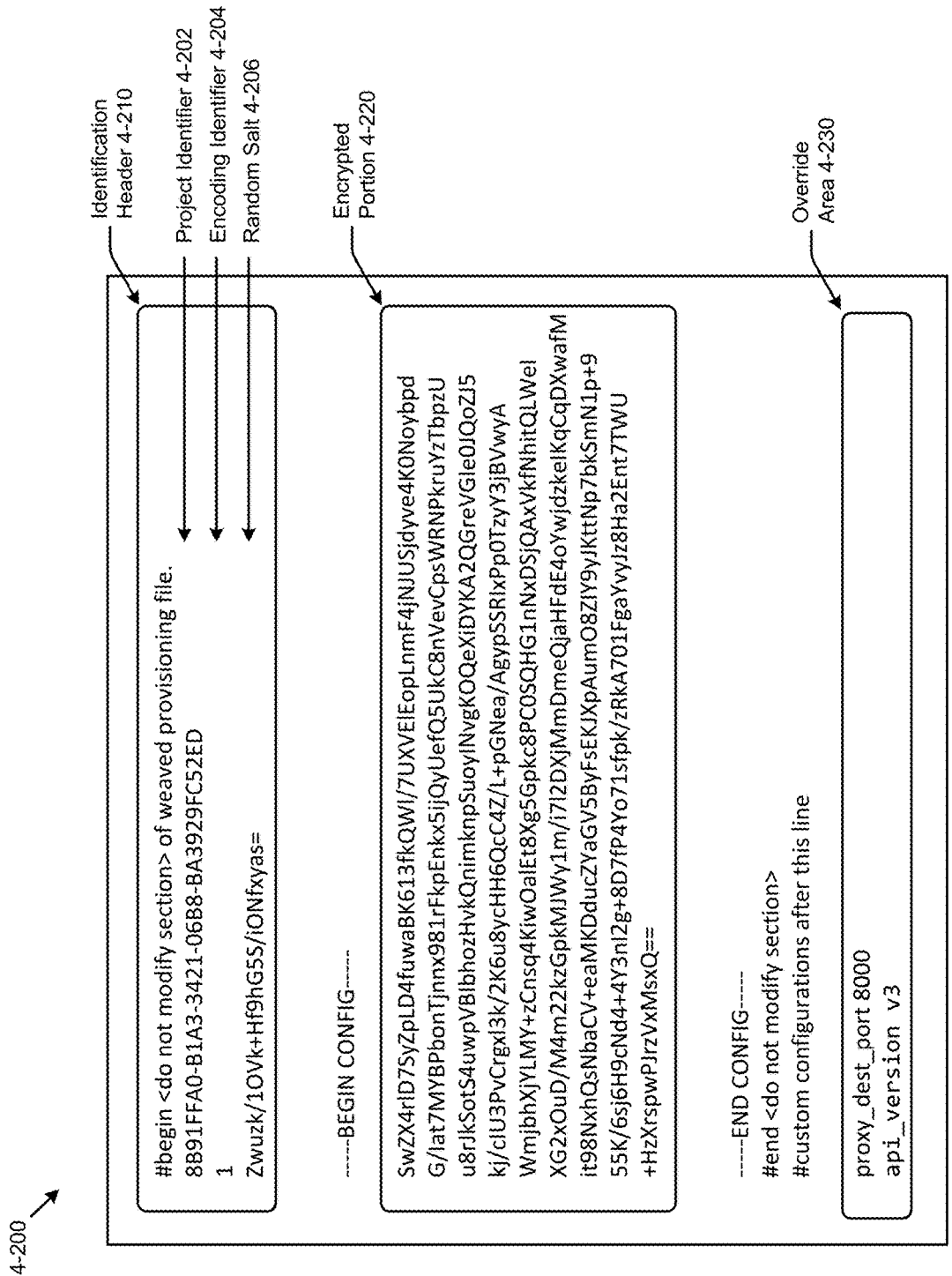

FIG. 93 presents a sample provisioning file used for secure device deployment with partially-encrypted keys or other data, according to one embodiment.

Figure 94:
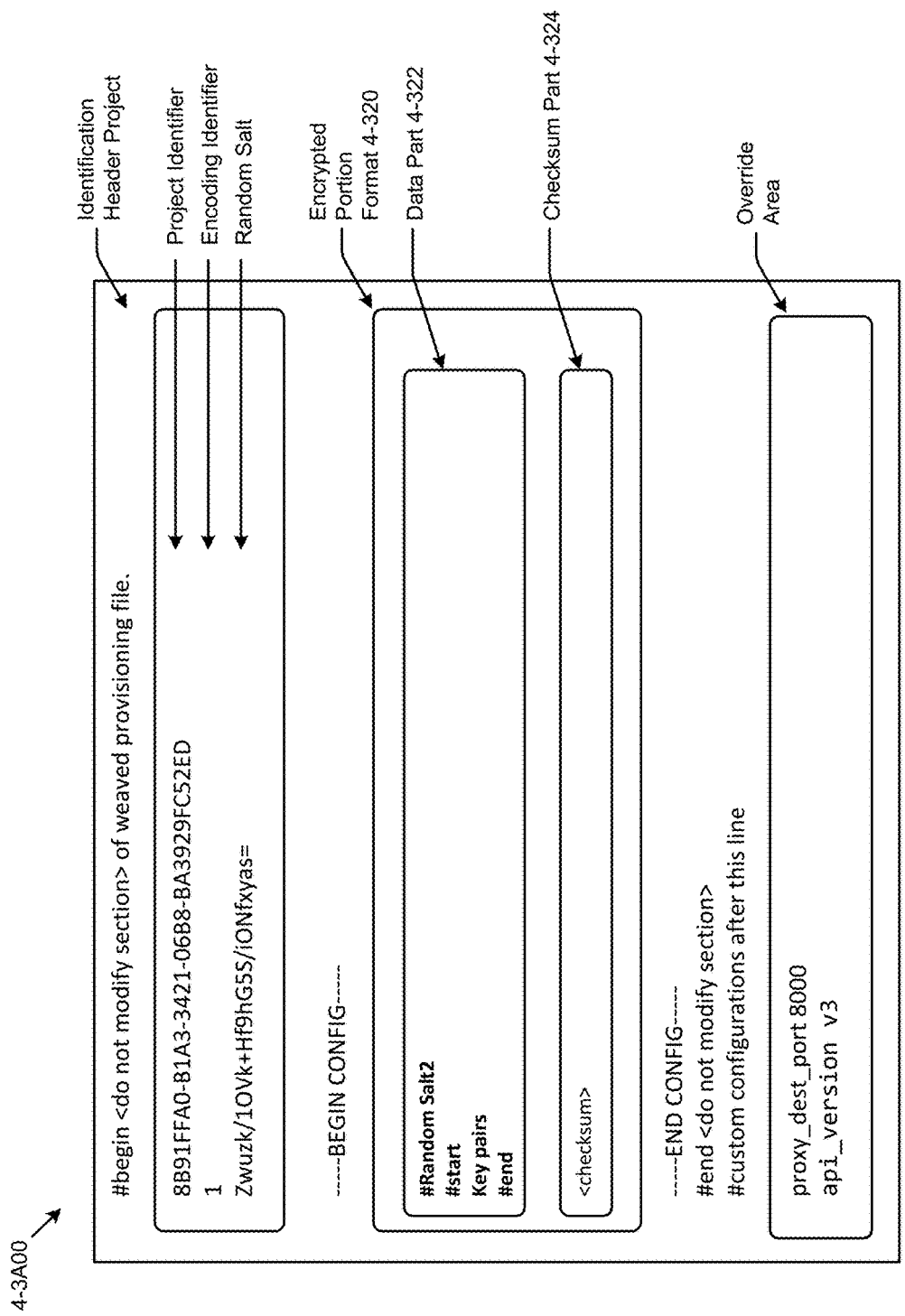

FIG. 94 presents a possible format for an encrypted portion used for secure device deployment using a partially-encrypted provisioning file, according to one embodiment.

Figure 95:
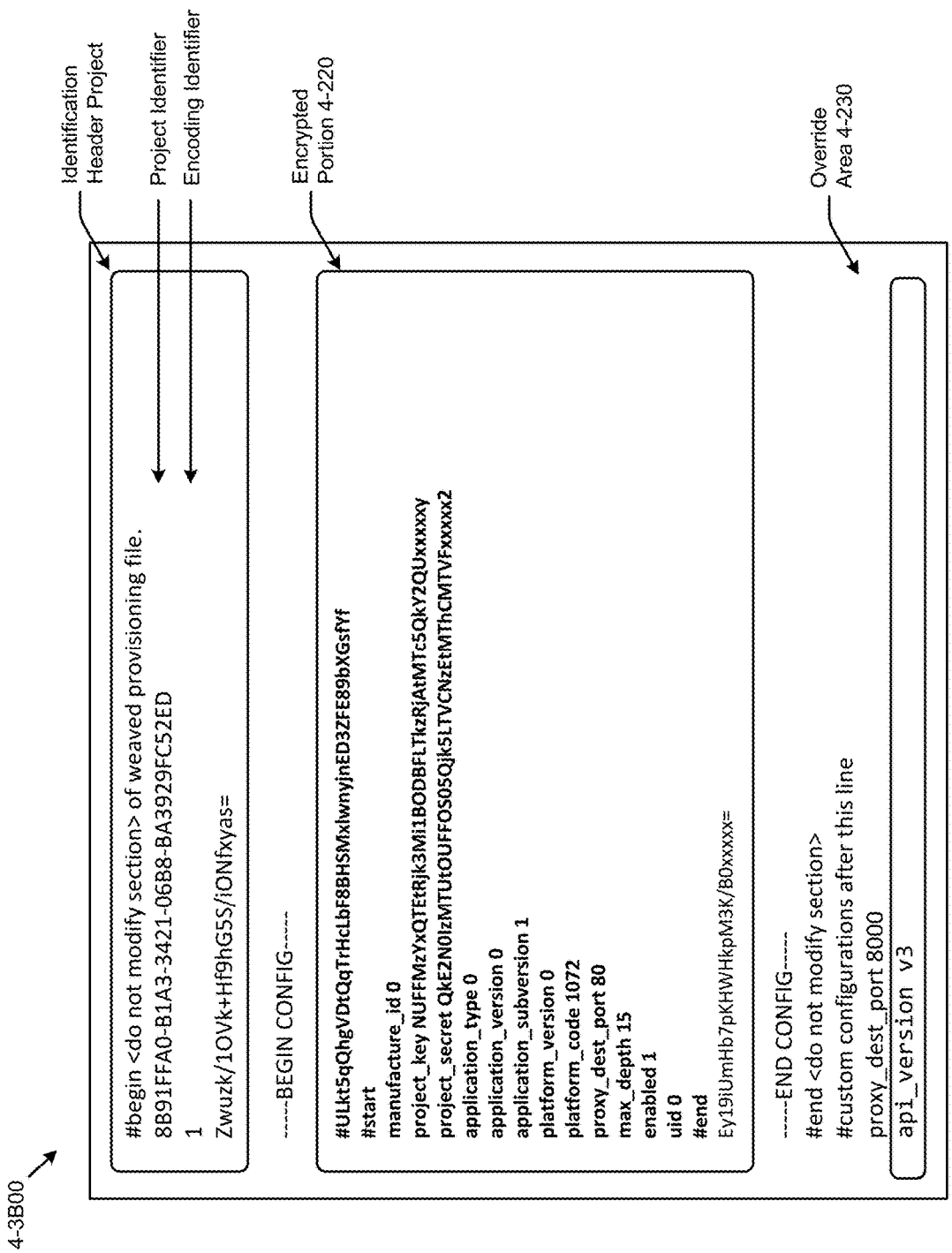

FIG. 95 presents a sample of an encrypted portion used for secure device deployment using a partially-encrypted provisioning file, according to one embodiment.

Figure 96:
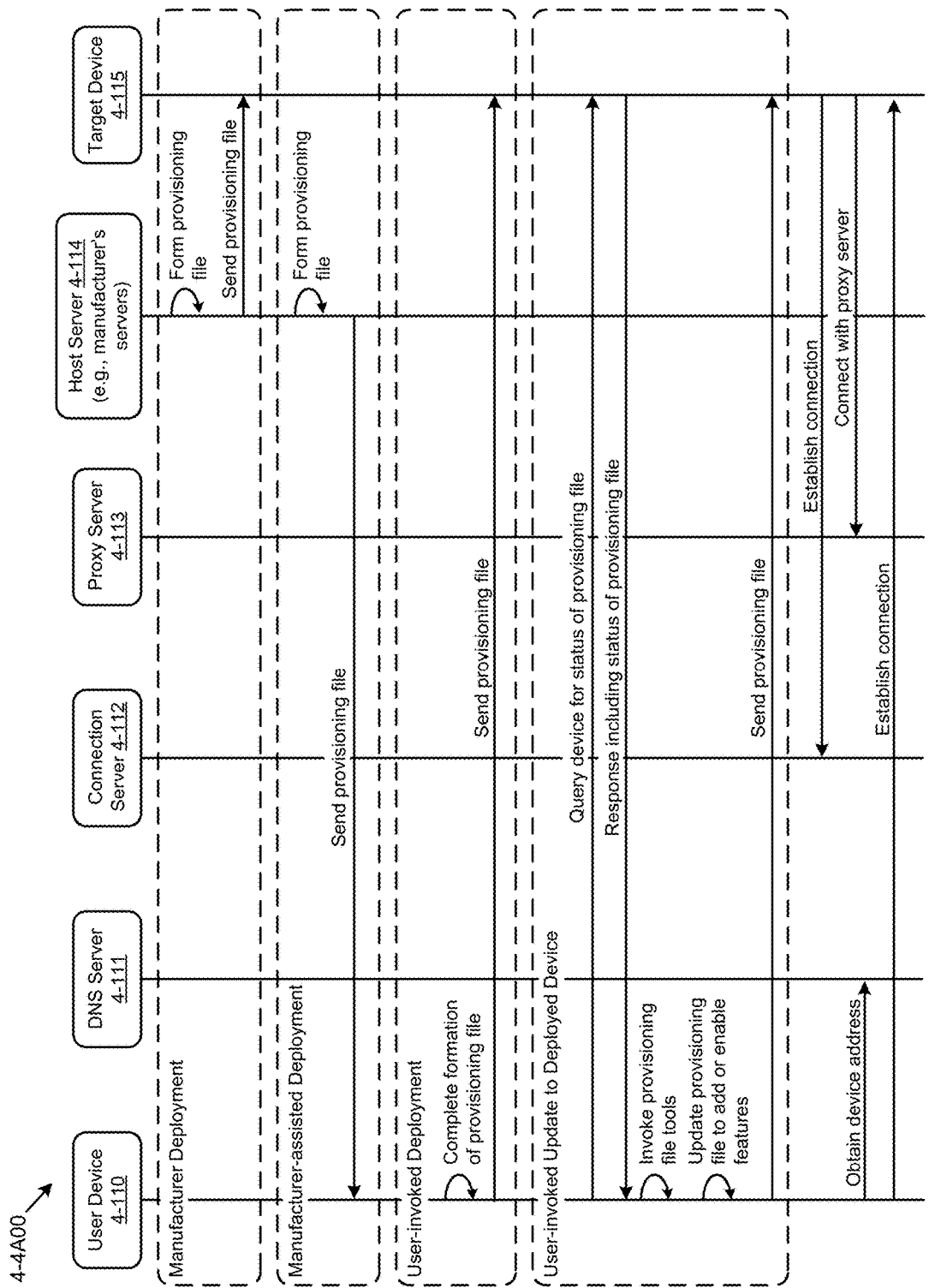

FIG. 96 presents several examples of use model protocols as used for secure device deployment using a partially-encrypted provisioning file, according to one embodiment.

Figure 97:
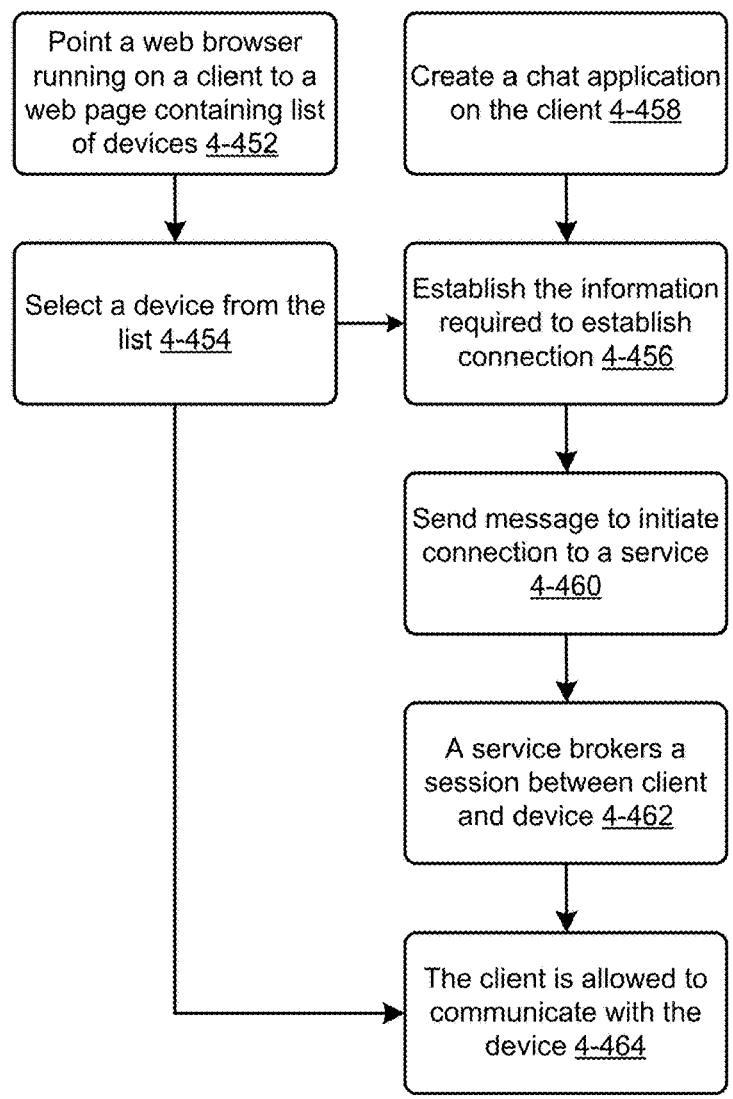

FIG. 97 shows a method for establishing communication with a device, in accordance with one embodiment.

Figure 98:
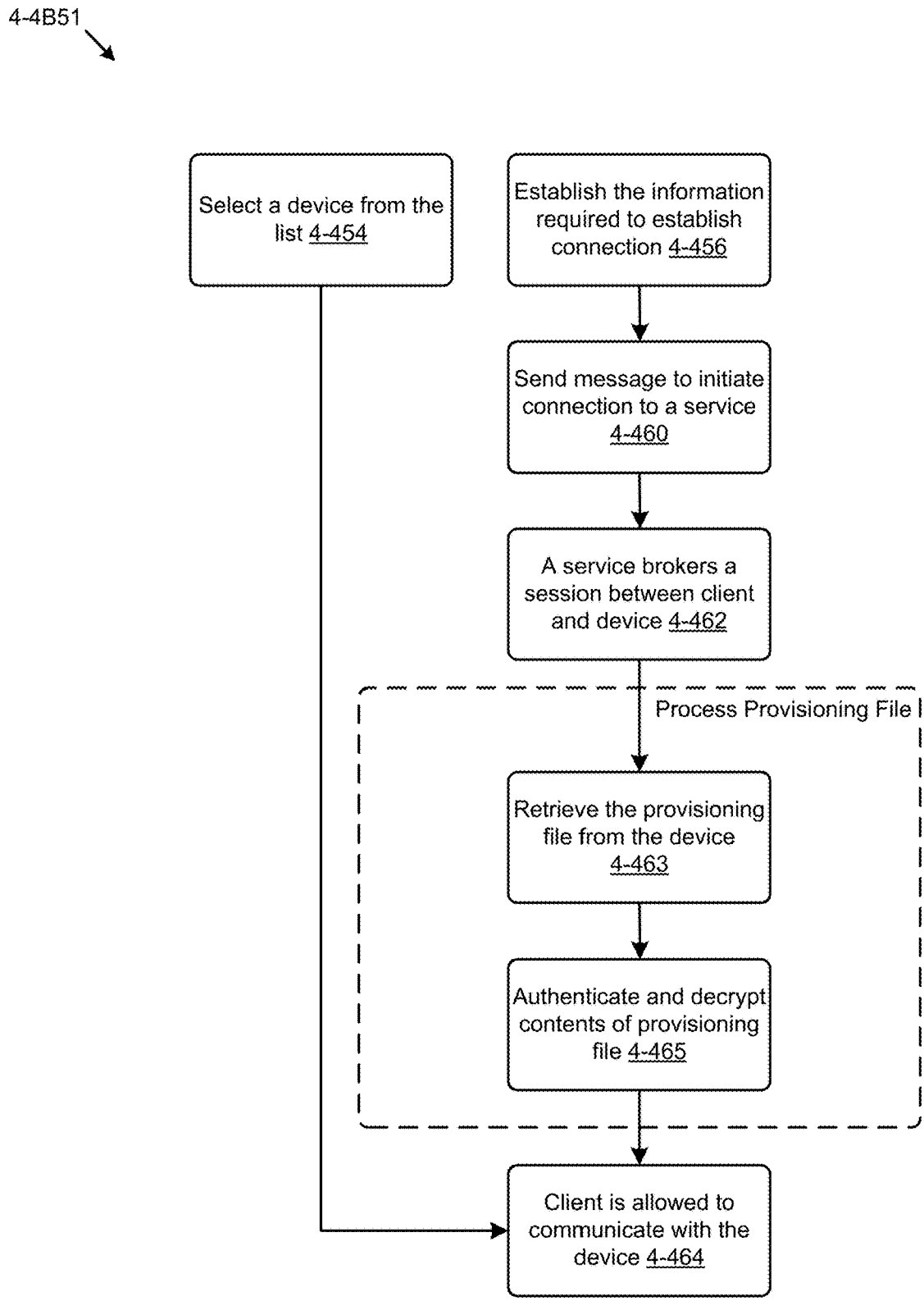

FIG. 98 shows a method for establishing authenticated and secure communication with a device, in accordance with one embodiment.

FIG. 99 shows the contents of a computer program containing device information including a partially-encrypted provisioning file, in accordance with one embodiment.

Figure 100:
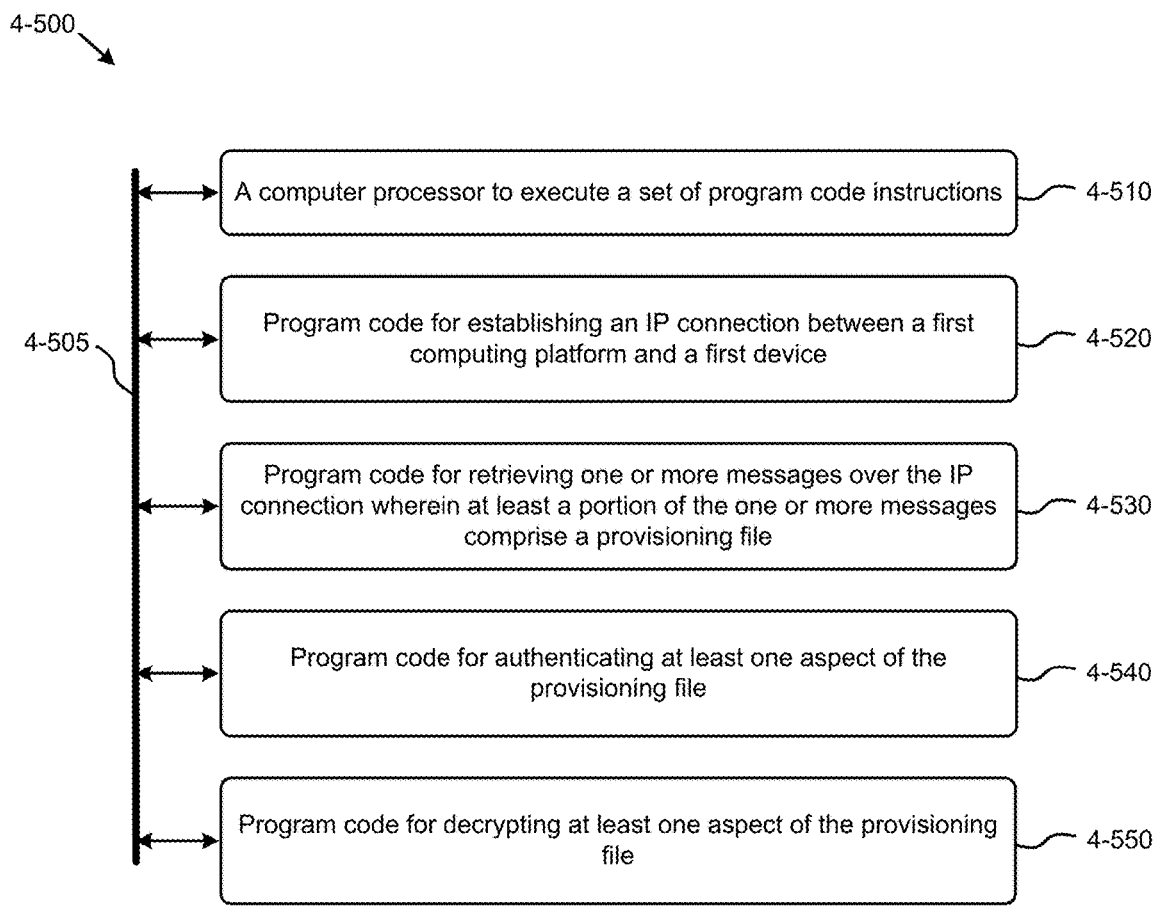

FIG. 100 is a block diagram of a system for implementing all or portions of any of the embodiments described herein.

Figure 101:
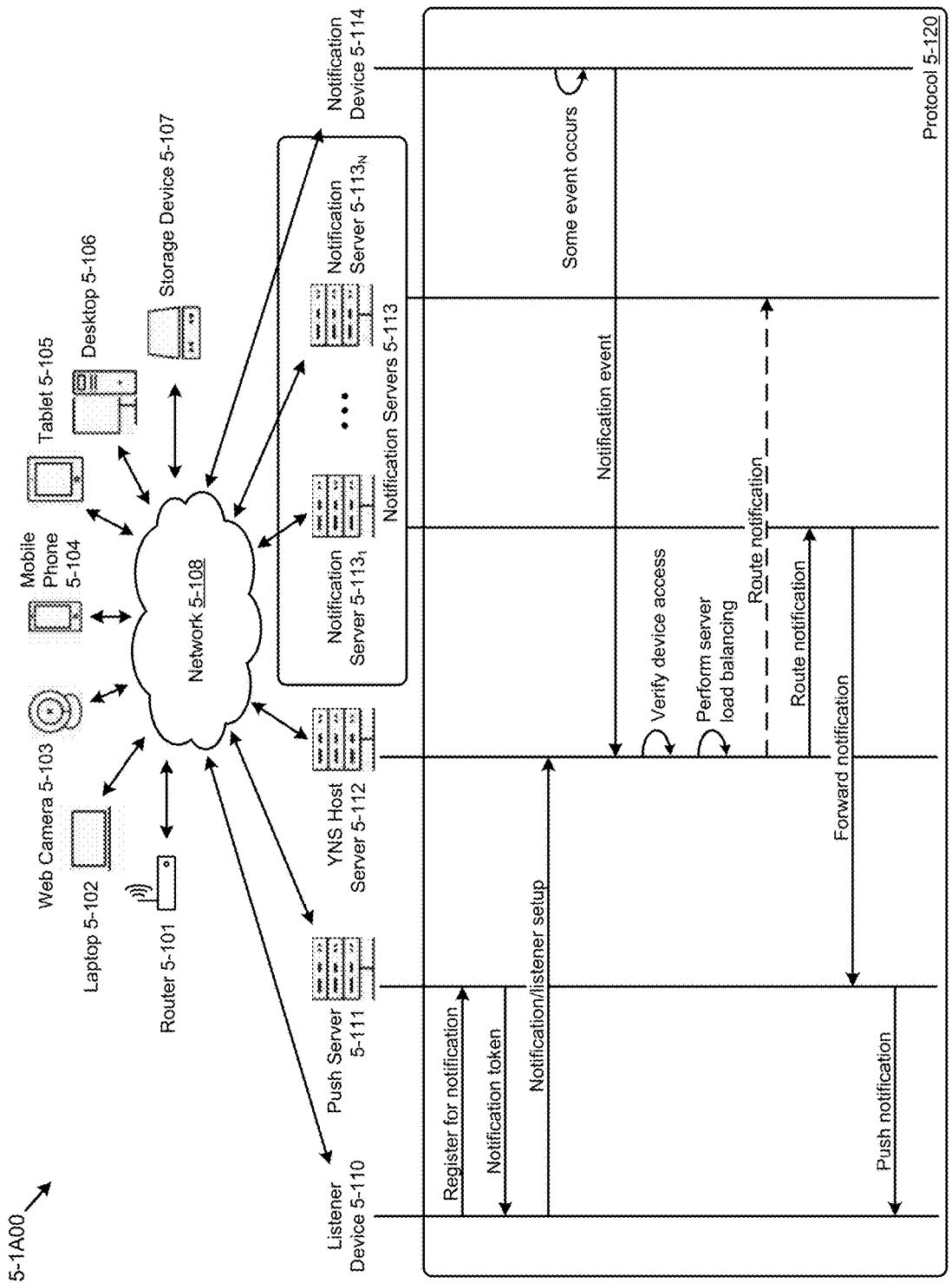

FIG. 101 is an environment that supports using multiple connection URLs to enable load balanced inter-device messaging, according to some embodiments.

Figure 102:
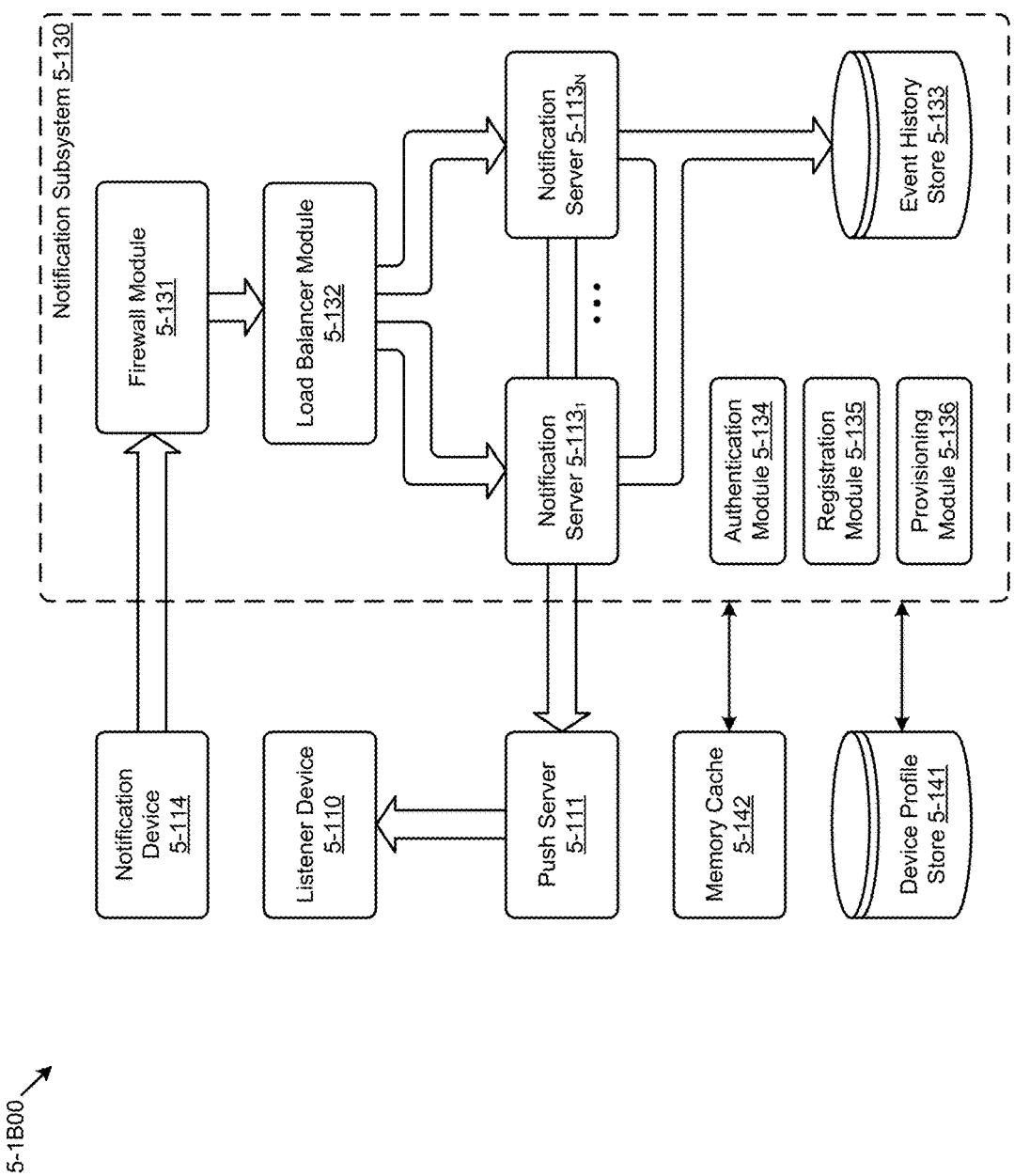

FIG. 102 is a block diagram depicting a system for using multiple connection URLs to enable load balanced inter-device messaging, according to some embodiments.

Figure 103:
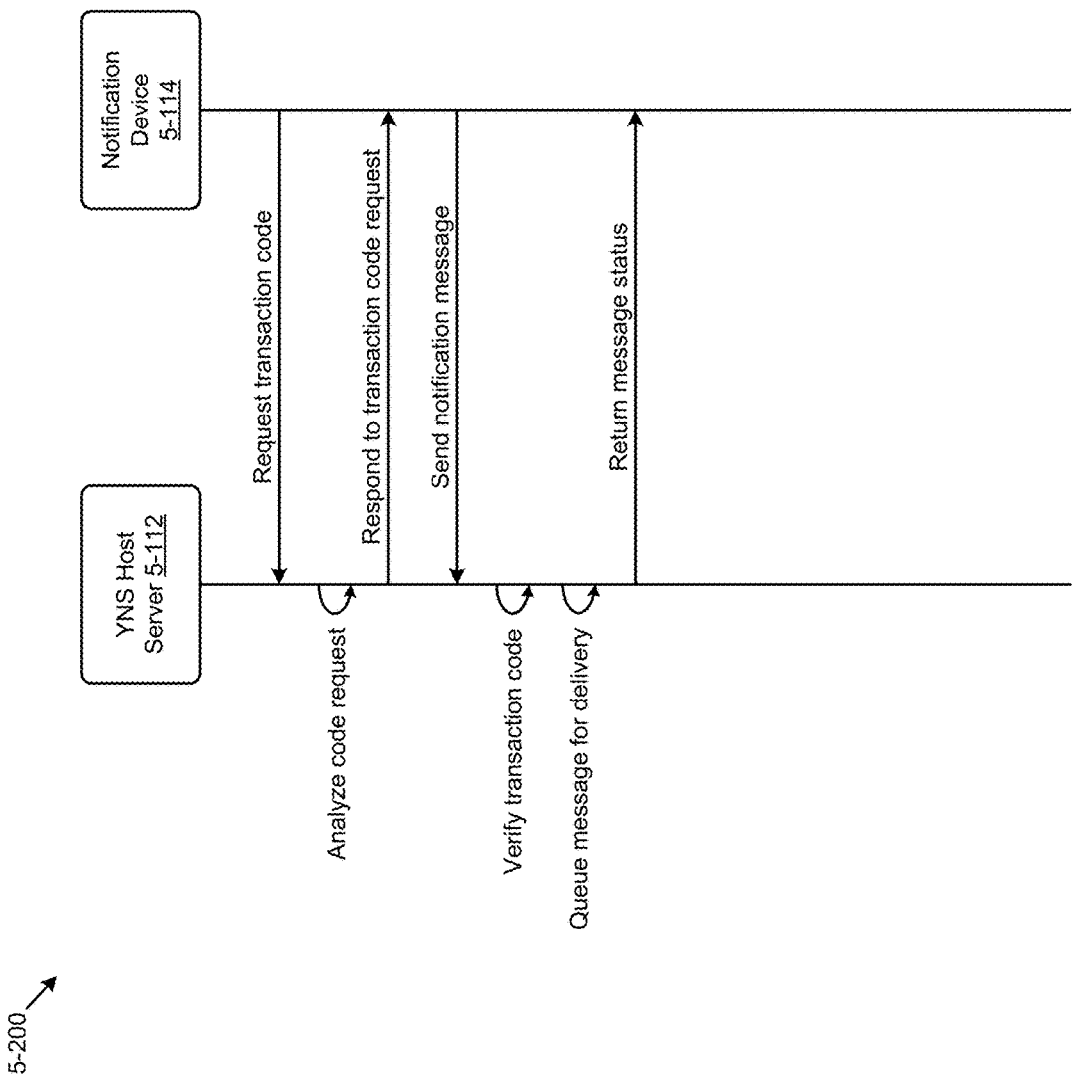

FIG. 103 is a diagram showing a notification device protocol for use in systems that use multiple connection URLs to enable load balanced inter-device messaging, according to some embodiments.

Figure 104:
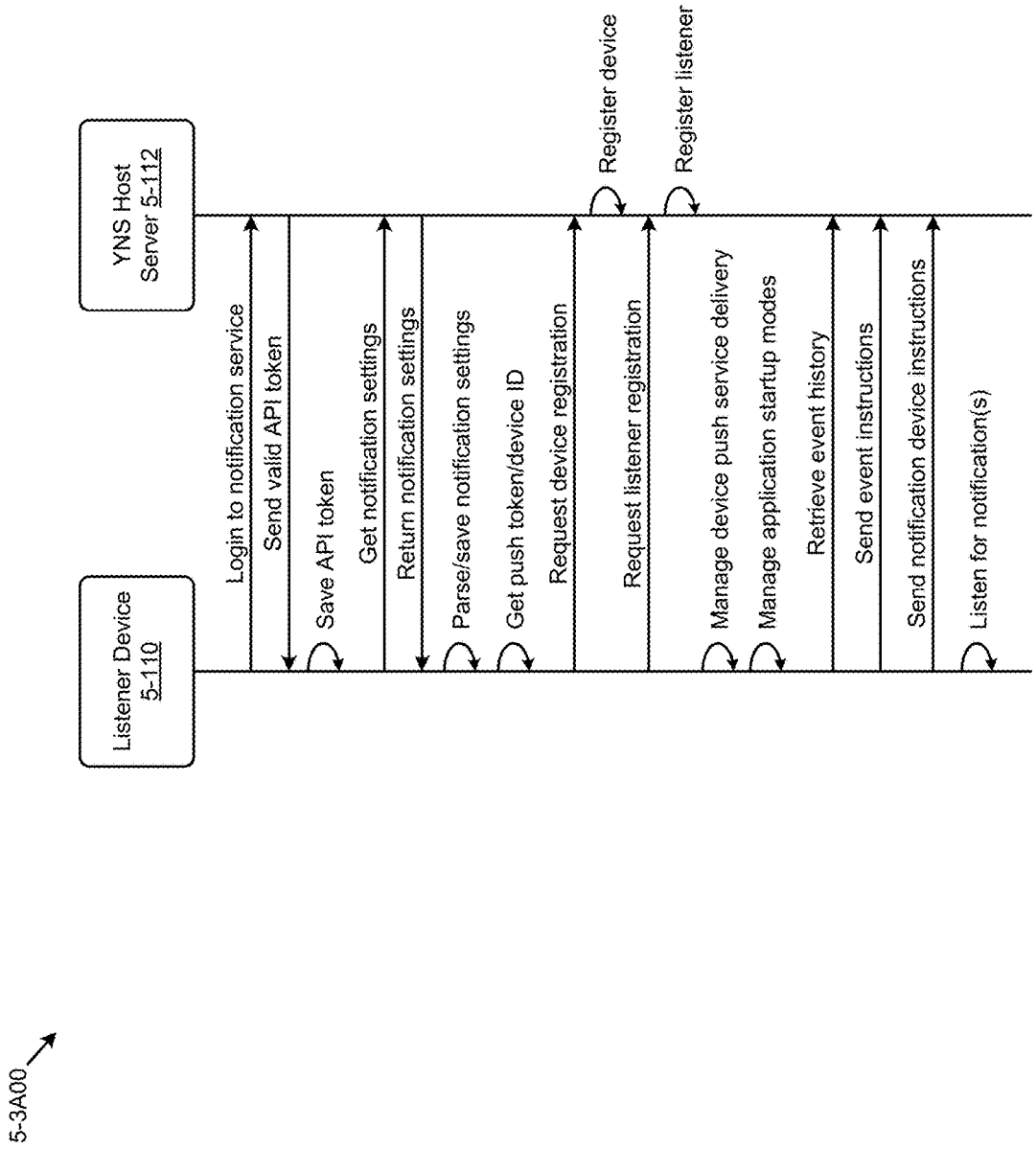

FIG. 104 is a diagram showing a listener device protocol for use in systems that use multiple connection URLs to enable load balanced inter-device messaging, according to some embodiments.

Figure 105:
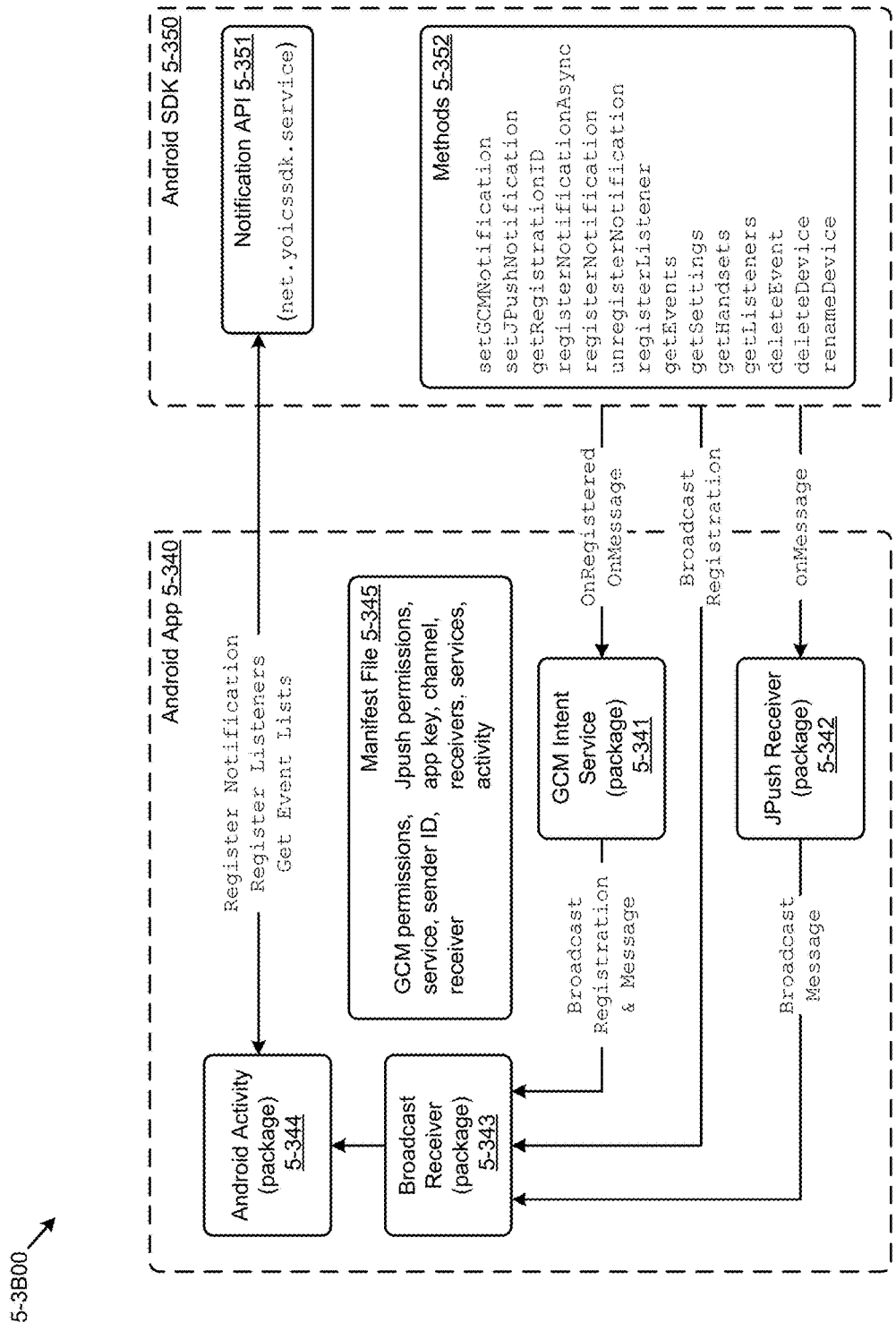

FIG. 105 presents usage scenarios of an application programming interface for listener devices in systems that use multiple connection URLs to enable load balanced inter-device messaging, according to some embodiments.

Figure 106:
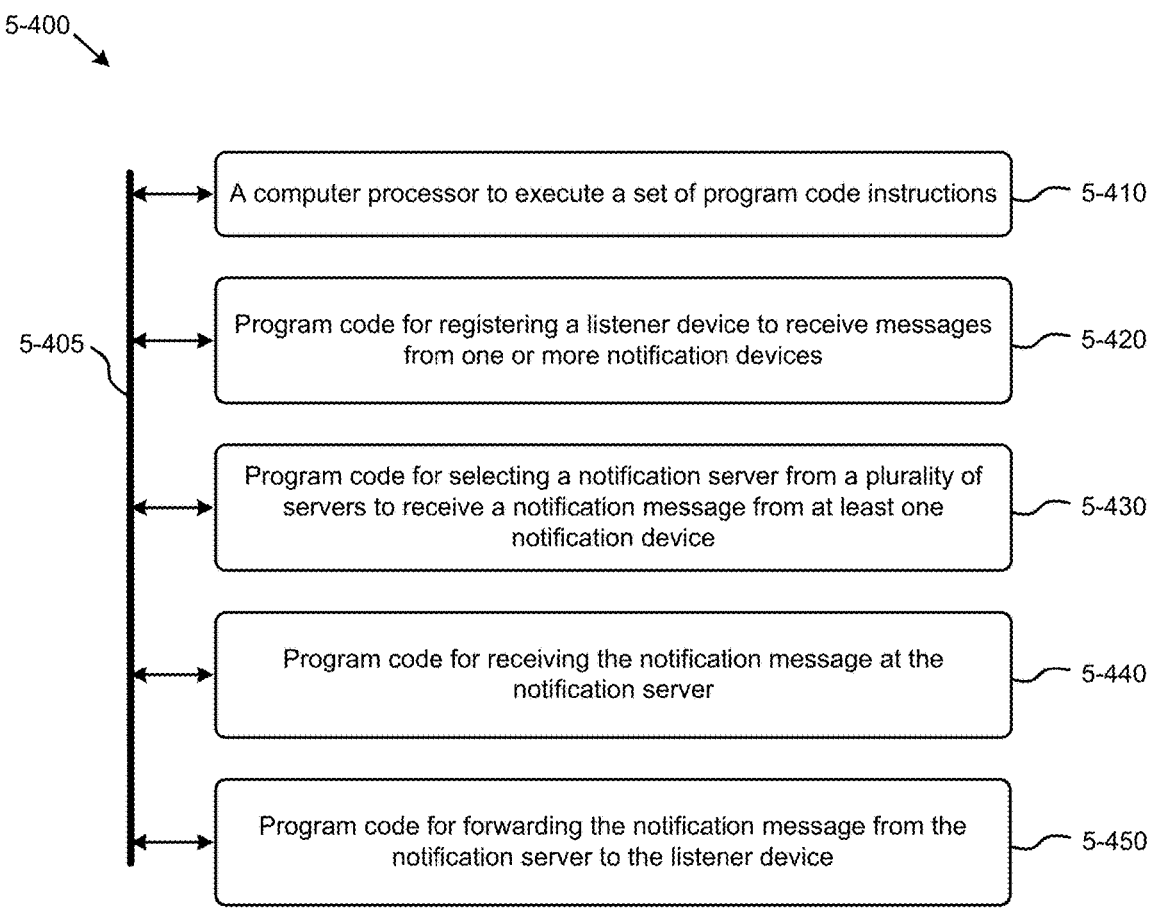

FIG. 106 is a block diagram of a system for implementing all or portions of any of the embodiments described herein.

Figure 107A:
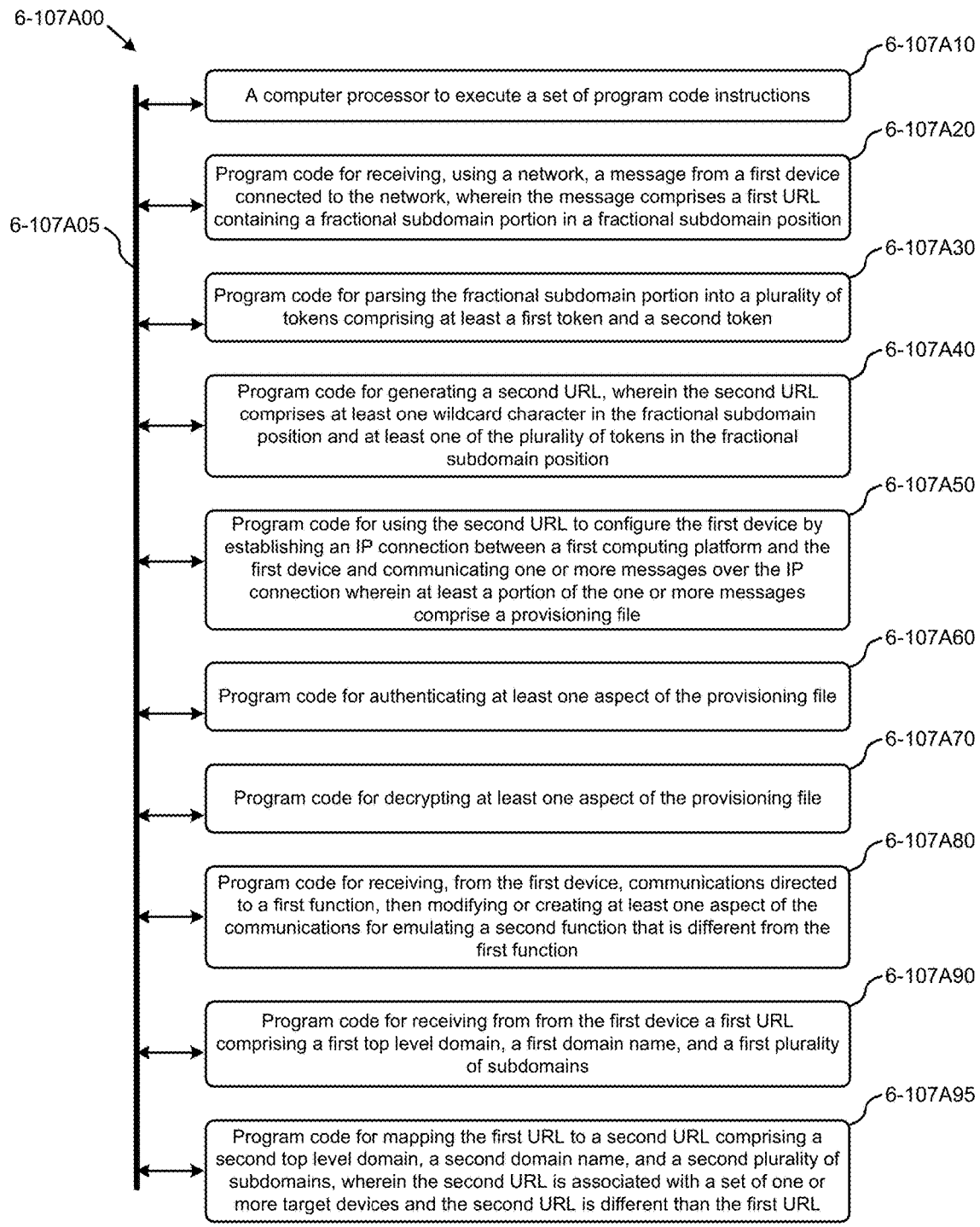

FIG. 107A is a block diagram of a system for implementing all or a portion of any of the embodiments described herein.

Figure 107B:
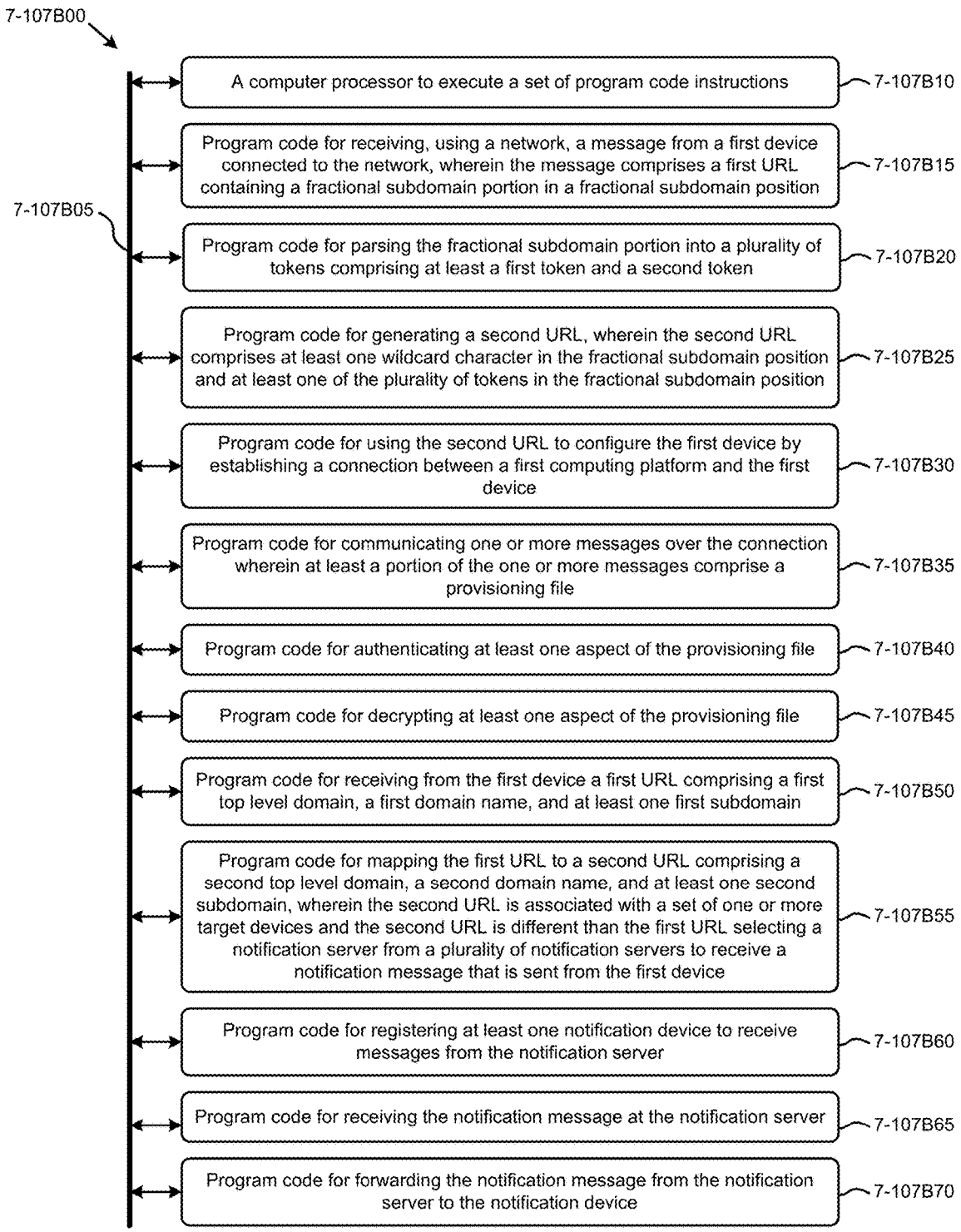

FIG. 107B is a block diagram of a system for implementing all or a portion of any of the embodiments described herein.

FIG. 108A, FIG. 108B, FIG. 108C and FIG. 108D depict exemplary architectures of components suitable for implementing embodiments of the present disclosure, and/or for use in the herein-described environments.

DETAILED DESCRIPTION

Glossary

In this description a device refers to a mobile device, electronic system, machine, and/or any type of apparatus, system, that may be mobile, fixed, wearable, portable, integrated, cloud-based, distributed and/or any combination of these and which may be formed, manufactured, operated, etc. in any fashion, and/or manner in any location(s). It should be understood, however, that one or more of the embodiments described herein and/or in one or more specifications incorporated by reference may be applied to any device(s) or similar object(s) e.g., consumer devices, phones, phone systems, cell phones, cellular phones, mobile phone, smart phone, internet phones, wireless phones, personal digital assistants (PDAs), remote communication devices, wireless devices, music players, video players, media players, multimedia players, video recorders, VCRs, DVRs, book readers, voice recorders, voice controlled systems, voice controllers, cameras, social interaction devices, radios, TVs, watches, personal communication devices, electronic wallets, electronic currency, smart cards, smart credit cards, electronic money, electronic coins, electronic tokens, smart jewelry, electronic passports, electronic identification systems, biometric sensors, biometric systems, biometric devices, smart pens, smart rings, personal computers, tablets, laptop computers, scanners, printers, computers, web servers, media servers, multimedia servers, file servers, datacenter servers, database servers, database appliances, cloud servers, cloud devices, cloud appliances, embedded systems, embedded devices, electronic glasses, electronic goggles, electronic screens, displays, wearable displays, projectors, picture frames, touch screens, computer appliances, kitchen appliances, home appliances, home theater systems, audio systems, home control appliances, home control systems, irrigation systems, sprinkler systems, garage door systems, garage door controls, remote controls, remote control systems, thermostats, heating systems, air conditioning systems, ventilation systems, climate control systems, climate monitoring systems, industrial control systems, transportation systems and controls, industrial process and control systems, industrial controller systems, machine-to-machine systems, aviation systems, locomotive systems, power control systems, power controllers, lighting control, lights, lighting systems, solar system controllers, solar panels, vehicle and other engines, engine controllers, motors, motor controllers, navigation controls, navigation systems, navigation displays, sensors, sensor systems, transducers, transducer systems, computer input devices, device controllers, touchpads, mouse, pointer, joystick, keyboards, game controllers, haptic devices, game consoles, game boxes, network devices, routers, switches, TIVO boxes, APPLETV devices, GOOGLETV devices, internet TV boxes, internet systems, internet devices, set-top boxes, cable boxes, modems, cable modems, PCs, tablets, media boxes, streaming devices, entertainment centers, entertainment systems, aircraft entertainment systems, hotel entertainment systems, car and vehicle entertainment systems, GPS devices, GPS systems, automobile and other motor vehicle systems, truck systems, vehicle control systems, vehicle sensors, aircraft systems, automation systems, home automation systems, industrial automation systems, reservation systems, check-in terminals, ticket collection systems, admission systems, payment devices, payment systems, banking machines, cash points, ATMs, vending machines, vending systems, point of sale devices, coin-operated devices, token operated devices, gas (petrol) pumps, ticket machines, toll systems, barcode scanners, credit card scanners, travel token systems, travel card systems, RFID devices, electronic labels, electronic tags, tracking systems, electronic stickers, electronic price tags, near field communication (NFC) devices, wireless operated devices, wireless receivers, wireless transmitters, sensor devices, motes, sales terminals, checkout terminals, electronic toys, toy systems, gaming systems, information appliances, information and other kiosks, sales displays, sales devices, electronic menus, coupon systems, shop displays, street displays, electronic advertising systems, traffic control systems, traffic signs, parking systems, parking garage devices, elevators and elevator systems, building systems, mailboxes, electronic signs, video cameras, security systems, surveillance systems, electronic locks, electronic keys, electronic key fobs, access devices, access controls, electronic actuators, safety systems, smoke detectors, fire control systems, fire detection systems, locking devices, electronic safes, electronic doors, music devices, storage devices, back-up devices, USB keys, portable disks, exercise machines, sports equipment, medical devices, medical systems, personal medical devices, wearable medical devices, portable medical devices, mobile medical devices, blood pressure sensors, heart rate monitors, blood sugar monitors, vital sign monitors, ultrasound devices, medical imagers, drug delivery systems, drug monitoring systems, patient monitoring systems, medical records systems, industrial monitoring systems, robots, robotic devices, home robots, industrial robots, electric tools, power tools, construction equipment, electronic jewelry, wearable devices, wearable electronic devices, wearable cameras, wearable video cameras, wearable systems, electronic dispensing systems, handheld computing devices, handheld electronic devices, electronic clothing, combinations of these and/or any other devices, multi-function devices, multi-purpose devices, combination devices, cooperating devices, and the like, etc.

The devices may support (e.g., include, comprise, contain, implement, execute, be part of, be operable to execute, display, source, provide, store, etc.) one or more applications and/or functions e.g., search applications, contacts and/or friends applications, social interaction applications, social media applications, messaging applications, telephone applications, video conferencing applications, e-mail applications, voicemail applications, communications applications, voice recognition applications, instant messaging (IM) applications, texting applications, blog and/or blogging applications, photographic applications (e.g., catalog, management, upload, editing, etc.), shopping, advertising, sales, purchasing, selling, vending, ticketing, payment, digital camera applications, digital video camera applications, web browsing and browser applications, digital music player applications, digital video player applications, cloud applications, office productivity applications, database applications, cataloging applications, inventory control, medical applications, electronic book and newspaper applications, travel applications, dictionary and other reference work applications, language translation, spreadsheet applications, word processing applications, presentation applications, business applications, finance applications, accounting applications, publishing applications, web authoring applications, multimedia editing, computer-aided design (CAD), manufacturing applications, home automation and control, backup and/or storage applications, help and/or manuals, banking applications, stock trading applications, calendar applications, voice driven applications, map applications, consumer entertainment applications, games, other applications and/or combinations of these and/or multiple instances (e.g., versions, copies, etc.) of these and/or other applications, and the like, etc.

The devices may include (e.g., comprise, be capable of including, have features to include, have attachments, communicate with, be linked to, be coupled with, operable to be coupled with, be connected to, be operable to connect to, etc.) one or more devices (e.g., there may be a hierarchy of devices, nested devices, etc.). The devices may operate, function, run, etc. as separate components, working in cooperation, as a cooperative hive, as a confederation of devices, as a federation, as a collection of devices, as a cluster, as a multi-function device, with sockets, ports, connectivity, etc. for extra, additional, add-on, optional, etc. devices and/or components, attached devices (e.g., direct attach, network attached, remote attach, cloud attach, add on, plug in, etc.), upgrade components, helper devices, acceleration devices, support devices, engines, expansion devices and/or modules, combinations of these and/or other components, hardware, software, firmware, devices, and the like, etc.

The devices may have (e.g., comprise, include, execute, perform, capable of being programmed to perform, etc.) one or more device functions (e.g., telephone, video conferencing, e-mail, instant messaging, blogging, digital photography, digital video, web browsing, digital music playing, social interaction, shopping, searching, banking, combinations of these and/or other functions, and the like, etc.). Instructions, help, guides, manuals, procedures, algorithms, processes, methods, techniques, etc. for performing and/or helping to perform, etc. the device functions, etc. may be included in a computer readable storage medium, computer readable memory medium, and/or other computer program product configured for execution, for example, by one or more processors.

The devices may include one or more processors (e.g., central processing units (CPUs), multicore CPUs, homogeneous CPUs, heterogeneous CPUs, graphics processing units (GPUs), computing arrays, CPU arrays, microprocessors, controllers, microcontrollers, engines, accelerators, compute arrays, programmable logic, DSP, combinations of these and the like, etc.). Devices and/or processors, etc. may include, contain, comprise, etc. one or more operating systems (OSs). Processors may use one or more machine or system architectures (e.g., ARM, Intel, x86, hybrids, emulators, other architectures, combinations of these, and the like, etc.).

Processor architectures may use one or more privilege levels. For example, the x86 architecture may include four hardware resource privilege levels or rings. The OS kernel, for example, may run in privilege level 0 or ring 0 with complete control over the machine or system. In the Linux OS, for example, ring 0 may be kernel space, and user mode may run in ring 3.

A multi-core processor (multicore processor, multicore CPU, etc.) may be a single computing component (e.g., a single chip, a single logical component, a single physical component, a single package, an integrated circuit, a multi-chip package, combinations of these and the like, etc.). A multicore processor may include (e.g., comprise, contain, etc.) two or more central processing units, etc. called cores. The cores may be independent, relatively independent and/or connected, coupled, integrated, logically connected, etc. in any way. The cores, for example, may be the units that read and execute program instructions. The instructions may be ordinary CPU instructions such as add, move data, and branch, but the multiple cores may run multiple instructions at the same time, increasing overall speed, for example, for programs amenable to parallel computing. Manufacturers may typically integrate the cores onto a single integrated circuit die (known as a chip multiprocessor or CMP), or onto multiple dies in a single chip package, but any implementation, construction, assembly, manufacture, packaging method and/or process, etc. is possible.

The devices may use one or more virtualization methods. In computing, virtualization refers to the act of creating (e.g., simulating, emulating, etc.) a virtual (rather than actual) version of something, including but not limited to a virtual computer hardware platform, operating system (OS), storage device, computer network resources and the like.

For example, a hypervisor or virtual machine monitor (VMM) may be a virtualization method and may allow (e.g., permit, implement, etc.) hardware virtualization. A hypervisor may run (e.g., execute, operate, control, etc.) one or more operating systems (e.g., guest OSs, etc.) simultaneously (e.g., concurrently, at the same time, at nearly the same time, in a time multiplexed fashion, etc.), and each may run on its own virtual machine (VM) on a host machine and/or host hardware (e.g., device, combination of devices, combinations of devices with other computer(s), etc.). A hypervisor, for example, may run at a higher level than a supervisor.

Multiple instances of OSs may share virtualized hardware resources. A hypervisor, for example, may present a virtual platform, architecture, design, etc. to a guest OS and may monitor the execution of one or more guest OSs. A Type 1 hypervisor (also type I, native, or bare metal hypervisor, etc.) may run directly on the host hardware to control the hardware and monitor guest OSs. A guest OS thus may run at a level above (e.g., logically above, etc.) a hypervisor. Examples of Type 1 hypervisors may include VMware ESXi, Citrix XenServer, Microsoft Hyper-V, etc. A Type 2 hypervisor (also type II, or hosted hypervisor) may run within a conventional OS (e.g., Linux, Windows, Apple iOS, etc.). A Type 2 hypervisor may run at a second level (e.g., logical level, etc.) above the hardware. Guest OSs may run at a third level above a Type 2 hypervisor. Examples of Type 2 hypervisors may include VMware Server, Linux KVM, VirtualBox, etc. A hypervisor thus may run one or more other hypervisors with their associated VMs. In some cases, virtualization and nested virtualization may be part of an OS. For example, Microsoft Windows 7 may run Windows XP in a VM. For example, the IBM turtles project, part of the Linux KVM hypervisor, may run multiple hypervisors (e.g., KVM and VMware, etc.) and operating systems (e.g., Linux and Windows, etc.). The term embedded hypervisor may refer to a form of hypervisor that may allow, for example, one or more applications to run above the embedded hypervisor without an OS.

The term hardware virtualization may refer to virtualization of machines, devices, computers, operating systems, combinations of these, etc. that may hide the physical aspects of a computer system and instead present (e.g., show, manifest, demonstrate, etc.) an abstract system (e.g., view, aspect, appearance, etc.). For example, x86 hardware virtualization may allow one or more OSs to share x86 processor resources in a secure, protected, safe, etc. manner. Initial versions of x86 hardware virtualization were implemented using software techniques to overcome the lack of processor virtualization support. Manufacturers (e.g., Intel, AMD, etc.) later added (e.g., in later generations, etc.) processor virtualization support to x86 processors, thus simplifying later versions of x86 virtualization software, etc. Continued addition of hardware virtualization features to x86 and other (e.g., ARM, etc.) processors has resulted in continued improvements (e.g., in speed, in performance, etc.) of hardware virtualization. Other virtualization methods, such as memory virtualization, I/O virtualization (IOV, etc.) may be performed by a chipset, integrated with a CPU, and/or by other hardware components, etc. For example, an input/output memory management unit (IOMMU) may enable guest VMs to access peripheral devices (e.g., network adapters, graphics cards, storage controllers, etc.) e.g., using DMA, interrupt remapping, etc. For example, PCI-SIG IOV may use a set of general (e.g., non-x86 specific) PCI Express (PCI-E) based native hardware I/O virtualization techniques. For example, one such technique may be address translation services (ATSs) that may support native IOV across PCI-E using address translation. For example, single root IOV (SR-IOV) may support native IOV in single root complex PCI-E topologies. For example, multi-root IOV (MR-IOV) may support native IOV by expanding SR-IOV to provide multiple root complexes that may, for example, share a common PCI-E hierarchy. In SR-IOV, for example, a host VMM may configure supported devices to create and allocate virtual shadows of configuration spaces (e.g., shadow devices, etc.) so that VM guests may, for example, configure, access, etc. one or more shadow device resources.

The devices (e.g., device software, device firmware, device applications, OSs, combinations of these, etc.) may use one or more programs (e.g., source code, programming languages, binary code, machine code, applications, apps, functions, etc.). The programs, etc. may use (e.g., require, employ, etc.) one or more code translation techniques (e.g., process, algorithms, etc.) to translate from one form of code to another form of code e.g., to translate from source code (e.g., readable text, abstract representations, high-level representations, graphical representations, etc.) to machine code (e.g., machine language, executable code, binary code, native code, low-level representations, etc.). For example, a compiler may translate (e.g., compile, transform, etc.) source code into object code (e.g., compiled code, etc.). For example, a linker may translate object code into machine code (e.g., linked code, loadable code, etc.). Machine code may be executed by a CPU, etc. at runtime. Computer programming languages (e.g., high-level programming languages, source code, abstract representations, etc.) may be interpreted or compiled. Interpreted code may be translated (e.g., interpreted, by an interpreter, etc.), for example, to machine code during execution (e.g., at runtime, continuously, etc.). Compiled code may be translated (compiled, by a compiler, etc.), for example, to machine code once (e.g., statically, at one time, etc.) before execution. An interpreter may be classified into one or more of the following types: type 1 interpreters may, for example, execute source code directly; type 2 interpreters may, for example, compile or translate source code into an intermediate representation (e.g., intermediate code, intermediate language, temporary form, etc.) and may execute the intermediate code; type 3 interpreters may execute stored precompiled code generated by a compiler that may, for example, be part of the interpreter. For example, languages such as Lisp, etc. may use a type 1 interpreter; languages such as Perl, Python, etc. may use a type 2 interpreter; languages such as Pascal, Java, etc. may use a type 3 interpreter. Some languages, such as Smalltalk, BASIC, etc. may, for example, combine facets, features, properties, etc. of interpreters of type 2 and interpreters of type 3. There may not always, for example, be a clear distinction between interpreters and compilers. For example, interpreters may also perform some translation. For example, some programming languages may be both compiled and interpreted or may include features of both. For example, a compiler may translate source code into an intermediate form (e.g., bytecode, portable code, p-code, intermediate code, etc.), that may then be passed to an interpreter. The terms interpreted language or compiled language applied to describing, classifying, etc. a programming language (e.g., C++ is a compiled programming language, etc.) may thus refer to an example (e.g., canonical, accepted, standard, theoretical, etc.) implementation of a programming language that may use an interpreter, compiler, etc. Thus a high-level computer programming language, for example, may be an abstract, ideal, theoretical, etc. representation that may be independent of a particular, specific, fixed, etc. implementation (e.g., independent of a compiled, interpreted version, etc.).

The devices (e.g., device software, device firmware, device applications, OSs, etc.) may use one or more alternative code forms, representations, etc. For example, a device may use bytecode that may be executed by an interpreter or that may be compiled. Bytecode may take any form. Bytecode, for example, may be based on (e.g., be similar to, use, etc.) hardware instructions and/or use hardware instructions in machine code. Bytecode design (e.g., format, architecture, syntax, appearance, semantics, etc.) may be based on a machine architecture (e.g., virtual stack machine, virtual register machine, etc.). Parts, portions, etc. of bytecode may be stored in files (e.g., modules, similar to object modules, etc.). Parts, portions, modules, etc. of bytecode may be dynamically loaded during execution. Intermediate code (e.g., bytecode, etc.) may be used to simplify and/or improve the performance, etc. of interpretation. Bytecode may be used, for example, in order to reduce hardware dependence, OS dependence, or other dependencies, etc. by allowing the same bytecode to run on different platforms (e.g., architectures, etc.). Bytecode may be directly executed on a VM (e.g., using an interpreter, etc.). Bytecode may be translated (e.g., compiled, etc.) to machine code, for example to improve performance, etc. Bytecode may include compact numeric codes, constants, references, numeric addresses, etc. that may encode the result of translation, parsing, semantic analysis, etc. of the types, scopes, nesting depths, etc. of program objects, constructs, structures, etc. The use of bytecode may, for example, allow improved performance over the direct interpretation of source code. Bytecode may be executed, for example, by parsing and executing bytecode instructions one instruction at a time. A bytecode interpreter may be portable (e.g., independent of device, machine architecture, computer system, computing platform, etc.).

The devices (e.g., device applications, OSs, etc.) may use one or more VMs. For example, a Java virtual machine (JVM) may use Java bytecode as intermediate code. Java bytecode may correspond, for example, to the instruction set of a stack-oriented architecture. For example, Oracle's JVM is called HotSpot. Examples of clean-room Java implementations may include Kaffe, IBM J9, and Dalvik. A software library (library) may be a collection of related object code. A class may be a unit of code. The Java Classloader may be part of the Java runtime environment (JRE) that may, for example, dynamically load Java classes into the JVM. Java libraries may be packaged in Jar files. Libraries may include objects of different types. One type of object in a Jar file may be a Java class. The class loader may locate libraries, read library contents, and load classes included within the libraries. Loading may, for example, be performed on demand, when the class is required by a program. Java may make use of external libraries (e.g., libraries written and provided by a third party, etc.). When a JVM is started, one or more of the following class loaders may be used: (1) bootstrap class loader; (2) extensions class loader; or (3) system class loader. The bootstrap class loader, which may be part of the core JVM, for example, may be written in native code and may load the core Java libraries. The extensions class loader may, for example, load code in the extensions directories. The system class loader may, for example, load code on the java.class.path stored in the system CLASSPATH variable. By default, all user classes may, for example, be loaded by the default system class loader that may be replaced by a user-defined ClassLoader. The Java class library may be a set of dynamically loadable libraries that Java applications may call at runtime. Because the Java platform may be independent of any OS, the Java platform may provide a set of standard class libraries that may, for example, include reusable functions commonly found in an OS. The Java class library may be almost entirely written in Java except, for example, for some parts that may need direct access to hardware, OS functions, etc. (e.g., for I/O, graphics, etc.). The Java classes that may provide access to these functions may, for example, use native interface wrappers, code fragments, etc. to access the API of the OS. Almost all of the Java class library may, for example, be stored in a Java archive file rt.jar, which may be provided with JRE and JDK distributions, for example.

The devices (e.g., device applications, OSs, etc.) may use one or more alternative code translation methods. For example, some code translation systems (e.g., dynamic translators, just-in-time compilers, etc.) may translate bytecode into machine language (e.g., native code, etc.) on demand, as required, etc. at runtime. Thus, for example, source code may be compiled and stored as machine independent code. The machine independent code may be linked at runtime and may, for example, be executed by an interpreter, compiler for JIT systems, etc. This type of translation, for example, may reduce portability, but may not reduce the portability of the bytecode itself. For example, programs may be stored in bytecode that may then be compiled using a JIT compiler that may translate bytecode to machine code. This may add a delay before a program runs and may, for example, improve execution speed relative to the direct interpretation of source code. Translation may, for example, be performed in one or more phases. For example, a first phase may compile source code to bytecode, and a second phase may translate the bytecode to a VM. There may be different VMs for different languages, representations, etc. (e.g., for Java, Python, PHP, Forth, Tcl, etc.). For example, Dalvik bytecode designed for the Android platform, for example, may be executed by the Dalvik VM. For example, the Dalvik VM may use special representations (e.g., DEX, etc.) for storing applications. For example, the Dalvik VM may use its own instruction set (e.g., based on a register-based architecture rather than stack-based architecture, etc.) rather than standard JVM bytecode, etc. Other implementations may be used. For example, the implementation of Perl, Ruby, etc. may use an abstract syntax tree (AST) representation that may be derived from the source code. For example, ActionScript (an object-oriented language that may be a superset of JavaScript, a scripting language) may execute in an ActionScript virtual machine (AVM) that may be part of Flash Player and Adobe Integrated Runtime (AIR). ActionScript code, for example, may be transformed into bytecode by a compiler. ActionScript compilers may be used, for example, in Adobe Flash Professional and in Adobe Flash Builder and may be available as part of the Adobe Flex SDK. A JVM may contain both and interpreter and JIT compiler and switch from interpretation to compilation for frequently executed code. One form of JIT compiler may, for example, represent a hybrid approach between interpreted and compiled code, and translation may occur continuously (e.g., as with interpreted code, etc.), but caching of translated code may be used e.g., to increase speed, performance, etc. JIT compilation may also offer advantages over static compiled code, e.g., the use late-bound data types, the ability to use and enforce security constraints, etc. JIT compilation may, for example, combine bytecode compilation and dynamic compilation. JIT compilation may, for example, convert code at runtime prior to executing it natively e.g., by converting bytecode into native machine code, etc. Several runtime environments, (e.g., Microsoft .NET Framework, some implementations of Java, etc.) may, for example, use, employ, depend on, etc. JIT compilers. This specification may avoid the use of the term native machine code to avoid confusion with the terms machine code and native code.

The devices (e.g., device applications, OSs, etc.) may use one or more methods of emulation, simulation, etc. For example, binary translation may refer to the emulation of a first instruction set by a second instruction set (e.g., using code translation, etc.). For example, instructions may be translated from a source instruction set to a target instruction set. In some cases, such as instruction set simulation, the target instruction set may be the same as the source instruction set, and may, for example, provide testing features, debugging features, instruction trace, conditional breakpoints, hot spot detection, etc. Binary translation may be further divided into static binary translation and dynamic binary translation. Static binary translation may, for example, convert the code of an executable file to code that may run on a target architecture without, for example, having to run the code first. In dynamic binary translation, for example, the code may be run before conversion. In some cases conversion may not be direct since not all the code may be discoverable (e.g., reachable, etc.) by the translator. For example, parts of executable code may only be reached through indirect branches, with values, state, etc. needed for translation that may be known only at runtime. Dynamic binary translation may parse (e.g., process, read, etc.) a short sequence of code, may translate that code, and may cache the result of the translation. Other code may be translated as the code is discovered and/or when it is possible to be discovered. Branch instructions may point to already translated code and/or saved and/or cached (e.g., using memorization, etc.). Dynamic binary translation may differ from emulation and may eliminate the loop formed by the emulator reading, decoding, executing, etc. Binary translation may, for example, add a potential disadvantage of requiring additional translation overhead. The additional translation overhead may be reduced, ameliorated, etc. as translated code is repeated, executed multiple times, etc. For example, dynamic translators (e.g., Sun/Oracle HotSpot, etc.) may use dynamic recompilation, etc. to monitor translated code and aggressively (e.g., continuously, repeatedly, in an optimized fashion, etc.) optimize code that may be frequently executed, repeatedly executed, etc. This and other optimization techniques may be similar to that of a JIT compiler, and such compilers may be viewed as performing dynamic translation from a virtual instruction set (e.g., using bytecode, etc.) to a physical instruction set.

The term virtualization may refer to the creation (e.g., generation, design, etc.) of a virtual version (e.g., abstract version, apparent version, appearance of, illusion rather than actual, non-tangible object, etc.) of something (e.g., an object, tangible object, etc.) that may be real (e.g., tangible, non-abstract, physical, actual, etc.). For example, virtualization may apply to a device, mobile device, computer system, machine, server, hardware platform, platform, PC, tablet, operating system (OS), storage device, network resource, software, firmware, combinations of these and/or other objects, etc. For example, a VM may provide, present, etc. a virtual version of a real machine and may run (e.g., execute, etc.) a host OS, other software, etc. A VMM may be software (e.g., monitor, controller, supervisor, etc.) that may allow one or more VMs to run (e.g., be multiplexed, etc.) on one real machine. A hypervisor may be similar to a VMM. A hypervisor, for example, may be higher in functional hierarchy (e.g., logically, etc.) than a supervisor and may, for example, manage multiple supervisors (e.g., kernels, etc.). A domain (also logical domain, etc.) may run in (e.g., execute on, be loaded to, be joined with, etc.) a VM. The relationship between VMs and domains, for example, may be similar to that between programs and processes (or threads, etc.) in an OS. A VM may be a persistent (e.g., non-volatile, stored, permanent, etc.) entity that may reside (e.g., be stored, etc.) on disk and/or other storage, loaded into memory, etc. (e.g., and be analogous to a program, application, software, etc.). Each domain may have a domain identifier (also domain ID) that may be a unique identifier for a domain, and may be analogous (e.g., equivalent, etc.), for example, to a process ID in an OS. The term live migration may be a technique that may move a running (e.g., executing, live, operational, functional, etc.) VM to another physical host (e.g., machine, system, device, etc.) without stopping (e.g., halting, terminating, etc.) the VM and/or stopping any services, processes, threads, etc. that may be running on the VM.

Different types of hardware virtualization may include:
1. Full virtualization: Complete or almost complete simulation of actual hardware to allow software, which may comprise a guest operating system, to run unmodified. A VM may be (e.g., appear to be, etc.) identical (e.g., equivalent to, etc.) to the underlying hardware in full virtualization.
2. Partial virtualization: Some but not all of the target environment may be simulated. Some guest programs, therefore, may need modifications to run in this type of virtual environment.
3. Paravirtualization: A hardware environment is not necessarily simulated; however, the guest programs may be executed in their own isolated domains, as if they are running on a separate system. Guest programs may need to be specifically modified to run in this type of environment. A VM may differ (e.g., in appearance, in functionality, in behavior, etc.) from the underlying (e.g., native, real, etc.) hardware in paravirtualization.

There may be other differences between these different types of hardware virtualization environments. Full virtualization may not require modifications (e.g., changes, alterations, etc.) to the host OS and may abstract (e.g., virtualize, hide, obscure, etc.) underlying hardware. Paravirtualization may also require modifications to the host OS in order to run in a VM. In full virtualization, for example, privileged instructions and/or other system operations, etc. may be handled by the hypervisor with other instructions running on native hardware. In paravirtualization, for example, code may be modified e.g., at compile-time, runtime, etc. For example, in paravirtualization privileged instructions may be removed, modified, etc. and, for example, replaced with calls to a hypervisor e.g., using APIs, hypercalls, etc. For example, Xen may be an example of an OS that may use paravirtualization, but may preserve binary compatibility for user-space applications, etc.

Virtualization may be applied to an entire OS and/or parts of an OS. For example, a kernel may be a main (e.g., basic, essential, key, etc.) software component of an OS. A kernel may form a bridge (e.g., link, coupling, layer, conduit, etc.) between applications (e.g., software, programs, etc.) and underlying hardware, firmware, software, etc. A kernel may, for example, manage, control, etc. one or more (including all) system resources e.g., CPUs, processors, I/O devices, interrupt controllers, timers, etc. A kernel may, for example, provide a low-level abstraction layer for the system resources that applications may control, manage, etc. A kernel running, for example, at the highest hardware privilege level may make system resources available to user-space applications through inter-process communication (IPC) mechanisms, system calls, etc. A microkernel, for example, may be a smaller (e.g., smaller than a kernel, etc.) OS software component. In a microkernel the majority of the kernel code may be implemented, for example, in a set of kernel servers (also just servers) that may communicate through a small kernel, using a small amount of code running in system (e.g., kernel, etc.) space and the majority of code in user space. A microkernel may, for example, comprise a simple (e.g., relative to a kernel, etc.) abstraction over (e.g., logically above, etc.) underlying hardware, with a set of primitives, system calls, other code, etc. that may implement basic (e.g., minimal, key, etc.) OS services (e.g., memory management, multitasking, IPC, etc.). Other OS services, (e.g., networking, storage drivers, high-level functions, etc.) may be implemented, for example, in one or more kernel servers. An exokernel may, for example, be similar to a microkernel but may provide a more hardware-like interface e.g., more direct interface, etc. For example, an exokernel may be similar to a paravirtualizing VMM (e.g., Xen, etc.), but an exokernel may be designed as a distinct and separate OS structure rather than to run multiple conventional OSs. A nanokernel may, for example, delegate (e.g., assign, etc.) virtually all services (e.g., including interrupt controllers, timers, etc.), for example, to device drivers. The term operating system-level virtualization (also OS virtualization, container, virtual private server (VPS), virtual environment (VE), jail, etc.) may refer to a server virtualization technique. In OS virtualization, for example, the kernel of an OS may allow (e.g., permit, enable, implement, etc.) one or more isolated user-space instances or containers. For example, a container may appear to be a real server from the view of a user. For example, a container may be based on standard Linux chroot techniques. In addition to isolation, a kernel may control (e.g., limit, stop, regulate, manage, prevent, etc.) interaction between containers.

Virtualization may be applied to one or more hardware components. For example, VMs may include one or more virtual components. The hardware components and/or virtual components may be inside (e.g., included within, part of, etc.) or outside (e.g., connected to, external to, etc.) a CPU, and may be part of or include parts of a memory system and/or subsystem, or may be any part or parts of a system, device, or may be any combinations of such parts and the like, etc. A memory page (also virtual page, or just page) may, for example, be a contiguous block of virtual memory of fixed-length that may be the smallest unit used for (e.g., granularity of, etc.) memory allocation performed by the OS e.g., for a program, etc. A page table may be a data structure, hardware component, etc. used, for example, by a virtual memory system in an OS to store the mapping from virtual addresses to physical addresses. A memory management unit (MMU) may, for example, store a cache of memory mappings from the OS page table in a translation lookaside buffer (TLB). A shadow page table may be a component that is used, for example, by a technique to abstract memory layout from a VM OS. For example, one or more shadow page tables may be used in a VMM to provide an abstraction of (e.g., an appearance of, a view of, etc.) contiguous physical memory. A CPU may include one or more CPU components, circuit, blocks, etc. that may include one or more of the following, but not limited to the following: caches, TLBs, MMUs, page tables, etc. at one or more levels (e.g., L1, L2, L3, etc.). A CPU may include one or more shadow copies of one or more CPU components, etc. One or more shadow page tables may be used, for example, during live migration. One or more virtual devices may include one or more physical system hardware components (e.g., CPU, memory, I/O devices, etc.) that may be virtualized (e.g., abstracted, etc.) by, for example, a hypervisor and presented to one or more domains. In this description the term virtual device, for example, may also apply to virtualization of a device (and/or part(s), portion(s) of a device, etc.) such as a mobile phone or other mobile device, electronic system, appliance, etc. A virtual device may, for example, also apply to (e.g., correspond to, represent, be equivalent to, etc.) virtualization of a collection, set, group, etc. of devices and/or other hardware components, etc.

Virtualization may be applied to I/O hardware, one or more I/O devices (e.g., storage devices, cameras, graphics cards, input devices, printers, network interface cards, etc.), I/O device resources, etc. For example, an IOMMU may be a MMU that connects one or more I/O devices on one or more I/O buses to the memory system. The IOMMU may, for example, map (e.g., translate, etc.) I/O device virtual addresses (e.g., device addresses, I/O addresses, etc.) to physical addresses. The IOMMU may also include memory protection (e.g., preventing and/or controlling unauthorized access to I/O devices, I/O device resources, etc.), one or more memory protection tables, etc. The IOMMU may, for example, also allow (e.g., control, manage, etc.) direct memory access (DMA) and allow (e.g., enable, etc.) one or more VMs, etc. to access DMA hardware.

Virtualization may be applied to software (e.g., applications, programs, etc.). For example, the term application virtualization may refer to techniques that may provide one or more application features. For example, application virtualization may isolate (e.g., protect, separate, divide, insulate, etc.) applications from the underlying OS and/or from other applications. Application virtualization may, for example, enable (e.g., allow, permit, etc.) applications to be copied (e.g., streamed, transferred, pulled, pushed, sent, distributed, etc.) from a source (e.g., centralized location, control center, datacenter server, cloud server, home PC, manufacturer, distributor, licensor, etc.) to one or more target devices (e.g., user devices, mobile devices, clients, etc.). For example, application virtualization may allow (e.g., permit, enable, etc.) the creation of an isolated (e.g., a protected, a safe, an insulated, etc.) environment on a target device. A virtualized application may not necessarily be installed in a conventional (e.g., usual, normal, etc.) manner. For example, a virtualized application (e.g., files, configuration, settings, etc.) may be copied (e.g., streamed, distributed, etc.) to a target (e.g., destination, etc.) device rather than being installed, etc. The execution of a virtualized application at runtime may, for example, be controlled by an application virtualization layer. A virtualized application may, for example, appear to interface directly with the OS, but may actually interface with the virtualization environment. For example, the virtualization environment may proxy (e.g., intercept, forward, manage, control, etc.) one or more (including all) OS requests. The term application streaming may refer, for example, to virtualized application techniques that may use pieces (e.g., parts, portions, etc.) of one or more applications (e.g., code, data, settings, etc.) that may be copied (e.g., streamed, transferred, downloaded, uploaded, moved, pushed, pulled, etc.) to a target device. A software collection (e.g., set, distribution, distro, bundle, package, etc.) may, for example, be a set of software components built, assembled, configured, and ready for use, execution, installation, etc. Applications may be streamed, for example, as one or more collections. Application streaming may, for example, be performed on demand (e.g., as required, etc.) instead of copying or installing an entire application before startup. In some cases a streamed application may, for example, require the installation of a lightweight application on a target device. A streamed application and/or application collections may, for example, be delivered using one or more networking protocols (e.g., HTTP, HTTPS, CIFS, SMB, RTSP, etc.). The term desktop virtualization (also virtual desktop infrastructure (VDI), etc.) may refer, for example, to an application that may be hosted in a VM (or blade PC, appliance, etc.) and that may also include an OS. VDI techniques may, for example, include control of (e.g., management infrastructure for, automated creation of, etc.) one or more virtual desktops. The term session virtualization may refer, for example, to techniques that may use application streaming to deliver applications to one or more hosting servers (e.g., in a remote datacenter, cloud server, cloud service, etc.). The application may then, for example, execute on the hosting server(s). A user may then, for example, connect to (e.g., login, access, etc.) the application, hosting server(s), etc. The user and/or user device may, for example, send input (e.g., mouse-click, keystroke, mouse or other pointer location, audio, video, location, sensor data, control data, combinations of these and/or other data, information, user input, etc.) to the application e.g., on the hosting server(s), etc. The hosting server(s) may, for example, respond by sending output (e.g., screen updates, text, video, audio, signals, code, data, information, etc.) to the user device. A sandbox may, for example, isolate (e.g., insulate, separate, divide, etc.) one or more applications, programs, software, etc. For example, an OS may place an application (e.g., code, preferences, configuration, data, etc.) in a sandbox (e.g., at install time, at boot, or any time). A sandbox may, for example, include controls that may limit the application access (e.g., to files, preferences, network, hardware, firmware, other applications, etc.). As part of the sandbox process, technique, etc. an OS may, for example, install one or more applications in one or more separate sandbox directories (e.g., repositories, storage locations, etc.) that may store the application, application data, configuration data, settings, preferences, files, and/or other information, etc.

Devices may, for example, be protected from accidental faults (e.g., programming errors, bugs, data corruption, hardware faults, network faults, link faults, etc.) or malicious (e.g., deliberate, etc.) attacks (e.g., virus, malware, denial of service attacks, root kits, etc.) by various security, safety, protection mechanisms, etc. For example, CPUs, etc. may include one or more protection rings (or just rings, also hierarchical protection domains, domains, privilege levels, etc.). A protection ring may, for example, include one or more hierarchical levels (e.g., logical layers, etc.) of privilege (e.g., access rights, permissions, gating, etc.). For example, an OS may run (e.g., execute, operate, etc.) in a protection ring. Different protection rings may provide different levels of access (e.g., for programs, applications, etc.) to resources (e.g., hardware, memory, etc.). Rings may be arranged in a hierarchy ranging from the most privileged ring (e.g., most trusted ring, highest ring, inner ring, etc.) to the least privileged ring (e.g., least trusted ring, lowest ring, outer ring, etc.). For example, ring 0 may be a ring that may interact most directly with the real hardware (e.g., CPU, memory, I/O devices, etc.). For example, in a machine without virtualization, ring 0 may contain the OS, kernel, etc.; ring 1 and ring 2 may contain device drivers, etc.; ring 3 may contain user applications, programs, etc. For example, ring 1 may correspond to kernel space (e.g., kernel mode, master mode, supervisor mode, privileged mode, supervisor state, etc.). For example, ring 3 may correspond to user space (e.g., user mode, user state, slave mode, problem state, etc.). There is no fundamental restriction to the use of rings and, in general, any ring may correspond to any type of space, etc.

One or more gates (e.g., hardware gates, controls, call instructions, other hardware and/or software techniques, etc.) may be logically located (e.g., placed, situated, etc.) between rings to control (e.g., gate, secure, manage, etc.) communication, access, resources, transition, etc. between rings e.g., gate the access of an outer ring to resources of an inner ring, etc. For example, there may be gates or call instructions that may transfer control (e.g., may transition, exchange, etc.) to defined entry points in lower-level rings. For example, gating communication or transitions between rings may prevent programs in a first ring from misusing resources of programs in a second ring. For example, software running in ring 3 may be gated from controlling hardware that may only be controlled by device drivers running in ring 1. For example, software running in ring 3 may be required to request access to network resources that may be gated to software running in ring 1.

One or more coupled devices may form a collection, federation, confederation, assembly, set, group, cluster, etc. of devices. A collection of devices may perform operations, processing, computation, functions, etc. in a distributed fashion, manner, etc. In a collection, etc. of devices that may perform distributed processing, it may be important to control the order of execution, how updates are made to files and/or databases, and/or other aspects of collective computation, etc. One or more models, frameworks, etc. may describe, define, etc. the use of operations, etc. and may use a set of definitions, rules, syntax, semantics, etc. using the concepts of transactions, tasks, composable tasks, noncomposable tasks, etc.

For example, a bank account transfer operation (e.g., a type of transaction, etc.) might be decomposed (e.g., broken, separated, etc.) into the following steps: withdraw funds from a first account one and deposit funds into a second account.

The transfer operation may be atomic. For example, if either step one fails or step two fails (or a computer crashes between step one and step two, etc.) the entire transfer operation should fail. There should be no possibility (e.g., state, etc.) that the funds are withdrawn from the first account but not deposited into the second account.

The transfer operation may be consistent. For example, after the transfer operation succeeds, any other subsequent transaction should see the results of the transfer operation.

The transfer operation may be isolated. For example, if another transaction tries to simultaneously perform an operation on either the first or second accounts, what they do to those accounts should not affect the outcome of the transfer option.

The transfer operation may be durable. For example, after the transfer operation succeeds, if a computer should fail, etc., there may be a record that the transfer took place.

The terms tasks, transactions, composable, noncomposable, etc. may have different meanings in different contexts (e.g., with different uses, in different applications, etc.). One set of frameworks (e.g., systems, applications, etc.) that may be used, for example, for transaction processing, database processing, etc. may be languages (e.g., computer languages, programming languages, etc.) such as structured transaction definition language (STDL), structured query language (SQL), etc.

For example, a transaction may be a set of operations, actions, etc. to files, databases, etc. that must take place as a set, group, etc. For example, operations may include read, write, add, delete, etc. All the operations in the set must complete or all operations may be reversed. Reversing the effects of a set of operations may roll back the transaction. If the transaction completes, the transaction may be committed. After a transaction is committed, the results of the set of operations may be available to other transactions.

For example, a task may be a procedure that may control execution flow, delimit or demarcate transactions, handle exceptions, and may call procedures to perform, for example, processing functions, computation, access files, access databases (e.g., processing procedures) or obtain input, provide output (e.g., presentation procedures).

For example, a composable task may execute within a transaction. For example, a noncomposable task may demarcate (e.g., delimit, set the boundaries for, etc.) the beginning and end of a transaction. A composable task may execute within a transaction started by a noncomposable task. Therefore, the composable task may always be part of another task's work. Calling a composable task may be similar to calling a processing procedure, e.g., based on a call and return model. Execution of the calling task may continue only when the called task completes. Control may pass to the called task (possibly with parameters, etc.) and then control may return to the calling task. The composable task may always be part of another task's transaction. A noncomposable task may call a composable task and both tasks may be located on different devices. In this case, their transaction may be a distributed transaction. There may be no logical distinction between a distributed and nondistributed transaction.

Transactions may compose. For example, the process of composition may take separate transactions and add them together to create a larger single transaction. A composable system, for example, may be a system whose component parts do not interfere with each other.

For example, a distributed car reservation system may access remote databases by calling composable tasks in remote task servers. For example, a reservation task at a rental site may call a task at the central site to store customer data in the central site rental database. The reservation task may call another task at the central site to store reservation data in the central site rental database and the history database.

The use of composable tasks may enable a library of common functions to be implemented as tasks. For example, applications may require similar processing steps, operations, etc. to be performed at multiple stages, points, etc. For example, applications may require one or more tasks to perform the same processing function. Using a library, for example, common functions may be called from multiple points within a task or from different tasks.

A uniform resource locator (URL) is a uniform resource identifier (URI) that specifies where a known resource is available and the mechanism for retrieving it. A URL comprises the following: the scheme name (also called protocol, e.g., http, https, etc.), a colon (":"), a domain name (or IP address), a port number, and the path of the resource to be fetched. The syntax of a URL is scheme://domain:port/path.

HTTP is the hypertext transfer protocol.

HTTPS is the hypertext transfer protocol secure (HTTPS) and is a combination of the HTTP with the SSL/TLS protocol to provide encrypted communication and secure identification.

A session is a sequence of network request-response transactions.

An IP address is a binary number assigned to a device on an IP network (e.g., 172.16.254.1) and can be formatted as a 32-bit dot-decimal notation (e.g., for IPv4) or in a notation to represent 128-bits, such as "2001:db8:0:1234:0:567:8:1" (e.g., for IPv6).

A domain name comprises one or more concatenated labels delimited by dots (periods), e.g., "en.wikipedia.org". The domain name "en.wikipedia.org" includes labels "en" (the leaf domain), "wikipedia" (the second-level domain), and "org" (the top-level domain).

A hostname is a domain name that has at least one IP address. A hostname is used to identify a device (e.g., in an IP network, on the World Wide Web, in an e-mail header, etc.). Note that all hostnames are domain names, but not all domain names are hostnames. For example, both en.wikipedia.org and wikipedia.org are hostnames if they both have IP addresses assigned to them. The domain name xyz.wikipedia.org is not a hostname if it does not have an IP address, but aa.xyz.wikipedia.org is a hostname if it does have an IP address.

A domain name comprises one or more parts, the labels that are concatenated, being delimited by dots such as "example.com". Such a concatenated domain name represents a hierarchy. The right-most label conveys the top-level domain; for example, the domain name www.example.com belongs to the top-level domain com. The hierarchy of domains descends from the right to the left label in the name; each label to the left specifies a subdivision, or subdomain of the domain to the right. For example, the label example specifies a node example.com as a subdomain of the corn domain, and www is a label to create www.example.com, a subdomain of example.com.

The DHCP is the dynamic host configuration protocol (described in RFC 1531 and RFC 2131) and is an automatic configuration protocol for IP networks. When a DHCP-configured device (DHCP client) connects to a network, the DHCP client sends a broadcast query requesting an IP address from a DHCP server that maintains a pool of IP addresses. The DHCP server assigns the DHCP client an IP address and lease (the length of time the IP address is valid).

A media access control address (MAC address, also Ethernet hardware address (EHA), hardware address, physical address) is a unique identifier (e.g., 00-B0-D0-86-BB-F7) assigned to a network interface (e.g., address of a network interface card (NIC), etc.) for communications on a physical network (e.g., Ethernet).

A trusted path (and thus trusted user, and/or trusted device, etc.) is a mechanism that provides confidence that a user is communicating with what the user intended to communicate with, ensuring that attackers cannot intercept or modify the information being communicated.

A proxy server (also proxy) is a server that acts as an intermediary (e.g., gateway, go-between, helper, relay, etc.) for requests from clients seeking resources from other servers. A client connects to the proxy server, requesting a service (e.g., file, connection, web page, or other resource, etc.) available from a different server, the origin server. The proxy server provides the resource by connecting to the origin server and requesting the service on behalf of the client. A proxy server may alter the client request or the server response.

A forward proxy located in an internal network receives requests from users inside an internal network and forwards the requests to the Internet outside the internal network. A forward proxy typically acts a gateway for a client browser (e.g., user, client, etc.) on an internal network and sends HTTP requests on behalf of the client browser to the Internet. The forward proxy protects the internal network by hiding the client IP address by using the forward proxy IP address. The external HTTP server on the Internet sees requests originating from the forward proxy rather than the client.

A reverse proxy (also origin-side proxy, server-side proxy) located in an internal network receives requests from Internet users outside the internal network and forwards the requests to origin servers in the internal network. Users connect to the reverse proxy and may not be aware of the internal network. A reverse proxy on an internal network typically acts as a gateway to an HTTP server on the internal network by acting as the final IP address for requests from clients that are outside the internal network. A firewall is typically used with the reverse proxy to ensure that only the reverse proxy can access the HTTP servers behind the reverse proxy. The external client sees the reverse proxy as the HTTP server.

An open proxy forwards requests to and from anywhere on the Internet.

In network computing, the term demilitarized zone (DMZ, also perimeter network), is used to describe a network (e.g., physical network, logical subnetwork, etc.) exposed to a larger untrusted network (e.g., Internet, cloud, etc.). A DMZ may, for example, expose external services (e.g., of an organization, company, device, etc.). One function of a DMZ is to add an additional layer of security to a local area network (LAN). In the event of an external attack, the attacker only has access to resources (e.g., equipment, server(s), router(s), etc.) in the DMZ.

In the HTTP protocol a redirect is a response (containing header, status code, message body, etc.) to a request (e.g., GET, etc.) that directs a client (e.g., browser, etc.) to go to another location (e.g., site, URL, etc.)

A localhost (as described, for example, in RFC 2606) is the hostname given to the address of the loopback interface (also virtual loopback interface, loopback network interface, loopback device, network loopback), referring to "this computer". For example, directing a browser on a computer running an HTTP server to a loopback address (e.g., http://localhost, http://127.0.0.1, etc.) may display the website of the computer (assuming a web server is running on the computer and is properly configured). Using a loopback address allows connection to any locally hosted network service (e.g., computer game server, or other inter-process communications, etc.).

The localhost hostname corresponds to an IPv4 address in the 127.0.0.0/8 net block i.e., 127.0.0.1 (for IPv4, see RFC 3330) or ::1 (for IPv6, see RFC 3513). The most common IP address for the loopback interface is 127.0.0.1 for IPv4, but any address in the range 127.0.0.0 to 127.255.255.255 maps to the loopback device. The routing table of an operating system (OS) may contain an entry so that traffic (e.g., packet, network traffic, IP datagram, etc.) with destination IP address set to a loopback address (the loopback destination address) is routed internally to the loopback interface. In the TCP/IP stack of an OS the loopback interface is typically contained in software (and not connected to any network hardware).

An Internet socket (also network socket or just socket) is an endpoint of a bidirectional inter-process communication (IPC) flow across a network (e.g., IP-based computer network such as the Internet, etc.). The term socket is also used for the API for the TCP/IP protocol stack. Sockets provide the mechanism to deliver incoming data packets to a process (e.g., application, program, application process, thread, etc.), based on a combination of local (also source) IP address, local port number, remote (also destination) IP address, and remote port number. Each socket is mapped by the OS to a process. A socket address is the combination of an IP address and a port number.

Communication between server and client (which are types of endpoints) may use a socket. Communicating local and remote sockets are socket pairs. A socket pair is described by a unique 4-tuple (e.g., four numbers, four sets of numbers, etc.) of source IP address, destination IP address, source port number, destination port number, (e.g., local and remote socket addresses). For TCP, each socket pair is assigned a unique socket number. For UDP, each local socket address is assigned a unique socket number.

A computer program may be described using one or more function calls (e.g., macros, subroutines, routines, processes, etc.) written as function_name ( ), where function_name is the name of the function. The process (e.g., a computer program, etc.) by which a local server establishes a TCP socket may include (but is not limited to) the following steps and functions:

1. socket( ) creates a new local socket.
2. bind( ) associates (e.g., binds, links, ties, etc.) the local socket with a local socket address i.e., a local port number and IP address (the socket and port are thus bound to a software application running on the server).
3. listen( ) causes a bound local socket to enter the listen state.

A remote client then establishes connections with the following steps:

1. socket( ) creates a new remote socket.
2. connect( ) assigns a free local port number to the remote socket and attempts to establishes a new connection with the local server.

The local server then establishes the new connection with the following step:

1. accept( ) accepts the request to create a new connection from the remote client.

A client and server may now communicate using send( ) and receive ( ).

An abstraction of the architecture of the World Wide Web is representational state transfer (REST). The REST architectural style was developed by the W3C Technical Architecture Group (TAG) in parallel with HTTP 1.1, based on the existing design of HTTP 1.0 The World Wide Web represents the largest implementation of a system conforming to the REST architectural style. A REST architectural style may consist of a set of constraints applied to components, connectors, and data elements, e.g., within a distributed hypermedia system. REST ignores the details of component implementation and protocol syntax in order to focus on the roles of components, the constraints upon their interaction with other components, and their interpretation of significant data elements. REST may be used to describe desired web architecture, to identify existing problems, to compare alternative solutions, and to ensure that protocol extensions do not violate the core constraints of the web. The REST architectural style may also be applied to the development of web services as an alternative to other distributed-computing specifications such as SOAP.

The REST architectural style describes six constraints: (1) Uniform Interface. The uniform interface constraint defines the interface between clients and servers. It simplifies and decouples the architecture, which enables each part to evolve independently. The uniform interface that any REST services must provide is fundamental to its design. The four principles of the uniform interface are: (1.1) Resource-Based. Individual resources are identified in requests using URIs as resource identifiers. The resources themselves are conceptually separate from the representations that are returned to the client. For example, the server does not send its database, but rather, some HTML, XML or JSON that represents some database records expressed, for instance, in Finnish and encoded in UTF-8, depending on the details of the request and the server implementation.

Networking Issues

This section describes some of the issues involved in the networking, deployment and management of a large number of networked devices.

Network address translation (NAT) is a method to map a first IP address space into a second IP address space by modifying network address information (e.g. one or more of IP address, port, etc.) in Internet Protocol (IP) datagram packet headers while packets are in transit across a traffic routing device (router, switch, server, device, etc.). A NAT, e.g. a device using one or more forms of NAT etc., is similar to a private phone system at an office that has one public telephone number and multiple private extensions. Outbound phone calls made from the office all appear to come from the same telephone number. However, an incoming call that does not specify an extension cannot be transferred to an individual inside the office. Every TCP and UDP packet contains a source IP address and source port number as well as a destination IP address and destination port number. The IP address/port number pair forms a socket. In particular, the source IP address and source port number form the source socket. For publicly accessible services such as web servers and mail servers the port number is important. For example, port 80 connects to the web server software and port 25 to a mail server's SMTP daemon. The IP address of a public server is also important, similar in global uniqueness to a postal address or telephone number. Both IP address and port number must be correctly known by all hosts wishing to successfully communicate. Using again the analogy of the private office telephone system: the office system corresponds to a private LAN, the main phone number is the public IP address, and the individual extensions are unique port numbers. NAT was originally used for ease of rerouting traffic in IP networks without renumbering every host. NAT is now widely used and an essential tool in conserving global address space allocations in face of IPv4 address exhaustion. When a device (first computer, first server, etc.) on a private (e.g. internal, corporate, etc.) network sends an IPv4 packet to an external (e.g. public, routable, etc.) network, the NAT device (e.g. second device, second computer, second server, etc.) replaces the internal IP address in the source field of the packet header (i.e. the sender's address) with the external IP address of the NAT device. Port Address Translation (PAT), which is one form of NAT, may then assign the connection a port number from a pool of available ports, inserting this port number in the source port field (much like a post office box number), and forwards the packet to the external network. The NAT device then makes an entry in a translation table containing the internal IP address, original source port, and the translated source port. Subsequent packets from the same connection are translated to the same port number. The device receiving a packet that has undergone NAT establishes a connection to the port and IP address specified in the altered packet, oblivious to the fact that the supplied address is being translated (analogous to using a post office box number). A packet coming from the external network is mapped to a corresponding internal IP address and port number from the translation table, replacing the external IP address and port number in the incoming packet header (similar to the translation from a post office box number to a street address). The packet is then forwarded over the inside network. Otherwise, if the destination port number of the incoming packet is not found in the translation table, the packet is dropped or rejected because the PAT device doesn't know where to send it. NAT only translates IP addresses and ports of its internal hosts, hiding the true endpoint of an internal host on a private network.

A session is defined as the set of traffic e.g. that is managed as a unit for translation. TCP and UDP sessions are uniquely identified by the tuple of (source IP address, source TCP/UDP port, target IP address, target TCP/UDP port). ICMP query sessions are identified by the tuple of (source IP address, ICMP query ID, target IP address). All other sessions are characterized by the tuple of (source IP address, target IP address, IP protocol). A session flow indicates the direction in which a session was initiated with reference to a network interface. A packet flow is the direction in which a packet has traveled with reference to a network interface.

A global network (or public network, also external network, e.g. internet, etc.) is an address realm (or address space) with unique network addresses assigned by Internet Assigned Numbers Authority (IANA) or an equivalent address registry. A private network (or private internet, also Local Network, Local Area Network, private LAN, LAN, etc.) is an address realm independent of external network addresses. IANA has three blocks of IP address space, namely 10/8 (e.g. single class A network), 172.16/12 (16 contiguous class B networks), and 192.168/16 (256 contiguous class C networks) set aside for private internets.

Types of NAT include: traditional NAT (or outbound NAT) with unidirectional sessions, outbound from the private network, including basic NAT (address translation) and Network Address Port Translation (NAPT); bi-directional NAT (or two-way NAT) with sessions initiated from hosts in the public network and the private network; twice NAT with mapping of both source and destination addresses c.f. traditional NAT etc. where only one addresses (source or destination) is translated (e.g. used when private and external realms have address collisions e.g., a site improperly numbers its internal nodes using public addresses assigned to another organization.); multihomed NAT with multiple NAT devices or multiple links on the same NAT device; full-cone NAT, also known as one-to-one NAT, where an internal address (iAddr:iPort) is mapped to an external address (eAddr:ePort), any packets from iAddr:iPort are sent through eAddr:ePort, and any external host can send packets to iAddr:iPort by sending packets to eAddr:ePort; (address)-restricted-cone NAT, where an internal address (iAddr:iPort) is mapped to an external address (eAddr:ePort), any packets from iAddr:iPort are sent through eAddr:ePort, and an external host (hAddr:any) can send packets to iAddr:iPort by sending packets to eAddr:ePort only if iAddr:iPort has previously sent a packet to hAddr:any (where 'any' means any port number); port-restricted cone NAT (similar to address restricted cone NAT, but the restriction includes port numbers) where an internal address (iAddr:iPort) is mapped to an external address (eAddr:ePort), any packets from iAddr:iPort are sent through eAddr:ePort, and an external host (hAddr:hPort) can send packets to iAddr:iPort by sending packets to eAddr:ePort only if iAddr:iPort has previously sent a packet to hAddr:hPort; symmetric NAT where each request from the same internal IP address and port to a specific destination IP address and port is mapped to a unique external source IP address and port; if the same internal host sends a packet even with the same source address and port but to a different destination, a different mapping is used and only an external host that receives a packet from an internal host can send a packet back.

Carrier-grade NAT (CGN), also known as large-scale NAT (LSN), is an configures end sites, e.g. residential networks, with private network addresses that are translated to public IPv4 addresses by middlebox NAT devices embedded in a network operator's network, thus permitting the sharing of pools of public addresses among many end sites and shifting the NAT function and configuration from customer premise to an Internet Service Provider (ISP) network.

The terms local endpoint, internal endpoint denote the local IP:port as seen locally by the host and the internal part of the NAT. The terms public endpoint, external endpoint denote the external IP:port mapped by the NAT, as seen by the network and the external part of the NAT. The term remote endpoint denotes the IP:port of the other peer as seen by the network, or the external parts of both NATs.

Hole punching is a technique to establish a direct connection between two parties in which one or both are behind restrictive firewalls, or behind routers that use NAT. To perform hole punching, each client connects to an unrestricted third-party server (e.g. proxy server, relay server, etc.) that temporarily stores external and internal address and port information for each client. The server then relays each client's information to the other one, and using that information both clients try to establish a connection between themselves; as a result of the connections using valid port numbers, restrictive firewalls or routers accept and forward the incoming packets on each side.

Session Traversal Utilities for NAT (STUN) is a standardized set of methods and a network protocol to allow an end host to discover its public IP address if it is located behind a NAT. STUN is used to permit NAT traversal for applications of real-time voice, video, messaging, and other interactive IP communications. STUN is intended to be a tool to be used by other protocols, such as ICE. The STUN protocol allows applications operating behind NAT to discover the presence of the NAT and to obtain the mapped (public) IP address (NAT address) and port number that the NAT has allocated for the application's UDP connections to remote hosts. STUN requires assistance from a third-party network server (STUN server) located on the opposing (public) side of the NAT, usually the public Internet.

Interactive Connectivity Establishment (ICE) provides a framework with which a communicating peer may discover and communicate its public IP address so that it can be reached by other peers. ICE is a protocol for NAT traversal for UDP-based multimedia sessions established with the offer/answer model. ICE makes use of the STUN protocol and its extension TURN. ICE can be used by any protocol utilizing the offer/answer model, such as the Session Initiation Protocol (SIP).

If a host is located behind a NAT, then in certain situations it may be impossible for that host to communicate directly with other hosts (peers). In these situations, it is necessary for the host to use the services of an intermediate node that acts as a communication relay. Traversal Using Relays around NAT (TURN) is a protocol that allows the host to control the operation of the relay and to exchange packets with its peers using the relay. TURN allows a client to communicate with multiple peers using a single relay address. The TURN protocol was designed to be used as part of the ICE approach to NAT traversal, though it also can be used without ICE.

Many NAT implementations follow port preservation for TCP: for a given outgoing TCP communication, they use the same values as internal and external port numbers. NAT port preservation for outgoing TCP connections is crucial for TCP NAT traversal, because as TCP requires that one port can only be used for one communication at a time, programs bind distinct TCP sockets to ephemeral ports for each TCP communication, rendering NAT port prediction impossible for TCP. For UDP, NATs do not need port preservation. Multiple UDP communications (each with a distinct endpoint) can occur on the same source port, and applications usually reuse the same UDP socket to send packets to distinct hosts. This makes port prediction straightforward, as it is the same source port for each packet. Port preservation in NAT for TCP allows P2P protocols to offer less complexity and less latency because there is no need to use a third party (such as STUN) to discover the NAT port since the application itself already knows the NAT port. If two internal hosts attempt to communicate with the same external host using the same port number, the external port number used by the second host is chosen at random. Such NAT is sometimes perceived as restricted cone NAT (or address restricted cone NAT, also as symmetric NAT).

Port forwarding or port mapping is an example of NAT that redirects a communication request from one address and port number combination to another while the packets are traversing a network gateway, such as a router or firewall. This technique is most commonly used to make services on a host residing on a protected or masqueraded (internal) network available to hosts on the opposite side of the gateway (external network), by remapping the destination IP address and port number of the communication to an internal host. Port forwarding allows remote computers (e.g. computers on the Internet) to connect to a specific computer or service within a private LAN. Types of port forwarding include: local port forwarding; remote port forwarding; and dynamic port forwarding (DPF), which is an on-demand method of traversing a firewall or NAT through the use of firewall pinholes.

NAT traversal is a method to establish IP connections across devices (e.g. gateways, routers, servers, etc.) that implement NAT. NAT breaks the principle of end-to-end connectivity originally envisioned in the design of the Internet. NAT traversal techniques may required for certain client-to-client (e.g. peer to peer etc.) network applications, such as peer-to-peer file sharing and Voice over IP (VOIP). Many NAT traversal techniques exist, but no single method works in every situation since NAT behavior is not standardized. Many NAT traversal techniques require assistance from a server at a publicly routable IP address (e.g. proxy server, relay server, etc.). Some NAT traversal methods use the server only when establishing the connection, while others are based on relaying all data through it, which adds bandwidth costs and increases latency, detrimental to real-time voice and video communications. Most NAT traversal techniques bypass enterprise security policies. IETF standards based on this security model are Realm-Specific IP (RSIP) and middlebox communications (MIDCOM). The use of symmetric NATs has reduced NAT traversal success rates in many practical situations such as mobile and public WiFi internet connections. Hole punching techniques such as STUN and ICE are unable to traverse symmetric NATs without the help of a relay server (e.g. TURN). Port prediction techniques are only effective with NAT devices that use known deterministic algorithms for port selection. This predictable yet non-static port allocation scheme is uncommon in large scale NATs such as those used in 4G LTE networks.

Manipulation of Resources Through Representations

When a client holds a representation of a resource, including any metadata attached, it has enough information to modify or delete the resource on the server, provided it has permission to do so. (1.3) Self-descriptive Messages. Each message includes enough information to describe how to process the message. For example, which parser to invoke may be specified by an Internet media type (previously known as a MIME type). Responses also explicitly indicate their cache-ability. (1.4) Hypermedia as the Engine of Application State (HATEOAS). Clients deliver state via body contents, query-string parameters, request headers and the requested URI (the resource name). Services deliver state to clients via body content, response codes, and response headers. This is technically referred to as hypermedia (or hyperlinks within hypertext). HATEOAS also means that, where necessary, links are contained in the returned body (or headers) to supply the URI for retrieval of the object itself or related objects. (2) Stateless. The necessary state to handle the request is contained within the request itself, whether as part of the URI, query-string parameters, body, or headers. The URI uniquely identifies the resource and the body contains the state (or state change) of that resource. Then, after the server completes processing, the appropriate state, or the piece(s) of state that matter, are communicated back to the client via headers, status and response body. A container provides the concept of "session" that maintains state across multiple HTTP requests. In REST, the client must include all information for the server to fulfill the request, resending state as necessary if that state must span multiple requests. Statelessness enables greater scalability since the server does not have to maintain, update, or communicate that session state. Additionally, load balancers do not have to deal with session affinity for stateless systems. State, or application state, is that which the server cares about to fulfill a request—data necessary for the current session or request. A resource, or resource state, is the data that defines the resource representation—the data stored in the database, for instance. Application state may be data that could vary by client, and per request. Resource state, on the other hand, is constant across every client who requests it. (3) Cacheable. Clients may cache responses. Responses must therefore, implicitly or explicitly, define themselves as cacheable, or not, to prevent clients reusing stale or inappropriate data in response to further requests. Well-managed caching partially or completely eliminates some client—server interactions, further improving scalability and performance. (4) Client-Server. The uniform interface separates clients from servers. This separation of concerns means that, for example, clients are not concerned with data storage, which remains internal to each server, so that the portability of client code is improved. Servers are not concerned with the user interface or user state, so that servers can be simpler and more scalable. Servers and clients may also be replaced and developed independently, as long as the interface is not altered. (5) Layered System. A client cannot ordinarily tell whether it is connected directly to the end server, or to an intermediary along the way. Intermediary servers may improve system scalability by enabling load-balancing and by providing shared caches. Layers may also enforce security policies. (6) Code on Demand (optional). Servers are able to temporarily extend or customize the functionality of a client by transferring logic to the client that it can then execute. Examples of this may include compiled components such as Java applets and client-side scripts such as JavaScript. Complying with these constraints, and thus conforming to the REST architectural style, will enable any kind of distributed hypermedia system to have desirable emergent properties such as performance, scalability, simplicity, modifiability, visibility, portability and reliability. The only optional constraint of REST architecture is code on demand. If a service violates any other constraint, it cannot strictly be referred to as RESTful.

In computer programming, an application programming interface (API) specifies how software components should interact with each other. In addition to accessing databases or computer hardware such as hard disk drives or video cards, an API may be used to simplify the programming of graphical user interface components. An API may be provided in the form of a library that includes specifications for routines, data structures, object classes, and variables. In other cases, notably for SOAP and REST services, an API may be provided as a specification of remote calls exposed to the API consumers. An API specification may take many forms, including an international standard such as POSIX, vendor documentation such as the Microsoft Windows API, or the libraries of a programming language, e.g., Standard Template Library in C++ or Java API. Web APIs may also be a component of the web fabric. An API may differ from an application binary interface (ABI) in that an API may be source code based while an ABI may be a binary interface. For instance POSIX may be an API, while the Linux standard base may be an ABI.

Overview

Some embodiments of the present disclosure address the problem of deploying and managing Internet-connected devices. Some embodiments are directed to approaches for network edge protocols. More particularly, disclosed herein and in the accompanying figures are exemplary environments, methods, and systems for deploying and maintaining Internet-connected networked devices.

Conventions and Use of Terms

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

If any definitions (e.g., figure reference signs, specialized terms, examples, data, information, definitions, conventions, glossary, etc.) from any related material (e.g., parent application, other related application, material incorporated by reference, material cited, extrinsic reference, etc.) conflict with this application (e.g., abstract, description, summary, claims, etc.) for any purpose (e.g., prosecution, claim support, claim interpretation, claim construction, etc.), then the definitions in this application shall apply.

This section may include terms and definitions that may be applicable to all embodiments described in this specification and/or described in specifications incorporated by reference. Terms that may be special to the field of the various embodiments of the disclosure or specific to this description may, in some circumstances, be defined in this description. Further, the first use of such terms (which may include the definition of that term) may be highlighted in italics just for the convenience of the reader. Similarly, some terms may be capitalized, again just for the convenience of the reader. It should be noted that such use of italics and/or capitalization and/or use of other conventions, styles, formats, etc. by itself, should not be construed as somehow limiting such terms beyond any given definition and/or to any specific embodiments disclosed herein, etc.

Use of Equivalents

As used herein, the singular forms (e.g., a, an, the, etc.) are intended to include the plural forms as well, unless the context clearly indicates otherwise.

In the following description and claims, the terms coupled and connected, along with their derivatives, may be used. It should be understood that these terms are not necessarily intended as synonyms for each other. For example, connected may be used to indicate that two or more elements (e.g., circuits, components, logical blocks, hardware, software, firmware, processes, computer programs, etc.) are in direct physical, logical, and/or electrical contact with each other. Further, coupled may be used to indicate that that two or more elements are in direct or indirect physical, electrical and/or logical contact. For example, coupled may be used to indicate that that two or more elements are not in direct contact with each other, but the two or more elements still cooperate or interact with each other.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The terms that are explained, described, defined, etc. here and other related terms in the fields of systems design may have different meanings depending, for example, on their use, context, etc. For example, task may carry a generic or general meaning encompassing, for example, the notion of work to be done, etc. or may have a very specific meaning particular to a computer language construct (e.g., in STDL or similar). For example, the term transaction may be used in a very general sense or as a very specific term in a computer program or computer language, etc. Where confusion may arise over these and other related terms, further clarification may be given at their point of use herein.

Reference is now made in detail to certain embodiments. The disclosed embodiments are not intended to be limiting of the claims.

Descriptions of Exemplary Embodiments

FIG. 1A presents an environment 1A00 and computing infrastructure suited for deploying and maintaining Internet-connected networked devices, in one embodiment. As an option, one or more instances of environment 1A00 or any aspect thereof may be implemented in the context of the architecture and functionality of various embodiments described herein.

The environment 1A00 comprises various computing systems interconnected by a network 108. Network 108 can comprise any combination of a wide area network (WAN), local area network (LAN), wireless network, wireless LAN (WLAN), or any similar means for enabling communication of computing systems. Network 108 can also collectively be referred to as the Internet. Environment 1A00 specifically comprises a representative host server, which host server can server as a domain name system (DNS) server, representative instances of listener devices (e.g., a mobile phone, and/or a tablet, and/or a desktop computer, etc.), a representative instances of notifier devices (e.g., web cameras), and a variety of types and instances of network components (e.g., a router, storage devices, etc.). Listener devices and notification devices can be any type of device as described in this disclosure. A protocol 120 depicts operations and communications on and among the shown components. Specifically, protocol 120 presents a representative set of messages and operations that are used to establish and maintain a notification regime in the presence of a swarm of notification devices.

In protocol 120, devices are initialized, deployed, brought-inline and managed over a lifecycle. Many variations of the environment 1A00 and/or any of its constituent components are shown and described in the disclosure herein. Moreover, the architecture of the components and/or interconnection between components may vary. As one specific example, the following figure illustrates a network architecture according to a particular embodiment that provides interconnection between and/or through (1) a telecommunications network, (2) a local area network (LAN), (3) a wireless network, and (4) a wide area network (WAN) such as the Internet.

A host server 110 or other master device plans a swarm deployment such that the listener devices can be configured (e.g., under protocol 120) to receive push notifications in response to notification server activities, which are in response to notification events originating from events seen at a notifier device. The swarm deployment may involve additional devices, messages and operations that are not shown in FIG. 1A. For example, protocol 120 can be practiced after operations are performed by a fractional subdomain DNS server, a connection server, a proxy server, and/or by any variations of any number of Internet-connected networked devices. The components involved in protocol 120 are further shown and described as to their structure and function in the disclosure below.

FIG. 1B through FIG. 1H presents embodiments that include infrastructure suited for deploying and maintaining Internet-connected networked devices.

FIG. 1B through FIG. 1H may, for example, represent one or more things such as things pertaining to the Internet of Things (IoT), systems, and any variations of electronic components that may form, or be part of, or include, one or more systems that are or may be considered part of an Internet of Things, etc. and/or otherwise consist, comprise, be part of, etc. a network or collection of networks of connected devices and/or systems.

FIG. 1B through FIG. 1H may, for example, represent one or more things (e.g., devices, systems, consumer devices, consumer electronics, industrial devices, industrial system, combinations of these and the like, etc.) that a user wishes to connect to, communicate with, control, access, etc. For example, a user may wish to connect to and control one or more devices (e.g., target devices, etc.) using a mobile device (e.g., a cell phone, tablet, user device, listener device, etc.). For example, a user may wish to control one or more of: a garage door, a ceiling light, a fan, combinations of these and/or any other similar device and the like. Or, for example, a user may wish to control one or more of these devices remotely such as when away from home, etc. Note that although this description and several of the descriptions that follow may be cast in the light of home use, etc. the use, deployment, implementation, etc. of the methods, techniques and processes as described herein may be practiced in any environment, scenario, or use case. For example similar methods, etc. may be used to control industrial machines, automotive functions, etc.

Figure 1B:
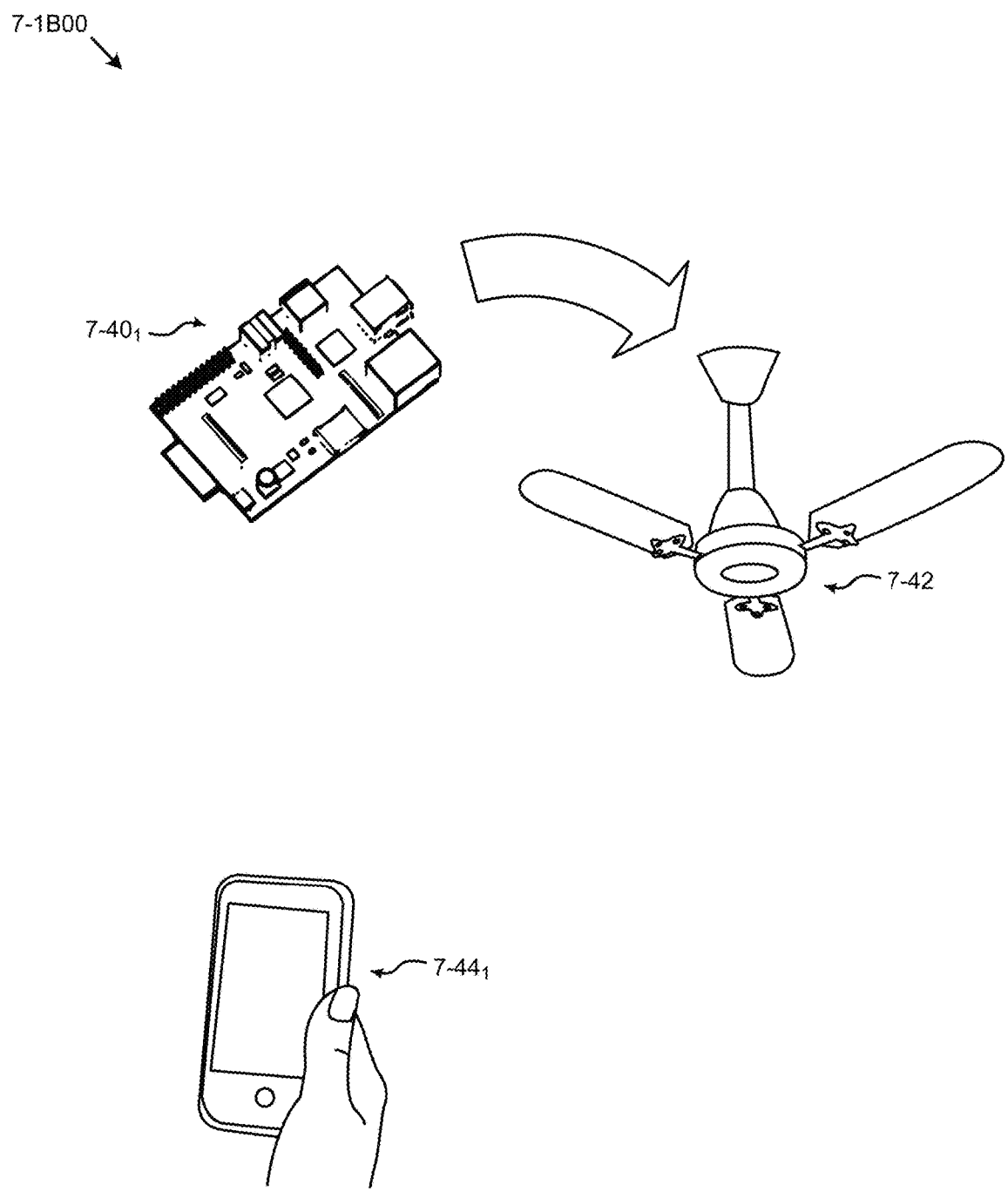

FIG. 1B, for example, may comprise an IoT system 7-1B00, which may include one or more instances or copies of an electronic system 7-40$_1$; one or more instances or copies of a ceiling fan 7-42; and a handheld device 7-44$_1$.

In one embodiment, for example, each ceiling fan may comprise, include, be connected to, etc. one electronic system. In one embodiment, for example, one electronic system may control, be connected to, etc. one or more ceiling fans and/or other similar devices, functions, systems, etc. In one embodiment, for example, more than one electronic system may be used to control, etc. one or more ceiling fans, other devices and the like, etc. In one embodiment, for example, one ceiling fan and/or one electronic system may be designated as a master or perform as a master, etc. and one or more electronic systems, portions of electronic systems, one or more ceiling fans, etc. may function as one or more slaves that may be controlled by one or more masters. Of course, any architecture of and/or protocol between masters and slaves can be implemented using any form, portions, etc. of any parts or components.

In one embodiment, for example, the IoT system may be capable of controlling the operation, function, behavior, etc. of the ceiling fan. For example, control may be performed by using software that operates, runs, executes, etc. on the electronic system. In one embodiment, for example, the electronic system may be part of, connected to, networked to, or otherwise in communication with the ceiling fan. For example, control may be performed by using software that operates, runs, executes, etc. in or on the handheld device. For example, one or more means, methods, functions, enablements, etc. may be used for control, etc. that are described in this specification or in one or more disclosures that are incorporated by reference. In one embodiment, for example, the handheld device may connect, communicate, etc. to the electronic system. In one embodiment, for example, the handheld device may be capable of connecting and/or being connected to the ceiling fan via a proxy connection, a direct connection, a connection, etc. employing one or more tunnels, etc. In one embodiment, for example, the handheld device may connect, communicate with, be connected to, the electronic system that may in turn be connected to the ceiling fan (motor control, speed control, on/off functions, integrated lighting fixture, and/or any other features, functions, facets, etc. that may be controlled). In one embodiment, for example, the handheld device may be capable of controlling the ceiling fan within the same building, home, premises, etc. as the ceiling fan. In one embodiment, for example, the handheld device may be capable of controlling one or more aspects of the function of the ceiling fan remotely via a network, the Internet, or any series of coupled, connected networks, etc. For example, the handheld device may be capable of connecting, or being connected to, etc. the ceiling fan using one or more wireless networks (Wi-Fi, Bluetooth, cellular connection and the like, etc.), one or more wired, non-wireless, etc. networks (Ethernet, serial connection, fiber optic cable, combinations of these and/or any other wired connection and the like, etc.). In one embodiment, for example, the handheld device may be responsible for initiating the connection or connections described above. In one embodiment, for example, the ceiling fan may initiate the connection. In one embodiment, for example, the electronic system may initiate the connection. In one embodiment, for example, the handheld device may initiate the connection to the ceiling fan and/or electronic system via a proxy server and/or other service system as described elsewhere in this specification and/or one or more specifications incorporated by reference. In this case, the proxy server, etc. may then enable one or more connections to the electronic system, ceiling fan, etc. In this case, the proxy server, etc. may act as a broker, intermediate, middle-man, etc. to enable a direct connection between handheld device and electronic system and/or ceiling fan. In this case, for example, the ceiling fan and/or electronic system may be registered with, documented by, associated with, etc. the proxy server, etc. In this case, for example, the user of the handheld device may use an application, visit a website, etc. in order to access the information associated with the ceiling fan and/or electronic system. For example, the user may login to a server that controls the connection service using a username and password. The user may then gain access to information showing, for example, devices including ceiling fans, electronic systems that may control ceiling fans, etc. The information may include, for example, whether the devices are online, connected, functioning, capable of being connected to by another device, etc. A user may then initiate a connection to such a device using an app and/or website in a browser, etc. A connection may then be established between a handheld device and one or more other devices including, for example, ceiling fans, electronic systems, etc. Once communication, connection, etc. is established information may be exchanged between the device, devices, and handheld device. For example, such information may include status, data, and the like. Such information may, for example, include fan speed, temperature, and/or any other information, data, indication and the like. Once one or more devices (e.g., handheld device, ceiling fan, electronic system, combinations of these and the like, etc.) are connected via a session, multiple separate data and/or control connections (also referred to as tunnels) may be established between the devices using the session. These tunnels may directly map (e.g. use, employ, translate, contain, include, etc.) one or more Internet protocols (e.g., UDP, TCP, internet control message protocol (ICMP), etc.), or may also map etc. one or more custom information and protocols. In this context a map may be used, for example, to map a service (e.g., as seen by the user etc.) to a tunnel and protocol. For example, the user may wish to have a service that allows ssh access to a device. In this case the ssh service may be mapped to a tunnel using e.g. UDP and that tunnel may contain a TCP stream that enables, allows, implements etc. an ssh connection to the device e.g. as a session etc. Other examples of services, sessions, etc. may include, but are not limited to, ssh, vnc, smb, web, http, etc. Of course, any service, any type of tunnel, any tunnel format, any tunnel protocol type, any tunnel protocol, any protocol within a tunnel etc. may be used, possibly in combination etc. For example, multiple tunnels may be used, multiple protocols may be carried by any number of tunnels etc. Of course, any number of tunnels, any number of protocols (including nested etc. protocols), any number of services, any number of sessions etc. may be used. Of course, any type of tunnel (e.g., encrypted, unencrypted, nested, VPN, combinations of one or more of these etc. may be used. Of course, any type of protocol, tunnel, service, session, etc. may be used. Such protocols may be defined in one or more tunnel connection negotiation messages, and/or in any other manner, fashion, etc. that may optionally be dependent on the session set-up or the device type, etc. Each session may contain a single tunnel, but of course may also use any number of different types of tunnels.

The communication network, environment, etc. that allows, permits, enables, etc. operations, connections, tunnels, and communications, etc. on and among devices (e.g., handheld device, ceiling fan, electronic system, etc.) may be more complex, more complicated, etc. than shown. As described elsewhere in this specification and/or in one or more disclosures incorporated by reference, such a communication network may include, comprise, etc. one ore more of the following system components: a direct map proxy, DMP server, and the like; a connection server, a proxy server; a host server; one or more target, client, server, user, handheld, and/or combinations of these and other similar devices and the like, etc.

A communication network, environment, etc. may represent the key activities, functions, enablements, etc. that may be required in using protocols with a connection service in order to establish indirect mapped, direct mapped, and/or other similar connections between one or more user devices with one or more target devices. The examples shown here, above and in other examples in this specification as well as other examples shown in one or more disclosures incorporated by reference may represent techniques for flexibly and efficiently mapping to a large number of devices that are connected to the Internet (e.g., a swarm).

In one embodiment, for example, a user at a handheld device and/or other similar user devices initiates, causes, etc. (e.g., by clicking a form button on a web page, etc.) handheld device to send a login request to a connection service operated by a connection server at domain name "www.example.com". A DMP server may receive (e.g., intercept) the request and may forward the request to a connection server. The connection server may then authenticate the user login credentials and establish a secure connection for further communication. The user may then request a connection to a target device (e.g., ceiling fan, etc.). The connection server may then associate target devices with the host server. The association between host server and target device may be based on physical location, server loading rules, subnet relationships, security rules, and the like. However, the host server may only be accessible through a proxy server. For example, such a proxy server may provide another security layer for a host server (e.g., firewall, nested proxy with DMP server, etc.), provide a tunnel for TCP communications, and the like. In this case, connection server may then initiate a connection to the host server and target device through the proxy server. The proxy server may forward the connection request to the host server that may then establish a user-device connection between user device and target device, through host server, proxy server, and DMP server. In various embodiments, one or more of the functions, features, etc. of one or more of the host server, proxy server, and DMP server may be combined. In various embodiments, one or more of the functions, features, etc. of one or more of the host server, proxy server, and DMP server may be not be required or used in all situations, applications, use cases, scenarios, etc.

Uses of the connection mechanisms described above are further described in more detail elsewhere in this specification and/or in one or more of the disclosures incorporated by reference.

In one embodiment, for example the connection mechanisms as described herein may result in connections that are more secure than otherwise possible. For example, software that runs, executes on a target device such as ceiling fan, electronic system may be made invisible to the Internet. For example, a web server that serves information may run, execute, etc. on the electronic system that controls a ceiling fan. Using the embodiments described herein or in one or more specifications incorporated by reference, the web server may be configured to respond only to requests from IP addresses in the 127 prefix or localhost IP address range. The embodiments described allow a tunnel connection to be made using a localhost address. In such an embodiment for example, the web server may be programmed not to respond to requests from any other IP addresses. Such a programming may be performed by using one or more configuration files or provisioning files. A configuration file or provisioning file may be programmed to bind (e.g., respond to, etc.) to 127.0.0.1 for example. In this manner, the target device, ceiling fan, electronic system, etc. may be made invisible to network scans, etc. Thus, for example, a TCP/IP software stack, Linux IP tables, etc. may be set on the target device to refuse connection, or to not respond to any probes, scans, nmpa scans, pings, and/or combinations of these messages and/or other network probes, probe techniques, etc. In this manner, one or more target devices may be isolated, hidden, cloaked, etc. Using these techniques may prevent harmful attacks that may be enabled by the discovery of device that are not otherwise able to be hidden.

In one embodiment, for example, an advantage of the techniques, methods, embodiments, etc. described may be that the connection between devices may be made despite the fact that one or more devices may be behind a firewall, behind a network address translation, etc. Using the techniques, methods, embodiments, etc. as are described herein, a connection between a user device and a target device may be made when the target device is the subject to network address translation. Such a connection may be made without performing port forwarding, for example. Establishing connections in this manner is made possible since a server (located at a service provider for example) knows, or has access to, has knowledge of, etc. the location, address, properties, etc. of one or more target devices.

In this manner, and using techniques described herein, one or more communication links, connections, tunnels, etc. between a first device and a second device may be made using a third device. In this manner, the connection between the first device and the second device may be made, initiated, completed, etc. without explicitly initiating a direct connection from a first device to a second device. Instead the first device initiates a connection to a third device; the second device establishes a connection to the third device; and then the third device brokers, initiates, establishes, maintains, etc. a connection between the first device and the second device.

In FIG. 1B, the components shown include one or more of the electronic system, ceiling fan, etc., which may take on one or more other forms, types, functions, etc. For example, the ceiling fan may be a floor-standing fan, etc. For example, the ceiling fan may be another type of air-conditioning system, HVAC system, heating system, cooling system, refrigeration systems, a combination of these and/or other similar systems, etc. For example, the electronic system may comprise one or more circuit boards, systems, components, etc. In one embodiment the one or more circuit boards, etc. may be connected, coupled, networked, and/or connected, joined, etc. in any fashion, manner, housing, form factor, system manifestation, etc. In various other embodiments the ceiling fan, electronic system, etc. may be any type of electronic system, device that may perform any functions, implement any features, etc. Several other examples of such other systems, components, devices, etc. are included in one or more of the figures and example systems that follow, but embodiments of such systems, components, networks, configurations are not limited to those shown.

Figure 1C:
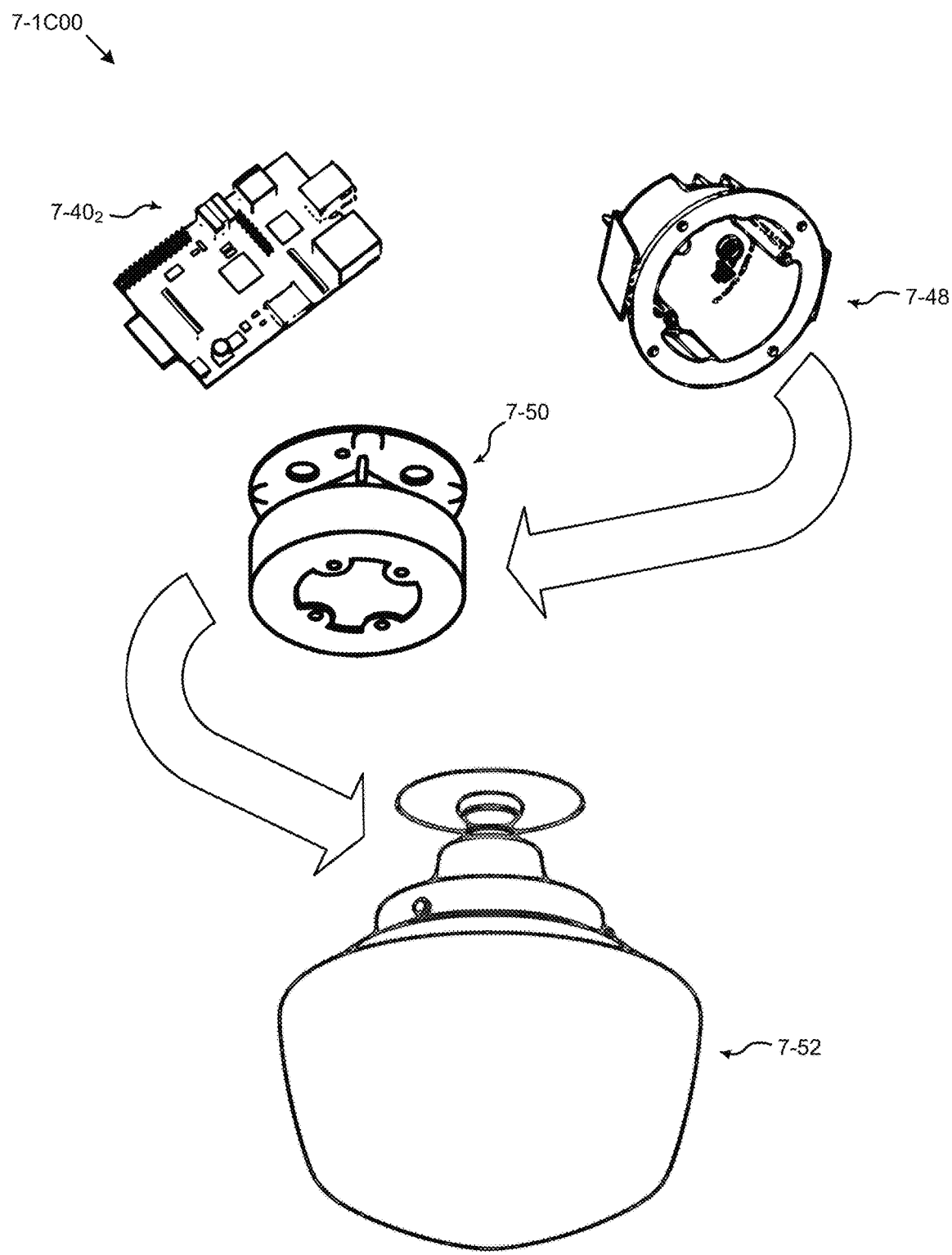

FIG. 1C, for example, may comprise an IoT system 7-1C00; one or more instances, copies, etc. of an electronic system 7-40$_2$; one or more copies, instances, etc. of a light receptacle 7-48; one or more copies, instances, etc. of a light housing 7-50; and one or more copies, instances, etc. of a ceiling light 7-52. In this IoT system, for example, the connection service system described herein may be used to allow a user to use the handheld device to connect and access, remotely or locally, the features, functions, etc. of the ceiling light. The software that may implement, enable, allow, permit, control, etc. in whole or in part, etc. one or more connections, tunnels, links, sessions, etc. using techniques described here may be included, located, implemented, etc. on the electronic systems of the IoT system shown. In one embodiment of the IoT system, the light housing, light receptacle and all other aspects of the housing, mounting, fixturing system may be standard sizes, shapes, construction, etc. In one embodiment, all of the electronic systems that may be required, used, etc. to control one or more ceiling lights, etc. may be housed in one or more of the light housing, light receptacle. In other, alternative, etc. embodiments, the electronic system, or part of the electronic system, may be included, manufactured, implemented, integrated, etc. in a form that may be external to the light housing and/or light receptacle, etc. In various other embodiments the electronic system function may be implemented in any way, any fashion, any manner, any form in any number of parts, components, etc. and/or distributed, located, manufactured, positioned, etc. in any combination of parts, portions of a lighting system, lighting parts, lighting systems, lighting components, etc. In various systems the electronic system may be configured, constructed, architected, manufactured, etc. in any manner. For example, one or more electronic systems may be used to control one or more lighting fixtures, lighting receptacles, lights, ceiling lights, etc. For example, one or more parts, pieces, etc., of the electronic system may be used as one or more master systems, components, etc. together with one or more slave systems, peer systems, etc. The slave systems, peer systems, etc. may include one or more parts, components, etc. of one or more electronic systems and/or one or more parts, components, etc. of lighting systems, lighting fixtures, receptacles, etc. Of course lighting systems that may be compatible with the embodiments described above and elsewhere herein may take any form, may be constructed or manufactured in any manner, fashion, as any type of modular system, etc.

Figure 1D:
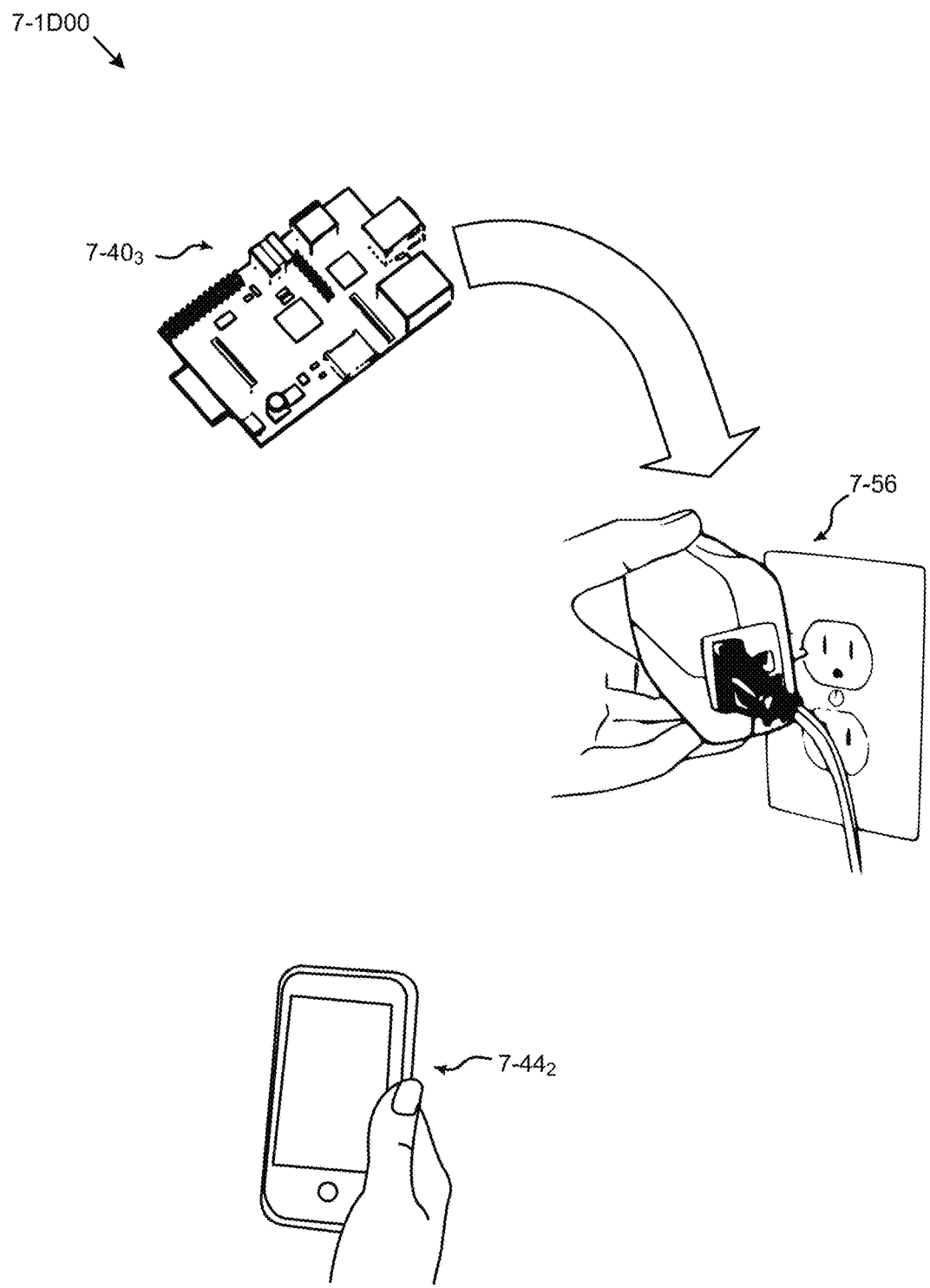

FIG. 1D, for example, may comprise an IoT system 7-1D00; one or more copies, instances, etc. of an electronic system 7-40₃; one or more copies, instances, etc. of a smart plug 7-56; and a handheld device 7-44₂. In this IoT system, for example, a smart plug may be any plug, fixture, socket, or any similar construction that allows detachable connection etc. In this IoT system, for example, a smart plug may be any plug etc. that allows some aspect, feature, function, etc. of smart, intelligent, control etc. In this IoT system, for example, a smart plug may be any plug etc. that allows some aspect, feature, function, etc. of remote control, remote monitoring etc. In this IoT system, for example, a smart plug may be any plug etc. that allows one or user-defined functions, features, programs, software etc. to be added, downloaded, augmented, etc. In this IoT system, for example, the connection service system described herein may allow a user to use the handheld device to connect and access, remotely or locally, the features, functions, etc. of the smart plug. In one embodiment, for example, the smart plug may contain one or more programmable logic components e.g., a microprocessor, CPU, FPGA, combinations of these and the like, etc. In one embodiment, one or more of the one or more programmable logic components may be enabled to run, execute, etc. an open-source or similar operating system, compute environment, etc. In this fashion the user of the smart plug may be allowed, enabled, etc. to program custom functions, features, etc. that may take advantage of, use, are based on, etc. a connection service such as described herein and/or in one or more specifications incorporated by reference. In one embodiment, for example, the smart plug may control one or more devices that is connected, plugged into, etc. the smart plug. In one embodiment, for example, the smart plug may contain one or more wireless communication functions e.g., Wi-Fi, Bluetooth, ZigBee and the like. In one embodiment, a smart plug may be used as a gateway device. For example, the smart plug may implement software to terminate a tunnel connection as described herein. The smart plug may terminate a tunnel connection but then act as a gateway and relay data, information, messages, status, etc. to one or more other devices that may be connected to the gateway. For example, the data may be relayed by the smart plug using one or more wireless connections. For example, in one embodiment, one or more smart plugs may be used in a user's home to control one or more devices. For example, a smart plug may be used to control a ceiling fan, a security system, a door lock, and/or any other similar and like devices, components, systems, etc.

Figure 1E:
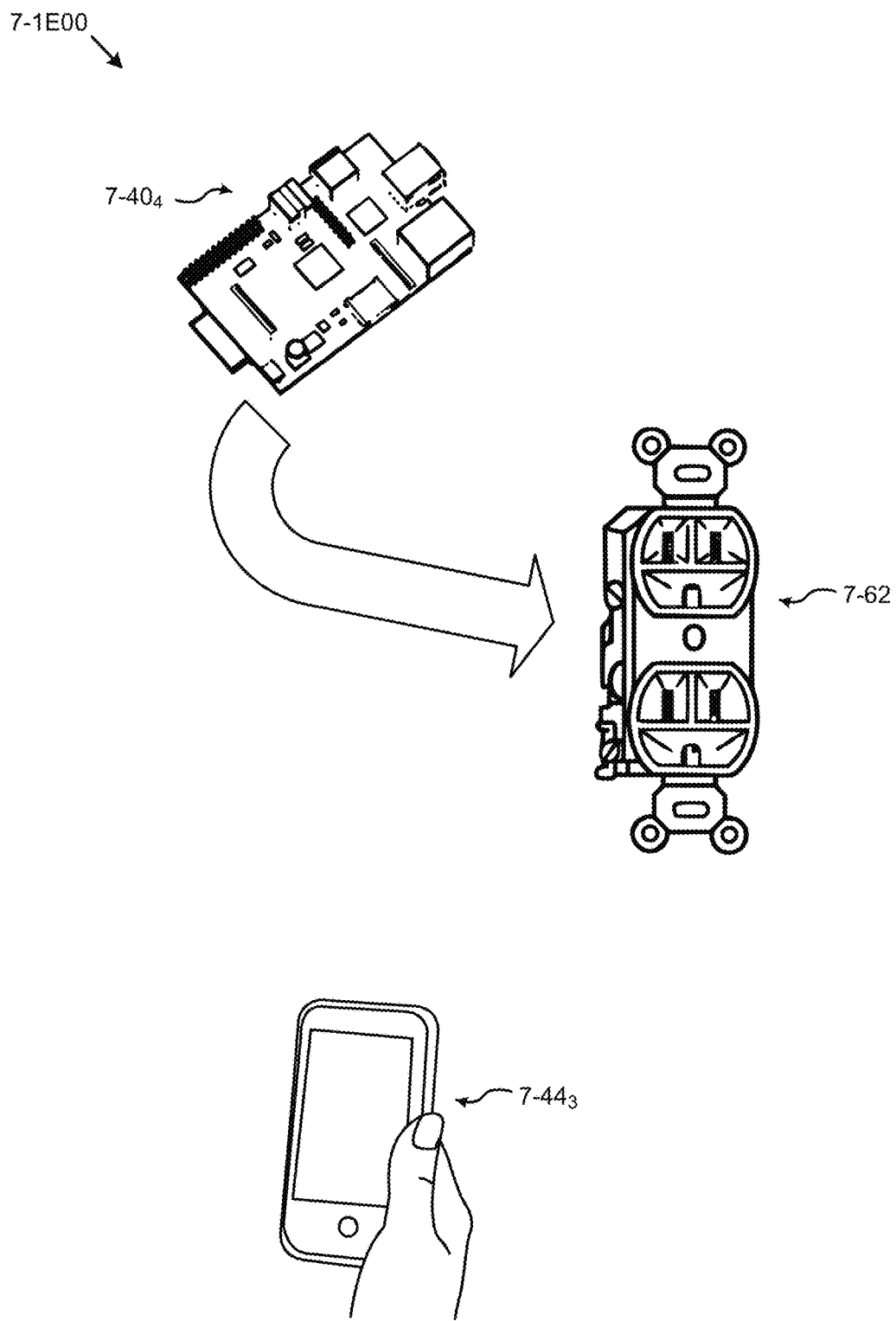

FIG. 1E, for example, may comprise an IoT system 7-1E00; one or more copies, instances, etc. of an electronic system 7-40₄; one or more copies, instances, etc. of a socket 7-62; and a handheld device 7-44₃. In one embodiment the electronic system may be integrated, manufactured, added into, attached to, etc. the socket. In one embodiment the socket may be a standard, approved, etc. form factor, size, dimension, etc. Thus, for example, in one embodiment the electronic system that may be integrated with, installed into, attached to, etc. the standard socket may be retrofitted to existing installations, built into new constructions, etc. Such a socket that is enabled with an electronic system may thus function as a smart plug as described above. Such a socket may then implement, enable, perform, etc. one or more of the features, functions, etc. as described above, in a manner, fashion, etc. similar to a smart plug.

Figure 1F:
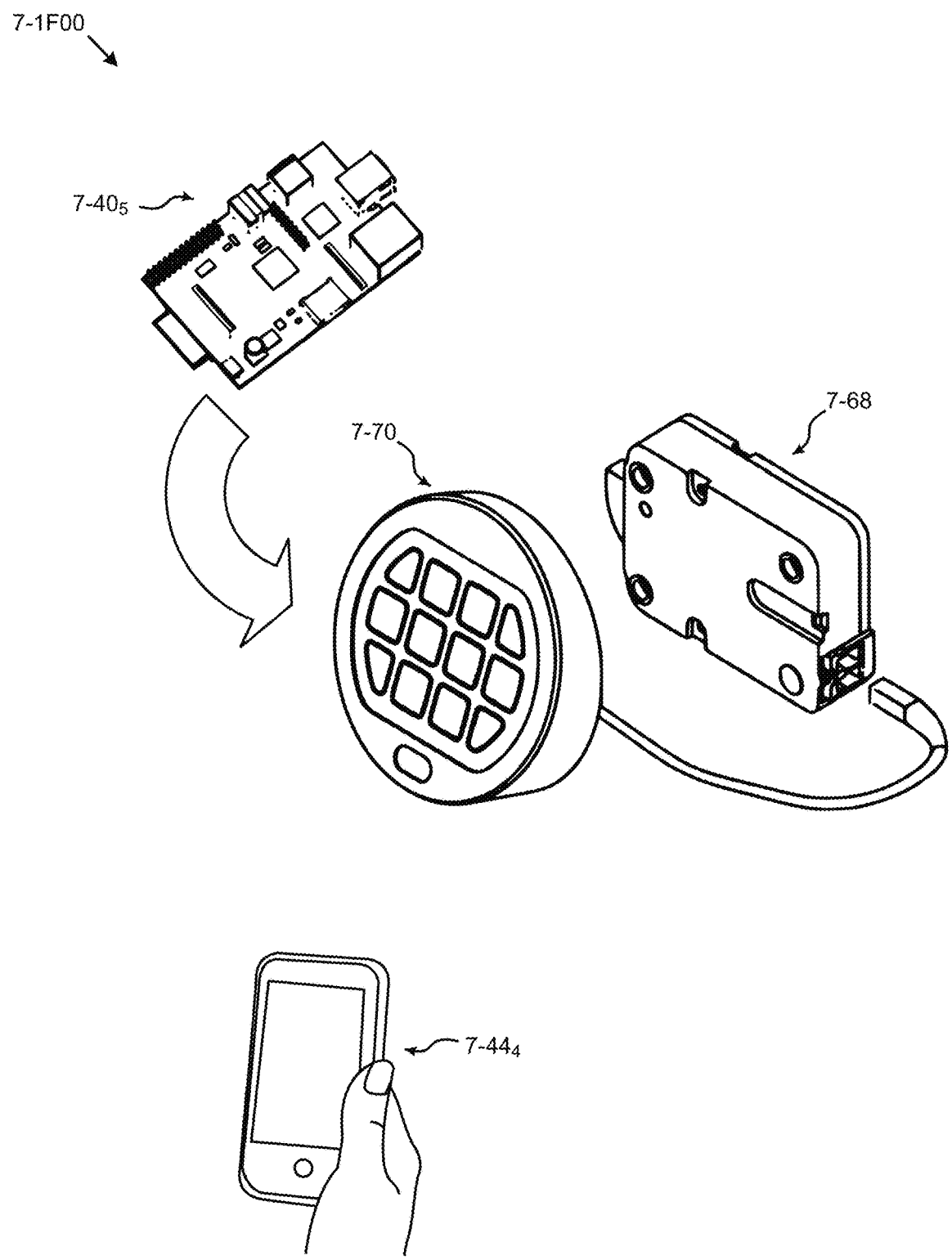

FIG. 1F, for example, may comprise an IoT system 7-1F00; one or more copies, instances, etc. of an electronic system 7-40₅; one or more copies, instances, etc. of a security system 7-68; one or more copies, instances, etc. of a keypad 7-70; and a handheld device 7-44₄. In this IoT system, for example, the security system may be an actuator such as a door lock, etc. Of course any form of security system may be used that may implement any of one or more security related functions, features, etc. In this IoT system, for example, the connection service system described herein may be used to allow a user to use the handheld device to connect and access, remotely or locally, the features, functions, etc. of the security system. Such a security system may be connected to one or more networks of sensors, actuators, data sources, and/or other electronic systems, components, combinations of these and/or other like components, etc.

Figure 1G:
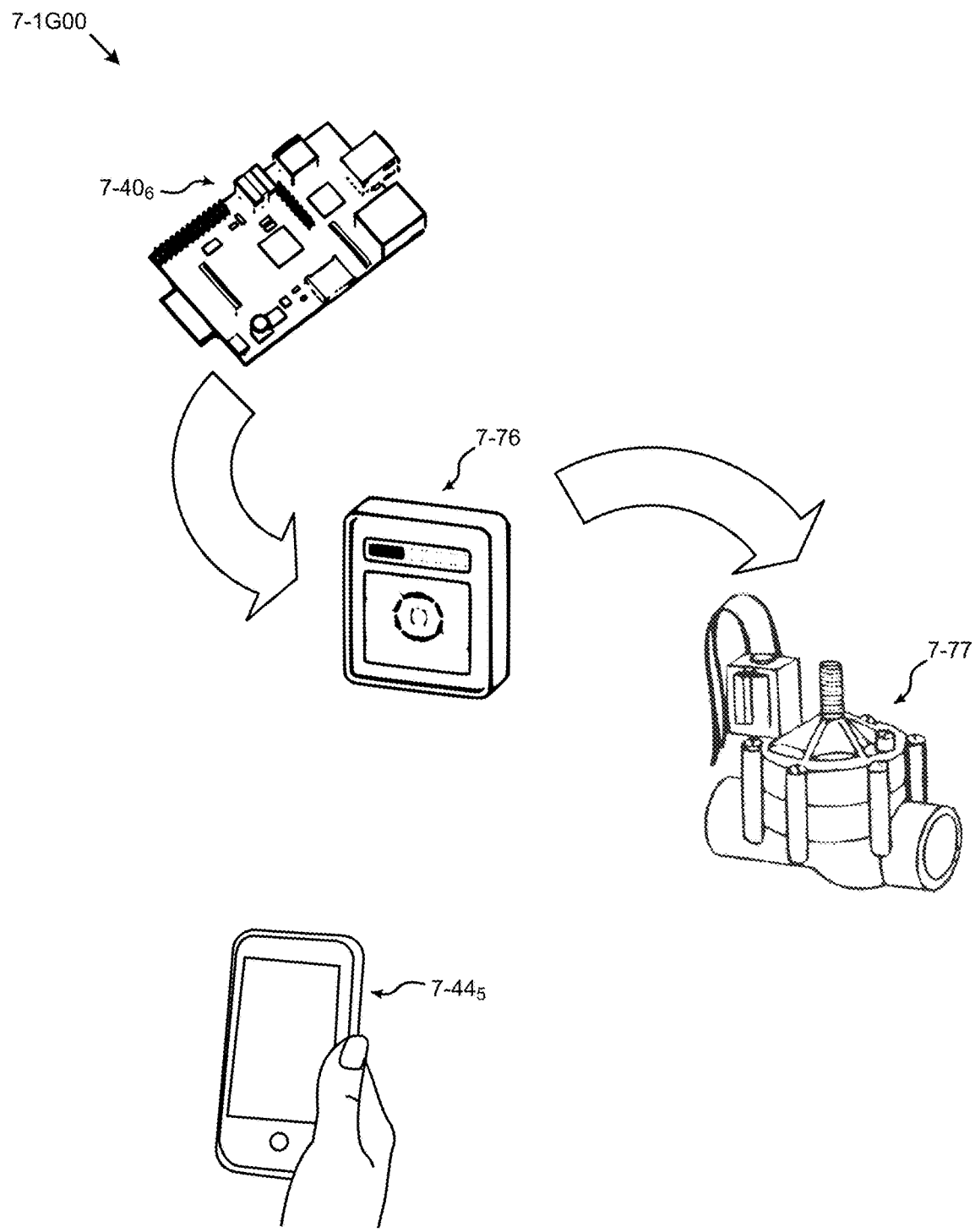

FIG. 1G, for example, may comprise an IoT system 7-1G00; one or more copies, instances, etc. of an electronic system 7-40₆; one or more copies, instances, etc. of a control system 7-76; one or more copies, instances, etc. of a valve 7-77; and a handheld device 7-44₅. In this IoT system, for example, the connection service system described herein may be used to allow a user to use the handheld device to connect and access, remotely or locally, the features, functions, etc. of the valve. For example, such a system may be used as part of a sprinkler, irrigation system, etc. Such an IoT system may allow the remote control of irrigation remotely based on automated or manual input for example.

Figure 1H:
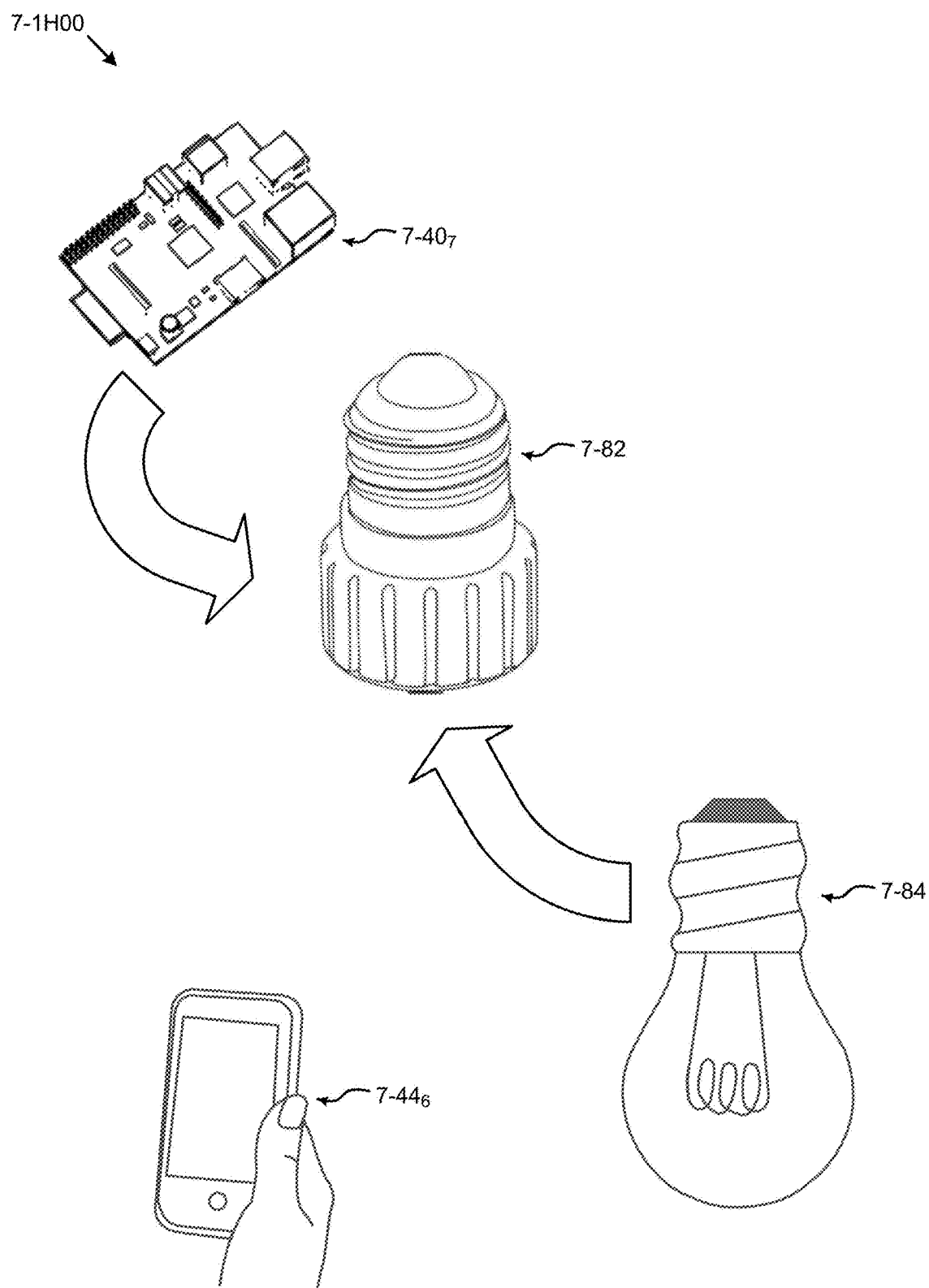

FIG. 1H, for example, may comprise an IoT system 7-1H00; one or more copies, instances, etc. of an electronic system 7-40$_7$; one or more copies, instances, etc. of a lighting fixture 7-82; one or more copies, instances, etc. of a light bulb 7-84; and a handheld device 7-44$_6$. In one embodiment the electronic system may be integrated, manufactured, added into, attached to, etc. the fixture. In one embodiment the fixture may be a standard, approved, etc. form factor, size, dimension, etc. Thus, for example, in one embodiment the electronic system that may be integrated with, installed into, attached to, etc. the standard fixture may be retrofitted to existing installations, built into new constructions, etc. Such a fixture that is enabled with an electronic system may thus function as a gateway device as described above. Such a fixture may then implement, enable, perform, etc. one or more of the features, functions, etc. as described above, in a manner, fashion, etc. similar to, for example, a smart plug that is used as a gateway device.

Of course, any of the above devices can be variously described as a ceiling fan, ceiling light, smart plug, socket, security system, sprinkler system, etc. In one embodiment, for example, any combination of the examples shown, illustrated, and described above may be used. Of course, systems are not limited to combinations of the exact systems, components, functions, etc. with features described above. One skilled in the art will recognize that the concepts, methods, techniques, etc. described above particularly with respect to the methods used to connect devices may be used with a vast array of devices, electronic system components, etc. that may be interconnected, linked, etc. to perform any number of functions, etc.

The following sections describe further details of the methods, techniques, process, systems, etc. used to establish communications, connections, links, sessions, control, etc. between one or more devices, systems, components, etc. such as those example systems, components, etc. described above.

FIG. 2 illustrates a network architecture 1Y-100, in accordance with one embodiment. As shown, at least one network 1Y-102 is provided. In the context of the present network architecture 1Y-100, the network 1Y-102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1Y-102 may be provided.

Coupled to the network 1Y-102 is a plurality of devices. For example, a server computer (e.g., data server 1Y-104) and a client computer (e.g., an end user computer 1Y-106) may be coupled to the network 1Y-102 for communication purposes. Such end user computer 1Y-106 may include a desktop computer, lap-top computer, and/or any other type of logic. Further, each of these computers can host independent virtual computers or services, which may operate as independent capabilities, each uniquely connected to the network. Still yet, various other devices may be coupled to the network 1Y-102, including a personal digital assistant (PDA) device 1Y-108, a mobile telephone device 1Y-110, a television 1Y-112, a networked camera 1Y-113, an irrigation controller 1Y-114, a network router 1Y-115, a media server, 1Y-116, etc. Additionally, devices may be coupled to the network via a separate network. These separate networks could feature the same protocols as the main network, 1Y-102, or be managed under an entirely different set of parameters where some intermediary device serves to translate the protocols between the two networks.

FIG. 3 illustrates an exemplary computer system 1Y-200, in accordance with one embodiment. As an option, the computer system 1Y-200 may be implemented in the context of any of the devices of the network architecture 1Y-100. Of course, the computer system 1Y-200 may be implemented in any desired environment.

As shown, a computer system 1Y-200 is provided including at least one central processor 1Y-201 which is connected to a communication bus 1Y-202. The computer system 1Y-200 also includes a main memory 1Y-204 (e.g., random access memory (RAM), etc.). The computer system 1Y-200 also may include a graphics processor 1Y-206 and/or a display 1Y-208. It should be noted that the single shared communication bus depicted is simply for illustrative purposes, and the various elements could communicate with the central processor or with other elements across dedicated buses.

The computer system 1Y-200 may also include a secondary storage 1Y-210. The secondary storage 1Y-210 includes, for example, a hard disk drive and/or a removable storage drive, representing a floppy disk drive, a magnetic tape drive, a compact disk drive, memory cards, devices with storage (e.g., MP3 players, digital cameras, etc.). The removable storage drive reads from and/or writes to a removable storage unit in a well-known manner.

Computer programs, or computer control logic algorithms, may be stored in the main memory 1Y-204 and/or the secondary storage 1Y-210. Such computer programs, when executed, enable the computer system 1Y-200 to perform various functions. Main memory 1Y-204, secondary storage 1Y-210 and/or any other storage are possible examples of computer-readable media.

FIG. 4 shows a method 1Y-300 for automatically configuring a device connected to a network, in accordance with one embodiment. As an option, the method 1Y-300 may be implemented in the context of the architectures and environments herein. Of course, however, the method 1Y-300 may be carried out in any desired environment.

As shown, a device connected to a network is automatically identified. See operation 1Y-302. Additionally, the device is automatically configured. See operation 1Y-304.

In the context of the present description, a device refers to any device capable of being connected to a network. For example, in various embodiments, the device may include, but is not limited to, a PDA, a mobile phone, a television, a camera, an irrigation controller, a network router, a media server, a computer, and/or any other device that meets the above definition.

Furthermore, the configuration of the device may involve any type of configuration. For example, in one embodiment the configuration may include setting configurable parameters. In another embodiment, the configuration may include updating and/or installing software on the device.

FIG. 5 shows a method 1Y-400 for identifying a device on a network, in accordance with one embodiment. As an option, the method 1Y-400 may be implemented in the context of the architectures and environments herein. Of course, however, the method 1Y-400 may be carried out in any desired environment. It should also be noted that the aforementioned definitions may apply during the present description.

As shown, a device connected to a network is identified using a unique identifier associated with the device. See operation 1Y-402. In the context of the present description, a unique identifier (e.g., a UNIQUE ID, etc.) refers to any identifier that is unique to the device. For example, in various embodiments, the unique identifier may include, but is not limited to, a Media Access Control (MAC) address, a Universal Product Code (UPC), and/or any other identifier that meets the above definition.

Strictly as an option, the device may be associated with a Universal Device Locator (UDL). In this case, the UDL may include any term (e.g., familiar term, etc.) capable of being used for identification purposes. In one embodiment, such a UDL may be associated with a service on the network.

For example, a UNIQUE ID of a device may be associated with a particular UDL, such that the UDL and derivatives of the UDL may be used by the service to access (e.g., locate, etc.) the device on the network. In yet another embodiment, the association of the device to the UDL may be used to establish a direct peer-to-peer network between the device and a remote device associated with the UDL.

Strictly as an option, the device may be configured once the device is identified. See operation 1Y-404. In one embodiment, the device may be automatically configured. In another embodiment, the device may be manually configured.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 6 shows a system 1Y-500 for accessing a device on a network and/or automatically configuring a device connected to the network, in accordance with another embodiment. As an option, the system 1Y-500 may be implemented in the context of the architectures and environments herein. Of course, however, the system 1Y-500 may be implemented in any desired environment. It should also be noted that the aforementioned definitions may apply within the context of the present description.

As shown, a device 1Y-502 may be identified using a unique identifier (e.g., UNIQUE ID 1Y-504 and/or another unique identification form, etc.) associated therewith. The device 1Y-502 may include any of the devices described above with respect to FIG. 1 and/or FIG. 2, and/or any other device capable of using a network. As shown by way of example, the device 1Y-502 may include a camera connected to a network 1Y-506.

The UNIQUE ID 1Y-504 may include, for example, a MAC address (and/or may be derived from a MAC address), a universal product code (UPC) number, and/or other type of unique identifier capable of guaranteeing the uniqueness of the ID across a plurality of different vendors (e.g., service providers, product providers, etc.). The device 1Y-502 may also be associated with a service having a particular Universal Device Locator (UDL) 1Y-512. In various embodiments, the UDL 1Y-512 may represent an individual, an entity (e.g., a company, vendor, etc., etc.). Accordingly, the service may be provided by such individual, entity, etc.

As an option, the device 1Y-502 may be associated with multiple UDLs 1Y-512, where each of the UDLs 1Y-512 represents various individuals or entities (e.g., user, manufacturer, software provider, reseller, etc.). In one embodiment, the device 1Y-502 may be associated with the UDL 1Y-512 by associating the UNIQUE ID 1Y-504 of the device 1Y-502 with the UDL 1Y-512. As shown, the UNIQUE ID 1Y-504 and the UDL 1Y-512 may be associated at a UDL server 1Y-514 (e.g., the association may be stored at the UDL server 1Y-514, etc.).

Further, if multiple UDLs 1Y-512 are associated with the device 1Y-502, a master UDL may optionally be identified (e.g., predetermined, etc.) that designates particular permissions for each of the UDLs 1Y-512 with respect to the device 1Y-502. In another embodiment, each UDL 1Y-512 may be designated as having authority over particular capabilities (e.g., functionality, etc.) of the device 1Y-502. By associating the device 1Y-502 with at least one UDL 1Y-512, a user (e.g., owner, etc.) associated with the UDL 1Y-512 may access the device 1Y-502 over the network 1Y-506 (e.g., from a location remote from the device, etc.) using the service providing the UDL 1Y-512. Accordingly, remote access to the capabilities of the device 1Y-502 may be disabled or severely limited if such association is broken (e.g., the UDL 1Y-512 is no longer associated with the device 1Y-502, etc.). As shown, the network 1Y-506 may include the Internet, but of course the network 1Y-506 may also include any of the networks described above with respect to FIG. 2, or any other suitable network.

In one embodiment, a user may access the device 1Y-502 from a remote personal computer (PC) 1Y-508 using the association of the UDL 1Y-512 and the UNIQUE ID 1Y-504, as shown. For example, the user may login to the service (e.g., the service providing the UDL 1Y-512, etc.) for authenticating the user and for identifying any devices associated therewith. Optionally, the user may login using a UDL 1Y-512. In addition, devices associated with the user's address (e.g., internet protocol (IP) address, etc.) may become accessible. In this way, a direct connection to the device 1Y-502 may be made remotely using the association between the UDL 1Y-512 and UNIQUE ID 1Y-504.

As a specific example, a user may purchase a home router 1Y-516 and configure the router for the user's home Internet connection. The user may also associate the MAC address of the router with an Internet service UDL 1Y-512. For illustrative purposes, the home router 1Y-516 may be manufactured by Company A. As the master UDL holder, the user may grant the manufacturer (Company A) permission to provide any updates to the firmware of the router using the UDL 1Y-512 associated with the home router 1Y-516. In addition, the user may login anywhere the user has access to an Internet connection and may establish a direct connection with the home router 1Y-516 using the associated UDL 1Y-512.

Going further with the example, Company A may determine that it needs to provide a firmware update to the home router 1Y-516. By logging into the Internet service providing the UDL 1Y-512, all devices that have been associated with such UDL 1Y-512 may become available and accordingly an automatic update to such devices may be allowed. Optionally, the user may grant the manufacture permission to access the home router 1Y-516 on a case-by-case basis, such that Company A may send an alert to the home router 1Y-516 for communicating with the user (e.g., the next time that the device owner logged into the service, etc.). The user may then determine whether or not to update the firmware of the home router 1Y-516 based on the received alert.

In another exemplary embodiment, the user may be traveling internationally and may receive a call from home that there is a problem with the home Internet connection. In a situation where no one at home is knowledgeable enough to check the home router 1Y-516, the user may login to the Internet service capable of providing direct connection to the home router 1Y-516 and may select the user's home router 1Y-516. A browser application may then be launched and a user interface for the home router 1Y-516 may be made available to the user for remotely configuring the home router 1Y-516 as if the user were accessing the router via the local network. For example, the user may reset the home router 1Y-516 and re-establish the Internet connection such that the home Internet connection is repaired.

In another exemplary embodiment, the owner of a network connected video camera 1Y-502 may select to make a UDL 1Y-512 associated with the camera 1Y-502 and any information associated therewith visible and searchable to anyone using the Internet service. For example, the device owner may be going on vacation and may ask another person (e.g., a neighbor, etc.) to monitor camera 1Y-502 while the device owner is away. The device owner may provide the other person with the UDL 1Y-512 associated with the device 1Y-502.

The neighbor may then login to the Internet service and conduct a search for devices associated with the UDL 1Y-512. Any devices associated with the UDL 1Y-512 may be presented and the neighbor may request and receive permission (e.g., temporary permission, permanent permission, etc.) from the device owner to view the network camera 1Y-502 over the network 1Y-506. The association of the UNIQUE ID 1Y-504, which in the present embodiment includes the MAC address of the device, with the UDL 1Y-512 may therefore allow for searching for and accessing remote devices via UDLs 1Y-512, such that a user attempting to access a remote device need not know or remember the UNIQUE ID 1Y-504 of the device 1Y-502, which may be a complex set of numbers that may not be easily remembered.

Furthermore, a browser plug in may be available for the Internet service, such that a user may use the "devicename@userID" as a UDL 1Y-512 to locate the device 1Y-502. In this scenario, the protocol type may be entered along with the UDL 1Y-512, similar to how Internet addresses may be entered. The table below titled "UDL example" illustrates an exemplary UDL 1Y-512 associated with a sample Internet Service that may be used for accessing the device 1Y-502. It should be noted that the UDL example illustrated below is for illustrative purposes only, and therefore should not be construed as limiting in any manner.

| UDL example | |
|---|---|
| Label | Description |
| Example: | Service via Yoics |
| Current: | http://www.yoics.com |
| Device: | yoics://camera@jane_doe |

In a further embodiment, the association of the UDL 1Y-512 and the UNIQUE ID 1Y-504 of the device 1Y-502 may be used for tracking product ownership. For example, devices may automatically register when connected to a network and identify their location (e.g., IP address, etc.) to the Internet service. Thus, a purchaser of used goods may request that payment be automatically released upon transfer of the device to the new UDL associated with the purchaser. Thus, a transfer of an association between a device's UNIQUE ID 1Y-504 and/or UDL 1Y-512 and a user may be used for triggering a commerce/commercial transaction. In addition, the association of the UDL 1Y-512 and the UNIQUE ID 1Y-504 of the device 1Y-502 may also provide security for the device 1Y-502, such that unless the UDL 1Y-512 is fundamentally modified, the UDL 1Y-512 may remain associated with the current owner.

In still yet a further embodiment, the association between the UDL 1Y-512 and the UNIQUE ID 1Y-504 of the device 1Y-502 may also be used by a system integrator, reseller, or manufacturer for configuring the device 1Y-502 for a customer. For example, the reseller may take ownership of the device 1Y-502 by associating a UDL 1Y-512 of the reseller with the device 1Y-502 and may further fully configure the device 1Y-502 for the customer. The reseller may then transfer ownership to a UDL 1Y-512 of the customer upon completing the configuration. This method of pre-configuration could also be used as a mechanism for product registration. In addition, the customer may optionally have the ability to temporarily grant access permission in order to temporarily provide direct access to the device 1Y-502, thus facilitating on-going sessions of technical support.

In one embodiment, the device 1Y-502 connected to the network 1Y-506 may be automatically identified and, in turn, automatically configured. The automatic identification of un-configured devices may allow for the configuration of such devices on the network 1Y-506. Moreover, such configuration may be performed without knowledge of a local IP address associated with the device 1Y-502, which may be acquired over the network 1Y-506 via DHCP (Dynamic Host Configuration Protocol). Accordingly, a user may locate and configure the device 1Y-502 by simply connecting the device 1Y-502 to the network 1Y-506 and/or by connecting to a service provided by a service provider with any other device.

As an option, any un-configured device on the network 1Y-506 may be automatically detected, configured, and linked to an account associated with the service. Once configured, a user may be able to reconfigure and update the device by connecting to the service and selecting the device to reconfigure or update. In addition, the service may also allow a connection to the configured device without the knowledge of an Internet Protocol (IP) address associated with the device.

Furthermore, a device class interface (e.g., user interface, etc.) may be configured or changed, thus allowing additional devices to connect and/or existing devices to be re-configured. For example, configurable information (e.g., attributes, etc.) of the device 1Y-502 may be abstracted into an interface associated with the service, or the interface associated with the service may be populated with configurable attributes of the device 1Y-502. A user may be able to configure the device 1Y-502 at the homepage of the service provider, and the device 1Y-502 may then be updated (e.g., based on user selections, etc.). The communication between the service and device 1Y-502 may consist of a protocol that can update configuration and memories of the device 1Y-502 at the request of a user or the associated service provider.

In one exemplary embodiment, a system that provides video cameras for monitoring purposes may allow a server associated with a service provider to automatically identify un-configured (e.g., unregistered, etc.) devices. A source IP address used to connect to the server may be detected. When a registered user (e.g., of the service) logs onto the server, a source IP address associated with such user may be logged. This source IP address could be either a static or dynamic, and does not have to remain constant with a user ID. Rather, the IP address for the user and the un-configured device would be associated on a login-session basis.

If an un-configured device is detected from the same source IP address as the logged source IP address, then it may be determined that the un-configured device belongs to the registered user. Specifically, such determination may be made on the basis that the un-configured device corresponds to the same source IP address. In a situation where a router uses Network Address Translation (NAT) to source all connections associated with a network, the device can enter the Auto Identification mode by pressing a button on the device or automatically when the un-configured device powers up, etc.

Automatic identification may therefore allow a user to find and configure the device 1Y-502 plugged into the network 1Y-506 without having to read complex instructions, change a configuring computer's network settings or install any software on a user computer 1Y-510. The user may simply plug in the device 1Y-502 and go to a service homepage, where the device 1Y-502 may automatically be displayed such that the user may configure the device 1Y-502. Once initialized to the user (e.g., registered to the user, etc.), the device 1Y-502 may be easily configured, updated or controlled from any source by the user through the service. The user could also grant to other users of the service various levels of permission on either a permanent or temporary basis. Such permissions could include monitoring, configuring, reconfiguring or even transfer.

FIG. 7 illustrates an automatic identification method 1Y-600, in accordance with another embodiment. As an option, the method 1Y-600 may be implemented in the context of the architectures and environments herein. Of course, however, the method 1Y-600 may be carried out in any desired environment. It should also be noted that the aforementioned definitions may apply within the context of the present description.

As shown, an un-configured device may power on and attempt to use an automated network service to acquire a configuration resource from a network server (e.g., a DHCP server, etc.). See operation 1Y-602. Once the resource is acquired, the device may attempt to connect to a service. See operation 1Y-604. If the connection is successful the device may enter a service chat mode (e.g., passive chat mode, etc.). See operation 1Y-606. Moreover, the device may await a command from the service provider.

If the device is unable to acquire a network resource from the network server, the device may signify to the user via an indicator that the device has failed to acquire a resource. The device may then continue to attempt to acquire the network resource unless directed otherwise by the user. If the device is unable to connect to the service, the device may signify to the user via an indicator that the device has failed to connect to the service. The device may then continue attempting to connect to the service unless directed otherwise by the user. See operation 1Y-608.

Once the device has connected to the service, the device may signify to the user via an indicator that it has connected to the service. The device may then await further commands from the service. See operation 1Y-610. Upon receiving instructions from the service, the device may update its internal database with identifying information.

For example, the device may update information associated with its configuration. See operation 1Y-612. Additionally, a local registration database may be updated. See operation 1Y-614. In addition, the device may await further commands from the service.

FIG. 8 illustrates an automatic identification method 1Y-700, in accordance with another embodiment. As an option, the method 1Y-700 may be implemented in the context of the architectures and environments herein. Of course, however, the method 1Y-700 may be carried out in any desired environment. It should also be noted that the aforementioned definitions may apply in the context of the present description.

As shown, a user may log into a service with an associated identifier (e.g., ID, username, etc.) and password. See operation 1Y-702. In other words, the service may provide access to the user based on the associated identifier. The service may then check for any un-configured devices from the users IP address that have contacted the service. See operation 1Y-704. If any un-configured device exists, such device may be displayed to the user. See operation 1Y-706. The same flow would follow for a pre-configured device, where during the discovery phase, the service (e.g., YOICS service, etc.) would scan for unregistered devices. Upon discovery of a registered device, where manufacturer and device type may be used as further filters, that device is presented to the user for confirmation. Upon registration by the user, a mechanism could be in place to allow device ownership transfer or simply to provide sharable access.

The user may optionally select to configure the device. If the user selects to configure the device, then the device may be configured as being associated with the user. In this way, the user may be allowed to configure and control the device.

If no un-configured device exists, the user is presented with devices owned by the user and options for configuration and control. See operation 1Y-708. It should be noted that once a device is configured and associated with a service ID, the device may be removed from a network associated with the user and plugged into another network where the associated service ID may still be able to control it. This may therefore allow users to configure devices and retain ownership and control of such devices once deployed.

FIG. 9 illustrates an abstracted device configuration 1Y-800, in accordance with another embodiment. As an option, the abstracted device configuration 1Y-800 may be implemented in the context of the architectures and environments herein. Of course, however, the abstracted device configuration 1Y-800 may be implemented in any desired environment. It should also be noted that the aforementioned definitions may apply within the context of the present description.

In the present exemplary embodiment, a device 1Y-802 may be configured through a service. Each class of devices may be associated with a first set of configurable options. The first set of configurable options may be stored in a local instance of device database 1Y-806 associated with each device 1Y-802.

In addition, each class of devices may be associated with a second set of options. The second set of options may be stored in a service database. It should be noted that the device 1Y-802 may not be configurable. In this way, a need for a device user interface and its associated network infrastructure may be alleviated, thus possibly lowering the complexity and cost of the device 1Y-802.

The service may be able to control and configure the device 1Y-802 through a simple device protocol that runs in conjunction with a chat protocol associated with the service. A user interface for the device configuration may be implemented through the service and may be scriptable to allow the addition of many classes of devices. Such classes of devices may be created and supported by the service and/or created and supported by a partner of the service.

Using a web interface 1Y-804, a user may select a device 1Y-802 to configure (e.g., using a web browser 1Y-812). The device 1Y-802 may be looked up in the device database 1Y-806. Moreover, the chat engine 1Y-814 may query the device 1Y-802 for the current configuration.

A corresponding web configuration interface template 1Y-808 for the selected device 1Y-802 may be populated with the current device configuration and may then be displayed to the user. Such web configuration interface template 1Y-808 for the selected device 1Y-802 may be populated using a device configuration control table 1Y-810, for example. The user may customize the device configuration and the chat engine 1Y-814 may make the desired customization to the device 1Y-802. The configuration may then be re-read, and displayed once again to the user to verify that the changes are correct. As an option, device classes may have different web interface "skins" depending on which service ID or device properties are configured.

FIG. 10 illustrates a system 1Y-900 for establishing a peer-to-peer connection between devices on a network, in accordance with another embodiment. As an option, the system 1Y-900 may be implemented in the context of the architectures and environments herein. Of course, however, the system 1Y-900 may be implemented out in any desired environment. It should also be noted that the aforementioned definitions may apply within the context of the present description.

As shown, associated devices and User IDs may be used to establish a direct peer-to-peer network connection between a remote device and another device, where the other device is used by a user for logging in to a service allowing access to the remote device. The direct connection between the two devices may ensure efficient topology, particularly where both devices are located within the same local area network (LAN).

The service may be used to facilitate the remote devices and/or users connecting based on their associated User IDs, UDLs, and/or UNIQUE IDs, along with the associated permissions and/or delegations configured on the service and/or device or specified by the users. For example, where the devices are remotely located on the Internet, the service may track the location of the devices, the users and their associated User IDs, UDLs, and/or UNIQUE IDs (i.e., the users' internet IP and port addresses used by the user/device from the device/user perspective and the perspective of the internet service).

This information may allow the remote devices to be informed, for example, when the service attempts to create a session between such remote devices (and/or between one or more other remote devices) using the information passed to the devices from the service. The information may include addressing information, encryption keys, access rights, and/or any other information capable of being used in the creation and operation of the connection between the remote devices and/or users of the service. As an option, any part of the communications (e.g., between the devices and/or between the devices and the service) may be encrypted and/or authenticated using cryptographic hashes and/or encryption functions.

As specifically shown, a camera 1Y-901 and/or user or user's PC or remote PC (e.g., via a PC 1Y-902, etc.) may communicate with a UDL service server 1Y-903 via standard Internet Protocols (e.g., TCP, UDP, and/or other internet protocol, etc.) and may transmit to the service server 1Y-903 (i.e., UDL server) its local address and port from the local network 1Y-904, its associated UNIQUE ID, authentication information and/or any other information associated therewith. The service server 1Y-903 may store the received information along with a perceived Internet address and communication port for the device/user (e.g., as determined by the service server 1Y-903). With this information, the service server 1Y-903 may determine if it will acknowledge the device (e.g., the camera 1Y-901) of its enrolment (e.g., registered status, etc.) and/or give the device further instructions. In this way, the camera 1Y-901 and/or user may register with the service server 1Y-903.

Once the camera 1Y-901 and/or user are registered with the service server 1Y-903, connections created between such devices (i.e., the camera 1Y-901 and the user's PC 1Y-902) may be facilitated by the service server 1Y-903. In one embodiment, a remote user via a PC 1Y-910 may request access to the camera 1Y-901, and the service server 1Y-903 may determine if the remote user has access rights to connect to the camera 1Y-901. If the remote user has such access rights, the service server 1Y-903 may send a connect message to both the camera 1Y-901 and the requesting user.

The connect message may contain various information related to internet addresses and ports, encryption and authentication keys, access rights and/or other session information used to create a connection between the two peer devices (i.e., the camera 1Y-901 and the user's PC 1Y-910). Using this information, packets may be sent to the requested addresses specified in the connect message in an attempt to create a direct connection between the devices using internet protocols (e.g., user datagram protocol (UDP), transmission control protocol (TCP), and/or any other internet protocol, etc.). If a direct connection is unable be established, an indirect connection via the service server 1Y-903 (or possibly any other well-connected internet device or server) may optionally be established. Once a peer connection has been established between various devices, a session may be generated and any type of data may be sent over the connection.

Once devices are connected via a session, multiple separate data and/or control connections (referred to as tunnels) may be established between the devices using the session. These tunnels may directly map other Internet protocols (e.g., UDP, TCP, internet control message protocol (ICMP), etc.), or may also map custom information and protocols. Such protocols may be defined in a tunnel connection negotiation message, and/or in any other manner that may optionally be dependent on the session set-up or the device type. Each session may contain a single tunnel, but of course may also use any number of different types of tunnels.

FIG. 11 illustrates a method 1Y-1000 for registering a device with a service server, in accordance with another embodiment. As an option, the method 1Y-1000 may be implemented in the context of the architectures and environments herein. Of course, however, the method 1Y-1000 may be carried out in any desired environment. It should also be noted that the aforementioned definitions may apply within the context of the present description.

As shown, an idle user/device is attached to a service. See operation 1Y-1002. As a result, a request authorization is sent to a server. See operation 1Y-1004. If a server authentication response is received, authentication and identification information is sent. See operation 1Y-1006.

In the case that the request authentication is redirected, a new server is stored to use. See operation 1Y-1008. Another request authentication may be sent to this new server. Once authentication and identification information is sent, it is determined whether the authentication/identification passes or fails. If the authentication/identification passes, the user/device is registered. See operation 1Y-1010. If the authentication/identification fails, new credentials are requested from the user. See operation 1Y-1012. As shown, if a retry count or a number of attempts threshold is reached, the user/device is set back to idle.

FIG. 12 illustrates a method 1Y-1100 for allowing a connection between devices using a service server, in accordance with another embodiment. As an option, the method 1Y-1100 may be implemented in the context of the architectures and environments herein. Of course, however, the method 1Y-1100 may be carried out in any desired environment. It should also be noted that the aforementioned definitions may apply within the context of the present description.

As shown, a request is received to connect to a session while in an idle mode. See operation 1Y-1102. As a result, rights are checked and a search for a target peer is initiated. See operation 1Y-1104. If a target peer is found and the rights are validated, an initiate connect message is constructed and initiated to both peers. See operation 1Y-1106. If a target peer is not found and/or the rights are not validated, an error message is constructed. See operation 1Y-1108.

FIG. 13 illustrates a method 1Y-1200 for generating a session between peer devices, in accordance with another embodiment. As an option, the method 1Y-1200 may be implemented in the context of the architectures and environments herein. Of course, however, the method 1Y-1200 may be carried out in any desired environment. It should also be noted that the aforementioned definitions may apply within the context of the present description.

As shown, an idle system receives an initiate connection message from a server. See operation 1Y-1202. Peer "hello packets" are then sent. See operation 1Y-1204. If the "hello packet" is received, a peer acknowledgement (ACK) packet is sent. See operation 1Y-1206 and operation 1Y-1208. Once the ACK packet is sent, and the "hello packet" is received, a connection is made. See operation 1Y-1210.

FIG. 14 illustrates a session 1Y-1300 containing different types of tunnels, in accordance with another embodiment. As an option, the session 1Y-1300 may be viewed in the context of the architectures and environments herein. Of course, however, the session 1Y-1300 may be viewed in the context of any desired environment. It should also be noted that the aforementioned definitions may apply within the context of the present description.

As shown, once devices 1Y-1302 are connected via a session 1Y-1304, multiple separate data and/or control connections (e.g., tunnels 1Y-1306) may be established between the devices using the session. These tunnels 1Y-1306 may directly map other Internet protocols (e.g., UDP, TCP, internet control message protocol (ICMP), etc.), or may also map custom information and protocols. Such protocols may be defined in a tunnel connection negotiation message, and/or in any other manner that may optionally be dependent on the session set-up or the device type. Each session may contain a single tunnel, but of course may also use any number of different types of tunnels as shown in FIG. 14.

FIG. 15 illustrates a service web page 1Y-1400 for remotely accessing a device over a network, in accordance with another embodiment. As an option, the service web page 1Y-1400 may be implemented in the context of the architectures and environments herein. Of course, however, the service web page 1Y-1400 may be implemented in any desired environment. It should also be noted that the aforementioned definitions may apply within the context of the present description.

As an option, service access software used for remotely accessing a device over a network may be distributed via web-embeddable software code 1Y-1401 using Java, ActiveX, Flash, and/or any other browser embeddable code. In addition, machine installable software programs, machine embedded software, and/or any other types of software configurations may be used for distributing the service access software via the web-embeddable software code 1Y-1401. The web-embeddable software code 1Y-1401 may be inserted with other web-based object code, such as static HTML content 1Y-1402, dynamic HTML content 1Y-1403, java script 1Y-1404 and/or any other type of web-servable content in any order or form.

Thus, a user of the service may be allowed to access an associated account and devices via the web-embedded code, thus preventing the need to download and install software for obtaining such access. This may be useful for accessing service enabled devices and users from remote places such as Internet café s and other public locations where downloading and installing applications is not possible.

FIG. 16 illustrates a user-created web space 1Y-1500 for remotely accessing a device over a network, in accordance with another embodiment. As an option, the user-created web space may be implemented in the context of the architectures and environments herein. Of course, however, the user-created web space 1Y-1500 may be implemented in any desired environment. It should also be noted that the aforementioned definitions may apply within the context of the present description.

As shown, embeddable code may allow public or private access to user devices from user-created web space 1Y-1500. In various embodiments, the user created web space 1Y-1500 may include web content hosted on web servers, online personal spaces (e.g., myspace.com, Facebook, etc.), any user created web content 1Y-1502, embeddable web object (e.g., embeddable web objects such as web-cameras 1Y-1503 and/or answering machines 1Y-1504, etc.). The web embeddable code may be sourced from the user's website, the services website, and/or a third party website. Thus, direct access to devices, such as web-cameras 1Y-1503, may be allowed and/or access or status information associated with devices (e.g., answering machines 1Y-1504) may be received without the need for static IP addresses, dynamic IP resolving services, redirection servers, firewall port forwarding, and/or any other consumer configuration that may otherwise prevent such access. It should be noted that the user content and the embeddable code may be formatted in any desired manner, and is therefore not limited to user-created web space 1Y-1500 shown.

FIG. 17 illustrates a web space 1Y-1600 for remotely accessing a device over a network, in accordance with another embodiment. As an option, the web space 1Y-1600 may be implemented in the context of the architectures and environments herein. Of course, however, the web space 1Y-1600 may be implemented in any desired environment. It should also be noted that the aforementioned definitions may apply within the context of the present description.

As shown, remote access to a plurality of network devices and services 1Y-1602 is provided. For example, the web space 1Y-1600 may provide access to a network printer, a configuration screen for a router, or any dedicated network device or a TCP/IP service running on a system. Additionally, such devices and services may be transformed into a remote accessible and shareable internet resource without having to modify a firewall of the system.

In one embodiment, right clicking a mouse corresponding with the system will display a window 1Y-1604 which may allow a user to access devices on a network. The window 1Y-1604 may allow the user to connect to a device, disconnect from a device, restart the web space 1Y-1600 and refresh the plurality of network devices and services 1Y-1602, change access to a device, configure parameters on a device, and/or various other functions.

FIG. 18 shows a system 3Y-10 consisting of a virtual device, in accordance with one embodiment. As an option, the system 3Y-10 may or may not be implemented in the context of the architecture and environment of any subsequent figure(s). Of course, however, the system 3Y-10 may be implemented in any desired environment in other embodiments. It should also be noted that the aforementioned definitions may apply within the context of the present description.

As shown, at least one module 3Y-12 is included that is characterized as including a first function. In various embodiments, the at least one module 3Y-12 may include a hardware and/or software module inclusive of any desired software/hardware code capable of carrying out a variety of functions and/or functionality. For example, the at least one module 3Y-12 may include a software service and/or device, etc. associated with a client, router, server (e.g., web server, proxy server, reverse proxy server, etc.). Further, the first function may include any capability, operation, technique, feature, etc. that is capable of being the subject of emulation that will be described hereinafter in greater detail in the context of various embodiments.

Further provided is code 3Y-14 for receiving and intercepting communications that are directed to the at least one module 3Y-12. In various embodiments, the code 3Y-14 may refer to any hardware and/or software code. For instance, in one embodiment, the code 3Y-14 may include at least one abstraction layer (e.g., software layer, protocol layer, etc.) in communication with the at least one module 3Y-12. Further, in one embodiment, the aforementioned communications may, at one point during communication, be communicated using an Internet Protocol (IP). It should also be noted, however, that the interception may occur before, during, and/or after the communications are communicated using the IP protocol. Just by way of example, in one embodiment, the interception may occur after received IP communications are translated, parsed, etc. into a different format, protocol, etc.

In use, the code 3Y-14 serves to modify or create at least one aspect of the communications for emulating a second function that is different from the first function of the at least one module 3Y-12. Of course, in various embodiments, such code 3Y-14 may only modify the at least one aspect, only create the at least one aspect, and/or any combination thereof (or even a combination thereof with a combination of any other operability).

Further, while such emulation may be carried out for absolutely any desired purpose, various illustrative purposes may involve security-related purposes, communication-protocol purposes, virtual devices, interfaces, GUI, simulation, compatibility, ease of use, trust, payment, etc. In one embodiment, for instance, the aforementioned aspect of the communications to be created and/or modified may involve a level of security. In such embodiment, the above referenced first function may involve a first type of connection and the second function that is emulated may involve a second type of connection. Specifically, the first function may involve a less-secure connection and the second function that is emulated may involve a more-secure connection.

In another embodiment, the at least one aspect of the communications may include a proxy name (e.g., a local host name, etc.). In such embodiment, the first function may involve a first proxy name and the second function may involve a second proxy name. In still yet another embodiment where the communication aspect includes the creation of one or more virtual devices, the first function may involve a physical device without a virtual device and the second function may involve one or more virtual devices in association with the physical device. Even still, another embodiment may involve at least one aspect of the communications that includes a number of endpoints. In such embodiment, the first function may involve an n-way (e.g., 2-way, etc.) communication and the second function that is emulated may involve an m-way (e.g., 3-way, etc.) communication. Further, the first function may involve a first communication protocol and the second function may involve a second communication protocol. Still yet, another embodiment may involve at least one aspect of the communications that includes creating and/or modifying at least one user interface. For example, in such embodiment, the first function may involve a first user interface and a second function may involve a second user interface that may differ from the first user interface in at least one respect.

More illustrative information will now be set forth regarding various optional architectures and features with which the foregoing techniques discussed may or may not be implemented, per the desires of the user. Any of such features may be optionally incorporated with or without the inclusion of other features described.

FIG. 19 shows a system 3Y-150 comprising a plurality of virtual devices, in accordance with one embodiment. As an option, the system 3Y-150 may be implemented in the context of any other figure(s) or accompanying description(s). Of course, however, the system 3Y-150 may be implemented in the context of any desired environment. It should also be noted that the aforementioned definitions may apply within the context of the present description.

In FIG. 19, a device 3Y-160 (e.g., cell phone, camera, other consumer electronic device, Internet appliance, media device, etc.) may contain several (e.g., one, two, or more) virtual devices. Each virtual device within a device may appear as a separate device (e.g., a consumer product (e.g., camera, media device, mp3 player, etc.), a service (e.g., telnet, ftp, web server, etc.), combinations of these, and/or other service/device/product, etc.).

In FIG. 19, virtual device 3Y-154 may contain a module 3Y-156 (for example, providing a WWW or world-wide web service as in FIG. 19). In FIG. 19, the virtual device 3Y-164 may contain a module 3Y-170 (for example, a telnet service).

In FIG. 19, one or more virtual devices may contain an application. In FIG. 19 one or more applications may be any form of embedded firmware and/or hardware and/or software e.g., a chat application; stub; software; other embedded firmware, hardware, software; combinations of these, etc.).

In FIG. 19, virtual device 3Y-154 may contain an application 3Y-158. In FIG. 19 virtual device 3Y-164 may contain an application 3Y-172.

In FIG. 19, in one embodiment, one of virtual device 3Y-154 or 3Y-164 may comprise a YOICS application. In one embodiment, the YOICS application may connect a service (e.g., web server, ftp, telnet, other software module, etc.), which service or portions thereof can be implemented external to the device and/or portions thereof can be implemented internal to the device. In some cases a plurality of service providers may be present and any can communicate (e.g., connect, couple, offer, provide, etc.) with any other service or portion thereof via one or more connections.

In FIG. 19, virtual device 3Y-154 may communicate via connection 3Y-166 using port 80, for example. In FIG. 19, the virtual device 3Y-164 may communicate via connection 3Y-168 using port 23, for example. Note that in FIG. 19, as well as other figures and throughout this description, specific port numbers and/or other communications means, types, etc. may be used as examples, but any port numbers, etc. may be used.

The use of virtual devices may allow much greater flexibility than the use of conventional devices with services and ports. For example, two virtual devices may be operating on a single device but on the same port. Thus one virtual device may have the address 127.0.0.1:80 and the other virtual device may have the address 127.0.0.2:80. Different web pages may be presented by the two virtual devices. Providing or presenting different web pages from a single device using the same port (port 80) would not be possible without the use of virtual devices.

In one embodiment, one or more virtual devices may contain separate instances (e.g., instantiation, copy, etc.) of the application(s).

In one embodiment, one or more virtual devices may share one or more instance(s) (e.g., instantiation, copy, etc.) of the application(s).

In one embodiment, the application(s) may present one or more services.

In one embodiment, one or more connections may use an IP-based packet network.

In one embodiment, one or more connections may use a non-standard protocol (e.g., chat protocol, etc.).

In one embodiment, one or more virtual devices may use the same connection (e.g., wireless, Wi-Fi, cell network, Ethernet, etc.).

In one embodiment, one or more virtual devices may use a different connection.

In one embodiment, the application(s) may modify (e.g., translate, alter, substitute, encapsulate, change, logically modify, etc.) the service(s) (e.g., protocol, packet format, address, data, number of packets, type of packets, etc.).

FIG. 20 shows a system 3Y-190 comprising a plurality of consumer devices, in accordance with one embodiment. As an option, the system 3Y-190 may be implemented in the context of any other figure(s) or accompanying description(s). Of course, however, the system 3Y-190 may be implemented in the context of any desired environment. It should also be noted that the aforementioned definitions may apply within the context of the present description.

In FIG. 20, a plurality of devices may be connected to a network 3Y-192 (e.g., home network, LAN, WAN, wireless network, etc.). The connections may be permanent (e.g., fixed, programmed, etc.) or transient (e.g., devices may be moved or moving, may be relocated, may be transferred to different networks, etc.). The devices shown in FIG. 20 are only representative examples of possible devices a user 3Y-194 may control (e.g., in the home, at the office, in a car, etc.). The devices shown in FIG. 20 may include devices the user may wish to control (e.g., power on or off, monitor while not at home, otherwise control, etc.). For example, the user 3Y-194 may wish to connect to the devices in the network 3Y-192 using a separate device (e.g., a cell phone, a computer, a TV, a camera, other appliance, other consumer device, etc.). The systems and methods described in FIG. 20 and subsequent figures may be used in connection with any device (e.g., networkable consumer device, Internet appliance, home networked device, embedded system, etc.).

In one embodiment, the network 3Y-192 may be connected to the Internet.

In one embodiment, additional devices may connect to the network 3Y-192.

FIG. 21 shows a network system 3Y-200 comprising a personal published channel, in accordance with one embodiment. As an option, the network system 3Y-200 may be implemented in the context of any other figure(s) or accompanying description(s). Of course, however, the network system 3Y-200 may be implemented in the context of any desired environment. It should also be noted that the aforementioned definitions may apply within the context of the present description.

In FIG. 21, a network router 3Y-202 and a network router 3Y-204 may be connected to the Internet 3Y-205. Of course any type and number of networks may be used.

In FIG. 21, the network router 3Y-202 may be connected to a device 3Y-206 and a device 3Y-208. In FIG. 21 a cell phone 3Y-210 (1) (or any other mobile device, or other device, etc.) may be connected to the network router 3Y-202 at time t1. In FIG. 21 a cell phone 3Y-210 (2) may be connected to the network router 3Y-204 at time t2. Of course any number of devices and/or any type of devices may be used (e.g., connected, etc.).

In one embodiment, the cell phone 3Y-210(1) may not initially be connected to the network router 3Y-202. Of course network connections may be made (e.g., established, etc.) and/or broken (e.g., disconnected, etc.) at any time and/or any manner, etc.

FIG. 21 shows a particular network connection of components such as a cell phone 3Y-210, a device 3Y-206, a device 3Y-208 and a network router 3Y-202. In different embodiments, other connections of components such as a cell phone 3Y-210, a device 3Y-206, a device 3Y-208 and a network router 3Y-202 are possible. Of course any number and type of connections may be used with any number and type of devices, etc.

In one embodiment, the device 3Y-206 and the device 3Y-208 may be connected to a home network (not shown in FIG. 21).

As an example, the device 3Y-206 and the device 3Y-208 may be surveillance cameras. For example, the device 3Y-206 may be a surveillance camera inside a house and the device 3Y-208 may be one or more surveillance cameras outside the house, etc.

In one embodiment, the device 3Y-206 and the device 3Y-208 may be any device(s) a user or users may wish to connect to.

In one embodiment, the cell phone 3Y-210 may be any device (e.g., a television, Internet appliance, media device (e.g., Google TV, Roku, Apple TV, gaming device (Playstation, Nintendo, etc.), camera, etc.). This list of devices is representative, but not exhaustive, of possible devices that may be connected to a home network or a user or users may otherwise wish to connect to.

In FIG. 21, a user 3Y-212 may initially connect the user's cell phone 3Y-210 to a network containing an array of devices including a device 3Y-206 and a device 3Y-208. At time t1, cell phone 3Y-210 (1) may be connected to network router 3Y-202. At a later time t2 cell phone 3Y-210 (2) may be moved and may now be connected to network router 3Y-204. Of course any order of connection or movement of devices, etc. may be used.

In FIG. 21, the user 3Y-212 may be a trusted user of the cell phone 3Y-210.

For example, user 3Y-212 may be at home at time t1. Network router 3Y-202 may be a home router. At time t2, user 3Y-212 may move to work. Network router 3Y-204 may be at work. User 3Y-212 may wish to securely connect to device 3Y-206 and device 3Y-208, which are at home. User 3Y-212 may wish these connections to be trusted connections.

In one embodiment the user may establish one or more trusted connections or personal published channels (e.g., between user 3Y-212 and device 3Y-206, between user 3Y-212 and device 3Y-208, between user 3Y-212 and device 3Y-206 and device 3Y-208, between device 3Y-206 and device 3Y-208, etc.).

As an example, a personal published channel (PPC) may be a media feed (e.g., video feed, music stream, etc.) and device 3Y-206 may be a media device (e.g., camera, Roku, media box, Slingbox, streaming media device, AppleTV, Google TV, Netflix, etc.). Of course a PPC may convey (e.g., transmit, receive, communicate, couple, etc.) any type of media, information, data, signals, combinations of these, etc.

In one embodiment, the connection to cell phone 3Y-210 may be via any method and/or means (e.g., wireless, Wi-Fi, cell network, Ethernet, dial-up, DSL, optical, magnetic, or any combinations of these and/or other coupling and/or communication means and/or communication methods, etc.).

FIG. 22 shows a system 3Y-240 containing software for establishing a personal published channel, in accordance with one embodiment, As an option, system 3Y-240 may be implemented in the context of any other figure(s) or accompanying description(s). Of course, however, the system 3Y-240 may be implemented in the context of any desired environment. It should also be noted that the aforementioned definitions may apply within the context of the present description.

In FIG. 22, a network router 3Y-242 may contain a software 3Y-244 that may establish and control PPCs between user(s) and/or device(s) (e.g., user(s) to user(s), user(s) to device(s), device(s) to device(s), etc.

In FIG. 22, the software 3Y-244 may contain a chat application 3Y-246 that communicates with a service 3Y-248.

In FIG. 22, the service 3Y-248 may contain a master database 3Y-250. The master database 3Y-250 may contain a list of addresses of trusted users, other user data, etc.

In one embodiment, the chat application 3Y-246 may be any application code.

In one embodiment, the service 3Y-248 may be any module (e.g., software, firmware, etc.).

In one embodiment, software 3Y-244 may be contained in a network router 3Y-242 (e.g., wireless router, media box, smart TV, other embedded router function(s), combinations of these, etc.).

In one embodiment, one or more parts (e.g., modules, functions, etc.) of software 3Y-244 may be in different locations and/or network components, etc.

In one embodiment, one or more parts of software 3Y-244 that perform the function(s) of software 3Y-244 may be in software, hardware, firmware, or combinations of these, etc.

FIG. 23 shows a method 3Y-260 for establishing a personal published channel, in accordance with one embodiment, As an option, the method 3Y-280 may be implemented in the context of any other figure(s) or accompanying description(s). Of course, however, the method 3Y-280 may be implemented in the context of any desired environment. It should also be noted that the aforementioned definitions may apply within the context of the present description.

As shown in FIG. 23, a method for establishing a PPC may consist of the following (but not limited to the following) steps.

1. A trusted user of a cell phone (or other mobile device, etc.) seeks to establish a PPC with one or more devices.
2. A network router may establish a connection between the router and a cell phone. This connection may be established, for example, using DHCP, etc.
3. After the connection is established, the network router may receive the address (e.g., MAC address, etc.) of the cell phone.
4. The software contained within the router may store the address of the cell phone.
5. The software may look up (e.g., index, etc.) the address of the cell phone in a master database of trusted users of the router.
6. If the master database contains the address of the cell phone, the software establishes the address of the cell phone as a trusted user of the network router.
7. The preceding steps may establish the address of the cell phone as a trusted user of the network router. Thus the user may be established as a trusted user of the network router via the address of the cell phone.
8. The software may now establish one or more PPCs (e.g., between the trusted user and one or more devices, for example, as shown in FIG. 21).

In one embodiment, the address may be any unique ID assigned to a device or virtual device.

In one embodiment, the address may be attached to (e.g., present on a sticker, barcode, label, box, carton, display, etc.) or otherwise associated with the device, device packaging, or portion(s) of the device, etc. (e.g., created at point of sale, retrieved during registration, obtained online, etc.).

In one embodiment, cell phone C1 may be any device (e.g., computer, tablet, media player, embedded device, consumer device, appliance, mobile device, fixed device, combinations of these and/or other devices, etc.) or may be one or more devices and/or one or more virtual devices (e.g., a device may present itself as one or more computers, embedded systems, smart TVs, media devices, tablets, software services, etc.).

In one embodiment, the cell phone C1 may have more than one address.

In one embodiment, the method for establishing a PPC may be combined with address mapping. For example, address mapping may use IPv4 to IPv6 mapping and/or use private IP addresses on a router. For example, cell phone C1 may be connected using a router R1 (e.g., a home router, etc.). Assume router R1 supports PPCs. For example cell phone C1 may have a PPC mapped to (e.g., paired with, associated with, linked to, etc.) a first address A1 (e.g., A1 may be an IPv4 address such as 10.10.10.99:5959, a loopback address, combinations of these and/or other addresses, etc.) using a router R1. For example, the mapping may be static (e.g., fixed, programmed, set, etc.) or may be dynamic (e.g., configurable, etc.). Thus, for example, when cell phone C1 uses the first address A1 (e.g., 10.10.10.99:5959, etc.) the router R1 may translate (e.g., map, etc.) the address A1 to a second address A2 (e.g., a private address, an IPv6 address, a loopback address, combinations of these and/or other addresses, etc.) associated with a device D1. For example, D1 may be a security camera, another mobile device, a service, etc. Then, cell phone C1 may move or otherwise change connection to router R2. Assume router R2 supports PPCs. Cell phone C1 may use the first address A1 (e.g., 10.10.10.99:5959) to access D1 and router R2 may automatically connect the cell phone C1 with the security camera D1 using the second address A2.

In one embodiment, more than one device may be mapped. In one embodiment, one address may be translated to multiple devices. For example, two devices D1 and D2 may use a first address A1 (e.g., 10.10.10.99:5959) as their mapping. When a first mobile device, e.g., cell phone C1, connects to a first address A1, a first router R1 may translate the first address A1 to a second address A2 (the second address A2 may be associated with a first device D1). For example, A2 and D1 may belong to a first security camera, etc. When a second mobile device, e.g., cell phone C2, connects to the first address A1, a second router R2 may translate the first address A1 to a third address A3 (the third address A3 may be associated with a second device D2). For example A3 and D2 may belong to a second security camera, etc. Of course R1 and R2 may be the same router. Of course any number of devices (e.g., D1, D2) may be mapped. Of course any number and type of addresses (e.g., A1) may be mapped. The translation of addresses (e.g., A1 to A2) may be fixed (e.g., programmed, etc.) or dynamic (e.g., programmable, configurable, etc.). Of course any type of mobile device (e.g., C1, C2, etc.) may be used. Of course any types of devices (e.g., C1, C2, mobile, fixed, etc.) may be used to connect. Of course any types of devices (e.g., D1, D2, mobile, fixed, etc.) may be connected.

FIG. 24 shows a method 3Y-280 for establishing a personal published channel, in accordance with one embodiment, As an option, the method 3Y-280 may be implemented in the context of any other figure(s) or accompanying description(s). Of course, however, the method 3Y-280 may be implemented in the context of any desired environment. It should also be noted that the aforementioned definitions may apply within the context of the present description.

As shown in FIG. 24, a network router establishes a connection between the router and a cell phone. See operation 3Y-282. This connection may be established, for example, using DHCP.

After the connection is established, the network router may receive the address (e.g., MAC address, etc.) of the cell phone. See operation 3Y-284.

The software contained within the router next may store the address of the cell phone. See operation 3Y-284.

The software next may look up (e.g., index, retrieve, etc.) the address of the cell phone in a master database. See operation 3Y-286.

If the master database contains the address of the cell phone (see decision 3Y-287), the software may next establish the address of the cell phone as a trusted user of the network router. See operation 3Y-288.

The cell phone user is a trusted user of the cell phone, and the cell phone is a trusted user of the address of the cell phone. Operations 3Y-282, 3Y-284, 3Y-286, 3Y-287, and 3Y-288 may establish the address of the cell phone as a trusted user of the network router. Thus the user may be established as a trusted user of the network router via the address of the cell phone.

The software may now establish one or more PPCs (e.g., between the trusted user and one or more devices, for example, as shown in FIG. 21). See operation 3Y-290.

In one embodiment, an address may be any unique ID assigned to a device or virtual device.

In one embodiment an address may be attached to (e.g., present on a sticker, barcode, label, box, carton, display, etc.) or otherwise associated with the device, device packaging, or portion(s) of the device, etc. (e.g., created at point of sale, retrieved during registration, obtained online, etc.).

In one embodiment cell phone C1 may be any device (e.g., computer, tablet, media player, embedded device, consumer device, appliance, etc.) or may be one or more devices and/or one or more virtual devices (e.g., a device may present itself as one or more computers, embedded systems, smart TVs, media devices, tablets, software services, etc.).

In one embodiment cell phone C1 may have more than one address.

FIG. 25 shows a system 3Y-300 comprising a direct map proxy, in accordance with one embodiment. As an option, the system 3Y-300 may be implemented in the context of any other figure(s) or accompanying description(s). Of course, however, the system 3Y-300 may be implemented in the context of any desired environment. It should also be noted that the aforementioned definitions may apply within the context of the present description.

FIG. 25 comprises the following internet devices: a connection service (e.g., peer-to-peer connection service, P2P connection service, YOICS connection service, etc.) CS 3Y-301, a direct map (DM) proxy DMP1 3Y-303, a client 3Y-305 (e.g., YOICS user, etc.), servers S1 3Y-308(1), server S2 3Y-308(2), server S3 3Y-308(3), and proxy P1 3Y-306. In FIG. 25 the Internet devices may be connected using Internet connections 3Y-302, 3Y-304, 3Y-307, 3Y-310, 3Y-311, 3Y-312, and 3Y-313.

In a first embodiment the DM proxy DMP1 may establish a direct mapped connection between a client and a server using a map. For example, in FIG. 25, client C1 may connect to the DM proxy DMP1 using domain name xxx.proxy.com using an Internet connection 3Y-307. The DM proxy DMP1 may use the map (e.g., internal software table, etc.) to map the domain name xxx.proxy.com to domain name xyz.com. Server S2 may host domain xyz.com. Server S2 may be connected to DMP1 via direct connection 3Y-304. Server S2 may be an IP camera, for example.

In a second embodiment the DM proxy DMP1 may establish a direct mapped connection between a client and a server using a connection service. For example, in FIG. 25, client C1 may connect to the connection service CS (e.g., YOICS service, etc.) at www.yoics.com through DMP1 using Internet connections 3Y-307 and 3Y-302. For example, client C1 may login to www.yoics.com with a user name and password and request a connection (e.g., using a web page hosted by CS, etc.) to an Internet camera named myipcameral. The Internet camera myipcameral may be located at server S1. The connection service CS may then setup a connection between client C1 and server S1 as described in the following steps. The connection service CS may, in a first step, lookup myipcameral and discover the association of myipcmaeral with server S1. The connection service CS may, in a second step, connect to server S1 via Internet connection 3Y-310. The connection service CS may, in a third step, using Internet connection 3Y-310 initiate a P2P connection, a myipcameral connection, between server S1 and client C1. The myipcameral connection between C1 and S1 may be initiated in a first stage using Internet connection 3Y-310, 3Y-302 and 3Y-307, but may transition in a second stage to Internet connections 3Y-311 and 3Y-307. The connection service CS may, in a fourth step, assign a domain name 943216.com to the myipcameral connection, for example. The assigned domain name may be dynamic or static, for example. The assigned domain name may be randomly chosen, for example. The connection service CS may, in a fifth step, send the domain name to DMP1. As part of the myipcameral connection the domain name 943216.com is sent to the client.

In a third embodiment the DM proxy DMP1 may establish a direct mapped connection between a client and a server using a connection service and an indirect link. For example, in FIG. 25, client C1 may connect to the connection service CS (e.g., YOICS service, etc.) at www.yoics.com through DMP1 using Internet connections 3Y-307 and 3Y-302. For example, client C1 may login to www.yoics.com with a user name and password and request a connection (e.g., using a web page hosted by CS, etc.) to an Internet camera named myipcamera2. The Internet camera named myipcamera2 may be located at server S3, for example. A connection, myipcamera2 connection, may be established as described for the myipcamera1 connection, but the connection between server S3 and DMP1 may be an indirect connection. For example P1 may be another proxy (e.g., DMP1 and P1 may form a nested proxy, etc.). For example P1 may be a tunnel (or other indirect network link, etc.).

FIG. 26 shows a method 3Y-350 for establishing a mapping proxy, in one embodiment. As an option, the operations described by method 3Y-350 may be implemented in the context of any other figure(s) or accompanying description(s). Of course, however, the method 3Y-350 may be implemented in the context of any desired environment. It should also be noted that the aforementioned definitions may apply within the context of the present description.

In the illustrated embodiment, the process commences when a firewall receives a request and forwards the request to a reverse proxy (see operation 3Y-352). Then, a reverse proxy receives the request (see operation 3Y-354), a reverse proxy determines that the request must be forwarded to a server (see operation 3Y-356), and a reverse proxy modifies the request and forwards the modified request to a firewall (see operation 3Y-358). A decision is taken to determine if the reverse proxy is allowed to access the server (see decision 3Y-360). If not, the process ends or returns to a waiting state (e.g., waiting for a firewall to receive a request (operation 3Y-352)). Otherwise, when the reverse proxy is allowed to access the server a firewall modifies the request and forwards the modified request to a server (see operation 3Y-362). The server processes the request (see operation 3Y-364), and a server returns a response to a reverse proxy (see operation 3Y-366). As shown, a reverse proxy changes references in URL and HTTP header(s) according to reverse mappings (see operation 3Y-368), and a reverse proxy forwards the modified response to the firewall (see operation 3Y-370).

FIG. 27 shows a method for establishing a mapping proxy, in accordance with one embodiment. FIG. 27 includes protocol 3Y-380 to implement portions of method 3Y-350. As an option, the operations described by protocol 3Y-380 may be implemented in the context of any other figure(s) or accompanying description(s). Of course, however, the protocol 3Y-380 may be implemented in the context of any desired environment. It should also be noted that the aforementioned definitions may apply within the context of the present description.

1. As shown, a client sends a GET request to a Firewall.
2. The firewall checks the GET request against NAT rules.
3. If applicable, the NAT rules instruct the firewall to forward the GET request to a reverse proxy.
4. The reverse proxy checks the prefix URL against a map or mapping function.
5. If applicable, the reverse proxy determines that the GET request needs to be forwarded to a server (e.g., according to the mapping).
6. The proxy server modifies the GET request according to the mapping (if any) and forwards the modified GET request to the firewall.
7. The firewall checks the modified GET request against the NAT rules.
8. The firewall determines that the modified GET request originates from the reverse proxy.
9. The firewall determines that the reverse proxy is allows to access a server, modify the GET request, and forward it to the server.
10. The firewall forwards the modified GET request to the server, which process the GET request.
11. The server returns to the reverse proxy a response to the GET request.
12. The reverse proxy checks the response against a reverse mapping.
13. The reverse proxy changes the references in the URL and HTTP header (received from the server) according to the reverse mappings.
14. The reverse proxy forwards the modified response to the client.

FIG. 28 shows a computer system 3Y-400 comprising a client and a device which include software for establishing a multiple virtual proxy, in accordance with one embodiment. As an option, the computer system 3Y-400 may be implemented in the context of any other figure(s) or accompanying description(s). Of course, however, the computer system 3Y-400 may be implemented in the context of any desired environment. It should also be noted that the aforementioned definitions may apply within the context of the present description.

In FIG. 28, a device 3Y-401 may contain a TCP/IP stack 3Y-402.

In FIG. 28, a client 3Y-403 may contain a TCP/IP stack 3Y-404.

In FIG. 28, a device 3Y-401 may contain a software 3Y-405 and a chat application 3Y-406.

In FIG. 28, a client 3Y-403 may contain software 3Y-407 that may create a chat application 3Y-408. Similarly, in FIG. 28, a client 3Y-403 may contain a web server WS1 3Y-412 and/or web server WS2 3Y-413.

In FIG. 28, a user (not shown) using client 3Y-403 may connect to device 3Y-401.

In FIG. 28, a service 3Y-409 (also server, chat server) may maintain a master database 3Y-410 of users, devices and clients including connection information required to establish connection(s) between devices(s) and client(s).

In FIG. 28, a client 3Y-403 and a device 3Y-401 may communicate via a chat protocol 3Y-411 (e.g., the chat protocol may appear to use UDP/IP and/or TCP/IP and/or other protocols, etc. over Ethernet, other network(s), etc., but the connection (e.g., chat protocol connection, etc.) may be via LAN, WAN, etc.; may be wired, wireless, or combinations of these and other media, etc.; may use any protocol(s) or combination of protocol(s), etc., or any other form of connection that allows communication between end points (e.g., devices, clients, computers, etc.).

In FIG. 28, the service 3Y-409 and the chat applications 3Y-406 and 3Y-408 act as a multiple virtual proxy.

In one embodiment, the service 3Y-409 may be a server (e.g., web server, computer, cloud server, etc.).

In one embodiment, the service 3Y-409 may run on (e.g., execute, operate, etc.) one or more servers (e.g., web server, computer, cloud server, etc.).

In one embodiment, the function of the service 3Y-409 may be distributed and one or more parts of the service 3Y-409 (e.g., portions, modules, functions, etc.) may be running on (e.g., executing, operating, etc.) one or more components (e.g., servers, embedded devices, cloud services, hardware, etc.).

In one embodiment, one or more functions performed by the service 3Y-409 may be preset (e.g., preconfigured, programmed, automated, etc.) such that one or more portions (e.g., parts, functions, operations, etc.) described in other embodiments may or may not be required as described.

In one embodiment, the service 3Y-409 may pass private address (e.g., internal network address, internal IP address, etc.) and public address (e.g., external network address, external IP address, etc.) information (e.g., of a device 3Y-401, etc.) to one or more clients (e.g., a client 3Y-403, etc.).

In one embodiment, a user (not shown in FIG. 28) may use an address directly as the connect side address (e.g., by entering an IP address possibly with port number, etc. into a browser running on the client 3Y-403, by using telnet, etc.).

In one embodiment, a user may use a loopback address (e.g., IP address 127.0.0.1, etc.) as the connect side address.

In one embodiment, any traffic sent (e.g., by a computer program, process, etc.) to the loopback interface is immediately received and processed on the same interface. In one embodiment, any traffic with a source address or destination address set to a loopback address must not appear outside of a computer system or be routed. In one embodiment, any traffic with a loopback destination address that is received on an interface must be dropped. Thus if the connect side address is a loopback address it can be known that the connection is secure (e.g., can only originate from the computer running the browser used to connect, etc.).

Thus, for example, if the connect side address is 172.18.7.170:80, the connection may or may not be secure, and should be treated as unsecure initially. If, for example, the connect side address is 127.0.0.1:80 then the connection is known to be secure.

In one embodiment, if the connection uses a loopback address then the connection (e.g., between client and device, etc.) may treated differently (e.g., may be given a different security treatment, may be given a different UI, etc.).

A port number is a 15-bit unsigned integer. Port numbers range from 1 to $(2^{16})-1$ or 65535. A registered port is a port assigned by the Internet Corporation for Assigned Names and Numbers (ICANN). A registered port is a port with a port number in the range 1024-49151. Ports with port numbers less than 1024 are called well-known ports. Ports with port numbers greater than 49151 are called dynamic ports (also private ports).

Note that the IPv4 loopback address block is a single class A block, written as 127.0.0.0/8 with netmask 255.0.0.0. There are 16,777,216 loopback addresses in a 24-bit block with addresses from 127.0.0.0 to 127.255.255.255.

Note that for each of the 16,777,216 loopback addresses (e.g., 127.a.b.c, etc.) used as a connect side address there are 65535 possible ports available for different devices, different UIs, or otherwise different treatments (e.g., facets, views, etc.) of end points (e.g., devices, clients, other computers, etc.).

FIG. 29 shows a method 3Y-450 for establishing a multiple virtual proxy, in accordance with one embodiment, As an option, the method 3Y-450 may be implemented in the context of any other figure(s) or accompanying description(s). Of course, however, the method 3Y-450 may be implemented in the context of any desired environment. It should also be noted that the aforementioned definitions may apply within the context of the present description.

In FIG. 29, communication may be established between a device D1 and a client C1 in the two following steps. Step 0 is the Setup and Step 1 is the Connection.

Step 0: Setup may establish the connection information (e.g., IP addresses, ports, etc.) as well as any required credentials, etc. See operation 3Y-456.

Step 1: Connection may be performed with the following steps, i.e., Steps 2-8.

Step 2: User U1 may point (e.g., enter information on a keyboard, etc.) a web browser WB1 (or other application program, etc.) running on client C1 to a web page (e.g., at yoics.com and a pre-assigned page, or directed to a specific web page via login/username/password, etc.). See operation 3Y-452.

Step 3: User U1 may see a list of devices L1 including device D1 (D1 may be a camera for example). See also operation 3Y-452.

Step 4: User U1 may initiate a connection to device D1 by selecting device D1 from L1 (or otherwise choosing one or more device, etc.). See operation 3Y-454.

Step 5: Application Y2 may create a chat application CA2 (or CA2 may already be running, etc.). See operation 3Y-458.

CA2 already has information established, for example, by Step 0: Setup required to connect to device D1. This information may be used in operation 3Y-456.

Step 6: CA2 on C1 may initiate the connection to device D1 by sending, for example, a message "C1 wishes to connect to D1" to the service, YS1. See operation 3Y-460.

Step 7: The service YS1 may broker a session between client C1 and device D1 by passing connection information to client C1 and to device D1. See operation 3Y-462. The connection information may include, but is not limited to: session keys, IP addresses, ports, etc.

Step 8: Once client C1 and device D1 receive connection information from YS1 they may communicate as if they had established communication directly between themselves. See operation 3Y-464.

Note that other mappings (e.g., static, dynamic, configurable, etc.) are also possible. For example, in one embodiment, a first address A1 (e.g., 127.0.0.2) could be setup to always map to a particular device D1. In one embodiment, a first address A1 (e.g., 127.0.0.2) could be setup to always map to a specific port P1 (e.g., 127.0.0.2:999). Of course the connection(s) (e.g., mapping, etc.) and/or connection type(s) (e.g., address, port, etc.) may also be programmed, programmable, configurable, under software control, etc. For example, in one embodiment, the act of trying to connect to 127.0.0.2:999 may automatically setup (e.g., in the background, trigger, initiate, establish, etc.) the connection as described above. For example, in one embodiment, running one or more virtual proxies may setup one or more connections. In one embodiment, the connections may be kept alive (e.g., using keep-alive and/or any other well-known technique(s), etc.) so as to have these connections always in place. Of course the connections may be programmable and/or configurable. The connections may be permanent (e.g., fixed, kept alive, etc.) or dynamic (e.g., transient, temporary, configurable, with timeout, etc.).

FIG. 30 shows a computer system 3Y-500 including an HTTP packet engine, in accordance with one embodiment. As an option, the computer system 3Y-500 may be implemented in the context of any other figure(s) or accompanying description(s). Of course, however, the computer system 3Y-500 may be implemented in the context of any desired environment. It should also be noted that the aforementioned definitions may apply within the context of the present description.

A Hypertext Transfer Protocol Daemon (HTTPD) server is typically a web server (e.g., Apache HTTP server, etc.). A web server delivers web pages on request to clients.

A POST request method (also just POST) is an HTTP method. A POST is used when a client needs to send data to a web server as part of the request (e.g., uploading a file, submitting a completed form, etc.). A POST contains URL, headers, and a message body containing the data to be sent. The POST method from the HTTP standard is defined in section 8.3 of RFC1945 and redefined for HTTP 1.1 in section 9.5 of RFC2616.

A multipart POST may contain multiple parts and uses a different request body format from a POST. The multipart/form-data MIME type used to format the body of a multipart request is defined in RFC1867. The media-type multipart/form-data follows the rules of all multipart MIME data streams as outlined in RFC 1521.

In FIG. 30, an HTTPD server (web server) 3Y-502 may be connected to devices 3Y-503 and 3Y-506. The device 3Y-503 may contain a service 3Y-504 and a chat application 3Y-505. The device 3Y-506 may contain a service 3Y-507 and a chat application 3Y-508.

In FIG. 30, the HTTPD web server 3Y-502 may be part of an HTTP packet engine 3Y-509.

In FIG. 30, the device 3Y-503 and the device 3Y-506 may communicate using the following (but not limited to the following) steps:

The device 3Y-503 may use a POST 3Y-510 to send data to the HTTPD web server 3Y-502 via a communication channel 3Y-512. The device 3Y-503 may be a camera for example. The communication channel 3Y-512 may be an Ethernet TCP/IP connection for example. The POST 3Y-510 may be one or more TCP packets.

The HTTPD web server 3Y-502 may optionally store the POST 3Y-510 to a storage system 3Y-514

The HTTP packet engine 3Y-509 may optionally process the POST 3Y-510.

The HTTP packet engine 3Y-509 may forward data 3Y-516 to a device 3Y-506 using a communication channel 3Y-518. Data 3Y-516 may be a POST including data from POST 3Y-510. The device 3Y-506 may be a cell phone for example. The communication channel 3Y-518 may be a wireless TCP/IP connection for example. The data 3Y-516 may be one or more TCP packets.

In FIG. 30, the device 3Y-503 and the device 3Y-506 may communicate via the HTTPD web server 3Y-502 using multipart POSTs with each POST containing encapsulated data. The HTTPD web server 3Y-502 thus acts as an HTTP packet engine.

In one embodiment, the encapsulated data may be multiple packets or parts of packets (e.g., groups of packets, string of packets, etc.). An example multipart POST containing two packets as encapsulated data may be as follows:

```
POST /path/to/script.php HTTP/1.0
Host: example.com
Content-type: multipart/form-data, boundary=xxxx
--xxxx
content-disposition: form-data; name="packet1"
<packet1 goes here>
--xxxx
content-disposition: form-data; name="packet2"
<packet2 goes here>
-xxxx
```

In one embodiment, the encapsulated data may be any information (e.g., binary data, text data, encrypted data, packets, images, files, video data, other media, commands, credentials, combinations of any of these, etc.).

In one embodiment, any command (e.g., method, protocol, etc.) may be used to transfer encapsulated data (e.g., packets, information, files, media, etc.) from a device 3Y-503 to an HTTPD web server 3Y-502 via a communication channel 3Y-512.

In one embodiment, any command (e.g., method, protocol, etc.) may be used to transfer encapsulated data 3Y-516 (e.g., packets, information, files, media, etc.) from an HTTPD web server 3Y-502 to a device 3Y-506.

In one embodiment, the packet format of the encapsulated data 3Y-516 may be TCP, UDP, or any other packet, data stream format, or combination(s) of formats, etc.

In one embodiment, the HTTP packet engine 3Y-509 may maintain a routing map (e.g., routing table, etc.).

In one embodiment, the encapsulated data 3Y-516 may be used in conjunction with one or more routing maps.

In one embodiment, one or more communication channels (as shown for example in FIG. 30, communication channel 3Y-512 and communication channel 3Y-518) may use secure methods (e.g., https connections, encrypted data, IPsec, etc.).

In one embodiment, an HTTP packet engine 3Y-509 may be used to obscure (e.g., hide, mask, etc.) one or more endpoints.

In one embodiment, multiple HTTP packet engines may be connected in series (e.g., cascade(s), chain(s), etc.).

In one embodiment, one or more HTTP packet engines connected in parallel (e.g., multi-path, etc.) may be used (e.g., for improved reliability, to allow for failover, include redundancy, etc.).

In one embodiment, one or more HTTP packet engines may be used to translate one or more protocols.

In one embodiment, a device 3Y-503 and a device 3Y-506 may be any devices.

In one embodiment, a device 3Y-503 and/or a device 3Y-506 may be a client.

In HTTP 1.0, a connection is closed after a single request/response pair. HTTP 1.1 allows a connection to be reused for more than one request. Under HTTP 1.0, there is no official specification for how keep-alive operates. If a client (e.g., browser) supports keep-alive, the client adds a keep-alive header to a request. When the server receives this request and generates a response, the server adds a keep-alive header to the response and the connection is kept open. When the client sends another request, it uses the same connection. This process continues until either the client or the server drops the connection. In HTTP 1.1 all connections are considered persistent unless declared otherwise. HTTP persistent connections do not use separate keep-alive messages; they allow multiple requests to use a single connection.

TCP keep-alives are an optional feature. The keep-alive packet contains null data. In an Ethernet network, a keep-alive frame length is 60 bytes, and the acknowledgement frame length with null data is 54 bytes.

In one embodiment the communication channel(s) may use any communication mechanism (e.g., HTTP POST, HTTP PUT, HTTP keep-alive, TCP keep-alive, combinations of these, etc.) in either a standard or non-standard manner. For example one or more null data fields in standard packet format(s) may be used to convey (e.g., communicate, transfer, etc.) or store (e.g., keep state, etc.) information (e.g., data, state, credentials, etc.) in a non-standard manner, etc.

In one embodiment, HTTP PUT may be used to send packets to the HTTP packet engine. For example, packets may be sent unencoded, with a length, in raw format, etc. For example, using keep-alive HTTP PUT may be an efficient way to send data via HTTP.

In one embodiment, the HTTP engine may support multipart POST and PUT.

FIG. 31 shows a system 3Y-600 comprising an abstract user interface to communicate to a device, in accordance with one embodiment. As an option, the system 3Y-600 may be implemented in the context of any other figure(s) or accompanying description(s). Of course, however, the system 3Y-600 may be implemented in the context of any desired environment. It should also be noted that the aforementioned definitions may apply within the context of the present description.

In FIG. 31, a device server 3Y-601 may contain a user display 3Y-602 and a render device 3Y-603.

In FIG. 31, the user display 3Y-602 may contain a user interface 3Y-604.

In FIG. 31, the render device 3Y-603 may be connected to the user display 3Y-604, In FIG. 31, the device 3Y-605 may be coupled to the user display 3Y-604 via a communication protocol 3Y-608.

In one embodiment, device 3Y-605 includes a service 3Y-606 and a chat application 3Y-607.

In FIG. 31, a device 3Y-605 may not have the CPU power to run its own user interface (e.g., UI, GUI, etc.). Examples of a device 3Y-605 may include a camera, sprinkler system, thermostat, etc. To establish communication with such a device 3Y-605, an abstract user interface (AUI) is created In one embodiment, an AUI may be separate from the device 3Y-605.

In one embodiment, an AUI may be different for different users, devices, etc.

For example, a device 3Y-605 may be a thermostat.

For example, a user display 3Y-602 may display a user interface 3Y-604.

For example, a render device, 3Y-603 may drive user display 3Y-602.

For example, a device server 3Y-601 communicates with user device 3Y-605 using a communication protocol 3Y-608.

For example, the thermostat is coupled to user display 3Y-602 via the communication protocol 3Y-608.

In one embodiment the user interface 3Y-604 includes user display 3Y-602.

In one embodiment, the user display 3Y-602 includes the user interface 3Y-604.

In one embodiment, two or more device servers, each with displays, communicate with a device 3Y-605. Each user interface may be different.

In one embodiment, a device server 3Y-601 may be a web server, data server, control server, with/without user interaction, etc.

For example, a device server 3Y-601 may be an Apache web server, but could also be a stand-alone application, etc. running on a CPU.

In one embodiment, a device server 3Y-601 may be a separate hardware system.

In one embodiment, a render device 3Y-603 may be a visual display unit (VDU). For example, a render device 3Y-603 may be a LCD screen, a CRT, a remote control, any form of hardware, or may be one or more lights (e.g., LEDs, bulbs, displays, dials, etc.), may be one or more audio alarms, etc., may be one or more control panels, etc.

In one embodiment, a user interface 3Y-604 may be a GUI on a user display 3Y-602 (for example, a touchscreen, etc.).

In one embodiment, a user display 3Y-602 may be part of a user interface 3Y-604 (e.g., a control panel that includes one or more buttons, switches, etc. as well as one or more LCD screens, etc.).

In one embodiment, a different user interface 3Y-604 may be used for different web servers, different user devices, different functions, different users, different uses, different places, different virtual devices, different contract rates, premium services, etc.

In one embodiment, a communication protocol 3Y-608 may be any type of protocol that may or may not contain methods, commands, etc.

In one embodiment, a communication protocol 3Y-608 may be any a set of procedures to be followed when communicating.

In one embodiment, a communication protocol 3Y-608 may be a standard protocol or non-standard protocol.

In one embodiment, a communication protocol 3Y-608 may be equivalent to a standard protocol. May be one or more subsets of one or more standard protocols (e.g., one or more subsets of one or more command sets of one or more standard protocols, etc.).

In one embodiment, a communication protocol 3Y-608 may be a superset of one or more standard protocols i.e., one or more standard protocols with the addition of one or more non-standard commands (e.g., methods, etc.).

In one embodiment, a communication protocol 3Y-608 may be a combination of any of the above (e.g., a combination of a non-standard protocol with a standard protocol, a combination of one or more protocol subsets with one or more protocol supersets, etc.).

In one embodiment, a communication protocol 3Y-608 may be any type or combinations of types of services (e.g., Internet services, application layer protocols, other service types, etc.). Examples of standard services include, but are not limited to, the following: echo, daytime, ftp, smtp, time, whois, nameserver, bootp, tftp, gopher, finger, http, pop, pop2, pop3, portmap, path, exec, login, who, timed, kerberos, man, nfs, irc, etc.

In one embodiment, a communication protocol 3Y-608 may be any type or combinations of types of standard Internet protocols (e.g., UDP, TCP, ARP, RARP, CDP, PPTP, L2TP, SLIP, ATM, IPv4, IPv6, EGP, ICMP, IGMP, AppleTalk, OSPF, BGP, ICMP, AH, ESP, IPsec, SCTP, NFS, SMB, RADIUS, MIME, IMAP, IRC, NTP, RDP, RTP, SIP, SMTP, SOAP, SMB, TFTP, WebDAV, etc.).

In one embodiment, a communication protocol 3Y-608 may perform the equivalent of any methods (also verbs, actions, etc.) or combinations of methods of any standard or non-standard protocol. For example, communication protocol 3Y-608 may perform the equivalent of HTTP GET and/or HTTP POST and/or HTTP PUT and/or other similar methods, etc. driven by a web server running on a device server 3Y-601.

In one embodiment, a communication protocol 3Y-608 may be a suite (e.g., one or more, family, multi-layer, group, collection, etc.) of protocols.

In one embodiment, a communication protocol 3Y-608 may contain one or more of the following layers or their equivalents and/or other layer(s) and/or equivalent(s): application layer; presentation layer; session layer; transport layer; network layer (data and/or management); data link layer; physical layer.

In one embodiment, a communication protocol 3Y-608 may vary between users, user devices, device servers, etc.

In one embodiment, a communication protocol 3Y-608 (or portions of communication protocol 3Y-608, etc.) may be secure or non-secure.

In one embodiment, a communication protocol 3Y-608 may perform one or more of the following: data format(s) for data exchange; address format(s) for data exchange; address mapping; routing; detection and/or correction of transmission errors; acknowledgment(s) of reception; timeout; retransmission; media access control (e.g., transmit direction control, etc.); sequence control (e.g., reordering, etc.); flow control (e.g., transmission rate, etc.); etc.

In one embodiment, a communication protocol 3Y-608 may use any format of transmission (e.g., simplex, multiplexed, time-multiplexed, half-duplex, full-duplex, packets, datagrams, bit streams, etc.).

In one embodiment, a communication protocol 3Y-608 may use any form of media (e.g., wired, wireless, optical, magnetic, etc.).

In one embodiment, a communication protocol 3Y-608 may use any type of connection (e.g., a connectionless network, a connection oriented network, etc.).

In one embodiment, a state (e.g., device state, user state, user credentials and/or other information, service information, HTTP cookies, etc.) may or may not be stored on web server/render device/user device.

In one embodiment, a communication protocol 3Y-608 may be established via localhost, i.e., http://localhost.

In one embodiment, a communication protocol 3Y-608 may be established via IP address, i.e., http://172.16.254.1.

In one embodiment, a communication protocol 3Y-608 may be established via ports, i.e., http://172.16.254.1:80.

In one embodiment, a communication protocol 3Y-608 may be established via a combination of localhost, IP address, ports, etc.

FIG. 32 shows the content of a computer program 3Y-700 comprising a master database, in accordance with one embodiment. As an option, the database may be implemented in the context of any other figure(s) or accompanying description(s). Of course, however, the database may be implemented in the context of any desired environment. It should also be noted that the aforementioned definitions may apply within the context of the present description.

In FIG. 32, the master database may contain (but is not limited to) the following fields: Owner, Address, Application, Manufacturer, Type, External IP, Internal IP, Alias, State, Server, Port, CreateDate, LastContact.

FIG. 33 shows the contents of a computer program 3Y-800 containing device information, in accordance with one embodiment. As an option, the computer program 3Y-800 may be implemented in the context of any other figure(s) or accompanying description(s). Of course, however, the computer program 3Y-800 may be implemented in the context of any desired environment. It should also be noted that the aforementioned definitions may apply within the context of the present description.

In FIG. 33, the computer program 3Y-800 containing device information may contain (but is not limited to) the following fields: Owner User ID, Device Type, Device Address, Last Contacted, Device State, Web Viewer URL, Client Download, Viewer Registration URL, Secured, Supports UDP, UDP Port, Supports TCP, Chat Server Port, Supports Reflector, Enabled, Chat Server, Security Key, Device Last IP, Device Alias, Server Encryption, Encryption Flag, Minimum Encryption, Global, Last State Changed, Access List, Recent Sessions, etc. Of course in other embodiments fewer fields may be used, or more fields may be used containing similar information, etc.

FIG. 34 is an environment 1-100 that exemplifies the need for a multi-server fractional subdomain DNS protocol. As an option, one or more instances of environment 1-100 or any aspect thereof may be implemented in the context of the architecture and functionality of the embodiments described herein. Also, environment 1-100 or any aspect thereof may be implemented in any desired environment. It should also be noted that the aforementioned definitions may apply within the context of the present description.

As shown in FIG. 34, environment 1-100 comprises various computing systems interconnected by a network 1-108. Network 1-108 can comprise any combination of a wide area network (WAN), local area network (LAN), wireless network, wireless LAN (WLAN), or any similar means for enabling communication of computing systems. Network 1-108 can also collectively be referred to as the Internet. Environment 1-100 specifically comprises a representative domain name system (e.g., DNS server 1-111), a representative first host server 1-112, a representative second host server 1-113, a representative instance of a user device 1-110, a representative first target device 1-114, a representative second target device 1-115, and a variety of types and instances of devices 1-110, 1-113, and 1-114 (e.g., a router 1-101, a laptop 1-102, a web camera 1-103, a mobile phone 1-104, a tablet 1-105, a desktop 1-106, and a storage device 1-107). User device 1-110 and target devices 1-114 and 1-115 can represent any type of device as described in this disclosure. A protocol 1-120 depicts operations and communications on and among user device 1-110, DNS server 1-111, first host server 1-112, second host server 1-113, first target device 1-114, and second target device 1-115. Specifically, protocol 1-120 represents the key activities required in legacy DNS and SSL protocols and systems to establish secure connections with first target device 1-114 and second target device 1-115 through multiple separate servers, first host server 1-112 and second host server 1-113, respectively.

In protocol 1-120, a user at user device 1-110 causes (e.g., by clicking a link, entering a URL, etc.) user device 1-110 to request the location of URL "d1.s1.xyz.com" (e.g., first target device 1-114) from DNS server 1-111. DNS server 1-111 will parse the URL octets and apply the resource records on DNS server 1-111 and any associated DNS or name servers to map the requested URL to a wildcard location "*.s1.xyz.com" and synthesize and return the IP address of "1.1.1.1" to user device 1-110. User device 1-110 communicates with the computing system at IP address "1.1.1.1" or first host server 1-112 to request an SSL connection. First host server 1-112 selects and serves the wildcard certificate associated with "*.s1.xyz.com" based on the initial URL request. User device 1-110 verifies the certificate allowing first host server 1-112 to perform various subsequent operations (not shown) to establish a secure connection between user device 1-110 and first target device 1-114.

The user at user device 1-110 can then request the location of URL "d2.s2.xyz.com" (e.g., second target device 1-115) from DNS server 1-111. DNS server 1-111 will parse the URL octets and apply the resource records on DNS server 1-111 and any associated DNS or name servers to map the requested URL to a wildcard location "*.s2.xyz.com" and synthesize and return the IP address of "2.2.2.2" to user device 1-110. User device 1-110 communicates with the computing system at IP address "2.2.2.2" or second host server 1-113 to request an SSL connection. Second host server 1-113 selects and serves the wildcard certificate associated with "*.s2.xyz.com" based on the initial URL request. User device 1-110 verifies the certificate allowing second host server 1-113 to perform various subsequent operations (not shown) to establish a secure connection between user device 1-110 and second target device 1-115.

Protocol 1-120 reveals that in order to connect to target devices served by separate host servers, legacy DNS and SSL protocols and systems require separate SSL certificates for each host server. This restriction limits the scaling of devices on the Internet (e.g., adding servers, subdomains, etc.) in a secure and cost-effective manner (e.g., minimizing the deployment of SSL certificates, managing server loading, etc.).

FIG. 35 depicts a protocol 1-200 for DNS processing of multi-server fractional subdomains, in one embodiment. As an option, one or more instances of protocol 1-200 or any aspect thereof may be implemented in the context of the architecture and functionality of the embodiments described herein. Also, protocol 1-200 or any aspect thereof may be implemented in any desired environment. It should also be noted that the aforementioned definitions may apply within the context of the present description.

As shown in FIG. 35, protocol 1-200 depicts operations and communications on and among a user device 1-210, a fractional DNS server 1-211, a first host server 1-212, a first target device 1-214, a second host server 1-213, and a second target device 1-215. Components shown as user device 1-210 through target device 1-215 are similar to components 1-110 through 1-115 of environment 1-100, although fractional DNS server 1-211 is capable of processing multi-server fractional subdomains as described herein. Specifically, protocol 1-200 represents the key activities required in DNS and SSL protocols and systems using multi-server fractional subdomains to establish secure connections with first target device 1-114 and second target device 1-115 through multiple separate servers, such as first host server 1-112 and second host server 1-113, respectively. The example shown in protocol 1-200 can represent the scaling of devices on the Internet (e.g., adding servers, subdomains, etc.) in a secure and cost-effective manner (e.g., minimizing the deployment of SSL certificates, managing server loading, etc.).

Specifically, in protocol 1-200, a user at user device 1-210 causes (e.g., by clicking a link, entering a URL, etc.) user device 1-210 to request the location of URL "d1s1.xyz.com" (e.g., first target device 1-214) from fractional DNS server 1-211. Fractional DNS server 1-211 responds by first parsing the URL octets to determine the TLD, domain and subdomain(s). Fractional DNS server 1-211 then parses subdomain "d1s1", distinguishing between the target host server portion (e.g., "s1") and the target device portion (e.g., "d1") of the subdomain. Fractional DNS server 1-211 algorithms and resource records direct fractional DNS server 1-211 to map the requested URL to a wildcard location "*s1.xyz.com" and synthesize and return the IP address of "1.1.1.1" to user device 1-210. Parsing the fractional subdomain and generating and synthesizing from the multi-server wildcard format shown comprise, in part, the multi-server fractional subdomain processing capability 1-220$_1$ of the present disclosure. User device 1-210 communicates with the computing system at IP address "1.1.1.1" or first host server 1-212 to request an SSL connection. First host server 1-212 selects and serves the wildcard certificate associated with "*.xyz.com" based on the initial URL request. User device 1-210 verifies the certificate allowing first host server 1-212 to perform various subsequent operations (not shown) to establish a secure connection between user device 1-210 and first target device 1-214.

The user at user device 1-210 can then request the location of URL "d2s2.xyz.com" (e.g., second target device 1-215) from fractional DNS server 1-211. Fractional DNS server 1-211 responds by first parsing the URL octets to determine the TLD, domain, and subdomain(s). Fractional DNS server 1-211 then parses subdomain "d2s2", distinguishing between the target host server portion (e.g., "s2") and the target device portion (e.g., "d2") of the subdomain. Fractional DNS server 1-211 algorithms and resource records direct fractional DNS server 1-211 to map the requested URL to a wildcard location "*s2.xyz.com" and synthesize and return the IP address of "2.2.2.2" to user device 1-210. Parsing the fractional subdomain and generating and synthesizing from the multi-server wildcard format shown comprise, in part, the multi-server fractional subdomain processing capability 1-220$_2$ of the present disclosure. User device 1-210 communicates with the computing system at IP address "2.2.2.2" or second host server 1-213 to request an SSL connection. Second host server 1-213 selects and serves the wildcard certificate associated with "*.xyz.com" based on the initial URL request. User device 1-210 verifies the certificate allowing second host server 1-213 to perform various subsequent operations (not shown) to establish a secure connection between user device 1-210 and second target device 1-215.

Protocol 1-200 reveals that a DNS server capable of processing multi-server fractional subdomains as described herein (e.g., fractional DNS server 1-211) allows the scaling of devices on the Internet (e.g., adding servers, subdomains, etc.) in a secure and cost-effective manner (e g, minimizing the deployment of SSL certificates, managing server loading, etc.). Specifically, protocol 1-200 allows a user to securely connect to multiple devices served through multiple host servers with a single SSL certificate (or reduced number of SSL certificates relative to legacy systems). This allows the network provider to rapidly add or scale devices and subdomains used to identify those devices (e.g., using a random subdomain generator) while also managing host server resource loading and SSL certificate deployment.

FIG. 36 represents a flowchart of a method 1-300 for processing of multi-server fractional subdomains. It should also be noted that the aforementioned definitions may apply within the context of the present description. As an option, one or more instances of method 1-300 or any aspect thereof may be implemented in the context of the architecture and functionality of the embodiments described herein. Also, method 1-300 or any aspect thereof may be implemented in any desired environment. Specifically, method 1-300 can be executed on a computing system similar to fractional DNS server 1-211 described herein, independently or in conjunction with other components and systems (e.g., software programs, databases, file servers, name servers, storage devices, cache storage, etc.).

As shown in FIG. 36, method 1-300 will first receive a URL query for "d1s1.xyz.com" (e.g., for target device "d1" served by host server "s$_1$"). Method 1-300 will then parse the URL octets against the "." delimiter to distinguish a TLD of "com", a domain of "xyz" and subdomain of "d1s1". Method 1-300 will then parse the fractional subdomain "d1s1" into a target device portion "d1" and target host server portion "s1". The fractional subdomain parsing step can be implemented by establishing certain subdomain structure rules and various parsing techniques (e.g., TOKEN: {<DEVICE: "d" (["0"–"9"])+>I<SERVER: "s" (["0"–"9"])+>}). Method 1-300 will then generate a multi-server wildcard URL "*s1.xyz.com" that includes the target host server portion and accepts any target device portion.

The multi-server wildcard format "*s1.xyz.com" is not allowed in legacy DNS protocols and systems but is enabled by method 1-300 and the multi-server fractional subdomain DNS protocol described herein. Method 1-300 will then synthesize the IP address for "*s1.xyz.com" from a fractional resource record (RR). Method 1-300 will then return the synthesized IP address "1.1.1.1" to the original requestor for further communications and operations (e.g., as shown in protocol 1-200 of FIG. 35).

Method 1-300 generally serves to parse a URL fractional subdomain to enable secure connections to multiple devices served through multiple host servers with a single SSL certificate (e.g., or reduced number of SSL certificates relative to legacy systems). Specifically, by parsing the fractional subdomain "d1s1" and by generating and synthesizing the IP address from the multi-server wildcard format "*s1.xyz.com", method 1-300 allows both a specific host server "s1" resource to be identified, and a more broad wildcard SSL certificate (e.g., associated with *.xyz.com) to be used. This allows the network provider to rapidly add or scale devices and subdomains used to identify those devices (e.g., using a random subdomain generator) while also managing host server resource loading and SSL certificate deployment.

It may thus be seen from the examples provided above that the improvements to devices (e.g., as shown in the contexts of the figures included in this specification, for example) may be used in various applications, contexts, environments, etc. The applications, uses, etc. of these improvements, etc. may not be limited to those described above but may be used, for example, in combination. For example, one or more applications, etc. used in the contexts, for example, in one or more figures may be used in combination with one or more applications, etc. used in the contexts of, for example, one or more other figures and/or one or more applications, etc. described in any specifications incorporated by reference.

FIG. 37 is a block diagram of a system 1-400 for implementing all or portions of any of the embodiments described herein. FIG. 37 depicts a block diagram of a system to perform certain functions of a computer system. As an option, the present system 1-400 may be implemented in the context of the architecture and functionality of the embodiments described herein. Of course, however, the system 1-400 or any operation therein may be carried out in any desired environment.

As shown, system 1-400 comprises at least one processor and at least one memory, the memory serving to store program instructions corresponding to the operations of the system. An operation can be implemented in whole or in part using program instructions accessible by a module. The modules are connected to a communication path 1-405, and any operation can communicate with other operations over communication path 1-405. The modules of the system can, individually or in combination, perform method operations within system 1-400. Any operations performed within system 1-400 may be performed in any order unless as may be specified in the claims. The embodiment of FIG. 37 implements a portion of a computer system, shown as system 1-400, comprising a computer processor to execute a set of program code instructions (see module 1-410) and modules for accessing memory to hold program code instructions to perform: receiving a first URL containing a fractional subdomain portion in a fractional subdomain position (see module 1-420); parsing the fractional subdomain portion into a plurality of tokens comprising at least a first token and a second token (see module 1-430); generating a second URL comprising at least one wildcard character (e.g., an asterisk) or a wildcard sequence (e.g., a sequence of characters to be interpreted as a wildcard indicator) in the fractional subdomain position and at least one of the plurality of tokens in the fractional subdomain position (see module 1-440); and matching the second URL to a third URL associated to at least one resource (see module 1-450).

FIG. 38 depicts an environment 2-100 in which embodiments of a direct map proxy system and protocol can operate. As an option, one or more instances of environment 2-100 or any aspect thereof may be implemented in the context of the architecture and functionality of the embodiments described herein. Also, environment 2-100 or any aspect thereof may be implemented in any desired environment. It should also be noted that the aforementioned definitions may apply within the context of the present description.

As shown in FIG. 38, environment 2-100 comprises various computing systems interconnected by a network 2-108. Network 2-108 can comprise any combination of a wide area network (WAN), local area network (LAN), wireless network, wireless LAN (WLAN), or any similar means for enabling communication of computing systems. Network 2-108 can also collectively be referred to as the Internet. Environment 2-100 comprises a representative Direct Map Proxy (DMP) server (e.g., DMP server 2-111), a representative instance of a connection server 2-112, a representative instance of a proxy server 2-113, a representative instance of a host server 2-114, a representative instance of a user device 2-110, a representative instance of a target device 2-115, and a variety of types and instances of devices 2-110 and 2-115 (e.g., a router 2-101, a laptop 2-102, a web camera 2-103, a mobile phone 2-104, a tablet 2-105, a desktop 2-106, and a storage device 2-107). User device 2-110 and target device 2-115 can represent any type of device as described in this disclosure. A protocol 2-120 depicts operations and communications on and among user device 2-110, DMP server 2-111, connection server 2-112, proxy server 2-113, host server 2-114, and target device 2-115. Protocol 2-120 represents the key activities required in a direct map proxy system and protocol when DMP server 2-111 is deployed as a reverse proxy. More specifically, in the example of protocol 2-120, host server 2-114 can be within an internal network (e.g., a subnet protected by a firewall) and user device 2-110 can be connected to the Internet outside of the internal network. Further, host server 2-114 can be allowed access only by DMP server 2-111.

In protocol 2-120, a user at user device 2-110 causes (e.g., by clicking a link, entering a URL, etc.) user device 2-110 to send a request to "xxxx.example.com" which is routed to DMP server 2-111. DMP server 2-111 will check the request against access rules (e.g., NAT rules) as a firewall. The firewall function can also be implemented on a separate server. DMP server 2-111 will then detect and map (e.g., using "regular mapping" or "prefix mapping") the "xxxx" prefix of request URL "xxxx.example.com" to URL "s1.example.com". Such regular mapping, or more specifically prefix mapping, tells a reverse proxy (e.g., DMP server 2-111) which URL prefix to "proxy" or translate to a final destination URL. In the example of protocol 2-120, URL "s1.example.com" can represent the location of a specific host server "s1". DMP server 2-111 will then forward the original request to "s1.example.com" or host server 2-114. Host server 2-114 will check the request against access rules (e.g., NAT rules) as a firewall. The firewall function can also be implemented on a separate server. If host server 2-114 determines the request is allowed access (e.g., is from DMP server 2-111, is within intranet, etc.), host server 2-114 will then process the request and send a response back to DMP server 2-111. DMP server 2-111 will then perform a reverse mapping of the response URL of "s1.example.com" back to "xxxx.example.com" and forward the response to user device 2-110. From the user side, the request satisfied by "s1.example.com" appears to have been satisfied by "xxxx.example.com".

Environment 2-100 and protocol 2-120 reveal that a direct map proxy system and protocol address the problem of flexibly and efficiently mapping to a large number of devices connected to the Internet using domain names. Specifically, in the embodiment and example shown in FIG. 38, a direct map proxy (e.g., DMP server 2-111) can use domain names to map (e.g., translate, change, modify, etc.) communications (e.g., requests, connections, links, protocol properties, etc.) to a plurality of target servers and devices. For example, the domain name "xxxx.example.com" can be a proxy domain name, where the placeholder "xxxx" can represent a proxy name and be mapped to one or more target servers and/or devices (e.g., "s1.example.com"). This proxy domain name can be used with a direct map proxy system and protocol instead of the host name plus directory name or names (e.g., directory syntax structure) in legacy proxy server mapping systems.

FIG. 39 depicts a communication network 2-2A00 showing communications using a domain name map in a direct map proxy system and protocol, in one embodiment. As an option, one or more instances of communication network 2-2A00 or any aspect thereof may be implemented in the context of the architecture and functionality of the embodiments described herein. Also, the communication network 2-2A00 or any aspect thereof may be implemented in any desired environment.

As shown in FIG. 39, communication network 2-2A00 depicts operations and communications on and among user device 2-110, DMP server 2-111, connection server 2-112, proxy server 2-113, host server 2-114, and target device 2-115 from environment 2-100. Specifically, communication network 2-2A00 represents the key activities required in direct map proxy systems and protocols using a domain name map to establish direct mapped connections between one or more user devices with one or more target devices, in one embodiment. The shown example of communication network 2-2A00 can represent techniques for flexibly and efficiently mapping to a large number of devices connected to the Internet using domain names. Specifically, within the communication network 2-2A00, a user at user device 2-110 causes (e.g., by clicking a link, entering a URL, etc.) user device 2-110 to send a request to "xxx.proxy.com" which is routed to DMP server 2-111. DMP server 2-111 will then map (e.g., using lookup table, etc.) the domain name "xxx.proxy.com" to domain name "xyz.com". DMP server 2-111 will then forward the original request to the host of domain "xyz.com" or host server 2-114. Host server 2-114 will then connect to DMP server 2-111 and process the request. For example, if the request from the user at user device 2-110 is for a connection to target device 2-115 (e.g., web camera 2-103), host server 2-114 can establish a user-device connection between user device 2-110 and target device 2-115, through host server 2-114 and DMP server 2-111.

FIG. 40 depicts a communication network 2-2B00 showing communications using a connection service in a direct map proxy system and protocol, in one embodiment. As an option, one or more instances of communication network 2-2B00 or any aspect thereof may be implemented in the context of the architecture and functionality of the embodiments described herein. Also, communication network 2-2B00 or any aspect thereof may be implemented in any desired environment. It should also be noted that the aforementioned definitions may apply within the context of the present description.

As shown in FIG. 40, communication network 2-2B00 depicts operations and communications on and among user device 2-110, DMP server 2-111, connection server 2-112, proxy server 2-113, host server 2-114, and target device 2-115 from environment 2-100. Specifically, communication network 2-2B00 represents the key activities required in direct map proxy systems and protocols using a connection service to establish direct mapped connections between one or more user devices with one or more target devices, in one embodiment. The example instance of communication network 2-2B00 can represent techniques for flexibly and efficiently mapping to a large number of devices connected to the Internet using domain names. Specifically, a user at user device 2-110 causes (e.g., by clicking a form button on a web page, etc.) user device 2-110 to send a login request to a connection service operated by connection server 2-112 at domain name "www.example.com". DMP server 2-111 will receive (e.g., intercept) the request and will forward the request to connection server 2-112. Connection server 2-112 will then authenticate the user login credentials and establish a secure connection for further communications. The user at user device 2-110 can then request a connection to target device 2-115 (e.g., web camera 2-103). Connection server 2-112 will then associate target devices 2-115 with host server 2-114. The association between host server 2-114 and target device 2-115 can be based on physical location, server loading rules, subnet relationships, security rules, and the like. Connection server 2-112 will then initiate a connection to target device 2-115 through host server 2-114. Host server 2-114 will then establish a user-device connection between user device 2-110 and target device 2-115, through host server 2-114, connection server 2-112, and DMP server 2-111. The aforementioned user-device connection can further transition to an alternative user-device connection that includes host server 2-114 and DMP server 2-111, but no longer includes connection server 2-112. Connection server 2-112 can also assign a domain name (e.g., "2-115.com", "klghrvb34vb7.example.com") to the connection to target device 2-115. The assigned domain name can be, for example, dynamic or static, or in part, randomly chosen per individual or set of connections, operations, sessions, and the like. The connection service at connection server 2-112 can also send the assigned domain name to DMP server 2-111, which can be forwarded to user device 2-110, for future reference and usage (e.g., direct mapped connections).

FIG. 41 depicts a communication network 2-2C00 showing communications using a connection service and indirect link in a direct map proxy system and protocol, in one embodiment. As an option, one or more instances of communication network 2-2C00 or any aspect thereof may be implemented in the context of the architecture and functionality of the embodiments described herein. Also, communication network 2-2C00 or any aspect thereof may be implemented in any desired environment. It should also be noted that the aforementioned definitions may apply within the context of the present description.

As shown in FIG. 41, communication network 2-2C00 depicts operations and communications on and among user device 2-110, DMP server 2-111, connection server 2-112, proxy server 2-113, host server 2-114, and target device 2-115 from environment 2-100. Specifically, communication network 2-2C00 represents the key activities required in direct map proxy systems and protocols using a connection service and an indirect link to establish direct mapped connections between one or more user devices with one or more target devices, in one embodiment. The shown example instance of communication network 2-2C00 can represent techniques for flexibly and efficiently mapping to a large number of devices connected to the Internet using domain names. Specifically, a user at user device 2-110 causes (e.g., by clicking a form button on a web page, etc.) user device 2-110 to send a login request to a connection service operated by connection server 2-112 at domain name "www.example.com". DMP server 2-111 will receive (e.g., intercept) the request and will forward the request to connection server 2-112. Connection server 2-112 will then authenticate the user login credentials and establish a secure connection for further communications. The user at user device 2-110 can then request a connection to target device 2-115 (e.g., web camera 2-103). Connection server 2-112 will then associate target devices 2-115 with host server 2-114. The association between host server 2-114 and target device 2-115 can be based on physical location, server loading rules, subnet relationships, security rules, and the like. However, host server 2-114 may only be accessible through proxy server 2-113. For example, proxy server 2-113 can provide another security layer for host server 2-114 (e.g., firewall, nested proxy with DMP server 2-111, etc.), provide a tunnel for TCP communications, and the like. In this case, connection server 2-112 will then initiate a connection to host server 2-114 and target device 2-115 through proxy server 2-113. Proxy server 2-113 will forward the connection request to host server 2-114 which will then establish a user-device connection between user device 2-110 and target device 2-115, through host server 2-114, proxy server 2-113, and DMP server 2-111.

FIG. 42 shows a system 2-2D00 including a direct map proxy server, also called a direct map proxy, in one embodiment. As an option, one or more instances of system 2-2D00 or any aspect thereof may be implemented in the context of the architecture and functionality of the embodiments described herein. Also, system 2-2D00 or any aspect thereof may be implemented in any desired environment. It should also be noted that the aforementioned definitions may apply within the context of the present description.

System 2-2D00 comprises various devices including a connection service 2-221 (e.g., peer-to-peer connection service, P2P connection service, YOICS connection service, etc.), a direct map proxy (DMP) 2-223, a client 2-225 (e.g., YOICS user, etc.), a first server 2-227, a second server 2-228, a third server 2-229, and a proxy server or proxy 2-226. The devices in connection system 2-2D00 can be connected using Internet connections (e.g., Internet connection 2-232, Internet connection 2-234, Internet connection 2-237, Internet connection 2-240, Internet connection 2-241, Internet connection 2-242, and Internet connection 2-243). In some embodiments, an internal network may comprise servers (e.g., server 2-227, server 2-228, and server 2-227, which may be HTTP servers) on their own subnet (e.g., inside a firewall).

In an example for comparison to system 2-2D00, a proxy system can support a site name "www.yoics.com", which resolves to a static NAT address of 10.0.1.1 and a real IP address of 192.168.0.1. The site name "www.yoics.com" and NAT address 10.0.1.1 can be associated with a reverse proxy server or reverse proxy RP1. Further, a server S1 (e.g., inside a firewall) is at "s1.yoics.com" with a NAT address of 10.0.100.1 and a real IP address of 192.168.10.1. Port 80 and 443 are ports generally associated with the Internet. Port 443/HTTPS is associated with the HTTP protocol over TLS/SSL. Port 80/HTTP is associated with the World Wide Web. A firewall may only allow the reverse proxy RP1 at 192.168.0.1 to access server S1 at 192.168.10.1 on ports 80 and 443, and all port 80 and 443 traffic to be forwarded to the reverse proxy RP1 at 192.168.0.1. The host file on the reverse proxy RP1 has an entry for the host name "s1.yoics.com" associated with the static NAT Address of S1 10.0.100.1.

The reverse proxy can use prefix mappings, directives (e.g., in Apache), and the like.

A regular mapping is used to tell a reverse proxy which URL prefix is to be proxied and the real (e.g., final, etc.) destination URL. For example, regular mapping contains the source "s1.yoics.com" and destination source "www.yoics.com".

A reverse mapping translates the URL prefix back to the reverse proxy URL (i.e., "www.yoics.com"). A reverse mapping contains the source "www.yoics.com" and destination source "s1.yoics.com".

As an example of a regular mapping for an Apache web server, the directive:
ProxyPass/mirror/foo/http://s1.yoics.com/directs a request for "http://yoics.com/mirror/foo/bar" (for example) to be converted into a proxy request to "http://s1.yoics.com/bar" (for example).

As an example of a reverse mapping for the Apache web server, the directive: ProxyPassReverse/mirror/foo/http://s1.yoics.com/takes care of redirects the server "s1.yoics.com" sends when "http://s1.yoics.com/bar1" (for example) is redirected to "http://s1.yoics.com/bar2" (for example). The Apache server converts "http://s1.yoics.com/bar2" to "http://yoics.com/mirror/foo/bar2" (for example) before forwarding the HTTP redirect response to the client.

In an example for comparison to system 2-2D00, the following operations can occur in a reverse proxy system:
1. A client C1 sends an HTTP GET request GR1 to "www.yoics.com" at 10.0.10.1 (e.g., a request for "http://yoics.com/mirror/foo/bar").
2. A firewall FW1 receives request GR1.
3. Firewall FW1 checks GR1 against its NAT rules.
4. NAT rules instruct FW1 to forward request GR1A to the reverse proxy RP1 at 192.168.0.1.
5. Reverse proxy RP1 receives request GR1A.
6. Reverse proxy RP1 checks the prefix URL against its mapping
7. RP1 determines the request GR1A needs to be forwarded to "s1.yoics.com".
8. RP1 forwards request GR1A as GR1B.
9. Firewall FW1 checks the request GR1B against its NAT rules.
10. Firewall FW1 detects that the request GR1B is from RP1 at 192.168.0.1.
11. FW1 determines RP1 at 192.168.0.1 is allowed to access the server S1 at 192.168.100.1 on port 80.
12. FW1 forwards the request GR1B to server S1 at "s1.yoics.com" as GR1C.
13. Server S1 at "s1.yoics.com" processes the request GR1C.
14. Server S1 at "s1.yoics.com" returns the results RESP1 (e.g., response, etc.) back to the requestor, or reverse proxy RP1.
15. Reverse proxy RP1 checks RESP1 against its reverse mappings.

16. Reverse proxy RP1 changes all references in the URL and the HTTP header from "s1.yoics.com" to "www.yoics.com".
17. After completing the translation, the reverse proxy RP1 now forwards RESP1 as RESP1A to FW1 and back to client C1 that originally sent the HTTP GET request GR1.

From the client side it appears that the request satisfied by "s1.yoics.com" was satisfied by "www.yoics.com". Thus, for example, a request for "http://yoics.com/mirror/foo/bar" may be proxied to "http://s1.yoics.com/bar". The original request (e.g., for "http://yoics.com/mirror/foo/bar", etc.) uses a hostname plus directory syntax. The directory syntax structure for a proxy server (e.g., /mirror/foo/bar, etc.) may cause problems for software, among other constraints to flexibly and efficiently mapping to a large number of devices connected to the Internet using domain names. Thus a more flexible and powerful method is needed.

In a system including a direct map proxy (e.g., DM proxy), the DM proxy may use (e.g., employ, store, create, etc.) a map to translate (e.g., change, modify, etc.) one or more connection, link, protocol properties, and the like. Any form (e.g., type, number, etc.) of maps may be used.

In one embodiment, for example, a DM proxy may use domain names as (e.g., in, as part of, etc.) a map. For example, a domain name such as "xxxx.yoics.com" may be used as a proxy domain name, where the placeholder "xxxx" may represent the proxy name and "yoics" may be the domain name. The proxy domain name may be used instead of a host name plus directory name in a domain map proxy. In one embodiment, a reverse proxy using a domain map proxy may operate as described above. Of course, the operation of a domain map proxy and/or any direct map proxy may be carried out (e.g., implemented, architected, etc.) in any fashion, manner, and the like.

In one embodiment, as shown in system 2-2D00, DMP 2-223 may establish a direct mapped connection between a client and a server using a map (e.g., domain name map, etc.). For example, in system 2-2D00, client 2-225 may connect to DMP 2-223 using domain name "xxx.proxy.com" using Internet connection 2-237. DMP 2-223 may use the map (e.g., internal software table, and/or other similar structures, etc.) to map the domain name "xxx.proxy.com" to domain name "xyz.com". Second server 2-228 may host domain "xyz.com". Second server 2-228 may be connected to DMP 2-223 via direct connection 2-234. Second server 2-228 may be an IP camera, for example.

In one embodiment, DMP 2-223 may establish a direct mapped connection between a client and a server using a connection service. For example, in system 2-2D00, client 2-225 may connect to connection service 2-221 (e.g., YOICS service, etc.) at "www.yoics.com" through DMP 2-223 using Internet connections 2-237 and 2-232. For example, client 2-225 may login to "www.yoics.com" with a user name and password and request a connection (e.g., using a web page hosted by connection service 2-221, etc.) to an Internet camera named myipcamera1. The Internet camera myipcamera1 may be located at first server 2-227. Connection service 2-221 may then setup a connection between client 2-225 and first server 2-227 as described in the following steps. Connection service 2-221 may, in a first step, lookup myipcamera1 and discover the association of myipcmaeral with first server 2-227. Connection service 2-221 may, in a second step, connect to first server 2-227 via Internet connection 2-240. Connection service 2-221 may, in a third step, using Internet connection 2-240 initiate a P2P connection, a myipcamera1 connection, between first server 2-227 and client 2-225. The myipcamera1 connection between client 2-225 and first server 2-227 may be initiated in a first stage using Internet connection 2-237, 2-232, and 2-240, but may transition in a second stage to Internet connections 2-237 and 2-241. Connection service 2-221 may, in a fourth step, assign a domain name "943216.com" to the myipcamera1 connection, for example. The assigned domain name may be dynamic or static, for example. The assigned domain name may be randomly chosen, for example. Connection service 2-221 may, in a fifth step, send the domain name to DMP 2-223. As part of the myipcamera1 connection the domain name "943216.com" is sent to client 2-225.

In one embodiment, DMP 2-223 may establish a direct mapped connection between a client and a server using a connection service and an indirect link. For example, within communication network 2-2B00, client 2-225 may connect to connection service 2-221 (e.g., YOICS service, etc.) at "www.yoics.com" through DMP 2-223 using Internet connections 2-237 and 2-232. For example, client 2-225 may login to "www.yoics.com" with a user name and password and request a connection (e.g., using a web page hosted by connection service 2-221, etc.) to an Internet camera named myipcamera2. The Internet camera named myipcamera2 may be located at third server 2-229, for example. A connection, myipcamera2 connection, may be established as described for the myipcamera1 connection, but the connection between third server 2-229 and DMP 2-223 may be an indirect connection. For example proxy 2-226 may be another proxy (e.g., DMP 2-223 and proxy 2-226 may form a nested proxy, etc.). For example, proxy 2-226 may be a tunnel, another indirect network link, and the like.

In one embodiment for a domain map proxy, a domain map proxy may be used to create connections that are private, protected, encrypted, masked, secured, or are PPCs, etc. to one or more devices or virtual devices.

In one embodiment for a domain map proxy, the proxy domain name may be mapped to an address (e.g., Internet URL, device address, virtual device address, etc.).

In one embodiment for a domain map proxy, HTTPS may be used as the protocol for secure connection to a domain map proxy.

In one embodiment of a domain map proxy, the proxy name "xxxx" may be different for different virtual devices.

In one embodiment of a domain map proxy, the proxy name may be random per connection, per operation, per session, or per set of connections, operations, or sessions, etc. Thus, for example, a proxy domain name may be "http://klghrvb34vb769kju.yoics.com" where the proxy name "klghrvb34vb769kju" is a randomly chosen bit string.

In one embodiment of a domain map proxy, the construction (e.g., length, characters used, etc.) of the random proxy name may be adjusted (e.g., modified, changed, etc.) to adjust (e.g., alter, etc.) the level of security.

In one embodiment of a domain map proxy, the algorithm (e.g., random number and/or character generator, etc.) used to construct the random proxy name may be adjusted (e.g., modified, changed, etc.) to adjust (e.g., alter, etc.) the level of security.

In one embodiment of a domain map proxy, the proxy name "xxxx" may be changed over time (e.g., fixed time period, length of connection(s), number of bytes exchanged per connection, total bytes exchanged, etc.).

In one embodiment of a domain map proxy, the proxy name "xxxx" may be changed based on the user or other variable (e.g., device type, type of user, type of device use, purpose of device use, virtual device type, etc.).

In one embodiment of a domain map proxy, the proxy name may use a secure URL as a password. For example the proxy domain name may be "xyzzy1234secure.yoics.com" where the proxy name "xyzzy1234secure" is used as a password.

In one embodiment of a domain map proxy, a URL may be used with access restriction (e.g., login name, password, etc.).

In one embodiment of a domain map proxy, a secure URL may be unpublished (e.g., unlisted, private, anonymous, etc.).

In one embodiment of a domain map proxy, a secure URL may be monitored and, if the secure URL discovered (e.g., published, discovered by search, etc.), the secure URL may be changed.

In one embodiment of a domain map proxy, a secure URL may be URL1. Mapped URL(s) may be URL2, URL3, etc. The mapped URLs may be mapped to URL1. If URL2 is discovered, then URL2 may be unmapped from URL1, and URL3 may be used instead of URL2.

In one embodiment of a domain map proxy, the user may control the domain map proxy (e.g., name construction, name length, level of security, etc.).

In one embodiment, any combination or combinations of one or more portions of one or more of the above embodiments may be used.

FIG. 43 is a block diagram 2-3A00 of a direct map proxy system, in one embodiment. As an option, one or more instances of block diagram 2-3A00 or any aspect thereof may be implemented in the context of the architecture and functionality of the embodiments described herein. Also, block diagram 2-3A00 or any aspect thereof may be implemented in any desired environment. It should also be noted that the aforementioned definitions may apply within the context of the present description.

As shown in FIG. 43, block diagram 2-3A00 comprises a direct map proxy system 2-310 according to some embodiments. Direct map proxy system 2-310 further includes a communications processing module 2-311, a domain name mapping module 2-312, a connection service module 2-313, a user interface module 2-314, and a mapping data store 2-315. In some embodiments, the modules shown in the diagram 2-3A00 can be implemented in a single computing system (e.g., server), and in other embodiments, the modules shown in the diagram 2-3A00 can be implemented in multiple computing systems. In some embodiments, other computing systems, modules, devices, and the like can be required to support direct map proxy system 2-310.

More specifically, communications processing module 2-311 can be configured to receive and send communications within direct map proxy system 2-310. For example, communications processing module 2-311 can receive a request using a standard networking protocol (e.g., HTTP) that contains a first URL including a domain name (e.g., "xxxx.example.com"), and forward the request to another computing service and/or system. In some embodiments, communications processing module 2-311 can intercept a request and forward it to domain name mapping module 2-312. Domain name mapping module 2-312 can map the first URL (e.g., "xxxx.example.com") to a second URL (e.g., "s1.example.com") according to rules contained in mapping data store 2-315 and/or other locations. In some embodiments, domain name mapping module 2-312 can also perform reverse mapping operations (e.g., "s1.example.com" to "xxxx.example.com"). In other embodiments, communications processing module 2-311 can intercept a request and forward it to a connection service server (e.g., connection service module 2-313). Connection service servers can implement embodiments of a connection service module and can authenticate user and access credentials, associate target devices with host servers (e.g., proxy servers), initiate connections between computing systems (e.g., a user device and a target device), among other operations. In some embodiments, connection service module 2-313 can also manage the handling (e.g., maintaining, redeploying, etc.) of persistent connections within the direct map proxy system 2-310. User interface module 2-314 enables configuration and management of various attributes (e.g., domain name mapping table) of direct map proxy system 2-310.

Various embodiments of direct map proxy system 2-310 have further capabilities. For example, direct map proxy system 2-310 can be used to create connections having various attributes (e.g., private, protected, encrypted, masked, secured, personal published channels, etc.) to one or more devices or virtual devices. Direct map proxy system 2-310 can also map a proxy domain name to an address (e.g., Internet URL, device address, virtual device address, etc.). Further, direct map proxy system 2-310 can use secure HTTPS protocol connections. Direct map proxy system 2-310 can also map a different URL prefix or proxy name (e.g., "xxxx" in "xxxx.example.com") to different virtual devices. In addition, the proxy name (e.g., "xxxx" in "xxxx.example.com") can be random per individual or set of connections, operations, sessions, and the like. For example, a proxy domain name may be "klghrvb34vb769kju.example.com", wherein the proxy name "klghrvb34vb769kju" is a randomly chosen bit string. Direct map proxy system 2-310 can also allow the construction (e.g., length, characters used, etc.) of the random proxy name to be adjusted (e.g., modified, changed, etc.) to adjust (e.g., alter, etc.) the level of security. Further, the algorithm (e.g., random number and/or character generator, etc.) used to construct the random proxy name may be adjusted (e.g., modified, changed, etc.) to adjust (e.g., alter, etc.) the level of security. Also, in some embodiments, the proxy name (e.g., "xxxx" in "xxxx.example.com") can be changed over time according to various metrics (e.g., fixed time period, length of connections, number of bytes exchanged per connection, total bytes exchanged, etc.). In other embodiments, the proxy name (e.g., "xxxx" in "xxxx.example.com") can be changed according to various other variables (e.g., type of device, type of user, type of device use, purpose of device use, etc.).

Direct map proxy system 2-310 can also use a proxy name in a secure URL as a password. For example, the proxy domain name may be "xyzzy1234secure.example.com", wherein the proxy name "xyzzy1234secure" is used a password. Additional security in direct map proxy system 2-310 can be implemented by using a URL with access restrictions (e.g., login name, password, etc.). In some embodiments of direct map proxy system 2-310, a secure URL may be unpublished (e.g., unlisted, private, anonymous, etc.). In other embodiments of direct map proxy system 2-310, a secure URL may be monitored and, if the secure URL is discovered (e.g., published, discovered by search, etc.), the secure URL may be changed. For example, with a secure URL1 mapped to URL2 and URL3, if URL2 is discovered, then URL2 can be unmapped from URL1, and URL3 can be used instead of URL2. In some embodiments of direct map proxy system 2-310, a user can control the domain map proxy (e.g., name construction, name length, level of security, etc.). In other embodiments, direct map proxy system 2-310 can be controlled through an interface (e.g., REST API, ABI, etc.).

FIG. 44 illustrates variations of mapping scenarios 2-3B00 of a direct map proxy system and a directory syntax structure proxy system for comparison, according to some embodiments. As an option, one or more instances of mapping scenarios 2-3B00 or any aspect thereof may be implemented in the context of the architecture and functionality of the embodiments described herein. Also, mapping scenarios 2-3B00 or any aspect thereof may be implemented in any desired environment. It should also be noted that the aforementioned definitions may apply within the context of the present description.

As shown in FIG. 44, mapping scenarios 2-3B00 illustrate four proxy mapping scenarios. Scenarios and 1 and 2 use direct map proxy system 2-310 (e.g., from FIG. 43), and scenarios 3 and 4 use a directory syntax proxy system 2-330. All scenarios can represent, in part, a request from a client or user (e.g., through one or more instances of user device 2-110) to connect to a target device (e.g., target device 2-115). Specifically, in mapping scenarios 2-3B00, the target devices 2-322 can be represented by target device $2\text{-}322_1$, target device $2\text{-}322_2$, target device $2\text{-}322_3$, and target device $2\text{-}322_4$, each connected through host server $2\text{-}321_1$, host server $2\text{-}321_2$, host server $2\text{-}321_3$, and host server $2\text{-}321_4$, respectively (e.g., for firewall protection, etc.).

As shown in FIG. 44, scenario 1 illustrates a request for connection including a URL "http://td1.dmpaddress.com" sent to direct map proxy system 2-310. Direct map proxy system 2-310 is configured to map "http://td1.dmpaddress.com" to target device $2\text{-}322_1$ and associated instance of host server $2\text{-}321_1$. Similarly, scenario 2 illustrates a request for connection including a URL "http://td2.dmpaddress.com" sent to direct map proxy system 2-310. Direct map proxy system 2-310 is configured to map "http://td2.dmpaddress.com" to target device $2\text{-}322_2$ and associated instance of host server $2\text{-}321_2$. In some embodiments, as shown in mapping scenarios 2-3B00, the domain name "dmpaddress" of both requests can be the same (e.g., DMP server address) and the subdomain names "td1" and "td2" can be descriptive (e.g., myipcamera), randomly generated, secure (e.g., a password), and the like, to enable direct map proxy system 2-310 to flexibly and efficiently map to a large number of devices connected to the Internet using domain names.

For comparison, as shown in FIG. 44, scenario 3 illustrates a request for connection including a URL "http://www.host123.com/a-dir/b-dir/c-dir/" sent to directory syntax proxy system 2-330. Directory syntax proxy system 2-330 is configured to map "http://www.host123.com/a-dir/b-dir/c-dir/" to target device $2\text{-}322_3$ and associated instance of host server $2\text{-}321_3$. Similarly, scenario 4 illustrates a request for connection including a URL "http://www.host456.com/x-dir/y-dir/z-dir/" sent to directory syntax proxy system 2-330. Directory syntax proxy system 2-330 is configured to map "http://www.host456.com/x-dir/y-dir/z-dir/" to target device $2\text{-}322_4$ and associated instance of host server $2\text{-}321_4$. As shown in mapping scenarios 2-3B00, the domain names "host123" and "host456" can be different and the appended directory syntax structure required to specify a given target device and host server can be extensive. The mapping structure used by directory syntax proxy system 2-330 has limits to scaling of devices on the Internet (e.g., adding devices, servers, subdomains, etc.) in a flexible and efficient manner (e.g., minimizing the deployment of proxy servers and mapping software, managing server loading).

FIG. 45 depicts an environment 2-4A00 including a bounce server implemented in a direct map proxy system and protocol. As an option, one or more instances of environment 2-4A00 or any aspect thereof may be implemented in the context of the architecture and functionality of the embodiments described herein. Also, environment 2-4A00 or any aspect thereof may be implemented in any desired environment. It should also be noted that the aforementioned definitions may apply within the context of the present description.

As shown in FIG. 45, environment 2-4A00 comprises various computing systems interconnected by a network 2-408. Network 2-408 can comprise any combination of a wide area network (WAN), local area network (LAN), wireless network, wireless LAN (WLAN), or any similar means for enabling communication of computing systems. Network 2-408 can also collectively be referred to as the Internet. Environment 2-4A00 specifically comprises a representative instance of bounce server 2-416, a representative instance of connection server 2-412, a representative instance of proxy server 2-413, a representative instance of host server 2-414, a representative instance of user device 2-410, a representative instance of target device 2-415, and a variety of types and instances of devices 2-410 and 2-415 (e.g., a router 2-401, a laptop 2-402, a web camera 2-403, a mobile phone 2-404, a tablet 2-405, a desktop 2-406, and a storage device 2-407). User device 2-410 and target device 2-415 can represent any type of device as described in this disclosure. Environment 2-4A00 is similar to environment 2-100 except that bounce server 2-416 is implemented in place of DMP server 2-111 of environment 2-100. Both environment 2-4A00 and environment 2-100 depict environments in which embodiments of a direct map proxy system and protocol can operate.

Environment 2-4A00 further shows a set of bounce connections 2-420 depicting connections between user device 2-410, bounce server 2-416, and connection server 2-412. Specifically, bounce connections 2-420 reveal that bounce server 2-416 and user device 2-410 (e.g., through a standard web browser, web agent, etc.) can be connected by persistent or non-persistent standard HTTP connections, connected sockets, couplings, and the like. Also, bounce server 2-416 and connection server 2-412 (e.g., through a server-side agent, application, daemon, software, etc.) can be connected by one or more persistent or non-persistent bounce connections, sockets, couplings, and the like. In some embodiments, the connections to and from the bounce server may be wireless, wired, networked, linked, routed, cascaded, serial, paired, bonded, secured, encrypted, compressed, and the like.

FIG. 46 depicts a network 2-4B00 including a bounce server implemented in a direct map proxy system and protocol, in one embodiment. As an option, one or more instances of network 2-4B00 or any aspect thereof may be implemented in the context of the architecture and functionality of the embodiments described herein. Also, network 2-4B00 or any aspect thereof may be implemented in any desired environment. It should also be noted that the aforementioned definitions may apply within the context of the present description.

Network 2-4B00 comprises a bounce server 2-451, a server-side agent 2-452, and a standard web browser/agent 2-453. In one embodiment, bounce server 2-451 may be connected (e.g., coupled, etc.) to server-side agent 2-452. In one embodiment, server-side agent 2-452 may include a service application (e.g., YOICS daemon, Linux daemon, yoics software, combinations of these and/or other applications, drivers, daemons and the like, etc.). In one embodiment, bounce server 2-451 may be connected (e.g., coupled, etc.) to standard web browser/agent 2-453 (e.g., other similar software, etc.). In one embodiment, bounce server 2-451 may be controlled (e.g., interfaced, etc.) to REST API 2-454 according to a purpose 2-457 (e.g., provisioning agents, address lookup, configuration, etc.). Of course, any similar API, ABI, interface, and the like, may be used to control (e.g., interface, etc.) bounce server 2-451. Any number, type, version, of control interfaces, methods, etc. may be used. In one embodiment, bounce server 2-451 may be connected (e.g., coupled, etc.) to one or more instances of server-side agent 2-452 using one or more bounce persistent sockets 2-456. Any number, type, form, combinations, etc. of socket, connection, persistent or non-persistent coupling, etc. may be used. In one embodiment, bounce server 2-451 may be connected (e.g., coupled, etc.) to one or more instances of standard web browser/agent 2-453 using one or more standard HTTP connections or connect sockets 2-455, and the like. Any number, type, form, combinations, etc. of socket, connection, persistent or non-persistent coupling, etc. may be used. In one embodiment, one or more connections to/from bounce server 2-451 may be wireless, wired, networked, linked, routed, cascaded, serial connections, paired, bonded, secured, encrypted, compressed, combinations of these and/or employ, use, etc. and type, form, number, etc. of any connection, coupling, network means, etc. In one embodiment, bounce server 2-451 may be a cloud server, consist of one or more cloud services, consist of one or more servers, collections of servers and/or any other type, form, combination, etc. of server, hardware and/or software services, function, and the like, etc.

FIG. 47 is a diagram 2-5A00 showing a bounce server communicating with standard HTTP clients and services as used in a direct map proxy system and protocol, in one embodiment. As an option, one or more instances of diagram 2-5A00 or any aspect thereof may be implemented in the context of the architecture and functionality of the embodiments described herein. Also, diagram 2-5A00 or any aspect thereof may be implemented in any desired environment. It should also be noted that the aforementioned definitions may apply within the context of the present description.

As shown in FIG. 47, diagram 2-5A00 depicts operations and communications on and among user device 2-410, bounce server 2-416, connection server 2-412, proxy server 2-413, host server 2-414, and target device 2-415 from environment 2-4A00. Specifically, diagram 2-5A00 represents the key activities required in direct map proxy systems and protocols using a bounce server to establish communications among and between standard HTTP clients and services, in one embodiment.

Specifically, in diagram 2-5A00, a user at user device 2-410 (e.g., standard HTTP web client) causes user device 2-410 to send a standard HTTP request to a bounce agent (e.g., connection service), which is in turn operated on by connection server 2-412. In some embodiments, this request can be made to a user-specific bounce address, such bounce address being a persistent address, permanent address, per-session address, or the like. Bounce server 2-416 will receive (e.g., intercept) the request and will forward the request to connection server 2-412. Connection server 2-412 will then associate the request as needing to be served by host server 2-414 (e.g., standard HTTP server) and will then forward the request to host server 2-414. Host server 2-414 will then establish a standard HTTP connection with user device 2-410, through connection server 2-412 (e.g., operating a bounce agent) and bounce server 2-416. In some embodiments, one or more instances of bounce server 2-416 can be connected to one or more instances each of connection server 2-412 (e.g., operating a bounce agent), host server 2-414 (e.g., standard HTTP server), and/or user device 2-410 (e.g., standard HTTP web client).

FIG. 48 is a diagram 2-5B00 showing a bounce server communicating with TCP clients and services as implemented in a direct map proxy system and protocol, in one embodiment. As an option, one or more instances of diagram 2-5B00 or any aspect thereof may be implemented in the context of the architecture and functionality of the embodiments described herein. Also, diagram 2-5B00 or any aspect thereof may be implemented in any desired environment. It should also be noted that the aforementioned definitions may apply within the context of the present description.

As shown in FIG. 48, diagram 2-5B00 depicts operations and communications on and among user device 2-410, bounce server 2-416, connection server 2-412, proxy server 2-413, host server 2-414, and target device 2-415 from environment 2-4A00. Specifically, diagram 2-5B00 represents the key activities required in direct map proxy systems and protocols using a bounce server to establish communications among and between TCP clients and services, in one embodiment. The example shown in diagram 2-5B00 can represent techniques for flexibly and efficiently mapping to a large number of devices connected to the Internet using domain names. Specifically, in diagram 2-5B00, a user at user device 2-410 (e.g., TCP client) causes user device 2-410 to send a standard HTTP request (e.g., GET request for tunnel) to a bounce agent (e.g., connection service) operated by connection server 2-412. In some embodiments, this request can be to establish a tunnel connection through which the TCP client (e.g., user device 2-410) can communicate using a TCP protocol. Bounce server 2-416 will receive (e.g., intercept) the request and will forward the request to connection server 2-412. Connection server 2-412 will then associate the request as needing to be served by host server 2-414 and will then forward the request to host server 2-414. Host server 2-414 will then establish a TCP connection (e.g., HTTP tunnel) with user device 2-410, through connection server 2-412 (e.g., operating a bounce agent) and bounce server 2-416. In some embodiments, one or more instances of bounce server 2-416 can be connected to one or more instances each of connection server 2-412 (e.g., operating a bounce agent), host server 2-414 (e.g., standard HTTP server), and/or user device 2-410 (e.g., web client). In other embodiments, other network protocols (e.g., UDP, ICMP, POP, FTP, IMAP, etc.), transport protocols, interaction protocols, serial connections, routed connections, networked connections, paired connections, and the like, can be used.

FIG. 49 is a network 2-5C00 showing bounce server connections with standard HTTP clients and services as used in a direct map proxy system and protocol, in one embodiment. As an option, one or more instances of network 2-5C00 or any aspect thereof may be implemented in the context of the architecture and functionality of the embodiments described herein. Also, network 2-5C00 or any aspect thereof may be implemented in any desired environment. It should also be noted that the aforementioned definitions may apply within the context of the present description.

As shown in network 2-5C00, a bounce server (e.g., bounce server 2-551) may be connected (e.g., coupled, coupled using connection 2-556, etc.) to a bounce agent (e.g., bounce agent 2-552), and the bounce agent may in turn be connected (e.g., coupled, coupled using connection 2-557, etc.) to a standard HTTP server 2-554. The bounce server may also be connected (e.g., coupled, coupled using connection 2-555, etc.) to a standard web client 2-553. In one embodiment, any number of bounce servers may be connected to any number of bounce agents, standard HTTP servers, and/or standard web clients. In one embodiment, other types, forms, implementations, of standard and/or non-standard agents, clients and servers may be used.

Also, as shown in network 2-5C00, the bounce agent may establish, initiate and/or otherwise cause to be initiated a connection to the bounce server. The standard web client may make standard HTTP requests to (e.g., directly, as a proxy, using a client-specific bounce address, etc.) to the bounce server. In one embodiment, a bounce address used in a standard HTTP request may be a persistent address, permanent address, per session address, and the like. As shown in FIG. 48, the bounce server and bounce agent may forward standard requests from the standard web client to the standard HTTP server.

FIG. 50 is a network 2-5D00 showing bounce server connections with TCP clients and services as used in a direct map proxy system and protocol, in one embodiment. As an option, one or more instances of network 2-5D00 or any aspect thereof may be implemented in the context of the architecture and functionality of the embodiments described herein. Also, network 2-5D00 or any aspect thereof may be implemented in any desired environment. It should also be noted that the aforementioned definitions may apply within the context of the present description.

As shown in network 2-5D00, a bounce server 2-561 can address TCP services, and may be connected (e.g., coupled via connection 2-566, etc.) to a bounce agent 2-562. The bounce agent may in turn be connected (e.g., coupled via connection 2-567, etc.) to any implementation of a TCP service 2-564. The bounce server may also be connected (e.g., coupled via connection 2-565, etc.) to a TCP client 2-563. In one embodiment, any number of bounce servers may be connected to any number, type, form, combination, etc. of bounce agents, TCP services, and/or TCP clients. In one embodiment, other types, forms, implementations, combinations, etc. of TCP clients, TCP services, and the like, may be used.

As shown in network 2-5D00, the bounce agent may establish, initiate and/or otherwise cause to be initiated a connection to the bounce server. The TCP client may make standard HTTP requests to the bounce server. In one embodiment, for example, an HTTP request may be a GET request or similar that may, for example, establish a tunnel or other similar connection. In one embodiment, for example, the TCP client may use the tunnel to continue communication using a TCP client protocol. In one embodiment, for example, communication between TCP service and TCP client may proceed, operate, function, etc. as described with respect to the communication between the standard HTTP server and the standard web client in network 2-5C00.

As shown in network 2-5D00, for example, the bounce server and bounce agent may forward standard TCP requests from the TCP client to the TCP service. In other embodiments, other protocols, combinations of protocols, nested protocols, tunneled protocols, transport protocols, serial connections, routed connections, networked connections, paired connections, combinations of these and/or any number, type, form, combination of connection, protocol, etc. may be used.

More details of the method of establishing, initiating, maintaining, creating, using, etc. connections to and from the bounce server will now be described.

FIG. 51 is a diagram 2-6A00 showing techniques for bounce server connection handling as implemented in a direct map proxy system and protocol, in one embodiment. As an option, one or more instances of diagram 2-6A00 or any aspect thereof may be implemented in the context of the architecture and functionality of the embodiments described herein. Also, diagram 2-6A00 or any aspect thereof may be implemented in any desired environment. It should also be noted that the aforementioned definitions may apply within the context of the present description.

As shown in FIG. 51, diagram 2-6A00 depicts example connections between user device 2-410, bounce server 2-416, connection server 2-412, proxy server 2-413, host server 2-414, and target device 2-415 from environment 2-400. Specifically, diagram 2-6A00 represents bounce connection handling in direct map proxy systems and protocols using a bounce server. The example shown in diagram 2-6A00 can represent techniques for flexibly and efficiently mapping to a large number of devices connected to the Internet using domain names. In some embodiments, the connections depicted in diagram 2-6A00 can be persistent, non-persistent, posted, non-posted, stateless, stateful, standard, non-standard, and/or used with timeouts, keep-alive packets, probes, and/or any other similar protocols, mechanisms, handshakes, packet exchanges, algorithms, and the like. Specifically, diagram 2-6A00 shows a persistent idle connection 2-602 between bounce server 2-416 and connection server 2-412 (e.g., operating a server-side agent, bounce agent, etc.). In some embodiments, bounce server 2-416 can keep one or more instances of persistent idle connection 2-602 available for establishing connections to clients (e.g., user device 2-410). In some embodiments, each socket connection can allow bounce server 2-416 to serve one request from a client. Diagram 2-6A00 further shows bounce server 2-416 can have a second connection 2-603 in a connecting state while maintaining idle connection 2-602. When a new request from a client (e.g., user device 2-410) requiring a connection (e.g., to host server 2-414) is received by bounce server 2-416, an established connection 2-604$_1$ can be created from an available used connection (e.g., idle connection 2-602). In some embodiments, bounce server 2-416 can also handle multiple connections, including verification of addresses, authentication, and the like. For example, bounce server 2-416 can create an established connection 2-604$_2$, along with established connection 2-604$_k$, between a client (e.g., user device 2-410 or an instance of user device 2-410) and server (e.g., host server 2-414 or an instance of host server 2-414).

FIG. 52 is a diagram 2-6B00 showing a bounce server with persistent idle connections as implemented in a direct map proxy system and protocol, according to some embodiments. As an option, one or more instances of diagram 2-6B00 or any aspect thereof may be implemented in the context of the architecture and functionality of the embodiments described herein. Also, diagram 2-6B00 or any aspect thereof may be implemented in any desired environment. It should also be noted that the aforementioned definitions may apply within the context of the present description.

As shown in diagram 2-6B00, characteristic 2-615 indicates that, in some embodiments, each socket connection to the bounce server may handle one request, and, in other embodiments, the bounce agent may keep one or two persistent idle connections to the bounce server waiting for connections from the client. As further shown in diagram 2-6B00, the bounce server 2-611 and bounce agent 2-614 can have a first connection 2-612 in an idle state, and a second connection in a connecting state 2-613.

In various embodiments, any number type, form, state, of connections, couplings, etc. may be used for any connections in diagram 2-6B00 and/or in any other similar figures and/or parts of figures included herein. Similarly, any type, form, number, etc. of protocols may be used. Similarly any connections, couplings, etc. described herein and/or in any material incorporated by reference, etc. may be persistent, non-persistent, posted, non-posted, stateless, stateful, standard, non-standard, used with timeouts, keep-alive packets, probes, and/or any other similar protocols, mechanisms, handshakes, packet exchange, algorithms, combinations of any of these and the like, etc.

FIG. 53 is a diagram 2-6C00 showing a bounce server capable of making one or more connections as implemented in a direct map proxy system and protocol, according to some embodiments. As an option, one or more instances of diagram 2-6C00 or any aspect thereof may be implemented in the context of the architecture and functionality of the embodiments described herein. Also, diagram 2-6C00 or any aspect thereof may be implemented in any desired environment. It should also be noted that the aforementioned definitions may apply within the context of the present description.

As shown in diagram 2-6C00, characteristic 2-625 indicates that, in some embodiments, once a connection comes in from the client 2-623 (e.g., via a TCP request) the bounce server 2-621 takes in the data and creates a local connection. A new connection to the bounce server is created to take place of the used one.

In the example shown, a connection comes in from the client 2-623 via TCP request $2\text{-}634_1$. The bounce server creates a local connection such as the shown TCP request $2\text{-}634_2$. The bounce agent 2-622 creates a new connection (e.g., connection 2-633) to the bounce server, which is created to take place of a used one (e.g., connection 2-632). A local TCP service 2-624 can be used to process a forwarded TCP request $2\text{-}634_3$.

FIG. 54 is a diagram 2-6D00 showing a bounce server capable of handling multiple connections as implemented in a direct map proxy system and protocol, according to some embodiments. As an option, one or more instances of diagram 2-6D00 or any aspect thereof may be implemented in the context of the architecture and functionality of the embodiments described herein. Also, diagram 2-6D00 or any aspect thereof may be implemented in any desired environment. It should also be noted that the aforementioned definitions may apply within the context of the present description.

The shown characteristic 2-645 indicates that, in some embodiments, multiple connections can be issued through the bounce server, from multiple sources as long as they have the proper address and/or authentication. The bounce agent should always try to keep at least one or more (e.g., two) idle connection to the bounce server to serve requests from clients.

As shown in diagram 2-6D00, multiple connections (e.g., idle connection 2-652, connecting connection 2-653, TCP connection 2-655), and multiple requests (e.g., TCP request $2\text{-}654_k$, TCP request $2\text{-}654_2$, etc.) can be processed through the bounce server 2-641. The bounce agent 2-642 should always try to keep at least one or more idle connections (e.g., idle connection 2-652) to the bounce server in order to serve requests from clients (e.g., client 2-643). A local TCP service (e.g., TCP service 2-644) can receive and process TCP requests (e.g., TCP request $2\text{-}654_3$).

It may thus be seen from the examples provided above that the improvements to devices (e.g., as shown in the contexts of the figures included in this specification, for example) may be used in various applications, contexts, environments, etc. The applications, uses, etc. of these improvements, etc. may not be limited to those described above, but may be used, for example, in combination. For example, one or more applications, etc. used in the contexts, for example, in one or more figures may be used in combination with one or more applications, etc. used in the contexts of, for example, one or more other figures and/or one or more applications, etc. described in any specifications incorporated by reference.

Additional Embodiments of the Disclosure

Additional Practical Application Examples

FIG. 55 is a block diagram of a system for implementing all or portions of any of the embodiments described herein. FIG. 55 depicts a block diagram of a system to perform certain functions of a computer system. As an option, the present system 2-700 may be implemented in the context of the architecture and functionality of the embodiments described herein. Of course, however, the system 2-700 or any operation therein may be carried out in any desired environment. As shown, system 2-700 comprises at least one processor and at least one memory, the memory serving to store program instructions corresponding to the operations of the system. An operation can be implemented in whole or in part using program instructions accessible by a module. The modules are connected to a communication path 2-705, and any operation can communicate with other operations over communication path 2-705. The modules of the system can, individually or in combination, perform method operations within system 2-700. Any operations performed within system 2-700 may be performed in any order unless as may be specified in the claims. The embodiment of FIG. 55 implements a portion of a computer system, shown as system 2-700, comprising a computer processor to execute a set of program code instructions (see module 2-710) and modules for accessing memory to hold program code instructions to perform: receiving (e.g., from a set of one or more user devices) a first URL comprising a first top level domain, a first domain name, and a first plurality of subdomains (see module 2-720); mapping the first URL to a second URL comprising a second top level domain, a second domain name, and a second plurality of subdomains, wherein the second URL is associated with a set of one or more target devices and the second URL is different than the first URL (see module 2-730); creating a connection between the set of one or more user devices and the set of one or more target devices, wherein the connection enables the set of one or more user devices and the set of one or more target devices to exchange information (see module 2-740); and generating a unique domain name associated with the connection (see module 2-750).

FIG. 56 exemplifies an environment 3-100 for supporting connections and servers as used in the installation and configuration of connected devices. As an option, one or more instances of environment 3-100 or any aspect thereof may be implemented in the context of the architecture and functionality of the embodiments described herein. Also, the environment 3-100 or any aspect thereof may be implemented in any desired environment. It should also be noted that the aforementioned definitions may apply within the context of the present description.

For example, environment 3-100 may contain one or more of the following items, or one or more combinations, networks, collections, federations, groupings, etc. of one or more of the following items, devices, servers, systems, etc. (but not limited to the following): laptop 3-102 (or other computing device, etc.); web camera 3-103 (or other device, system, monitor, sensor, actuator and/or any other similar device, system including any Internet-of-Things (IoT), device, system and the like, etc.); mobile phone 3-104 (or any other mobile device, watch, device, system and the like, etc.); tablet 3-105 or similar computing device; desktop 3-106 (or PC, or any other similar system, computing device, combination of devices, and the like, etc.); storage device 3-107 (or storage system, cloud back-up, removable storage, mobile storage device, combinations of these, networks of these, router 3-101 and/or any other types of network equipment and/or storage service, storage devices, collections or combinations of these and the like, etc.); network 3-108 or any collection, combination, etc. of networks including but not limited to wireless, wired, serial, high-speed, optical, buses, serial and/or parallel connections of these, and the like, etc.; user device 3-110 including any type of computing device, virtual device, and the like; domain name service server such as DNS server 3-111 or any similar proxy server, relay, server, etc. that performs a service, mapping, network functions, relay service, combinations of these and the like, etc.; connection server 3-112 or any server, computing device, cloud service, and the like that may perform one or more connection, service, relay, brokering, hand-off, subscription, logging, authentication, and/ or similar functions, services and the like; proxy server 3-113 or any other server, compute device, cloud service, etc. that may perform proxy functions, firewall, communication setup, protocol translation, address mapping, and/or similar functions and the like; host server 3-114 or any other server, cloud services, combinations of servers, datacenter, etc. that may perform, provide, supply, etc. one or more services, offerings, advertisements, subscriptions, media content, web content, user services, device services, database functions, payment systems, combinations of these, and/or any other similar functions and the like; target device 3-115 or any computing device, network device, embedded system, machine, IoT device, sensor, actuator, combinations, collections, networks of these and other similar systems, functions and the like; protocol 3-120 or any collection of protocols, networking protocols, networking standards, bus protocols, bus standards that may be used, for example, to allow communication between one or more elements, devices, servers, systems, etc. in the environment 3-100. Note that in one embodiment, one of more of the elements, devices, servers, etc. shown may be combined, merged, joined, etc. in any way.

In one embodiment, one or more services may be provided to allow one or more devices or elements to be connected as shown in environment 3-100 to communicate to/with each other. In one embodiment, communication between two devices, etc. may occur via a third device. In one embodiment, communication may occur directly between two devices, etc. In one embodiment, communication between two devices, etc. may occur via any number of other devices, networks, protocols, etc. In one embodiment, communication between two devices may be set up using one first configuration and then switched to a second configuration. For example, in one embodiment, communication between two devices of a first device and a second device may be initially set up using a third device, server, etc. as a relay; the relay may then act to broker, set up, etc. a direct communication line between the first device and the second device. Any method of communication setup may be used. For example, any protocol (e.g., TCP, IP, wireless, wired, encrypted, layered, nested, tunneled, etc. and/or any combination of these and the like, etc.) may be used. Any number of communication links may be setup, reconfigured, adjusted, modified, etc. For example an initial setup of a first communication link between two devices may be modified to a second setup of a second communication link and then may be modified to a third setup of a third communication link. Links may be adjusted, modified, setup, torn down, established, re-established, maintained, controlled, transformed, and/or otherwise altered, etc. in response to network performance, resource availability, subscription models, bandwidth, network traffic, network traffic types, communication quality, and/or any other metric, measure, property, etc. of the devices, servers, networks and/or any other similar component, device, server, service, combinations of these, and the like, etc.

In one embodiment, for example, a service may be provided to allow the connection of two or more devices. In one embodiment, for example, a service may be provided to allow a user to connect to a remote web camera, etc. In one embodiment, for example, a framework, kit, software development kit (SDK), and/or other similar components, etc. may be provided to developers, programmers, companies, OEMs, and the like in order to develop, program, construct, deploy, sell, distribute, etc. one or more elements, components, aspects, etc. of a service that allows the connection of devices. In one embodiment, for example, a service may be offered that allows users to connect to one or more devices in the IoT.

The shown protocol 3-120 exemplifies one possible traversal through messages and any corresponding activities responsive to the messages. The shown protocol commences when a user, at a user device, initiates a download of a kit via a download request (see, e.g., message 3-332) which causes a host server 3-114 to service the download request, and return a kit to the requestor. The kit may itself perform some installation activities (e.g., unpacking) and may autonomously complete installation and open for user interaction. Such a user may interact with any of the herein-disclosed user interfaces, and may, for example initiate configuration of a DNS server (see, e.g., message 3-334). In some settings a proxy is used, and a user may interact with any of the herein-disclosed user interfaces to initiate configuration of a proxy server (see, e.g., message 3-336). In some situations, the foregoing configuration (or more or less) may be sufficient to provide connection services for devices in the IoT. Devices can be deployed (see, e.g., operation 3-338) and such devices can be configured (see, e.g., message 3-340). In some situations services provided by a DNS server and/or a proxy server are used for device deployment and configuration.

FIG. 57 depicts a project setup user interface 3-200 as used in the installation and configuration of connected devices. As an option, one or more instances of project setup user interface 3-200 or any aspect thereof may be implemented in the context of the architecture and functionality of the embodiments described herein. Also, the project setup user interface 3-200 or any aspect thereof may be implemented in any desired environment. It should also be noted that the aforementioned definitions may apply within the context of the present description.

In one embodiment, a project setup user interface 3-200 may represent a page of a website that allows developers, etc. to create a service, etc. that allows connections between devices. In one embodiment, for example, the developer may create a project that is used to allow communication, connection, etc. to a particular type of device. In one embodiment, for example, the project may allow communication, etc. to a Raspberry Pi, a particular type of embedded system compute device or platform. Any type of device, platform, etc. may be used. For example, a project may be based on any type of embedded system using or based on, etc., any SoC, ASIC, CPU, microcontroller, FPGA, microprocessor, combinations of these, and the like. In one embodiment, for example, the creation of a project, as shown in FIG. 57, may allow the creation of software, code, software environments, configuration files, database entries, user accounts, passwords, keys, secret keys, public keys, user IDs, device codes, device IDs, authorization codes, subscription information, other keys and codes, etc., install scripts, binary files, combinations of these, etc. that may allow communication by a developer, user, etc. from any mobile device, laptop, desktop, server, etc. to the Raspberry Pi (or any other similar device, etc.). In one embodiment, for example, communication may be of any form. In one embodiment, for example, communication may use any type, form, mode, etc. of content. In one embodiment, for example, content may be web content, e.g., HTML served using http or https. In one embodiment, for example, communication may use any network port, e.g., port 80 for web content, etc. In one embodiment, for example, any number of types, forms, modes, ports, contents, etc. may be used. In one embodiment, for example, each combination of content and/or port may correspond to a service. Any number type, form, mode of services may be used. In one embodiment, for example, a remote secure login service may be provided using SSH.

FIG. 58 depicts a project creation user interface 3-300 as used in the installation and configuration of connected devices, in one embodiment. As an option, one or more instances of project creation user interface 3-300 or any aspect thereof may be implemented in the context of the architecture and functionality of the embodiments described herein. Also, the project creation user interface 3-300 or any aspect thereof may be implemented in any desired environment. It should also be noted that the aforementioned definitions may apply within the context of the present description.

In one embodiment, a project creation user interface 3-300 presents to a developer a list of current projects, their platform types and/or any other property, aspect, interface, content, etc.

FIG. 59 depicts a project download user interface 3-400 as used in the installation and configuration of connected devices, in one embodiment. As an option, one or more instances of project download user interface 3-400 or any aspect thereof may be implemented in the context of the architecture and functionality of the embodiments described herein. Also, the project download user interface 3-400 or any aspect thereof may be implemented in any desired environment. It should also be noted that the aforementioned definitions may apply within the context of the present description.

In one embodiment, for example, a developer may be presented a list of options to download specific kits, collections, assemblies, directories, etc. of one or more software packages, etc. One embodiment, for example, may present to a developer a list of packages that may perform a specific service, e.g., provide remote secure login to a platform, device, etc. from a user's mobile device. One embodiment, for example, a screen such as the project download user interface 3-400, may present to a developer a list of actions that may be performed on a project, including but not limited to, account maintenance, authorization of devices, setup of configuration files, enablement of connections, database access, and/or any other similar function, etc.

FIG. 60 depicts a core navigation user interface 3-500 as used in the installation and configuration of connected devices, in one embodiment. As an option, one or more instances of core navigation user interface 3-500 or any aspect thereof may be implemented in the context of the architecture and functionality of the embodiments described herein. Also, the core navigation user interface 3-500 or any aspect thereof may be implemented in any desired environment. It should also be noted that the aforementioned definitions may apply within the context of the present description.

In one embodiment, for example, a developer may be presented a list of software packages, help files, installation directions, expected results, error codes, and the like in order to facilitate the development process. One embodiment, for example, may represent a web page hosted by the company supplying the device software, device services, etc. One embodiment, for example, may represent a web page hosted by a third-party, e.g., software repository (e.g., GitHub, etc.).

FIG. 61 depicts a daemon service installation user interface 3-600 as used in the installation and configuration of connected devices, in one embodiment. As an option, one or more instances of daemon service installation user interface 3-600 or any aspect thereof may be implemented in the context of the architecture and functionality of the embodiments described herein. Also, the daemon service installation user interface 3-600 or any aspect thereof may be implemented in any desired environment. It should also be noted that the aforementioned definitions may apply within the context of the present description.

In one embodiment, for example, a developer may be presented the sequence of instructions, code, commands, etc. that may be needed to install, create, update, modify, etc. one or more services on a device. One embodiment, for example, the daemon service installation user interface 3-600 may convey to a developer the sequence of instructions needed to install a secure remote login service on the device.

FIG. 62 depicts a device authorization user interface 3-700 as used in the installation and configuration of connected devices, in one embodiment. As an option, one or more instances of device authorization user interface 3-700 or any aspect thereof may be implemented in the context of the architecture and functionality of the embodiments described herein. Also, the device authorization user interface 3-700 or any aspect thereof may be implemented in any desired environment. It should also be noted that the aforementioned definitions may apply within the context of the present description.

FIG. 63 depicts a script access user interface 3-800 as used in the installation and configuration of connected devices, in one embodiment. As an option, one or more instances of script access user interface 3-800 or any aspect thereof may be implemented in the context of the architecture and functionality of the embodiments described herein. Also, the script access user interface 3-800 or any aspect thereof may be implemented in any desired environment. It should also be noted that the aforementioned definitions may apply within the context of the present description.

In one embodiment, for example, as in the script access user interface 3-800 presented to a developer might include the sequence of instructions, code, commands, etc. that the developer may use to enter into a terminal program (e.g., SSH, etc.) on the device. In one embodiment, for example, these instructions may download code, software packages, compile commands, make files, install scripts and the like, etc. from one or more software repositories. One embodiment, for example, may convey to a developer the sequence of instructions, code, commands, etc. that the developer may execute on a Raspberry Pi or other similar platform, device, etc.

FIG. 64 depicts a daemon startup user interface 3-900 as used in the installation and configuration of connected devices, in one embodiment. As an option, one or more instances of daemon startup user interface 3-900 or any aspect thereof may be implemented in the context of the architecture and functionality of the embodiments described herein. Also, the daemon startup user interface 3-900 or any aspect thereof may be implemented in any desired environment.

In one embodiment, for example, a developer may be presented the instructions, commands, etc. needed to create, start, maintain, modify, execute, etc. one or more pieces, parts, collections, of software, programs, daemons, startup scripts, and the like. One embodiment may convey the instructions to start a daemon on a Raspberry Pi or other similar platform. One embodiment, for example, may convey instructions to start a daemon that may be used to monitor, initiate, control, setup, tear down, authorize, etc. one or more communication links, connections, services, etc. to and/or between one or more devices, etc.

FIG. 65 depicts a connected device registration user interface 3-1000 as used in the installation and configuration of connected devices, in one embodiment. As an option, one or more instances of connected device registration user interface 3-1000 or any aspect thereof may be implemented in the context of the architecture and functionality of the embodiments described herein. Also, the connected device registration user interface 3-1000 or any aspect thereof may be implemented in any desired environment. It should also be noted that the aforementioned definitions may apply within the context of the present description.

In one embodiment, for example, a developer may be presented with the option to register a device, platform, etc. One embodiment, for example, the connected device registration user interface 3-1000 may be part of a flow that allows a developer to provision, enable, register, etc. a device, platform, etc.

FIG. 66 depicts a project listing user interface 3-1100 as used in the installation and configuration of connected devices, in one embodiment. As an option, one or more instances of project listing user interface 3-1100 or any aspect thereof may be implemented in the context of the architecture and functionality of the embodiments described herein. Also, the project listing user interface 3-1100 or any aspect thereof may be implemented in any desired environment. It should also be noted that the aforementioned definitions may apply within the context of the present description.

FIG. 67 depicts a startup page user interface 3-1200 as used in the installation and configuration of connected devices, in one embodiment. As an option, one or more instances of startup page user interface 3-1200 or any aspect thereof may be implemented in the context of the architecture and functionality of the embodiments described herein. Also, the startup page user interface 3-1200 or any aspect thereof may be implemented in any desired environment. It should also be noted that the aforementioned definitions may apply within the context of the present description.

In one embodiment, for example, a developer may be presented with the option of the number of registered devices, active devices, or devices in some other state that are visible, known, attached, etc. to a network. One embodiment, for example, may convey to a developer the number of devices, their state, and/or any other property, information, etc. One embodiment, for example, a page such as startup page user interface 3-1200, may convey to a developer the number and status of devices on a local network. One embodiment, for example, may convey to a developer the number, type, and status of devices that are connected to a network with the same base IP address, etc. In the illustrated embodiment, startup page user interface 3-120 indicates that no active unregistered devices were found on the local network.

FIG. 68 depicts a display terminal status page 3-1300 as used in the installation and configuration of connected devices, in one embodiment. As an option, one or more instances of display terminal status page 3-1300 or any aspect thereof may be implemented in the context of the architecture and functionality of the embodiments described herein. Also, the display terminal status page 3-1300 or any aspect thereof may be implemented in any desired environment. It should also be noted that the aforementioned definitions may apply within the context of the present description.

In one embodiment, for example, may be a screen that is part of an application that may run on a user device. One embodiment, for example, may be one screen of an iPhone app that may allow a user, developer, etc. to connect to one or more devices, platforms, etc. One embodiment, for example, may convey to a developer, etc. that a connection to a device, etc. has failed, been rejected, torn down, disconnected, etc. Of course, any status information, update, connection details, communication link errors, etc. may be shown.

FIG. 69 depicts a display terminal upgrade prompt user interface 3-1400 as used in the installation and configuration of connected devices, in one embodiment. As an option, one or more instances of display terminal upgrade prompt user interface 3-1400 or any aspect thereof may be implemented in the context of the architecture and functionality of the embodiments described herein. Also, the display terminal upgrade prompt user interface 3-1400 or any aspect thereof may be implemented in any desired environment. It should also be noted that the aforementioned definitions may apply within the context of the present description.

In one embodiment, for example, may be one screen of an iPhone app that may allow a user, developer, etc. to connect to one or more devices, platforms, etc. One embodiment, for example, may provide an interface, etc. that may allow the user, developer, etc. to upgrade and/or otherwise modify, change, alter, etc. one or more parameters, aspects, features, etc. of an account, subscription, service level, and the like.

FIG. 70 depicts a display terminal upgrade status user interface 3-1500 as used in the installation and configuration of connected devices, in one embodiment. As an option, one or more instances of display terminal upgrade status user interface 3-1500 or any aspect thereof may be implemented in the context of the architecture and functionality of the embodiments described herein. Also, the display terminal upgrade status user interface 3-1500 or any aspect thereof may be implemented in any desired environment. It should also be noted that the aforementioned definitions may apply within the context of the present description.

In one embodiment, for example, display terminal upgrade status user interface 3-1500 may be one screen of an iPhone app that may allow a user, developer, etc. to connect to one or more devices, platforms, etc. One embodiment, for example, may provide an interface, etc. that details the devices, platforms, etc. that are available for connection, etc. Of course, any number, type, form, kind, etc. of various options, features, aspects of control, maintenance, configuration, etc. related to devices, connections, etc. may be provided. One embodiment, for example, may be one screen of an iPhone app that may allow a user, developer, etc. to connect to one or more devices, platforms, etc. One embodiment, for example, may provide an interface, etc. that shows the status of each user, developer, etc. device. One embodiment, for example, may be one screen of an iPhone app that may allow a user, developer, etc. to connect to one or more devices, platforms, etc. One embodiment, for example, may show the name of a device that is available next to a circle, while a triangle may represent a device that if offline or otherwise unavailable for connection, etc. Of course any type of information, status, state, etc. may be provided.

FIG. 71 depicts a display terminal device error user interface 3-1600 as used in the installation and configuration of connected devices, in one embodiment. As an option, one or more instances of display terminal device error user interface 3-1600 or any aspect thereof may be implemented in the context of the architecture and functionality of the embodiments described herein. Also, the display terminal device error user interface 3-1600 or any aspect thereof may be implemented in any desired environment. It should also be noted that the aforementioned definitions may apply within the context of the present description.

In one embodiment, for example, as in the a display terminal device error user interface 3-1600, may be presented on one screen of an iPhone app that may allow a user, developer, etc. to connect to one or more devices, platforms, etc. One embodiment, for example, may provide an interface, etc. that informs the user, developer, etc. of the status and/or other information, properties, aspects, etc. of remote devices, etc. One embodiment, for example, may provide an interface, etc.

FIG. 72 depicts a display terminal option setup user interface 3-1700 as used in the installation and configuration of connected devices, in one embodiment. As an option, one or more instances of display terminal option setup user interface 3-1700 or any aspect thereof may be implemented in the context of the architecture and functionality of the embodiments described herein. Also, the display terminal option setup user interface 3-1700 or any aspect thereof may be implemented in any desired environment. It should also be noted that the aforementioned definitions may apply within the context of the present description.

In one embodiment, for example, an instance of a display terminal option setup user interface 3-1700 may be one screen of an iPhone app that may allow a user, developer, etc. to connect to one or more devices, platforms, etc. One embodiment, for example, may provide an interface, etc. to configure and/or otherwise modify, alter, change, etc. one or more parameters, features, options, alerts, notices, notification methods, startup options, preferences, sharing, combinations of these and/or other information and the like. One embodiment, for example, may provide an interface, etc. that is specific to a single device, but need not be. One embodiment, for example, may provide an interface, etc. to share a device between other users, etc.

FIG. 73 depicts a display terminal information display user interface 3-1800 as used in the installation and configuration of connected devices, in one embodiment. As an option, one or more instances of display terminal information display user interface 3-1800 or any aspect thereof may be implemented in the context of the architecture and functionality of the embodiments described herein. Also, the display terminal information display user interface 3-1800 or any aspect thereof may be implemented in any desired environment. It should also be noted that the aforementioned definitions may apply within the context of the present description.

In one embodiment, for example, may be one screen of an iPhone app that may allow a user, developer, etc. to connect to one or more devices, platforms, etc. One embodiment, for example, may provide an interface, etc. to provide, view, present, navigate to, list, etc. information about the app, version, date, OEM, configuration (at the app level, etc.), help, legal notices, etc.

FIG. 74 depicts a display terminal global configuration user interface 3-1900 as used in the installation and configuration of connected devices, in one embodiment. As an option, one or more instances of display terminal global configuration user interface 3-1900 or any aspect thereof may be implemented in the context of the architecture and functionality of the embodiments described herein. Also, the display terminal global configuration user interface 3-1900 or any aspect thereof may be implemented in any desired environment. It should also be noted that the aforementioned definitions may apply within the context of the present description.

In one embodiment, for example, a display terminal global configuration user interface 3-1900 may be presented on one screen of an iPhone app that may allow a user, developer, etc. to connect to one or more devices, platforms, etc. One embodiment, for example, may provide an interface, etc. to view global or other configuration parameters. One embodiment, for example, may provide an interface, etc. to control one or more aspects of the communication and/or connection links, networks, couplings, etc. between users and/or one or more devices. One embodiment, for example, may provide an interface, etc. to control, modify, alter, etc. one or more aspects of the app behavior, device behavior and/or any other similar aspect of services, service functions, alerts, notifications, etc. One embodiment, for example, may provide an interface, etc. that may determine when, how, etc. notifications are sent and/or how they are presented, viewed, displayed, etc. (e.g., if notifications are allowed while the user is working in another application, e.g., email, etc.). One embodiment, for example, may provide an interface, etc. to control, modify, alter, etc. how connections are established. One embodiment, for example, may provide an interface, etc. to force a relay mode of connection rather than a direct connection between devices, etc. Of course any type, form, mode of connection links, communication links, etc. may be controlled. Of course any sequence of connections, types of connections, number of connections, startup sequence, hand-off, brokering of connections, relay operation, combinations of these and/or any other aspect, status, feature, parameter, configuration, function, flow, sequence, etc. of the behavior, etc. of communication and/or connections may be so controlled.

FIG. 75 depicts a display terminal device options user interface 3-2000 as used in the installation and configuration of connected devices, in one embodiment. As an option, one or more instances of display terminal device options user interface 3-2000 or any aspect thereof may be implemented in the context of the architecture and functionality of the embodiments described herein. Also, the display terminal device options user interface 3-2000 or any aspect thereof may be implemented in any desired environment. It should also be noted that the aforementioned definitions may apply within the context of the present description.

In one embodiment, for example, display terminal device options user interface 3-2000 may be one screen of an iPhone app that may allow a user, developer, etc. to connect to one or more devices, platforms, etc. One embodiment, for example, may provide an interface, etc. to control startup behavior, configure devices, etc. Of course any controls, fields, parameters, etc. may be displayed and enabled for change, alteration, entry, configuration, modification, etc.

FIG. 76 depicts a display terminal guest access setup user interface 3-2100 as used in the installation and configuration of connected devices, in one embodiment. As an option, one or more instances of display terminal guest access setup user interface 3-2100 or any aspect thereof may be implemented in the context of the architecture and functionality of the embodiments described herein. Also, the display terminal guest access setup user interface 3-2100 or any aspect thereof may be implemented in any desired environment. It should also be noted that the aforementioned definitions may apply within the context of the present description.

In one embodiment, for example, display terminal guest access setup user interface 3-2100 may be one screen of an iPhone app that may allow a user, developer, etc. to connect to one or more devices, platforms, etc. One embodiment, for example, may provide an interface, etc. to allow a user, developer, etc. to share a device with another user. One embodiment, for example, may provide an interface, etc. to provide the username, email address, or other identification, etc. of another use with which to share one or more devices. Other options may of course be provided including but not limited to guest access control, group access and/or access, control, etc. based on any other form of group, directory, location, ownership, etc.

FIG. 77 depicts a display terminal confirmation user interface 3-2200 as used in the installation and configuration of connected devices, in one embodiment. As an option, one or more instances of display terminal confirmation user interface 3-2200 or any aspect thereof may be implemented in the context of the architecture and functionality of the embodiments described herein. Also, the display terminal confirmation user interface 3-2200 or any aspect thereof may be implemented in any desired environment. It should also be noted that the aforementioned definitions may apply within the context of the present description.

In one embodiment, for example, display terminal confirmation user interface 3-2200 may be one screen of an iPhone app that may allow a user, developer, etc. to connect to one or more devices, platforms, etc. One embodiment, for example, may provide an interface, etc. to allow the user of an iPhone app to upgrade and/or otherwise modify, control, configure, etc. one or more aspects of an account, subscription service and the like.

FIG. 78 depicts a display terminal account creation user interface 3-2300 as used in the installation and configuration of connected devices, in one embodiment. As an option, one or more instances of display terminal account creation user interface 3-2300 or any aspect thereof may be implemented in the context of the architecture and functionality of the embodiments described herein. Also, the display terminal account creation user interface 3-2300 or any aspect thereof may be implemented in any desired environment. It should also be noted that the aforementioned definitions may apply within the context of the present description.

In one embodiment, for example, display terminal account creation user interface 3-2300 may be one screen of an iPhone app that may allow a user, developer, etc. to connect to one or more devices, platforms, etc. One embodiment, for example, may provide an interface, etc. to create an account using personal details and/or any other information, etc. One embodiment, for example, may provide an interface, etc. to create one or more accounts that allow, permit, control, etc., access to one or more services between the user and various devices, platforms, etc.

FIG. 79 depicts a display terminal browser-oriented user interface 3-2400 as used in the installation and configuration of connected devices, in one embodiment. As an option, one or more instances of display terminal browser-oriented user interface 3-2400 or any aspect thereof may be implemented in the context of the architecture and functionality of the embodiments described herein. Also, the display terminal browser-oriented user interface 3-2400 or any aspect thereof may be implemented in any desired environment. It should also be noted that the aforementioned definitions may apply within the context of the present description.

In one embodiment, a display terminal browser-oriented user interface 3-2400 for example, may be one screen of an iPhone app that may allow a user, developer, etc. to connect to one or more devices, platforms, etc. One embodiment, for example, may provide an interface, etc. to remotely control a device, platform, etc. One embodiment, for example, may provide an interface, etc. to a program, software such as WebIOPi. WebIOPi is a publicly-available software package (developed and written by Eric Ptak) that normally allows control of a Raspberry Pi from a web interface running on the Raspberry Pi. Normally WebIOPi would be accessed, viewed, etc. locally using the Raspberry Pi. One embodiment, for example, may provide an interface, etc. to WebIOPi that allows a user, developer, etc. to use WebIOPi to control a Raspberry Pi remotely. For example, the screen shown may be displayed remotely on a user's iPhone.

FIG. 80 depicts a display terminal device-specific browser rendering user interface 3-2500 as used in the installation and configuration of connected devices, in one embodiment. As an option, one or more instances of display terminal device-specific browser rendering user interface 3-2500 or any aspect thereof may be implemented in the context of the architecture and functionality of the embodiments described herein. Also, the display terminal device-specific browser rendering user interface 3-2500 or any aspect thereof may be implemented in any desired environment. It should also be noted that the aforementioned definitions may apply within the context of the present description.

In one embodiment, for example, display terminal device-specific browser rendering user interface 3-2500 may be one screen of an iPhone app that may allow a user, developer, etc. to connect to one or more devices, platforms, etc. One embodiment, for example, may provide an interface, etc. that shows the connection mode. For example, the connection address to a remote Raspberry Pi may be https://mwscjqag.p6.yoics.net/ and the connection mode may be RELAY. In this case, for example, the connection between a user's iPhone and the Raspberry Pi device may be constructed using a relay server (at yoics.net). In this case, for example, the server address may be generated in a random or semi-random manner according to methods and techniques that may be described elsewhere herein and/or in one or more specifications incorporated by reference.

FIG. 81 depicts a display terminal port-addressable device-specific browser-oriented user interface 3-2600 as used in the installation and configuration of connected devices, in one embodiment. As an option, one or more instances of display terminal port-addressable device-specific browser-oriented user interface 3-2600 or any aspect thereof may be implemented in the context of the architecture and functionality of the embodiments described herein. Also, the display terminal port-addressable device-specific browser-oriented user interface 3-2600 or any aspect thereof may be implemented in any desired environment. It should also be noted that the aforementioned definitions may apply within the context of the present description.

In one embodiment, for example, may be one screen of an iPhone app that may allow a user, developer, etc. to connect to one or more devices, platforms, etc. One embodiment, for example, may provide an interface, etc. that displays alternative information about the connection type, etc. For example, the address is shown as a localhost address 127.0.0.1 using port 31315. The use of localhost addresses to provide, for example, additional security between remote devices may be described elsewhere herein and/or in one or more specifications incorporated by reference.

FIG. 82 depicts a display terminal account setup interview user interface 3-2700 as used in the installation and configuration of connected devices, in one embodiment. As an option, one or more instances of display terminal account setup interview user interface 3-2700 or any aspect thereof may be implemented in the context of the architecture and functionality of the embodiments described herein. Also, the display terminal account setup interview user interface 3-2700 or any aspect thereof may be implemented in any desired environment. It should also be noted that the aforementioned definitions may apply within the context of the present description.

In one embodiment, for example, a display terminal account setup interview user interface 3-2700 may be one screen of an iPhone app that may allow a user, developer, etc. to connect to one or more devices, platforms, etc. One embodiment, for example, may provide an interface, etc. to create an account.

FIG. 83 depicts a display terminal device-specific signal configuration user interface 3-2800 as used in the installation and configuration of connected devices, in one embodiment. As an option, one or more instances of display terminal device-specific signal configuration user interface 3-2800 or any aspect thereof may be implemented in the context of the architecture and functionality of the embodiments described herein. Also, the display terminal device-specific signal configuration user interface 3-2800 or any aspect thereof may be implemented in any desired environment. It should also be noted that the aforementioned definitions may apply within the context of the present description.

In one embodiment, for example, may be one screen of an iPhone app that may allow a user, developer, etc. to connect to one or more devices, platforms, etc. One embodiment, for example, may provide an interface, etc. to control a remote device. For example, the WebIOPi interface shown allows control of the Raspberry Pi GPIO functions. A similar screen may be displayed to allow control of any remote device functions. Such a screen would be created by a developer to allow a user to control household appliances, sprinkler systems and/or any device, platform, system, etc.

FIG. 84 depicts a display terminal instance-specific signal configuration user interface 3-2900 as used in the installation and configuration of connected devices, in one embodiment. As an option, one or more instances of display terminal instance-specific signal configuration user interface 3-2900 or any aspect thereof may be implemented in the context of the architecture and functionality of the embodiments described herein. Also, the display terminal instance-specific signal configuration user interface 3-2900 or any aspect thereof may be implemented in any desired environment. It should also be noted that the aforementioned definitions may apply within the context of the present description.

In one embodiment, for example, a display terminal instance-specific signal configuration user interface 3-2900 may be one screen of an iPhone app that may allow a user, developer, etc. to connect to one or more devices, platforms, etc. One embodiment, for example, may provide an interface, etc. to view the connection address and other details of the communication links, etc. between user device (e.g., mobile phone, etc.) and remote device (e.g., Raspberry Pi, etc.).

FIG. 85 depicts a display terminal signal configuration editor interface 3-3000 as used in the installation and configuration of connected devices, in one embodiment. As an option, one or more instances of display terminal signal configuration editor interface 3-3000 or any aspect thereof may be implemented in the context of the architecture and functionality of the embodiments described herein. Also, the display terminal signal configuration editor interface 3-3000 or any aspect thereof may be implemented in any desired environment. It should also be noted that the aforementioned definitions may apply within the context of the present description.

In one embodiment, for example, a display terminal signal configuration editor interface 3-3000 may be one screen of an iPhone app that may allow a user, developer, etc. to connect to one or more devices, platforms, etc. One embodiment, for example, may provide an interface, etc. to allow the user, developer, etc. to change address details, etc. in an embedded browser interface. One embodiment, for example, may show an interface, etc. that is provided by an embedded Safari browser running on an iPhone, iPad, etc.

FIG. 86 depicts a display terminal device enumeration user interface 3-3100 as used in the installation and configuration of connected devices, in one embodiment. As an option, one or more instances of display terminal device enumeration user interface 3-3100 or any aspect thereof may be implemented in the context of the architecture and functionality of the embodiments described herein. Also, the display terminal device enumeration user interface 3-3100 or any aspect thereof may be implemented in any desired environment. It should also be noted that the aforementioned definitions may apply within the context of the present description.

In one embodiment, for example, display terminal device enumeration user interface 3-3100 may be one screen of an iPhone app that may allow a user, developer, etc. to connect to one or more devices, platforms, etc. One embodiment, for example, may provide an interface, etc. that may show which devices are online, available, turned on, etc. (e.g., using a circle next to their names) and which devices are not online, etc. (e.g., with a triangle next to their names). Of course any symbol, indication, notation, etc. may be used and any status, information, state, etc. may be displayed. Of course any naming, icon, symbols, etc. may be used to represent a device, groups of devices, etc.

FIG. 87 depicts a display terminal device timeout status user interface 3-3200 as used in the installation and configuration of connected devices, in one embodiment. As an option, one or more instances of display terminal device timeout status user interface 3-3200 or any aspect thereof may be implemented in the context of the architecture and functionality of the embodiments described herein. Also, the display terminal device timeout status user interface 3-3200 or any aspect thereof may be implemented in any desired environment. It should also be noted that the aforementioned definitions may apply within the context of the present description.

In one embodiment, for example, display terminal device timeout status user interface 3-3200 may be one screen of an iPhone app that may allow a user, developer, etc. to connect to one or more devices, platforms, etc. One embodiment, for example, may show an interface, etc. that conveys information, status, errors, notices, notifications and/or any other data, etc. to the user, developer, etc. One embodiment, for example, may provide an interface, etc. that shows how, why, when, etc., a connection, communication link, network, etc. has failed, dropped, etc.

FIG. 88 depicts a display terminal device limit status user interface 3-3300 as used in the installation and configuration of connected devices, in one embodiment. As an option, one or more instances of display terminal device limit status user interface 3-3300 or any aspect thereof may be implemented in the context of the architecture and functionality of the embodiments described herein. Also, the display terminal device limit status user interface 3-3300 or any aspect thereof may be implemented in any desired environment. It should also be noted that the aforementioned definitions may apply within the context of the present description.

In one embodiment, for example, display terminal device limit status user interface 3-3300 may be one screen of an iPhone app that may allow a user, developer, etc. to connect to one or more devices, platforms, etc. One embodiment, for example, may provide an interface, etc. that allows the OEM, service provider, etc. to regulate, monitor, control, upgrade, downgrade, upsell, and/or otherwise interact, service, etc. a user, developer, etc. One embodiment, for example, may provide an interface, etc. to control communication time and offer the ability to extend session times, etc.

FIG. 89 depicts a display terminal peer-to-peer status user interface 3-3400 as used in the installation and configuration of connected devices, in one embodiment. As an option, one or more instances of display terminal peer-to-peer status user interface 3-3400 or any aspect thereof may be implemented in the context of the architecture and functionality of the embodiments described herein. Also, the display terminal peer-to-peer status user interface 3-3400 or any aspect thereof may be implemented in any desired environment. It should also be noted that the aforementioned definitions may apply within the context of the present description.

In one embodiment, for example, display terminal peer-to-peer status user interface 3-3400 may be one screen of an iPhone app that may allow a user, developer, etc. to connect to one or more devices, platforms, etc. One embodiment, for example, may provide an interface or indication, etc. to show that communication links, connections, etc. are operating a direct mode, or peer-to-peer (P2P) mode (see indication 3-3402), etc. Of course any connection mode, type, form, sequence, flow, etc., may be displayed.

While a representative selection of screen captures, etc. have been presented herein, of course any number, type, form, layout, representation, etc. of screens (and/or equivalent interfaces, etc.) may be used for both the portal (e.g., website(s) for developers, account registration, user setup, etc.) as well as any user app (e.g., for remote device access running for example on a mobile device such as an iPhone or Android device, etc.). Of course such techniques as described are intended to be widely applicable allowing a user, developer, etc. to access any number, type, form, etc. of system, device, IoT device(s), etc. from any other device(s) including mobile (i.e., phone, tablet, laptop, etc.) and/or fixed device (desktop, server, etc.).

FIG. 90 presents an image of a connected device 3-3500 as used in the installation and configuration of connected devices, in one embodiment. As an option, one or more instances of connected device 3-3500 or any aspect thereof may be implemented in the context of the architecture and functionality of the embodiments described herein. Also, the connected device 3-3500 or any aspect thereof may be implemented in any desired environment. It should also be noted that the aforementioned definitions may apply within the context of the present description.

One embodiment, for example, connected device 3-3500 may be a smart plug. A smart plug may be a type of IoT device that may be controlled remotely. For example the smart plug may allow a household appliance to be remotely controlled by switching power to that appliance on or off remotely. The software that is required to allow such remote control may be generated by a developer using the techniques described herein and/or in one or more specifications incorporated by reference. For example, some of this generated software may be incorporated into the smart plug platform (e.g., executed by a microprocessor, etc. included in the smart plug). The software that is required to perform such remote control may be also generated by a developer using the techniques described herein and/or in one or more specifications incorporated by reference and/or using similar techniques, etc. The software that performs such remote control may have the appearance and use the techniques, content, controls, displays, etc. that may be described herein and/or in one or more specifications incorporated by reference.

FIG. 91 depicts a process flow 3-3600 from initial download through status check performed after installation and configuration of connected devices, in one embodiment. As an option, one or more instances of process flow 3-3600 or any aspect thereof may be implemented in the context of the architecture and functionality of the embodiments described herein. Also, the process flow 3-3600 or any aspect thereof may be implemented in any desired environment. It should also be noted that the aforementioned definitions may apply within the context of the present description.

The shown flow begins upon taking steps to download a kit (see 3-3610), then installing the kit including APIs (see 3-3620), configuring the kit to recognize connected device type(s) and addressing modes (see 3-3630), deploying one or more connected devices (see 3-3640), and commencing to receive communications including status communications from deployed device (see 3-3650). Any of the heretofore presented installation and configuration techniques can be used, and any of the herein-disclosed application programming interfaces (APIs) can be used.

Certain aspects in some embodiments of the present application are related to material disclosed in U.S. patent application Ser. No. 14/493,278, titled "MULTI-SERVER FRACTIONAL SUBDOMAIN DNS PROTOCOL" filed on Sep. 22, 2014, the content of which is incorporated by reference in its entirety in this Application.

Certain aspects in some embodiments of the present application are related to material disclosed in U.S. patent application Ser. No. 14/499,362, titled "DIRECT MAP PROXY SYSTEM AND PROTOCOL" filed on Sep. 29, 2014, the content of which is incorporated by reference in its entirety in this Application.

FIG. 92 depicts an environment 4-100 in which devices using a partially-encrypted provisioning file can be deployed, in one embodiment. As an option, one or more instances of environment 4-100 or any aspect thereof may be implemented in the context of the architecture and functionality of the embodiments described herein. Also, the environment 4-100 or any aspect thereof may be implemented in any desired environment. It should also be noted that the aforementioned definitions may apply within the context of the present description.

The environment 4-100 supports network communications over network 4-108 which communications are by and between any forms or servers (e.g., DNS server 4-111, connection server 4-112, proxy server 4-113, host server 4-114) and any forms of devices (e.g., user device 4-110, target device 4-115). Such communications may also include messaging to and from or through a router 4-101, a laptop 4-102, a mobile phone 4-104, a tablet 4-105, and a desktop 4-106, and can include communications to and from a web camera 4-103 and/or any forms of a storage device 4-107.

The shown protocol 4-120 includes a message exchange (see exchange 4-140) to send a provisioning file (see message 4-134) and receive an acknowledgement (see message 4-136). The exchange 4-140 further includes an operation where a target device applies configuration aspects as may be present in a provisioning file (see operation 4-138). Further operations may be undertaken by a target device, such as the shown operation to enable a requested device configuration (see operation 4-141).

In some situations, there may be certain setup preparations taken. As shown, setup preparations can include downloading an installation kit (see message 4-122), service a download request (see operation 4-124), and perform installation activities (see operation 4-126). Setup preparations can further include initiating a connection under a particular proxy server configuration (see message 4-128), and then deploying connected devices (see operation 4-130) and initiating communication with the deployed device, for example, to communicate the beginning of a configuration session (see message 4-132).

The message 4-134 refers to a provisioning file, the format and contents of which are presently discussed.

FIG. 93 presents a sample provisioning file 4-200 used for secure device deployment with partially-encrypted keys or other data, in one embodiment. As an option, one or more instances of sample provisioning file 4-200 or any aspect thereof may be implemented in the context of the architecture and functionality of the embodiments described herein. Also, the sample provisioning file 4-200 or any aspect thereof may be implemented in any desired environment. It should also be noted that the aforementioned definitions may apply within the context of the present description.

In the illustrated embodiment, the provisioning file comprises three areas:
  An identification header area 4-210
  An encrypted area comprising an encrypted portion 4-220, and
  An override area 4-230.

The abovementioned areas are discussed in succession below.

Identification Header

An example identification header is shown in the sample provisioning file 4-200. In the illustrated embodiment, the identification header comprises the contents as shown. In this example, there are three elements in the identification header:
  The first element serves as a project identifier 4-202. The project identifier corresponds to the project in the Weaved developer portal and uniquely identifies the project.
  The second line is the encoding identifier 4-204 that specifies how the rest of the provisioning file is encoded.
  The third line in the identification header is a random salt 4-206 that is used in encoding the encrypted portion 4-220. In exemplary uses, each time the provisioning file is generated it will use a different random salt.

Encrypted Portion

The encrypted portion 4-220 contains the protected key-value pairs that are to be protected by use of the provisioning file. (Examples of key-value pairs and usage are disclosed herein.) Before encryption, the encrypted portion comprises two parts, a data part and a checksum part, which are further described herein.

Override Area Format

The override area 4-230 comprises application-specific parameters, and in some cases implementation-specific parameters.

A possible format and a corresponding example is shown and described as pertains to the following figures.

FIG. 94 presents a possible format for an encrypted portion 4-3A00 used for secure device deployment using a partially-encrypted provisioning file, in one embodiment. As an option, one or more instances of encrypted portion 4-3A00 or any aspect thereof may be implemented in the context of the architecture and functionality of the embodiments described herein. Also, the encrypted portion 4-3A00 or any aspect thereof may be implemented in any desired environment. It should also be noted that the aforementioned definitions may apply within the context of the present description.

A possible format of the data part 4-322 is shown below. The last line is the checksum part 4-324. Before encoding/encryption the data can comprise a data part and a checksum part, and can correspond to the format as follows:

```
#Random Salt2
#start
Key pairs
#end
checksum
```

Data Part

The first line of the encrypted area before encryption comprises a random byte string of some minimum length (e.g., a minimum length of 20 characters long). Some implementations use a variable length string of 20 to 160 bytes in length. In one embodiment, this string should be present in every provisioning file (e.g., at or upon each provisioning file generation even if nothing has changed in the data portion). In one embodiment, the first character should be a comment indicator (e.g., a hash sign '#') to signify a comment, and to signify that the line is to be parsed as a comment line (e.g., not encrypted).

The next line is the start marker "#start"; this signifies the start of the key pairs section. The key pairs are listed next. The extent of key-value pairs and can be of any quantity or size. When no more key pairs are listed the end is signified by a "#end" to signify the end of the key-value pair section.

Checksum Part

The checksum part 4-324 comprises the checksum of the data part. The checksum calculation can use any known method. In exemplary cases, the method should be respective to the encoding identifier 4-204 given in the identification header. In the example shown, the checksum is a SHA1 HMAC in the following format:
  hash_hmac ("sha1", $encrypt_block, $hmac_key)
  In this case the hmac_key is another SHA1 HMAC of the project identifier and a shared secret. When the entire encrypted area has been thusly preprocessed, it is then encoded to form the encrypted portion 4-220. A sample of an encrypted portion is given as follows.

FIG. 95 presents a sample of an encrypted portion 4-3B00 used for secure device deployment using a partially-encrypted provisioning file, in one embodiment. As an option, one or more instances of encrypted portion 4-3B00 or any aspect thereof may be implemented in the context of the architecture and functionality of the embodiments described herein. Also, the encrypted portion 4-3B00 or any aspect thereof may be implemented in any desired environment. It should also be noted that the aforementioned definitions may apply within the context of the present description.

The encrypted portion 4-3B00 comprises the aspects shown. This exemplary embodiment as well as other embodiments may implement additional features, in particular, any known methods can be used to perform the encoding.

Encoding Technique Examples

When the entire encrypted area has been formatted (e.g., as shown and described as pertaining to encrypted portion 4-3A00), it can then be encoded into the encrypted portion 4-220. In exemplary embodiments, the method of encryption corresponds to the encoding identifier 4-204. In this example, the encrypted area is encrypted with RC4 and an encryption key is formed as indicated below:

```
$enc_key=hash_hmac("sha1", $project_id.$salt, $shared_secret)
$enc_block = base64_encode_cert(rc4($enc_key,
    $encrypt_block))."\n";
```

The function to generate the encryption key "$enc_key" is shown above as "hash_hmac", which arguments include the encoding method (e.g., "sha1"), a salt (e.g., "$project_id. $salt"), and a shared secret (e.g., "$shared_secret"). The encryption key "$enc_key" is then used in encoding the block comprising the encrypted portion 4-220.

Continuing the example, an encrypted portion can be formed by encrypting a data segment as described above (e.g., comprising key-value pairs, etc.). Strictly as one example, the data segment can comprise:

```
#ULkt5qQhgVDtQqTrHcLbF8BHSMxlwnyjnED3ZFE89bXGsfYf
#start
manufacture_id 0
project_key
NUFFMzYxQTEtRjk3Mi1BODBFLTkzRjAtMTc5QkY2QUxxxxxy
project_secret
QkE2N0IzMTUtOUFFOS05Qjk5LTVCNzEtMThCMTVFxxxxx2
application_type 0
application_version 0
application_subversion 1
platform_version 0
platform_code 1072
proxy_dest_port 80
max_depth 15
enabled 1
uid 0
#end
Ey19iUmHb7pKHWHkpM3K/B0xxxxx=
```

The above example is then encrypted, resulting in:

```
SwZX4rlD7SyZpLD4fuwaBK613fkQWl/7UXVElEopLnmF4jNJUSjdyve
4K0NoybpdG/Iat7MYBPbonTjnnx981rFkpEnkx5ijQyUefQ5UkC8nVevC
psWRNPkruYzTbpzUu8rJkSotS4uwpVBIbhozHvkQnimknpSuoyINvgKO
QeXiDYKA2QGreVGIe0JQoZJ5kj/cIU3PvCrgxl3k/2K6u8ycHH6QcC4Z/
L+pGNea/AgypSSRIxPp0TzyY3jBVwyAWmjbhXjYLMY+zCnsq4Kiw
OalEt8Xg5Gpkc8PC0SQHG1nNxDSjQAxVkfNhitQLWeIXG2xOuD/M
4m22kzGpkMJWy1m/i7l2DXjMmDmeQjaHFdE4oYwjdzkeIKqCqDXw
afMit98NxhQsNbaCV+eaMKDducZYaGV5ByFsEKJXpAumO8ZIY9
yJKttNp7bkSmN1p+955K/6sj6H9cNd4+4Y3nI2g+8D7fP4Yo71
sfpk/zRkA701FgaYvyJz8Ha2Ent7TWU+HzXrspwPJrzVxMsxQ==
```

The block header and footer are added, as shown. A begin encrypted portion indication (e.g., "BEGIN CONFIG") and an end encrypted portion indication (e.g., "END CONFIG") are added:

```
-----BEGIN CONFIG-----
SwZX4rlD7SyZpLD4fuwaBK613fkQWl/7UXVElEopLnmF4jNJUSjdyve4
K0NoybpdG/Iat7MYBPbonTjnnx981rFkpEnkx5ijQyUefQ5UkC8nVevCps
WRNPkruYzTbpzUu8rJkSotS4uwpVBIbhozHvkQnimknpSuoyINvgKOQe
XiDYKA2QGreVGIe0JQoZJ5kj/cIU3PvCrgxl3k/2K6u8ycHH6QcC4Z/L+
pGNea/AgypSSRIxPp0TzyY3jBVwyAWmjbhXjYLMY+zCnsq4KiwOalE
t8Xg5Gpkc8PC0SQHG1nNxDSjQAxVkfNhitQLWeIXG2xOuD/M4m22
kzGpkMJWy1m/i7l2DXjMmDmeQjaHFdE4oYwjdzkeIKqCqDXwafMit
98NxhQsNbaCV+eaMKDducZYaGV5ByFsEKJXpAumO8ZIY9yJKtt
Np7bkSmN1p+955K/6sj6H9cNd4+4Y3nI2g+8D7fP4Yo71sfpk/
zRkA701FgaYvyJz8Ha2Ent7TWU+HzXrspwPJrzVxMsxQ==
-----END CONFIG-----
```

The shown forms of the begin encrypted portion indication and the end encrypted portion indication can take on various forms and variations of formatting, and further, the begin encrypted portion indication and the end encrypted portion indication can be used to bound any encrypted portion (e.g., in the situation where an override area is encrypted).

Override Area Example

The provisioning file comprises an override/extension area that may or may not be encrypted. This section can be formatted to contain key-value pairs that are not protected or encrypted. Or, this section can be formatted to contain key-value pairs that are encrypted. These key-value pairs can override some allowable key-value pairs in the encrypted portion, while others can specify options that are not specified in the encrypted portion.

Strictly as an example, the lines of text in the override area 4-230 comprise:

```
proxy_dest_port 8000
api_version v3
```

The examples given in these two lines refer to a proxy destination port value of "8000", and an API version of "v3", respectively.

In one embodiment, for example, the identification header area may be used for any purpose, feature, function, etc. Thus, for example, the identification header area may be used to pass information from a host system to a device, to pass information from one device to another, and to pass information between programs or applications running on a host, on one or more devices, etc.

In one embodiment, for example, the identification header area may contain instructions, company and/or user identification details, copyright notices, version numbers, codes, keys, key-value pairs, device identification, device type, device functions, switches, configuration aspects, combinations of these and the like, etc. In one embodiment, for example, the identification header area and/or other areas, data, information, etc. may indicate, direct, function, etc. to allow further processing, control, etc. of one or more device feature, functions, etc. In one embodiment, for example, the identification header area, etc. may indicate which version of software may be used to process one or more parts, pieces of the configuration file and/or provisioning file, etc. In one embodiment, for example, the identification header area, etc. may indicate which version of database, schema, etc. may be used in one or more parts, pieces of the configuration file and/or provisioning file, etc.

In one embodiment, for example, the encrypted area may be used for any purpose, feature, function, etc. Thus, for example, the encrypted area may be used to securely pass, convey, transfer, etc. information, or pass in a secure manner, etc. from a host system to a device, to securely pass information from one device to another, to securely pass information between programs or applications running on a host, on one or more devices, etc.

In one embodiment, for example, the encrypted area may be used to enable, disable, modify, alter, change, or otherwise affect in any manner, fashion, etc. any aspect, feature, behavior, function, mode of operation, etc. of any device, network, system, and/or portions of these, combinations of these and the like, etc. In one embodiment, for example, the encrypted area may be an encrypted version of part or all of the unencrypted portions of one or more configuration files. In this case, the encrypted portion may be used, for example, to check that no unauthorized changes, etc. have been made to the configuration file. In one embodiment, for example, the encrypted area may contain information that allows, permits, enables, authorizes, etc. user or other changes (either directly via encoded values, etc. or indirectly by further decoding, processing, post-processing, etc. of the content of the encrypted area). In one embodiment, for example, there may be more than one encrypted area or the encrypted area may be split, portioned, divided, etc. into several parts, portions, areas, etc. In one embodiment, for example, the encrypted area may contain passwords and/or other data, information, etc. that may be used, needed, required, etc. for one or more device operations, service enablement, access authorization and/or any other function, purpose, behavior and the like, etc. In one embodiment, for example, the encrypted area may contain information related to, required by, etc. one or more aspects of multi-factor authentication (MFA). For example, the provisioning files, etc. may contain information related to MFA factors (e.g., details of fingerprints, signatures, other unique factors, biometrics, etc.). For example, the provisioning files, etc. may contain details, information, functions, etc. related to the verification and authentication required by MFA. For example, the provisioning files may provide data, information, etc. on the number and types required by MFA for access to a particular device, to access or use a particular service or set of services on a device, with a device, etc. Such MFA information may be stored in the encrypted area and/or in other areas, etc. Of course the techniques described are not limited to a particular type of MFA (e.g., SAML, etc.) or indeed MFA itself. Any type of authentication, access control, permission system, etc. may be used separately and/or in combination with MFA and other similar authentication systems, etc.

In one embodiment, for example, the override area may be used for any purpose, feature, function, etc. Thus, for example, the override area may be used to pass, convey, transfer, etc. information from a host system to a device, to pass information from one device to another, to pass information between programs or applications running on a host, on one or more devices, etc.

In one embodiment, for example, the override area may be used by a user, program, script, processor function, pre-processor program, database, etc. to change, alter, modify or otherwise affect any feature, behavior, mode of operation and the like, etc. For example one or more lines, values, data, fields, switches, etc. in the override area may be used to enable one or more services, ports, communication links, etc. on one or more devices. For example, one or more features that may be enabled by one or more parts, pieces, etc. in the encrypted area may be switched on/off, enabled/disabled, modified, and or otherwise similarly affected by data, tags, switches, codes, key-value pairs, options, controls, etc. that may be present in the override area. In one embodiment, for example, WebSSH may be enabled/disabled and/or otherwise configured, provisioned, etc. as a service. In one embodiment, for example, TCP port 80 may be enabled/disabled and/or otherwise configured, provisioned, etc. Of course any similar feature (such as service type, etc.) or configuration (such as port number, etc.) or indeed any other behavior, facet, aspect of device function, connection, behavior and the like may be controlled as described above or in a similar fashion, manner, etc. to that described above, elsewhere herein, and/or in one or more specifications incorporated by reference.

In one embodiment, for example, the provisioning file may be used for any purpose, function, feature, etc. and/or in conjunction with any purpose, function, feature, etc. In one embodiment, for example, the provisioning file may be used for configuration. Thus, for example, the provisioning file may be used to configure e.g., select, enable, disable, choose, control, modify, etc. one or more aspects of a device configuration, state, purpose, behavior, etc. Thus, for example, the provisioning file may be used to configure which TCP ports the device may use for connection, etc. Of course any aspect, feature, etc. of a device configuration may be so controlled using any known techniques.

In one embodiment, for example, a provisioning file, configuration file, etc. may be produced (e.g., created, modified, etc.) by a script, program, utility, application, combinations of these, and the like, etc. For example, a user, company, OEM, provider, etc. may use, sell, provide, distribute, offer, publish, etc. a utility program, etc. that may create, modify, alter, etc. one or more configuration files, portions of one or more configuration files, provisioning files, etc. In one embodiment, for example, an application (app, etc.) on a user phone (e.g., iPhone, etc.) may be used to create, change, alter and/or otherwise modify a provisioning file, configuration file, part or parts of one or more such files and the like, etc. In one embodiment, for example, a user e.g., on a phone (e.g., iPhone, etc.) may be allowed, permitted, etc. to create, change, alter and/or otherwise modify a provisioning file.

Of course other and any similar functions, behaviors, features, etc. may be achieved by similar techniques to those described above. For example, there may be more than three areas of a configuration file or provisioning file. For example, there may be more than one configuration file, etc. For example, the entire configuration file may be encrypted, etc. In one embodiment, for example, the override area may be encrypted. In one embodiment, for example, there may be more than one override area. In one embodiment, for example, a first override area may be encrypted and a second override area may be unencrypted. An override area may comprise an override-specific salt and/or an encryption scheme indication using an encoding identifier. In one embodiment, for example, a first override area or encrypted area may be encrypted using a first encryption scheme and a second override area or encrypted area may be encrypted using a second encryption scheme. Of course not all information may be encrypted on all devices in the same manner. For example on a first type of device, all data may be unencrypted and on a second type of device the same data may be encrypted, etc. Of course which data is encrypted and how it is encrypted may depend on any factor and is not limited to device type. For example, any encryption functions, encryption behavior, encryption features, encryption strength, encryption type, etc. may depend on the user, a group of users, the type of device, the services present on the device, the services enabled on the device, the device capabilities, functions, device location, type of use, battery power remaining, device status, device state, application running on the device, power usage of the devices, device history, resources available, and/or combinations of these, and any other similar factors and the like, etc.

For example, in one embodiment, there may be one or more provisioning files that may be used for initial configuration, boot, start-up, etc. and one or more configuration files that may be altered, modified, etc. by the user at run-time, etc. Of course, provisioning files, configuration files, etc. may be altered, modified, created, changed, etc. at any time including (but not limited to) design time, during manufacturing, testing, deployment, sales, at installation, boot, start-up, during provisioning, at run-time, at any combination of these times, and/or at any point in time, etc. Of course, one or more provisioning files, configuration files, etc. may be separate, combined, and/or combined, linked, structured, etc. with other files, data storage structures, databases, etc.

In one embodiment, for example, the one or more provisioning files, configuration files, etc. may be used to perform transport of, provide a conduit for, communicate with, connect to, and/or distribute, convey, etc. any type of information, data, code, etc. In one embodiment, for example, such communication of information may be between devices, between a user and a service, between a host system and a device, or between any number, type, form of device, system, etc. For example, code required by a device may be fetched from a host server under control or partial control of a provisioning file, etc.

In one embodiment, for example, the one or more provisioning files, configuration files, etc. may be used to store, convey, etc. the state, status, notifications, context, or other similar related information, data, etc. of one or more devices, systems, services, etc. Thus, for example, one or more provisioning files, etc. may contain information about the types of notification required by a device, supported by a device, chosen by the user, etc. Thus, for example, one or more provisioning files, etc. may contain style sheets, CSS, and/or other information, data, etc. that may pertain to, configure, select, filter, etc. data, information, etc. that is sent to a device, received by a device, etc. Thus, for example, one or more provisioning files, etc. may contain style sheets, device information, screen size, screen capabilities, language features, language preferences, etc. that control the display, control notifications, or control any such similar aspect of display, function, behavior, etc. on a device, system, etc.

In one embodiment, for example, the one or more provisioning files, configuration files, etc. may be used to store, convey, etc. an image of a virtual machine, code corresponding to a device driver, install scripts, and/or any other form, type, etc. of object code, encoded function, binary image, database, code library, routine, device driver, as well as portions, parts and/or combinations of any of these and the like, etc. For example, the provisioning file may contain, include, point to, link to, etc. one or more code segments, library files, install scripts, patches, updates, bug fixes, code containers (e.g., .jar file or similar, etc.), that may be required, needed, used, etc. by one or more devices. For example, a provisioning file may contain code, a link to code, etc. required to handle a particular feature or function, etc. on a device, on other devices, systems, etc. For example, a provisioning file, etc. may contain a link, etc. to code, etc. required to handle a particular feature or function on a device. For example, a provisioning file, etc. may contain code, etc. that may enable or permit a first device to access or control a function, behavior, service, etc. on a second device.

In one embodiment, for example, a provisioning file, configuration file, etc. may be used, may contain data, information, etc. pertaining to, corresponding to, belonging to, to be applied to, to be used by or for, etc. the device on which the provisioning file, configuration file, etc. is kept, stored, located, created, etc. In one embodiment, for example, a provisioning file, configuration file, etc. may be used, may contain data, information, etc. pertaining to, corresponding to, belonging to, to be applied to, to be used by or for, etc. a different device or devices on which the provisioning file, configuration file, etc. is kept, stored, located, created, etc. For example, a first device of a first type may be used as a hub, central resource, gateway, etc. for a number of other devices, including for example a second device of a second type. In one embodiment, for example, a provisioning file, configuration file, etc. may be kept, stored, located, created, etc. on the first device and may be used, may contain data, information, etc. pertaining to, corresponding to, belonging to, to be applied to, to be used by or for, etc. the second device. For example a smart home may contain a number of electronic door locks that may for example be wirelessly controlled by a central resource. The central resource may be a first device of a first type and a door lock may be a second device of a second type. The manufacturer, user, OEM, etc. may provision, configure, etc. such a door lock system or any similar system in a number of ways according to various techniques described above, elsewhere herein or in one or more specifications incorporated by reference. For example, in one such configuration or provisioning technique a provisioning file, configuration file, etc. may be created, stored, located, managed, etc. on the first device, the central resource, which may be a small embedded system capable of connecting to the electronic door locks. In one embodiment, one or more parts, portions, etc., of the provisioning file, configuration file, etc. may be copied, moved, transferred, etc. to one or more door locks. For example, one or more combinations may be transferred from the central resource to one or more door locks. For example, the door locks may not have the capability to set, reset, and/or change, alter, etc. the combination of the lock. Such a provisioning, configuration, etc. technique may allow the lock combinations to be set, configured, changed, etc. remotely. In one embodiment, for example, such a technique may reduce the cost and/or complexity of the locks. In one embodiment, for example, such a technique may increase the security of the door lock system, e.g., by reducing the possibility of tampering with locks, altering the combination, etc. Such a provisioning, configuring, etc. technique may also allow greater control over who can change combinations, when combinations may be changed, how, etc. door lock combinations may be changed. Of course, similar schemes, techniques, etc. to those described above may be used in any similar situation, system, device network, etc. For example, such a configuration, provisioning, etc. scheme may be used for any system that employs one or more relatively smart resources, systems, central controls, etc. together with an array, system, collection, etc. of relatively dumb accessories, sensors, actuators, and the like, etc. In this case part or all of the provisioning, configuration, etc. may be performed on the relatively smart device and parts, portions, elements, etc. of the configuration, provisioning, etc. may then be transferred, moved, copied, etc. to one or more of the relatively dumb devices.

In one embodiment, for example, the act of creating, editing or otherwise manipulating, altering, etc. a provisioning file, configuration file, etc. may be triggered, initiated, controlled, managed, performed manually, performed automatically, etc. by any trigger, event, etc. For example provisioning, etc. may be triggered by a user, OEM, manufacturer, etc. Provisioning, etc. may, for example, be required before a device is first used, and/or before a device can connect or be connected to another device, system, network, etc. Provisioning, etc. may, for example, be required after a device is registered by a user. For example, a user may purchase a device and then be required to register and provision the device. Provisioning, etc. may be triggered, for example, by the purchase of one or more devices, subscriptions, upgrades, or other services. For example, a webcam may be purchased and then provisioned to upload images to a cloud service with such provisioning occurring after the device is registered and the user subscribes to the cloud storage service. Of course any similar event, etc. may be used to trigger, may be used as a trigger, or may otherwise cause, etc. provisioning to occur. In one embodiment, for example, the initial act of configuration of a device, or devices, or services, etc. may be referred to as provisioning. In one embodiment, for example, the configuration of a device, or devices, or services, etc. that occurs after any initial provisioning may be referred to as configuration. Thus for example, there may be only one provisioning step, which in some cases may be required for device operation, but there may be zero, one or more configuration steps during the life of a device. However, in general, any number, type, form, etc. of provisioning and/or configuration steps, functions, operations, etc. may be performed in any sequence, at any time, on any combination of devices, systems, etc. In one embodiment, for example, the configuration and/or provisioning of a device, or devices, or services, etc. may be performed before, during, as part of, or after the process, function, etc. corresponding to onboarding. For example, onboarding a device may correspond to joining, connecting, etc. a device to a network, system, other device, service, etc. and/or registering a device, etc. Although the use of the term onboarding is not always consistent between manufacturers, OEMs, users, etc. and across different devices, different manuals and/or other documentation, etc. generally the process of provisioning and/or configuration or part of the process of provisioning and/or configuration generally occurs before onboarding, though it need not necessarily occur before onboarding.

A provisioning file containing an identification header area 4-210, an encrypted portion 4-220, and an override area 4-230 can be used in accordance with many use models, and in accordance with many protocols. A selection of which use models and protocols are shown and discussed as pertaining to the following figure.

FIG. 96 presents several examples of use model protocols 4-4A00 as used for secure device deployment using a partially-encrypted provisioning file, in one embodiment. As an option, one or more instances of use model protocols 4-4A00 or any aspect thereof may be implemented in the context of the architecture and functionality of the embodiments described herein. Also, the use model protocols 4-4A00 or any aspect thereof may be implemented in any desired environment. It should also be noted that the aforementioned definitions may apply within the context of the present description.

The use model protocols 4-4A00 comprises the aspects shown. This exemplary set of use model protocols 4-4A00 as well as other embodiments may implement additional features. Strictly as examples:

In production, manufacturer performs provisioning of devices at manufacture time (e.g., including preparation and installation of a provisioning file).

A manufacturer performs some steps of a provisioning process at the time of device manufacture, and remaining steps are performed after purchase (e.g., in conjunction with purchases of optional services, upgrades, etc.).

A user uses manufacturer-provided tools to perform provisioning (e.g., after device purchase).

A user changes provisioning after initial provisioning.

Provisioning is performed in conjunction with a device update (e.g., update to firmware, services, bug fix, etc.).

Provisioning can be used to enable additional services (e.g., to facilitate use in advertising, revenue generation, customer reward, combinations of these and/or other services, features and the like).

FIG. 97 shows a method for establishing communication with a device, in accordance with one embodiment. As an option, the method 4-4B50 may be implemented in the context of any other figure(s) or accompanying description(s). Of course, however, the method 4-4B50 may be implemented in the context of any desired environment. It should also be noted that the aforementioned definitions may apply within the context of the present description.

As shown in the method 4-4B50, communication may be established between a device D1 and a client C1 in the following steps:

Step 0: Setup may establish the connection information (e.g., IP addresses, ports, etc.) as well as credentials, etc. required. See operation 4-456.

Step 1: Connection may be performed with the following steps: (e.g., Steps 2-8).

Step 2: User U1 may point (e.g., enter information on a keyboard, etc.) a web browser WB1 or other application program, etc. that are running on client C1 to a web page (e.g., at yoics.com and a pre-assigned page, or directed to a specific web page via login/username/password, etc.). See operation 4-452.

Step 3: User U1 may see a list of devices L1 including device D1 (D1 may be a camera for example). See also operation 4-452.

Step 4: User U1 may initiate a connection to device D1 by selecting device D1 from L1 (or otherwise choosing one or more device, etc.). See operation 4-454.

Step 5: Application Y2 may create a chat application CA2 (or CA2 may already be running, etc.). See operation 4-458. CA2 already has information established, for example, by Step 0: Setup required to connect to or communicate with, etc. device D1. This information may be used in various operations, including any invocations of operation 4-456.

Step 6: CA2 on C1 may initiate the connection to device D1 by sending, for example, a message "C1 wishes to connect to D1" to the service, YS1. See operation 4-460.

Step 7: The service YS1 may broker (e.g., setup, help, initiate, etc.) a session between client C1 and device D1 by passing connection information to client C1 and to device D1. See operation 4-462. The connection information may include, but is not limited to session keys, IP addresses, ports, etc.

Step 8: Once client C1 and device D1 receive connection information from YS1 they may communicate as if they had established communication directly between themselves. See operation 4-464.

Note that other mappings (e.g., static, dynamic, configurable, etc.) are also possible. For example, in one embodiment, a first address A1 (e.g., 127.0.0.2) could be setup to always map to a particular device D1. In one embodiment, a first address A1 (e.g., 127.0.0.2) could be setup to always map to a specific port P1 (e.g., 127.0.0.2:999). Of course the connection(s) (e.g., mapping, etc.) and/or connection type(s) (e.g., address, port, etc.) may also be programmed, programmable, configurable, under software control, etc. For example, in one embodiment, the act of trying to connect to 127.0.0.2:999 may automatically setup the connection as described above. The setup can be performed in the background, and can be triggered, initiated, established, etc. using any known technique. For example, in one embodiment, running one or more virtual proxies may set up one or more connections. In one embodiment, the connections may be kept alive (e.g., using keep-alive or other known techniques, etc.) so as to have these connections always in place. Of course the connections may be programmable and/or configurable. The connections may be permanent (e.g., fixed, kept alive, etc.) or dynamic (e.g., transient, temporary, configurable, with timeout, etc.).

FIG. 98 shows a method for establishing authenticated and secure communication with a device, in accordance with one embodiment. As an option, the method 4-4B51 may be implemented in the context of any other figure(s) or accompanying description(s). Of course, however, the method 4-4B51 may be implemented in the context of any desired environment. It should also be noted that the aforementioned definitions may apply within the context of the present description.

The shown method 4-4B51 includes steps for processing a provisioning file (see operation 4-463 and operation 4-465). In particular, after securing a session between a client and a device (see operation 4-462), operation 4-463 is performed so as to retrieve the provisioning file from the device (e.g., using the connection established by operation 4-462). Various known-in-the-art operations (e.g., checksum checks, etc.) are performed to authenticate the provisioning file and to perform decryption. In exemplary cases the decryption is performed in accordance with aspects found in the provisioning file. For example, decryption may be performed using a decryption scheme as indicated by one or more instances of an encoding identifier. For example, a first override area or encrypted area may be decrypted using a first encryption scheme based on a first encoding identifier and a second override area or encrypted area may be decrypted using a second encryption scheme based on a second encoding identifier.

FIG. 99 shows the contents of a computer program containing device information including a partially-encrypted provisioning file, in accordance with one embodiment. As an option, the computer program 4-4C00 may be implemented in the context of any other figure(s) or accompanying description(s). Of course, however, the computer program 4-4C00 may be implemented in the context of any desired environment. It should also be noted that the aforementioned definitions may apply within the context of the present description.

The computer program 4-4C00 may contain (but is not limited to) the following fields: Owner User ID, Device Type, Device Address, Last Contacted, Device State, Web Viewer URL, Client Download, Viewer Registration URL, Secured, Supports UDP, UDP Port, Supports TCP, Chat Server Port, Supports Reflector, Enabled, Chat Server, Security Key, Device Last IP, Device Alias, Server Encryption, Encryption Flag, Minimum Encryption, Global, Last State Changed, Access List, Recent Sessions, etc. Of course in other embodiments fewer fields may be used, or more fields may be used containing similar information, etc.

Additional Embodiments of the Disclosure

Additional Practical Application Examples

FIG. 100 is a block diagram of a system for implementing all or portions of any of the embodiments described herein, in one embodiment. As an option, the present system 4-500 may be implemented in the context of the architecture and functionality of the embodiments described herein. Of course, however, the system 4-500 or any operation therein may be carried out in any desired environment. As shown, system 4-500 comprises at least one processor and at least one memory, the memory serving to store program instructions corresponding to the operations of the system. As shown, an operation can be implemented in whole or in part using program instructions accessible by a module. The modules are connected to a communication path 4-505, and any operation can communicate with other operations over communication path 4-505. The modules of the system can, individually or in combination, perform method operations within system 4-500. Any operations performed within system 4-500 may be performed in any order unless as may be specified in the claims. The embodiment of this figure implements a portion of a computer system, shown as system 4-500, comprising a computer processor to execute a set of program code instructions (see module 4-510) and modules for accessing memory to hold program code instructions to perform: establishing an IP connection between a first computing platform and a first device (see module 4-520); retrieving one or more messages over the IP connection wherein at least a portion of the one or more messages comprise a provisioning file (see module 4-530); authenticating at least one aspect of the provisioning file (see module 4-540); and decrypting at least one aspect of the provisioning file (see module 4-550).

FIG. 101 is an environment 5-1A00 that supports using multiple connection URLs to enable load balanced inter-device messaging, according to one embodiment. As an option, one or more instances of environment 5-1A00 or any aspect thereof may be implemented in the context of the architecture and functionality of various embodiments described herein. Also, environment 5-1A00 or any aspect thereof may be implemented in any desired environment. It should also be noted that the aforementioned definitions may apply within the context of the present description.

The environment 5-1A00 comprises the aspects shown. This exemplary embodiment as well as other embodiments may implement additional features. Environment 5-1A00 comprises various computing systems interconnected by a network 5-108. Network 5-108 can comprise any combination of a wide area network (WAN), local area network (LAN), wireless network, wireless LAN (WLAN), or any similar means for enabling communication of computing systems. Network 5-108 can also collectively be referred to as the Internet. Environment 5-1A00 comprises a representative instance of a push server 5-111, a representative Yoics notification service (e.g., implemented on a YNS host server 5-112), a plurality of notification servers 5-113 (e.g., notification server 5-113$_k$, notification server 5-113$_N$), a representative instance of a listener device 5-110, a representative notification device 5-114, and a representative variety of types and instances of listener device 5-110 and notification device 5-114 (e.g., a router 5-101, a laptop 5-102, a web camera 5-103, a mobile phone 5-104, a tablet 5-105, a desktop 5-106, and a storage device 5-107). Listener device 5-110 and notification device 5-114 can represent any type of device as described in this disclosure. A protocol 5-120 depicts operations and communications on and among listener device 5-110, push server 5-111, YNS host server 5-112, the plurality of notification servers 5-113, and notification device 5-114. Protocol 5-120 represents the key activities in a system that supports using multiple connection URLs to enable load balanced (e.g., between the plurality of notification servers 5-113) inter-device messaging.

More specifically, in the example of protocol 5-120, notification device can be any device (e.g., web camera 5-103, etc.) enabled with embedded notification services. Further, listener device 5-110 can be any device (e.g., mobile handset, mobile phone 5-104, tablet 5-105, etc.) hosting a client application (e.g., "app") that is listening (e.g., has notification turned on) to one or more notification devices and receiving push notifications, wherein the client application can be a third-party application using the YNS APIs, and the push notifications can be asynchronous messages. More specifically, push notifications can include an "in-app" notification received by the app when it is running, and an "out-app" notification received and displayed by listener device 5-110 when the app is not running.

Specifically, protocol 5-120 and environment 5-1A00 support a notification service (NS) that provides enabled products (e.g., notification device 5-114) with generic methods to communicate notifications (e.g., events and alarms) with the product's registered owner (e.g., user of listener device 5-110) over mobile notification or push systems (e.g., through push server 5-111), such as the Apple Push Notification Service (APNS), the Google Cloud Messaging (GCM), or JPush platforms. These notifications can be application specific (e.g., supporting network cameras with motion and audio alarm capabilities). As shown in protocol 5-120, YNS usage can begin with listener device 5-110 registering for notification (e.g., can be off by default) with a push server at push server 5-111 (e.g., APNS for iOS handsets, or GCM or JPush for Android handsets). Push server 5-120 then provides a notification token back to listener device 5-110 to allow listener device 5-110 to be setup for notifications and listening (e.g., to specifically enabled notification devices) with the YNS at YNS host server 5-112. This step can be done, for example, in conjunction with registering a remote storage solution for storing recorded video (e.g., YouTube), since the YNS may not store all event data. Also, the client app API can use a common load balanced URL (e.g., notification.yoics.net) to access the YNS APIs. When some event occurs on notification device 5-114, the notification event (e.g., a single message from a notification device) will be communicated with the YNS at YNS host server 5-112. In some embodiments, notification device 5-114 can use multiple primary base URLs (e.g., notify1.yoics.net, notify2.yoics.net, notify3.yoics.net, notify4.yoics.net, etc.) to contact the NS, wherein the server at each URL contains the same APIs and capabilities. In some embodiments, these URLs can be used (e.g., by a standard UpTube notification engine or daemon) in a random access pattern. YNS host server 5-112 will first verify access for notification device 5-114 (e.g., as a firewall) and then prepare to route the message by performing a server load balancing analysis. YNS host server 5-112 can choose to route the notification message to any of the plurality of notification servers 5-113 to optimize the load balancing of the servers. As shown in protocol 5-120, YNS host server 5-112 routes the notification to notification server 5-113$_i$, which forwards the notification to the push service (e.g., back-end service such as APNS, GCM, or JPush) at push server 5-111. In the final step, push server 5-111 delivers the push notification from notification device 5-114 to listener device 5-110. In some embodiments, the push notification can be an SMTP notification (e.g., an email message sent to the registered user's email address).

The operational and communication flow through a representative YNS system is shown in the following diagram.

FIG. 102 is a block diagram depicting a system 5-1B00 for using multiple connection URLs to enable load balanced inter-device messaging, in one embodiment. As an option, one or more instances of system 5-1B00 or any aspect thereof may be implemented in the context of the architecture and functionality of various embodiments described herein. Also, system 5-1B00 or any aspect thereof may be implemented in any desired environment. It should also be noted that the aforementioned definitions may apply within the context of the present description.

As shown in FIG. 102, system 5-1B00 comprises a notification subsystem 5-130 in communication with listener device 5-110, push server 5-111, and notification device 5-114 from environment 5-1A00. A device profile store 5-141 and a memory cache 5-142 are also included in system 5-1B00. Notification subsystem 5-130 further comprises a firewall module 5-131, a load balancer module 5-132, the plurality of notification servers 5-113 from environment 5-1A00, an event history store 5-133, an authentication module 5-134, a registration module 5-135, and a provisioning module 5-136. This exemplary embodiment as well as other embodiments may implement additional features. The flow of systems 5-1B00 starts with notification device 5-114 sending a notification message to notification subsystem 5-130 through firewall module 5-131. Firewall module 5-131 validates access for notification device 5-114 and validates the message before sending it on to load balancer module 5-132 for determining the optimized routing of the message for balancing the load on the plurality of notification servers 5-113. The notification message then gets sent to notification subsystem 5-130, then to push server 5-111, and then on to listener device 5-110. Other modules and components shown in system 5-1B00 that support various functions are memory cache 5-142 and device profile store 5-141 (e.g., access to list of notification devices, device profile information, etc.); authentication module 5-134 (e.g., user login credential verification, etc.); registration module 5-135 (e.g., device and listener registration processing, etc.); and provisioning module 5-136 (e.g., cloud storage setup and provisioning, etc.).

FIG. 103 is a diagram showing a notification device protocol 5-200 for use in systems that use multiple connection URLs to enable load balanced inter-device messaging, in one embodiment. As an option, one or more instances of notification device protocol 5-200 or any aspect thereof may be implemented in the context of the architecture and functionality of various embodiments described herein. Also, notification device protocol 5-200 or any aspect thereof may be implemented in any desired environment. It should also be noted that the aforementioned definitions may apply within the context of the present description.

The notification device protocol 5-200 comprises the aspects shown. This exemplary embodiment as well as other embodiments may implement additional features. Notification device protocol 5-200 depicts operations and communications on and among YNS host server 5-112 and notification device 5-114 from environment 5-1A00. Specifically, notification device protocol 5-200 shows that notification device 5-114 must request a transaction code from the YNS before notifications can be sent. In some embodiments, a transaction code can be an authorization string provided by the NS, allowing a notification device to send notification messages to the NS. The YNS may reject the request for the transaction code under certain conditions (e.g., related to send rate and correct message formatting). All transactions to send a notification must include a valid and active (e.g., not expired) transaction code. The transaction code can be an alpha numeric code that is of a minimum length (e.g., 16 characters). The client may also need to provide the device UID as a parameter for the transaction code request. Table 1 is an example of the transaction code request (e.g., call) format. The server and path information can be controlled by templates in a configuration file.

TABLE 1

| Ref | Information |
|---|---|
| 1 | http://<server>/request_code.php?uid=<uid>&type=<respformat> |
| 2 | where, |
| 3 | <server> is the server name (e.g., notify1.yoics.com) |
| 4 | <uid> is the formatted (e.g., with colons) device id for the device |
| 5 | <respformat> is "json" or "xml" designating the response format |

The YNS at YNS host server 5-112 will then analyze the transaction code request. The response to the transaction code request can either be in "json" format or in "xml" format depending on the "type" parameter. The default can be "json" if no format is provided. For example, if the response format is "json" and the operation succeeds the response will be as shown in Table 2.

TABLE 2

| Ref | Information |
|---|---|
| 1 | { "NewDataSet": { "Table": [ {"status": "ok", "code":"<code>"}] }} |

If the response format is "json" and an error occurs the response will be as shown in Table 3.

TABLE 3

| Ref | Information |
|---|---|
| 1 | { "NewDataSet": { "Table": [ {"status": "error", "error":"<errorcode>", "errorid":"<errorid>", "message":"<errormessage>"}] }} |

If the format is "xml" and the operation succeeds the response will be as shown in Table 4.

TABLE 4

| Ref | Information |
|---|---|
| 1 | <NewDataSet> |
| 2 |   <Table> |
| 3 |     <status>ok</status> |
| 4 |     <code>code</code> |
| 5 |   </Table> |
| 6 | </NewDataSet> |

If the response format is "xml" and an error occurs the response will be as shown in Table 5.

TABLE 5

| Ref | Information |
|---|---|
| 1 | <NewDataSet> |
| 2 |   <Table> |
| 3 |     <status>error</status> |
| 4 |     <errorcode>errorcode</errorcode> |
| 5 |     <errorid>errorid</errorid> |
| 6 |     <message>errormsg</message> |
| 7 |   </Table> |
| 8 | </NewDataSet> |

After notification device 5-114 receives the transaction code, a notification message or request may be sent to the YNS at YNS host server 5-112. If the transaction code is valid, the YNS will queue the message for delivery and return a successful status to notification device 5-114. Notification device 5-114 may not wait or be informed of the actual delivery status of the notification message. Table 6 is an example of the notification request (e.g., call) format. The server and path information can be controlled by templates in a configuration file.

TABLE 6

| Ref | Information |
|---|---|
| 1 | http://<server>/send_notification.php?transaction_code=<transactioncode>&uid=<uid>&device_type=<devicetype>&event_type=<eventtype>&timestamp=<timestamp>&message=<message>&status=<status>&transaction_hash=<transactionhash>&type=<respformat> |
| 2 | where, |
| 3 | <server> is the server name (e.g., notify1.yoics.com), |
| 4 | <transaction_code> is a valid transaction code acquired from the server |
| 5 | <uid> is the formatted (e.g., with colons) device id for the device |
| 6 | <device_type> unique device type stored in the configuration file |
| 7 | <event_type> event type (e.g., audio, video, status, etc.) |
| 8 | <timestamp> timestamp for the event using the format "%Y%m%d%H%M%S" |
| 9 | <message> base64 encoded message string |
| 10 | <status> base64 encoded status string |

TABLE 6-continued

| Ref | Information |
| --- | --- |
| 11 | <transactionhash> hash field from template in configuration file |
| 12 | <respformat> is "json" or "xml" designating the response format |

The notification message response will either be in "json" format or in "xml" format depending on the "type" parameter. The default can be "json" if no format is provided. If the response format is "json" and the operation succeeds the response will be as shown in Table 7.

TABLE 7

| Ref | Information |
| --- | --- |
| 1 | { "NewDataSet": { "Table": [ {"status": "ok"}] }} |

If the response format is "json" and an error occurs the response will be as shown in Table 8.

TABLE 8

| Ref | Information |
| --- | --- |
| 1 | { "NewDataSet": { "Table": [ {"status": "error", "error":"<errorcode>", "errorid":"<errorid>", "message":"<errormessage>"}] }} |

If the format is "xml" and operation succeeds the response will be as shown in Table 9.

TABLE 9

| Ref | Information |
| --- | --- |
| 1 | <NewDataSet> |
| 2 | <Table> |
| 3 | <status>ok</status> |
| 4 | </Table> |
| 5 | </NewDataSet> |

If the response format is "xml" and an error occurs the response will be as shown in Table 10.

TABLE 10

| Ref | Information |
| --- | --- |
| 1 | <NewDataSet> |
| 2 | <Table> |
| 3 | <status>error</status> |
| 4 | <errorcode>errorcode</errorcode> |
| 5 | <errorid>errorid</errorid> |
| 6 | <message> errormsg</message> |
| 7 | </Table> |
| 8 | <NewDataSet> |

FIG. 104 is a diagram showing a listener device protocol 5-3A00 for use in systems that use multiple connection URLs to enable load balanced inter-device messaging, in one embodiment. As an option, one or more instances of listener device protocol 5-3A00 or any aspect thereof may be implemented in the context of the architecture and functionality of various embodiments described herein. Also, listener device protocol 5-3A00 or any aspect thereof may be implemented in any desired environment. It should also be noted that the aforementioned definitions may apply within the context of the present description.

The listener device protocol 5-3A00 comprises the aspects shown. This exemplary embodiment as well as other embodiments may implement additional features. Listener device protocol 5-3A00 depicts operations and communications on and among listener device 5-110 and YNS host server 5-112 from environment 5-1A00. In general, listener device 5-110 running a client application must first be authorized by the YNS before it can call the YNS for notification settings and features. This requires the YNS to process a security authorization (e.g., logging in to the YNS using a login API at authentication module 5-134 from system 5-1B00, or a "platform-specific" SDK), sending a valid API token to listener device 5-110, and listener device 5-110 saving and using the valid API token when interacting with the NS. If an invalid token error response is received during authorization, for example, the client app must be authorized again to obtain a new token.

Tokens may expire at any time based on service usage and security settings. After these initialization steps, the client app on listener device 5-110 can manage notification settings and configuration by first asking the YNS for the current user's notification settings (e.g., global settings, mobile handsets, listener devices, notification devices, etc.), and then parsing and saving the returned notification settings information. Next, the client app will need to register the user's mobile handset. The registration process can vary with the mobile handset platform, but each of the processes are very well defined by the platform manufacturer (e.g., Apple, Google, etc.). In one example, as shown within listener device protocol 5-3A00, registration of listener device 5-110 calls for listener device 5-110 to get a push token and a unique device ID. A push token is a unique identifier provided by a push service that maps the user's handset to the client application. Both Apple iOS and Google Android SDKs, for example, provide the push token service to mobile applications. Also, the unique device ID can be obtained from the platform SDK. This ID should be saved as it will be needed to register the listener device 5-110 as a "listener" (see below). With this information, listener device 5-110 can then request device registration from the NS, which can then register the device (e.g., at registration module 5-135 of system 5-1B00).

The second step in receiving notifications is to register the listener device 5-110 as a "listener" with the NS. This registration provides a virtual mapping of one or more listener devices to one or more notification devices. This mapping includes how to send notification messages received from a notification device to specific listener devices (e.g., mobile handsets). There may be multiple listener devices registered. Specifically, referring to listener device protocol 5-3A00, the client app at listener device 5-110 can request listener registration using the unique device ID of listener device 5-110 and notification device ID (e.g., from user notification settings) of the target notification device. With this information, the YNS at YNS host server 5-112 (e.g., using registration module 5-135) can register the listener. To remove a listener, the client app can make the same API call with the remove action. During device registration, the client app must inform the YNS that a new device is being registered. This allows the YNS to perform privacy checks and clean up any older settings and events from previous registrations for the specific device. This step must be performed under very specific conditions. The client app must call the YNS during pre-registration after removing the device and before registering the device. This step prevents potential security vulnerabilities between device registrations where a device may have been previously registered by another user.

Other operations between and among listener device 5-110 and YNS host server 5-112 are also shown in listener device protocol 5-3A00, including: (1) manage the mobile platform's push service delivery methods for in-app notifications; (2) manage the mobile platform's application startup modes to detect being started as a result of an out-app notification event and immediately display the relevant content; (3) retrieve event history (e.g., notification history, or a saved listing of recent messages from a notification device for one or more listener devices) from the YNS show the user's recent events; (4) send the YNS instructions on clearing events from the event history; and (5) send the YNS instructions on renaming and deleting notification devices as appropriate for the application. In some embodiments, some user accounts can have service restrictions, where the YNS allows notification delivery and saves notification history based on published service levels. These service levels and settings are specific to each YNS user and may change accordingly. These settings typically affect items such as push delivery methods, push message frequency, and save event history. Further, some user accounts can qualify for an event cloud provisioning and storage service. If enabled, the provisioning API in the YNS (e.g., at provisioning module 5-136) is activated to provision the storage using a storage service. After provisioning, the client app can configure devices to use the storage service. When listener device 5-110 has been completely setup with the NS, it can then listen for notifications.

The following describes in more detail implementations of listener device protocol 5-3A00 (e.g., as the client API), according to some embodiments.

API Login—the YNS API uses the Yoics Service API for authenticating the client API requests. This involves logging in to the Yoics Service API to obtain an authentication and authentication token. All Yoics related handset applications would already have done the login to authenticate the user, for which the API token is then easily obtained in the login response message. This authentication token will be referred to as the '<yoicstoken>'.

Apple Push Registration—iOS applications must contact the APNS to obtain a registration token. This process informs the APNS that this application has been authorized to receive push notifications. The process will return an APNS token that must be provided to the YNS during handset registration. This token will be referred to as '<apnstoken>' or, more generically, as '<pushtoken>' when iOS handsets are involved.

Google GCM Registration—Android applications must contact the GCM service to obtain a registration token. This process informs the GCM that this application has been authorized to receive push notifications. The process will return a GCM token that must be provided to the YNS during handset registration. This token will be referred to as '<gcmtoken>' or, more generically, as '<pushtoken>' when Android handsets are involved.

JPush Registration—Android applications must contact the JPush service to obtain a registration token. This process informs the JPush that this application has been authorized to receive push notifications. The process will return a JPush token that must be provided to the YNS during handset registration. This token will be referred to as '<jpushtoken>' or, more generically, as '<pushtoken>' when Android handsets are involved.

YNS Handset Registration—Each handset intending to receive notifications from the YNS must be registered with the YNS. This requires the handset to send its unique identifier and the appropriate <pushtoken> to the YNS. The YNS will save this information for use in delivery notifications that arrive from the user's YNS enabled products. As an example, before an iOS device is registered for receiving notifications, ServerCallYNSAPI class must be initialized with the appropriate yoicsID, YoicsToken and PushToken as shown in Table 11.

TABLE 11

| Ref | Information |
|---|---|
| 1 | (void) initializeWithYoicsID:(NSString*)yoicsID |
| 2 | yoicsToken:(NSString*)yoicsToken |
| 3 | apnsToken:(NSString*)apnsToken; |

YNS Handset Registration Request—Once a push registration has been acquired from the appropriate push service, the handset registration request can be sent to the YNS.

YNS Handset Registration Request Format—To register or enable an iOS device handset to receive notifications, use the below API defined in ServerCallYNSAPI.m, as shown in Table 12.

TABLE 12

| Ref | Information |
|---|---|
| 1 | (void) registerHandsetWithPushEnabled:(BOOL)pushEnabled |
| 2 | smtpEnabled:(BOOL)smtpEnabled |
| 3 | success:(void (^)(NSDictionary*response))success |
| 4 | failure:(void (^)(NSError *error))failure; |
| 5 | Example: |
| 6 | [[ServerCallYNSAPI sharedClient] registerHandsetWithPushEnabled:pushEnabled |
| 7 | smtpEnabled:smtpEnabled |
| 8 | success:^(NSDictionary *response) { |
| 9 | <some-success-handler-code> |
| 10 | } |
| 11 | failure:^(NSError * error) |
| 12 | { |
| 13 | <some-failure-handler-code> |
| 14 | } |

TABLE 12-continued

| Ref | Information |
|---|---|
| 15 | ]; |
| 16 | The following is an example of the calling format. |
| 17 | http://<server>/register_handset.php?yoicsid=<yoicsid>&yoics_token=<yoics_token>&push_token=<push_token>>&push_system=<push_system>&handset_uid=<handset_uid>&platform=<platform>&manufacturer=<manufacturer>&version=<version>>&mode=<mode>&type=<respformat> |
| 18 | where |
| 19 | <yoicsid> is the registered user's Yoics account (Base64) |
| 20 | <email> is the registered user's email address (Base64) |
| 21 | <yoics_token> is the Yoics login token received from the Login API |
| 22 | <push_token> is push registration token from APNS, GCM, JPush |
| 23 | <push_system> is push system identifier APNS, GCM or JPush [1] |
| 24 | <handset_uid> unique handset ID from the mobile device |
| 25 | <platform> is the mobile handset type (ANDROID or IOS) |
| 26 | <manufacturer> is the mobile handset manufacturer (Apple, Samsung, etc.) |
| 27 | <version> is the mobile handset OS version |
| 28 | <mode> is the mobile application notification mode |
| 29 | <push> indicates if the user wants push notifications (yes or no) |
| 30 | <smtp> indicates if the user wants SMTP notifications (yes or no) |
| 31 | Note [1]: optional field (defaults to APNS on iOS, GCM on Android) |

To unregister/disable a handset from receiving notifications use the below API defined in ServerCallYNSAPI.m, as shown in Table 13.

TABLE 13

| Ref | Information |
|---|---|
| 1 | + (void) unregisterHandsetWithSuccess:(void (^)(NSDictionary*response))success |
| 2 | failure:(void (^)(NSError *error))failure; |

YNS Handset Registration Response—The response will either be in json format or in xml format depending on the "type" parameter. The default is "xml" if no format is provided. If the response format is json and the operation succeeds the response will be as shown in Table 14.

TABLE 14

| Ref | Information |
|---|---|
| 1 | { "NewDataSet": { "Table": [ {"status": "ok"}] }} |

If the response format is json and an error occurs the response will be as shown in Table 15.

TABLE 15

| Ref | Information |
|---|---|
| 1 | { "NewDataSet": { "Table": [ {"status": "error", "error":"<errorcode>", "errorid":"<errorid>", "message":"<errormessage>"}] }} |

If the format is xml and operation succeeds the response will be as shown in Table 16.

TABLE 16

| Ref | Information |
|---|---|
| 1 | <NewDataSet> |
| 2 | <Table> |
| 3 | <status>ok</status> |

TABLE 16-continued

| Ref | Information |
|---|---|
| 4 | </Table> |
| 5 | </NewDataSet> |

If the response format is xml and an error occurs the response will be as shown in Table 17.

TABLE 17

| Ref | Information |
|---|---|
| 1 | <NewDataSet> |
| 2 | <Table> |
| 3 | <status>error</status> |
| 4 | <errorcode>errorcode</errorcode> |
| 5 | <errorid>errorid</errorid> |
| 6 | <message> errormsg</message> |
| 7 | </Table> |
| 8 | </NewDataSet> |

YNS Handset Registration Possible Error Codes—The following <errorcode>, <errorid>, <message> attributes may be received from the API as shown in Table 18.

TABLE 18

| Ref | Information |
|---|---|
| 1 | "InvalidToken", "1000", "The Yoics token failed validation" |
| 2 | "RegisterHandsetFailed", "1002", "<textual explanation>" |
| 3 | "RegisterUserFailed", "1001", "<textual explanation>" |
| 4 | "UnexpectedError", "9999", "<textual explanation>" |

YNS Device Listener Registration Request—Once a handset has been registered with the YNS, the user may request to receive notification events (called a listener) coming from one of their YNS enabled devices.

YNS Device Listener Request Format—Use below API defined in ServerCallYNSAPI.m to add an iOS device as a listener as shown in Table 19.

TABLE 19

| Ref | Information |
|---|---|
| 1 | + (void) registerDeviceListenerWithDeviceUID:(NSString*)deviceUID |
| 2 | success:(void (^)(NSDictionary *response))success |
| 3 | failure:(void (^)(NSError *error))failure; |
| 4 | Example: |
| 5 | http://<server>/register_listener.php?yoicsid=<yoicsid>&yoics_token=<yoics_token>&devicve_uid=<device_uid>&handset_uid=<handset_uid>&action=<action>&type=<respformat> |
| 6 | where, |
| 7 | <yoicsid> is the registered users Yoics account (Base64) |
| 8 | <yoics_token> is the Yoics login token received from the Login API |
| 9 | <handset_uid> unique handset ID from the mobile device |
| 10 | <device_uid> is the Yoics device's unique identifier |
| 11 | <action> indicates either 'add' or 'remove' listener (add or remove) |

Use below API defined in ServerCallYNSAPI.m to remove a handset as a listener for a particular Yoics enabled device as shown in Table 20.

TABLE 20

| Ref | Information |
|---|---|
| 1 | + (void) unregisterDeviceListenerWithDeviceUID:(NSString*)deviceUID |
| 2 | success:(void (^)(NSDictionary *response))success |
| 3 | failure:(void (^)(NSError *error))failure; |

YNS Device Listener Response—The response will either be in json format or in xml format depending on the "type" parameter. The default is "xml" if no format is provided. If the response format is json and the operation succeeds the response will be as shown in Table 21.

TABLE 21

| Ref | Information |
|---|---|
| 1 | { "NewDataSet": { "Table": [ {"status": "ok"}] }} |

If the response format is json and an error occurs the response will be as shown in Table 22.

TABLE 22

| Ref | Information |
|---|---|
| 1 | { "NewDataSet": { "Table": [ {"status": "error", "error": "<errorcode>", "errorid":"<errorid>", "message": "<errormessage>"}] }} |

If the format is xml and operation succeeds the response will be as shown in Table 23.

TABLE 23

| Ref | Information |
|---|---|
| 1 | <NewDataSet> |
| 2 | <Table> |
| 3 | <status>ok</status> |
| 4 | </Table> |
| 5 | </NewDataSet> |

If the response format is xml and an error occurs the response will be as shown in Table 24.

TABLE 24

| Ref | Information |
|---|---|
| 1 | <NewDataSet> |
| 2 | <Table> |
| 3 | <status>error</status> |
| 4 | <errorcode>errorcode</errorcode> |
| 5 | <errorid>errorid</errorid> |
| 6 | <message> errormsg</message> |
| 7 | </Table> |
| 8 | </NewDataSet> |

YNS Device Listener Registration Possible Error Codes—The following <errorcode>, <errorid>, <message> attributes may be received from the API as shown in Table 25.

TABLE 25

| Ref | Information |
|---|---|
| 1 | "InvalidToken", "1000", "The Yoics token failed validation" |
| 2 | "ListenerFailed", "2003", "Listener failed to get added to database" |
| 3 | "UnknownDevice", "2002", "no device found:" <device_uid> |
| 4 | "UnknownHandset", "2001", "no handset found:" <handset_uid> |
| 5 | "UnexpectedError", "9999", "<textual explanation>" |

YNS Event History Request—At any time, the mobile application may request a list of the events for their account. This history includes all notification events received from their YNS enabled products and saved according the service definition for their account.

YNS Event History Format—The following APIs for an iOS app are defined in ServerCallYNSAPI.m to get the event history as shown in Table 26.

TABLE 26

| Ref | Information |
|---|---|
| 1 | + (void) getEventHistoryWithSuccess:(void (^)(NSDictionary *response))success<br>        failure:(void (^)(NSError *error))failure; |
| 2 | Example: |
| 3 | [[ServerCallYNSAPI sharedClient ] getEventHistoryWithSuccess: |
| 4 | ^(NSDictionary *response) { |
| 5 | <some-success-handler-code> |
| 6 | } |
| 7 | failure:^(NSError * error) { |
| 8 | <some-failure-handler-code> |
| 9 | } |
| 10 | ]; |

To get the event history based on the index (of events that happened) use the following API defined in ServerCallYN-SAPI.m, as shown in Table 27.

TABLE 27

| Ref | Information |
|---|---|
| 1 | + (void) getEventHistoryFromIndex:(int)fromIndex |
| 2 | numberEvents:(int)numberEvents |
| 3 | WithSuccess:(void (^)(id responseObject))success |
| 4 | failure:(void (^)(NSError *error))failure; |

To get the total numbers of events that occurred use the following API defined in ServerCallYNSAPI. m, as shown in Table 28.

TABLE 28

| Ref | Information |
|---|---|
| 1 | + (void)getEventsCountSuccess:(void (^) (id responseObject)) success failure:(void (^)(NSError *error))failure; |

The following Table 29 is an example of the calling format:

TABLE 29

| Ref | Information |
|---|---|
| 1 | http://<server>/event_history.php?yoicsid=<yoicsid>&yoics_token=<yoics_token>&action=list&type=<respformat> |
| 2 | where |
| 3 | <yoicsid> is the registered users Yoics account (Base64) |
| 4 | <yoics_token> is the Yoics login token received from the Login API |

YNS Event History Response—The response will either be in json format or in xml format depending on the "type" parameter. The default is "xml" if no format is provided. If the format is xml and the operation succeeds the response will be as shown in Table 30.

TABLE 30

| Ref | Information |
|---|---|
| 1 | <NewDataSet> |
| 2 | <Table> |
| 3 | <id>1</id> |
| 4 | <device_uid>00:00:00:00:00:00:00:01 </device_uid> |
| 5 | <message>aHR0cDovL3d3dy55b3V0dWJlLmNvbS93YXRjaD92PXFBYkdtTVBGYnk0</message> |
| 6 | <timestamp>20120118095222</timestamp> |
| 7 | <status>new</status> |
| 8 | <type>video</type> |
| 9 | <updated>1327477743</updated> |
| 10 | <created>1327477743</created> |
| 11 | <delivered>1327477743</delivered> |
| 12 | </Table> |
| 13 | <Table> |
| 14 | <id>2</id> |
| 15 | <device_uid>00:00:00:00:00:00:00:01</device_uid> |
| 16 | <message>aHR0cDovL3d3dy55b3V0dWJlLmNvbS93YXRjaD92PXFBYkdtTVBGYnk0</message> |
| 17 | <timestamp>20120118095228</timestamp> |
| 18 | <status>new</status> |
| 19 | <type>video</type> |
| 20 | <updated>1327477772</updated> |
| 21 | <created>1327477772</created> |
| 22 | <delivered>1327477772</delivered> |
| 23 | </Table> |
| 24 | </NewDataSet> |
| 25 | where |
| 26 | <id> is the unique ID for the event |
| 27 | <device_uid> is the originating Yoics device's unique ID |
| 28 | <message> is the notification message generated by the device (Base64) |
| 29 | <timestamp> is the timestamp as received from the device |
| 30 | <status > is current status of the event (new, pending, delivered) |
| 31 | <type > is the event type as received from the device (video, audio) |
| 32 | <updated > is the YNS timestamp of the last updated status |
| 33 | <created > is the YNS timestamp when the event was recorded |
| 34 | <delivered> is the YNS timestamp when the event was delivered to the messaging system (APNS, GCM, JPush, SMTP) |

If the response format is json and an error occurs the response will be as shown in Table 31.

TABLE 31

| Ref | Information |
|---|---|
| 1 | { |
| 2 | newdataset:{ |
| 3 | table:[ |
| 4 | { |
| 5 | id:1, |

TABLE 31-continued

| Ref | Information |
|---|---|
| 6 | device_uid:'00:00:00:00:00:00:00:01', |
| 7 | message:'aHR0cDovL3d3dy55b3V0dWJILmNvbS93YXRjaD92PXFBYkdtTVBGYnk0', |
| 8 | timestamp:20120118095222, |
| 9 | status:'new', |
| 10 | type:'video', |
| 11 | updated:'1327477743', |
| 12 | created:'1327477743', |
| 13 | delivered:'1327477743' |
| 14 | }, |
| 15 | { |
| 16 | id:2, |
| 17 | device_uid:'00:00:00:00:00:00:00:01', |
| 18 | message:'aHR0cDovL3d3dy55b3V0dWJILmNvbS93YXRjaD92PXFBYkdtTVBGYnk0', |
| 19 | timestamp:20120118095228, |
| 20 | status:'new', |
| 21 | type:'video', |
| 22 | updated:'1327477772', |
| 23 | created:'1327477772', |
| 24 | delivered:'1327477772' |
| 25 | } |
| 26 | ] |
| 27 | } |
| 28 | } |

If the response format is xml and an error occurs the response will be as shown in Table 32.

TABLE 32

| Ref | Information |
|---|---|
| 1 | <NewDataSet> |
| 2 | <Table> |
| 3 | <status>error</status> |
| 4 | <errorcode>errorcode</errorcode> |
| 5 | <errorid>errorid</errorid> |
| 6 | <message> errormsg</message> |
| 7 | </Table> |
| 8 | </NewDataSet> |

YNS Event History Possible Error Codes
Some YNS event history error codes are given in Table 33.

TABLE 33

| Ref | Information |
|---|---|
| 1 | "InvalidToken", "1000", "The Yoics token failed validation" |
| 2 | "UnexpectedError", "9999", "<textual explanation>" |

YNS Event Deletion—At any time, the mobile application may request to delete an event from their event history. This deletion will permanently remove the record from YNS. Table 34 is an example of the calling format.

TABLE 34

| Ref | Information |
|---|---|
| 1 | http://<server>/event_history.php?yoicsid=<yoicsid>&yoics_token=<yoics_token>&idevice_uid=<device_uid>&timestamp=<timestamp>&action=<delete_action>&type=<respformat> |
| 2 | where |
| 3 | <yoicsid> is the registered users Yoics account (Base64) |
| 4 | <yoics_token> is the Yoics login token received from the Login API |
| 5 | <device_uid> is the Yoics device UID for the saved event |
| 6 | <device_action> is the delete action or delete scope (see below) |
| 7 | <timestamp> is the event timestamp as received from the device |
| 8 | <delete_action> or delete scope: |
| 9 | "delete" - uses the <timestamp> to find exact matches for deleting events for the specified <yoicsid> and <device_uid>. |
| 10 | "deleteall" - ignores the <timestamp> for deleting events for the specified <yoicsid> and <device_uid>. |
| 11 | "deleteday" - uses the year, month, day of the <timestamp> for deleting events for the specified <yoicsid> and <device_uid>. |
| 12 | "deleteallbyuser" - ignores the <timestamp> for deleting events for the specified <yoicsid>, ignoring the device_uid and including all applicable devices. |
| 13 | "deletedaybyuser" - uses the year, month, day of the <timestamp> for deleting events for the specified <yoicsid>, ignoring the device_uid and including all applicable devices. |

Table 35 shown the APIs defined in ServerCallYN-SAPI.m for deleting event history.

TABLE 35

| Ref | Information |
|---|---|
| 1 | Delete event of a device of given time (action=delete) : |
| 2 | + (void) deleteEventWithDeviceAddress:(NSString*)deviceAddress |
| 3 | timestamp:(NSString*)timestamp |
| 4 | success:(void (^)(NSDictionary *response))success |
| 5 | failure:(void (^)(NSError *error))failure; |
| 6 | Delete all events of a Device(action=deleteall) : |
| 7 | + (void) deleteAllEventsWithDeviceAddress:(NSString*)deviceAddress success:(void (^)(NSDictionary *response))success |
| 8 | failure:(void (^)(NSError *error))failure; |
| 9 | Delete all events of a device of a specific EventType (action=deleteallbytype): |
| 10 | + (void) deleteAllEventsWithDeviceAddress:(NSString*)deviceAddress |
| 11 | eventType:(NSString*)eventType |
| 12 | success:(void (^)(NSDictionary *response))success |
| 13 | failure:(void (^)(NSError *error))failure; |
| 14 | Delete all events of a user of all devices (action=deleteallbyuser) : |
| 15 | + (void) deleteAllEventsWithSuccess:(void (^)(NSDictionary *response))success failure:(void (^)(NSError *error))failure; |
| 16 | Delete all events of a user of a device with specific UID (action= deleteallbyuser): |
| 17 | + (void) deleteAllEventsByUserWithDeviceAddress:(NSString*)deviceAddress |
| 18 | success:(void (^)(NSDictionary *response))success |
| 19 | failure:(void (^)(NSError *error))failure; |
| 20 | Delete all events of all devices of a user by date (action=deletedaybyuser) : |
| 21 | + (void) deleteAllEventsByDate:(NSString *)dateDelete |
| 22 | success:(void (^) (id responseObject))success |
| 23 | failure:(void (^)(NSError *error))failure; |
| 24 | Delete all events of a specified device of a user by date (action=deleteday) |
| 25 | + (void) deleteAllEventsByDate:(NSString *)dateDelete |
| 26 | deviceAddress:(NSString*)deviceAddress |
| 27 | success:(void (^)(NSDictionary *response))success |
| 28 | failure:(void (^)(NSError *error))failure; |

YNS Event Deletion Response—

The response will either be in json format or in xml format depending on the "type" parameter. The default is "xml" if no format is provided. If the response format is json and the operation succeeds the response will be as shown in Table 36.

TABLE 36

| Ref | Information |
|---|---|
| 1 | { "NewDataSet": { "Table": [ {"status": "ok"}] }} |

If the response format is json and an error occurs the response will be as shown in Table 37.

TABLE 37

| Ref | Information |
|---|---|
| 1 | { "NewDataSet": { "Table": [ {"status": "error", "error":"<errorcode>", "errorid":"<errorid>", "message":"<errormessage>"}] }} |

If the format is xml and operation succeeds the response will be as shown in Table 38.

TABLE 38

| Ref | Information |
|---|---|
| 1 | <NewDataSet> |
| 2 | <Table> |
| 3 | <status>ok</status> |

TABLE 38-continued

| Ref | Information |
|---|---|
| 4 | </Table> |
| 5 | </NewDataSet> |

If the response format is xml and an error occurs the response will be as shown in Table 39.

TABLE 39

| Ref | Information |
|---|---|
| 1 | <NewDataSet> |
| 2 | <Table> |
| 3 | <status>error</status> |
| 4 | <errorcode>errorcode</errorcode> |
| 5 | <errorid>errorid</errorid> |
| 6 | <message> errormsg</message> |
| 7 | </Table> |
| 8 | </NewDataSet> |

YNS Event Deletion Possible Error Codes

Table 40 is an example of the calling format.

TABLE 40

| Ref | Information |
|---|---|
| 1 | "InvalidToken", "1000", "The Yoics token failed validation" |
| 2 | "UnexpectedError", "9999", "<textual explanation>" |

YNS Get User Settings—

At any time, the mobile application may request the notification settings for the user. This is likely needed to confirm settings and display correct settings to the user.

YNS Get User Settings Format—

The following is an example of the calling format as shown in Table 41.

TABLE 41

| Ref | Information |
|---|---|
| 1 | http://<server>/user_settings.php?action=settings&yoicsid=<yoicsid>&type=<respformat> |
| 2 | where |
| 3 | <yoicsid> is the registered users Yoics account (Base64) |
| 4 | <respformat> response format as json or xml |
| 5 | <action> is the settings (see below) |
| 6 | <device_uid> optional parameter for renamedevice and deletedevice actions |
| 7 | <device_name> optional parameter for ranemdevice action |
| 8 | Settings Action: |
| 9 | "settings" - returns the YNS Global Settings for the specified <yoicsid>. |
| 10 | "handsets" - returns the Mobile Handsets for the specified <yoicsid>. |
| 11 | "listeners" - returns the Device Listeners for the specified <yoicsid> |
| 12 | "renamedevice" - informs YNS that a device rename is requested <yoicsid>. This action requires the <device_uid>and <device_name> parameters. |
| 13 | "deletedevice" - informs YNS that a device delete is requested <yoicsid>. This action requires the <device_uid>parameter. |
| 14 | "verifystorage" - informs to provision storage for the requested <yoicsid>. This action requires the <email> parameter indicating the user's registered email address and the <yoics_token> parameter representing an active Yoics API token. |

The following are the API's defined in ServerCallYN-SAPI.m for user settings as shown in Table 42.

TABLE 42

| Ref | Information |
|---|---|
| 1 | action=settings : |
| 2 | + (void) getUserSettingsWithSuccess:(void (^)(NSDictionary *response))success failure:(void (^)(NSError *error))failure; |
| 3 | action=provisionkii : |
| 4 | + (void) getYoicsStorageAccount:(void (^)(id response))success |
| 5 | failure:(void (^)(NSError *error))failure; |
| 6 | action=verifystorage : |
| 7 | + (void) verifyYoicsStorageSettingsWithSuccess:(void (^)(id response))success failure:(void (^)(NSError *error))failure; |
| 8 | action=listeners : |
| 9 | + (void) getDeviceListenersWithSuccess:(void (^)(NSDictionary *response))success failure:(void (^)(NSError *error))failure; |
| 10 | action=deletedevice |
| 11 | + (void)deleteNotificationDeviceUid:(NSString*)deviceUid |
| 12 | success:(void (^)(id responseObject))success |
| 13 | failure:(void (^)(NSError *error))failure; |
| 14 | action=renamedevice |
| 15 | + (void)renameNotification:(NSString*)deviceName |
| 16 | deviceUid:(NSString*)deviceUid |
| 17 | success:(void (^) (id responseObject))success |
| 18 | failure:(void (^)(NSError *error))failure; |
| 19 | action=settings : |
| 20 | + (void)getNotificationSettingsSuccess:(void (^)(id responseObject))success failure:(void (^)(NSError *error))failure; |
| 21 | action=listeners |
| 22 | + (void)getNotificationListenerSuccess:(void (^)(id responseObject))success failure:(void (^)(NSError *error))failure; |

YNS Get User Settings Response—

The response will either be in json format or in xml format depending on the "type" parameter. The default is "xml" if no format is provided. If the response format is json and the operation succeeds the response will be as shown in Table 43.

TABLE 43

| Ref | Information |
|---|---|
| 1 | {"Table":{"yoicsid":"user","email":"email@domain.com", "level":"BASIC or PRO","push":"yes or no","smtp":"yes or no","created":"Epoch date","updated":"Eposh date"}} |

If the response format is json and an error occurs the response will be as shown in Table 44.

TABLE 44

| Ref | Information |
|---|---|
| 1 | { "NewDataSet": { "Table": [ {"status": "error", "error":"<errorcode>", "errorid":"<errorid>", "message":"<errormessage>"}] }} |

If the format is xml and operation succeeds the response will be as shown in Table 45.

TABLE 45

| Ref | Information |
|---|---|
| 1 | User Setting Response |
| 2 | <NewDataSet> |
| 3 |   <Table> |
| 4 |     <yoicsid>dolkein</yoicsid> |
| 5 |     <email>dolkein</email> |
| 6 |     <level>BASIC</level> |
| 7 |     <push>yes</push> |
| 8 |     <smtp>no</smtp> |
| 9 |     <created>1330465582</created> |
| 10 |     <updated>1330465582</updated> |
| 11 |   </Table> |
| 12 | </NewDataSet> |
| 13 | Mobile Handset Response |
| 14 | <NewDataSet> |
| 15 |   <Table> |
| 16 |     <handset_uid>fac245967e34734ddb76d5184aa938f317fee097</handset_uid> |
| 17 |     <push_token>574753c9 b4010703 269a4ebb 1c47b6a9 19f89c1e cbf8dc59 2a21828d 2ad090ef </push_token> |
| 18 |     <platform>iOS</platform> |
| 19 |     <manufacturer>Apple</manufacturer> |
| 20 |     <mode>P:com.philips.cl.insight.bet </mode> |
| 21 |     <version>5.0</version> |
| 22 |     <created>1330465582</created> |
| 23 |     <updated>1330465582</updated> |
| 24 |   </Table> |
| 25 |   <Table> |
| 26 | <handset_uid>9b23dcdfbaba0c854242946dd70344c8213f3785</handset_uid> |
| 27 |     <push_token>e2e12ed 073b1e19 9dbda9b0 31ce5d31 80fe593a 52d4f107 52a8a453 cf153520</push_token> |
| 28 |     <platform>iOS</platform> |
| 29 |     <manufacturer>Apple</manufacturer> |
| 30 |     <mode>P:com.philips.cl.insight.bet </mode> |
| 31 |     <version>4.3.5</version> |
| 32 |     <created>1330465582</created> |
| 33 |     <updated>1330465582</updated> |
| 34 |   </Table> |
| 35 | </NewDataSet> |
| 36 | Device Listeners Response |
| 37 | <NewDataSet> |
| 38 |   <Table> |
| 39 | <handset_uid>fac245967e34734ddb76d5184aa938f317fee097</handset_uid> |
| 40 |     <device_uid>00:00:48:02:2A:A0:07:88</device_uid> |
| 41 |     <created>1330465582</created> |
| 42 |     <updated>1330465582</updated> |
| 43 |   </Table> |
| 44 |   <Table> |
| 45 |     <handset_uid>fac245967e34734ddb76d5184aa938f317fee097</handset_uid> |
| 46 |     <device_uid>00:00:00:E0:4C:A9:55:65</device_uid> |
| 47 |     <created>1330465582</created> |
| 48 |     <updated>1330465582</updated> |
| 49 |   </Table> |
| 50 | </NewDataSet> |

If the response format is xml and an error occurs the response will be as shown in Table 46.

TABLE 46

| Ref | Information |
|---|---|
| 1 | <NewDataSet> |
| 2 |   <Table> |
| 3 |     <status>error</status> |
| 4 |     <errorcode>errorcode</errorcode> |
| 5 |     <errorid>errorid</errorid> |
| 6 |     <message>errormsg</message> |
| 7 |   </Table> |
| 8 | </NewDataSet> |

YNS Get User Settings Possible Error Codes— Table 47 presents possible error codes.

TABLE 47

| Ref | Information |
|---|---|
| 1 | "InvalidToken", "1000", "The Yoics token failed validation" |
| 2 | "InvalidUser", "6000", "No user settings available" |
| 3 | "InvalidDevice", "6001", "Device not owned by user" |
| 4 | "InvalidDevice", "6001", "No device found" |
| 5 | "UnexpectedError", "9999", "<textual explanation>" |

FIG. 105 presents examples of usage scenarios 5-3B00 of an application programming interface for listener devices in systems that use multiple connection URLs to enable load balanced inter-device messaging, in one embodiment. As an option, one or more instances of usage scenarios 5-3B00 or any aspect thereof may be implemented in the context of the architecture and functionality of various embodiments described herein. Also, usage scenarios 5-3B00 or any aspect thereof may be implemented in any desired environment. It should also be noted that the aforementioned definitions may apply within the context of the present description.

The usage scenarios 5-3B00 along with the following accompanying disclosure presents detailed information describing an example implementation of client applications and SDKs. (e.g., for a Google Android handset). Usage scenarios 5-3B00 illustrates one exemplary embodiment comprising an Android App 5-340 and an Android SDK 5-350, but other embodiments (e.g., for Apple iOS) are possible. As shown the Android App 5-340 comprises an Android activity package 5-344, a broadcast receiver 5-343, a manifest file 5-345, an intent service package 5-341, a JPush receiver package 5-342. Also, as shown the Android SDK 5-350 comprises a notification API 5-351, and a set of methods 5-352. The Android App 5-340 and Android SDK 5-350, together with constituent components and exemplary uses thereto are discussed infra.

Android Notification SDK—The YNS Android SDK has storage and notification extensions to simplify the Java development for adding storage and notification services. The main class for adding notification services is the NotificationAPIManager.

Instantiation

Table 48 depicts one possible instantiation syntax.

TABLE 48

| Ref | Information |
|---|---|
| | /** |
| | * <p> |
| | * Instantiate a new API Manager to use for accessing the API. |
| | * </p> |
| | * @param yoicsid |
| | *     Yoics Id of the current user |
| | * @param email |
| | *     Email of the current user |
| | * @param serverURL |
| | *     Yoics API Server URL, like api.yoics.net/web/api/ |
| | * @param APIKey |
| | *     Yoics API key provided by Yoics Inc when registering as a |
| | *     developer. |
| | * @param useSSL |
| | *     Indicate if Yoics API should be contacted using SSL |
| | *     (recommended) |
| | * @param token |
| | *     Yoics API token provided in the Login API |
| | */ |
| 15 | public NotificationAPIManager(String yoicsid, String email, String serverURL, String APIKey, boolean useSSL, String token) |

Push Registration—

Push registration changes with this version of the Yoics Android SDK. The interaction with Google GCM and JPush is abstracted into the Notification API to make it easier on the developer. The following flow shows how the developer should structure the application integration with the SDK.

GCM Registration—

Android apps must have access to a registered GCM account at Google. This account is tied specifically to the application package. Without it, notification will not work. Once the account is created and approved, there are several steps the application must perform. These steps are fully documented by Google. The critical pieces of data are the app package name and the GCM app ID and secret. These values must be registered with the Yoics service.

JPush Registration—

Android apps must have access to a registered JPush account at http://jpush.cn. JPush is intended for apps deployed into China. This account is tied specifically to the application package. Without it, notification will not work. Once the account is created and approved, there are several steps the application must perform. These steps are fully documented by Google. The critical pieces of data are the app package name and the JPush App ID and master secret. These values must be registered with the Yoics service.

Methods

Table 49 depicts some possible methods to implement aspects of JPushNotification.

TABLE 49

| Ref | Information |
|---|---|
| 1 | public void setGCMNotification(String senderID, String |
| 2 |     pushDomain, BroadcastReceiver receiver) |
| 3 | public void setJPushNotification(String pushDomain) |
| 4 | public String getRegistrationID( ) |
| 5 | public boolean registerNotification(boolean push, boolean smtp, String push_token, String mode, Context context) |
| 6 | NOTE: Refer to HandsetRegistration API for mode specification |
| 7 | public boolean registerListener(String device_address, |
| 8 |     boolean add, Context context) |
| 9 | public List<EventData> getEvents( ) |
| 10 | public List<NotificationSettingsData> getSettings( ) |
| 11 | public List<NotificationHandsetData> getHandsets( ) |
| 12 | public List<NotificationListenerData> getListeners( ) |
| 13 | public boolean deleteEvent(String device_address, |
| 14 |     String timestamp, String action) |
| 15 | NOTE: Refer to Device Event API for action specification |
| 16 | public boolean deleteDevice(String device_address) |
| 17 | public boolean renameDevice(String yoicsid, String device_address, |
| 18 |     String device_name) |
| 19 | public boolean provisionStorage( ) |

Java SDK Examples

Table 50 depicts a possible Java SDK implementation.

TABLE 50

| Ref | Information |
|---|---|
| | Service Settings |
| | package net.yoicsexample; |
| | public class YoicsServiceSettings { |
| |     public static String YOICS_API_KEY = "PhilipsAndroid"; |
| |     public static String YOICS_API_SERVER = "server5.yoics.net/web/api/"; |
| |     public static String YOICS_NOTIFICATION_API_SERVER = "notification.yoics.net/"; |
| |     public static boolean YOICS_API_USE_SSL = false; |
| | } |
| | NoteL Modes identify the push domain. e.g. - net.yoics.launcher. They are derived from the package name used to register with the push delivery system (e.g., GCM or JPush) |
| | Calling Examples |

TABLE 50-continued

| Ref | Information |
|---|---|
| | ```
import net.yoicsexample.YoicsServiceSettings;
import net.yoicssdk.data.*;
import net.yoicssdk.service.*;
...
LoginData login = api.login(username, password);
if (login != null) {
NotificationAPIManager apiNotify = new NotificationAPIManager(
        username, login.getEmail( ),
        YoicsServiceSettings.YOICS_NOTIFICATION_API_SERVER,
            YoicsServiceSettings.YOICS_API_KEY,
            YoicsServiceSettings.YOICS_API_USE_SSL, api.getToken( ));
        apiNotify.setGCMNotification(
YoicsServiceSettings.YOICS_NOTIFICATION_GCM_SENDER,
YoicsServiceSettings.YOICS_NOTIFICATION_DOMAIN,
this.mHandleMessageReceiver);
        apiNotify.registerWithPushSystem( );
        /* At this point, the receiver must handle registration completion
            and then call the code below */
}
...
/* code from registration handler (receiver) */
        String regid = apiNotify.getRegistrationID( );
        // register handset
apiNotify.registerNotification(true, true, regid, "<mode>", context));
// register listener
apiNotify.registerListener(
username, dd.getDeviceAddress( ), true, getApplicationContext( ));
// get user settings
        List<NotificationSettingsData> settings =
apiNotify.getSettings( );
        // get handsets
        List<NotificationHandsetData> handsets =
apiNotify.getHandsets( );
        // get listeners
        List<NotificationListenerData> listeners =
apiNotify.getListeners( );
        // rename device
boolean renStatus = apiNotify.renameDevice("00:00:48:02:2A:A0:07:XX", "New
Name");
        List<EventData> events = apiNotify.getEvents( );
// delete device
        boolean delStatus = apiNotify.deleteDevice("00:00:48:02:2A:A0:07:XX");
``` |

Android GCM Manifest Settings

Table 51 depicts some possible settings to implement aspects of an Android GCM manifest.

TABLE 51

| Ref | Information |
|---|---|
| | ```
/* Required permissions for */
    <uses-permission android:name="android.permission.INTERNET" />
    <uses-permission
android:name="android.permission.WRITE_EXTERNAL_STORAGE" />
    <uses-permission android:name="android.permission.GET_TASKS" />
    <uses-permission
android:name="android.permission.READ_PHONE_STATE" />
    <uses-permission android:name="android.permission.GET_ACCOUNTS" />
    <uses-permission android:name="android.permission.WAKE_LOCK" />
  <uses-permission
android:name="com.google.android.providers.gsf.permission.READ_GSERVICES" />
    <uses-permission
android:name="net.yoics.launcher.permission.C2D_MESSAGE" />
    <uses-permission
android:name="com.google.android.c2dm.permission.RECEIVE" />
    <permission
android:name="net.yoics.launcher.permission.C2D_MESSAGE"
android:protectionLevel="signature" />
        /* Required for GCM Notification */
        <service android:name="GCMIntentService"
    android:exported="false"
    android:enabled="true">
        </service>
        <meta-data android:name="GCM_SENDER_ID"
``` |

TABLE 51-continued

| Ref | Information |
|---|---|
| | android:value="716134499940" /> // Replace with production sender ID<br><receiver<br>    android:name="com.google.android.gcm.GCMBroadcastReceiver"<br>    android:permission="com.google.android.c2dm.permission.SEND"><br>    <intent-filter><br>      <action<br>android:name="com.google.android.c2dm.intent.RECEIVE" /><br>      <action<br>android:name="com.google.android.c2dm.intent.REGISTRATION" /><br>      <category android:name="net.yoics.launcher" /><br>    </intent-filter><br></receiver> |

15

Initiate Yoics Notification for Android GCM

TABLE 52

| Ref | Information |
|---|---|
| 1 | mAPI = new NotificationAPIManager(mUsername, mUserEmail, |
| 2 | YoicsServiceSettings.YOICS_NOTIFICATION_API_SERVER, |
| 3 |   YoicsServiceSettings.YOICS_API_KEY, |
| 4 |   YoicsServiceSettings.YOICS_API_USE_SSL, mToken, |
| 5 |   this.getApplicationContext( )); |
| 6 | mAPI.setGCMNotification( |
| 7 |   YoicsServiceSettings.YOICS_NOTIFICATION_GCM_SENDER, |
| 8 |   YoicsServiceSettings.YOICS_NOTIFICATION_DOMAIN, |
| 9 |   this.mHandleMessageReceiver); |
| 10 | mAPI.registerWithPushSystem( ); |

GCM Intent Service—

The GCM Intent service responds to GCM broadcast messages related to registration and messages. This service must be packaged in the main activity namespace. Below is a code example as shown in Table 53.

TABLE 53

| Ref | Information |
|---|---|
| | ```<br>package net.yoics.launcher;<br>import net.yoics.service.YoicsServiceSettings;<br>import net.yoicssdk.service.NotificationAPIManager;<br>import android.app.IntentService;<br>import android.content.Context;<br>import android.content.Intent;<br>import android.util.Log;<br>import com.google.android.gcm.GCMBaseIntentService;<br>import com.google.android.gcm.GCMRegistrar;<br>/**<br> *{@link IntentService} responsible for handling GCM messages.<br> */<br>public class GCMIntentService extends GCMBaseIntentService {<br>    @SuppressWarnings("hiding")<br>    private static final String TAG = "GCM_Intent";<br>    public GCMIntentService( ) {<br>    super(YoicsServiceSettings.YOICS_NOTIFICATION_GCM_SENDER);<br>    }<br>    @Override<br>    protected void onRegistered(Context context, String regid) {<br>        // Send broadcast message so activity can complete server side<br>        NotificationAPIManager.broadcastRegistrationID(context, regid);<br>    }<br>    @Override<br>    protected void onUnregistered(Context context, String registrationId) {<br>        // displayMessage(context, getString(R.string.gcm_unregistered));<br>        if (GCMRegistrar.isRegisteredOnServer(context)) {<br>            // Delete the saved registrastion id<br>        }<br>    }<br>    @Override<br>    protected void onMessage(Context context, Intent intent) {<br>        try {<br>``` |

TABLE 53-continued

| Ref | Information |
|---|---|
| | ```
            // pull the message sent from the server out of the intent.
            String message = intent.getStringExtra("data.message");
            String title = intent.getStringExtra("data.title");
            String devicename =
  intent.getStringExtra("data.devicename");
            String timestamp = intent.getStringExtra("data.timestamp");
            String uid = intent.getStringExtra("data.deviceuid");
            // Let the Main activity know we are done, let's send
            Intent i = new
  Intent(NotificationAPIManager.NOTIFICATION_RECEIVED);
            i.putExtra("message", message);
            i.putExtra("devicename", devicename);
            i.putExtra("timestamp", timestamp);
            i.putExtra("deviceuid", uid);
            i.putExtra("title", title);
            context.sendBroadcast(i);
        } catch (Exception error) {
            Log.e("GCMReceiver", "HandleMessage: " +
  error.toString( ));
        }
    }
    @Override
    protected void onDeletedMessages(Context context, int total) {
        // String message = getString(R.string.gcm_deleted, total);
    }
    @Override
    public void onError(Context context, String errorId) {
        // displayMessage(context, getString(R.string.gcm_error, errorId));
    }
    @Override
    protected boolean onRecoverableError(Context context, String errorId) {
        // displayMessage(context,
  getString(R.string.gcm_recoverable_error,
        // errorId));
        return super.onRecoverableError(context, errorId);
    }
}
``` |

Notification Broadcast Receiver—

The Notification Broadcast Receiver receives messages from the GCM Intent and the JPush Receiver and the Yoics Notification SDK. This receiver standardizes the broadcast interface to the main activity and must be in the same package as the activity but may be re-written based on the application's needs as shown in Table 54.

TABLE 54

| Ref | Information |
|---|---|
| | ```
        private BroadcastReceiver mRegistrationReceiver = new
  BroadcastReceiver( ) {
            @Override
            public void onReceive(Context context, Intent intent) {
                String action = intent.getAction( );
                if (action
  .equalsIgnoreCase(NotificationAPIManager.NOTIFICATION_REGISTRA
  TION_DONE)) {
                    Bundle extra = intent.getExtras( );
                    String regid = extra.getString("registrationid");
                    try {
                        if (mToken != null && mUsername != null) {
                            // register the push token at Yoics
  mAPI.registerNotificationAsync(regid);
                            // save the push token for next login
  PreferencesManager.saveNotificationToken(regid,
                                    mPreferences);
                            // announce the completion
                            try {
                                Message myMessage = new
  Message( );
                                myMessage.obj =
  "Notification Registered on Receive";
        handler.sendMessage(myMessage);
``` |

TABLE 54-continued

| Ref | Information |
|---|---|

```
                    } catch (Exception e) {
                    }
                }
            } catch (Exception ex) {
            }
        } else if (action
    .equalsIgnoreCase(NotificationAPIManager.NOTIFICATION_RECEIVED)
) {
                Bundle extra = intent.getExtras( );
                String deviceuid = extra.getString("deviceuid");
                String title = extra.getString("title");
                String message = extra.getString("message");
                String timestamp = extra.getString("timestamp");
                String devicename =
extra.getString("devicename");
                try {
                    // announce the notification
                    try {
                        Message myMessage = new
Message( );
                        myMessage.obj =
"Notification Received from " + devicename + " at " + timestamp;
    handler.sendMessage(myMessage);
                    } catch (Exception e) {
                    }
                } catch (Exception ex) {
                }
            }
        }
    };
```

Android JPush Component Examples—

Configuring JPush from an Android app requires setting up the Manifest, instantiating the Yoics Notification API for JPush, and responding to the JPush broadcast Intents.

JPush Manifest Settings

TABLE 55

| Ref | Information |
|---|---|

```
            <!-- Required for JPush -->
            <permission
android:name="net.yoics.launcher.permission.JPUSH_MESSAGE"
android:protectionLevel="signature" />
<uses-permission
android:name="net.yoics.launcher.permission.JPUSH_MESSAGE" />
    <uses-permission
android:name="android.permission.RECEIVE_USER_PRESENT" />
    <uses-permission android:name="android.permission.INTERNET" />
    <uses-permission android:name="android.permission.WAKE_LOCK" />
    <uses-permission android:name="android.permission.READ_PHONE_STATE"
/>
    <uses-permission
android:name="android.permission.WRITE_EXTERNAL_STORAGE" />
    <uses-permission
android:name="android.permission.READ_EXTERNAL_STORAGE" />
    <uses-permission android:name="android.permission.VIBRATE" />
    <uses-permission
android:name="android.permission.MOUNT_UNMOUNT_FILESYSTEMS" />
    <uses-permission
android:name="android.permission.ACCESS_NETWORK_STATE" />
    <uses-permission
android:name="android.permission.SYSTEM_ALERT_WINDOW"/>
            /* Required for JPush Notification */
            <meta-data android:name="JPUSH_APPKEY"
android:value="422495f659ca790ee1ddf740" /> // Replace with Registered
JPush App Key
        <meta-data android:name="JPUSH_CHANNEL"
android:value="net.yoics.lanuncher" /> // Replace with Registered Java
PAckage for App
            <!-- Yoics JPush Receiver -->
            <!-- User defined. For test only 用户自定义的广播接收器 -->
        <receiver
            android:name="net.yoics.launcher.JPushReceiver"
```

TABLE 55-continued

| Ref | Information |
|---|---|

```
                android:enabled="true" >
            <intent-filter>
                <action android:name="cn.jpush.android.intent.REGISTRATION" /> <!-
-Required 用户注册 SDK的 intent-->
                <action android:name="cn.jpush.android.intent.UNREGISTRATION" />
                <action
android:name="cn.jpush.android.intent.MESSAGE_RECEIVED" /> <!--Required
 用户接收 SDK 消息的 intent-->
                <action
android:name="cn.jpush.android.intent.NOTIFICATION_RECEIVED" /> <!--
Required 用户接收 SDK 通知栏信息的 intent-->
                <action
android:name="cn.jpush.android.intent.NOTIFICATION_OPENED" /> <!--
Require 用户打开自定义通知栏的 intent-->
                <action
android:name="cn.jpush.android.intent.ACTION_RICHPUSH_CALLBACK" /> <!--
Optional 用户接受 Rich Push Javascript 回调函数的 intent-->
                <category android:name="net.yoics.launcher" />
            </intent-filter>
        </receiver>
                <!-- Required for JPush SDK -->
                <activity
            android:name="cn.jpush.android.ui.PushActivity"
            android:theme="@android:style/Theme.Translucent.NoTitleBar"
            android:configChanges="orientation|keyboardHidden" >
            <intent-filter>
                <action android:name="cn.jpush.android.ui.PushActivity" />
                <category android:name="android.intent.category.DEFAULT" />
                <category android:name="net.yoics.launcher" />
            </intent-filter>
        </activity>
        <!-- Required SDK 核心功能 -->
        <service
            android:name="cn.jpush.android.service.DownloadService"
            android:enabled="true"
            android:exported="false" >
        </service>
        <!-- Required SDK 核心功能 -->
        <service
            android:name="cn.jpush.android.service.PushService"
            android:enabled="true"
            android:exported="false" >
            <intent-filter>
                <action android:name="cn.jpush.android.intent.REGISTER" />
                <action android:name="cn.jpush.android.intent.REPORT" />
                <action android:name="cn.jpush.android.intent.PushService" />
                <action android:name="cn.jpush.android.intent.PUSH_TIME" />
            </intent-filter>
        </service>
        <!-- Required SDK 核心功能 -->
        <receiver
            android:name="cn.jpush.android.service.PushReceiver"
            android:enabled="true" >
            <intent-filter android:priority="1000">
                <action
android:name="cn.jpush.android.intent.NOTIFICATION_RECEIVED_PROXY" />
<!--Required 显示通知栏 -->
                <category android:name="net.yoics.launcher" />
            </intent-filter>
            <intent-filter>
                <action android:name="android.intent.action.USER_PRESENT" />
                <action android:name="android.net.conn.CONNECTIVITY_CHANGE"
/>
            </intent-filter>
              <!-- Optional -->
            <intent-filter>
                <action android:name="android.intent.action.PACKAGE_ADDED" />
                <action android:name="android.intent.action.PACKAGE_REMOVED"
/>
                <data android:scheme="package" />
            </intent-filter>
        </receiver>
        <!-- Required SDK 核心功能 -->
        <receiver android:name="cn.jpush.android.service.AlarmReceiver" />
```

Initiate Yoics Notification for JPush

TABLE 56

| Ref | Information |
|---|---|
| 1 | mAPI = new NotificationAPIManager(mUsername, mUserEmail, |
| 2 | YoicsServiceSettings.YOICS_NOTIFICATION_API_SERVER, |
| 3 | YoicsServiceSettings.YOICS_API_KEY, |
| 4 | YoicsServiceSettings.YOICS_API_USE_SSL, mToken, |
| 5 | this.getApplicationContext( )); |
| 6 | mAPI.setJPushNotification(YoicsServiceSettings.YOICS_NOTIFICATION_DOMAIN); |
| 7 | mAPI.registerWithPushSystem( ); |

JPush Receiver—

The JPush Receiver handles the messages received from JPush. Upon receiving a message, the receiver packages the message into a standard broadcast message and sends it to the broadcast receiver as shown in Table 57. Refer to the GCM components for information on the broadcast receiver.

TABLE 57

| Ref | Information |
|---|---|
| | ```
package net.yoics.launcher;
import java.util.Iterator;
import java.util.Map;
import java.util.HashMap;
import net.yoicssdk.service.NotificationAPIManager;
import org.json.JSONObject;
import android.content.BroadcastReceiver;
import android.content.Context;
import android.content.Intent;
import android.os.Bundle;
import android.util.Log;
import cn.jpush.android.api.JPushInterface;
public class JPushReceiver extends BroadcastReceiver {
    private static final String TAG = "JPushReceiver";
    @Override
    public void onReceive(Context context, Intent intent) {
        Bundle bundle = intent.getExtras( );
        if (JPushInterface.ACTION_MESSAGE_RECEIVED.equals(intent.getAction( ))) {
            String message = bundle.getString(JPushInterface.EXTRA_MESSAGE);
            String extras = bundle.getString(JPushInterface.EXTRA_EXTRA);
            try {
                JSONObject jsonObject = new JSONObject(extras);
                Iterator keys = jsonObject.keys( );
                Map<String, String> map = new HashMap<String, String>( );
                while (keys.hasNext( )) {
                    String key = (String) keys.next( );
                    map.put(key, jsonObject.getString(key));
                }
                System.out.println(map);// this map will contain your json stuff
                // pull the message sent from the server out of the intent.
                String app_name = "Yoics";
                String msg = (String)map.get("message");
                String title = (String)map.get("title");
                String uid = (String)map.get("deviceuid");
                String timestamp = (String)map.get("timestamp");
                String devicename = (String)map.get("devicename");
                // Let the Main activity know we are done, let's send
                Intent i = new Intent(NotificationAPIManager.NOTIFICATION_RECEIVED);
                i.putExtra("message", message);
                i.putExtra("devicename", devicename);
                i.putExtra("timestamp", timestamp);
                i.putExtra("deviceuid", uid);
                i.putExtra("title", title);
                context.sendBroadcast(i);
            } catch (Exception error) {
                Log.e("GCMReceiver", "HandleMessage: " + error.toString( ));
            }
``` |

TABLE 57-continued

| Ref | Information |
|---|---|
| | ``` } else {     Log.d(TAG, "Unhandled intent - " + intent.getAction( ));   } } } ``` |

Uptube Configuration Parameters—

For Maxim Camera platforms, the UpTube daemon handles notification delivery services. The following sections describe the required configuration to enable notification features. UpTube has a number of configurable options for the second generation notification system. These options are controlled by entries in the configuration (e.g., config.1ua) file.

Enabling and Disabling the Second Generation Notification System—

This entry is used to enable or disable the second generation notification system as shown in Table 58.

TABLE 58

| Ref | Information | |
|---|---|---|
| 1 | NOTIFY2_SERVER_ACTIVE=n | |
| 2 | Where | |
| 3 | n = 0 | notification system is off |
| 4 | n = 1 | notification system is on |

Notify Server Count—

This entry designates the number of notification servers available as shown in Table 59.

TABLE 59

| Ref | Information |
|---|---|
| 1 | NOTIFY2_SERVER_COUNT=n |
| 2 | Where |
| 3 | n = number of servers available for notification |
| 4 | Example: If there were 2 servers the entry would appear as: |
| 5 | NOTIFY2_SERVERS_COUNT=2 |

Notify Server Name List—

This entry specifies the list of available notification servers as shown in Table 60.

TABLE 60

| Ref | Information |
|---|---|
| 1 | NOTIFY2_SERVER_LIST="<server>;<server>;<server>;<server>;..." |
| 2 | Where |
| 3 | <server> = server name |
| 4 | Example: assume 2 servers with the names notify1.yoics.com and notify2.yoics.com the entry would appear as: |
| 5 | NOTIFY2_SERVER_LIST="notify1.yoics.com;notify2.yoics.com" |

Notify Server Request for Transaction Code Template

TABLE 61

| Ref | Information | |
|---|---|---|
| 1 | NOTIFY2_TRANS_CODE_REQ_TEMPLATE="<template>" | |
| 2 | Example: Below is the template as it accepted today: | |
| 3 | NOTIFY2_TRANS_CODE_REQ_TEMPLATE="http://<server>/request_code.php?uid=<uid>&type=<respformat>" | |
| 4 | Uptube replaces: | |
| 5 | <server> | with one of the servers from the server list |
| 6 | <uid> | with the device ID. |

Notify Server Send Notification Request Template—

This template specifies how the request for notification should be formatted as shown in Table 62.

TABLE 62

| Ref | Information |
|---|---|
| 1 | NOTIFY2_SEND_REQ_TEMPLATE="<template>" |
| 2 | Example: The template below is the current accepted format |
| 3 | NOTIFY2_SEND_REQ_TEMPLATE="http://<server>/send_notification.php?transaction_code=<transactioncode>&uid=<uid>&device_type=<devicetype>&event_type=<eventtype>&timestamp=<timestamp>&message=<message>&status=<status>&transaction_hash=<transactionhash>>&type=<respformat>" |

TABLE 62-continued

| Ref | Information | |
|---|---|---|
| 4 | Uptube replaces: | |
| 5 | <server> | with one of the servers from the server list |
| 6 | <transactioncode> | with a transaction code returned from the server |
| 7 | <uid> | with the device id |
| 8 | <devicetype> | with the string provided in config.lua (see above) |
| 9 | <eventtype> | with the event type supplied by camera firmware |
| 10 | <timestamp> | with the event timestamp from the camera firmware |
| 11 | <message> | with the message -e.g. youtube URL for event video |
| 12 | <status> | with any pending status message |
| 13 | <transactionhash> | with the transaction hash based on the template |

Notify Request Hash Template—

This template designates how the hash string should be assembled before being hashed with the device secret as shown in Table 63.

TABLE 63

| Ref | Information | |
|---|---|---|
| 1 | NOTIFY2_HASH_TEMPLATE=<template> | |
| 2 | Example: The current accepted format | |
| 3 | NOTIFY2_HASH_TEMPLATE="<transactioncode><uid><devicetype><eventtype><timestamp><message><status>" | |
| 4 | Uptube replaces: | |
| 5 | <transactioncode> | with a transaction code returned from the server |
| 6 | <uid> | with the device id |
| 7 | <devicetype> | with the string provided in config.lua (see above) |
| 8 | <eventtype> | with the event type supplied by camera firmware |
| 9 | <timestamp> | with the event timestamp from the camera firmware |
| 10 | <message> | with the message ie. youtube URL for event video |
| 11 | <status> | with any pending status message |

Notify Server Retries—

This entry specifies the maximum number of retries to attempt before discarding the notification. This is a retry count so the total number of attempts will be one more than this value. The server will attempt to send the notification. If that fails it will attempt a maximum of two retries before it discards the notification. See Table 64.

TABLE 64

| Ref | Information |
|---|---|
| 1 | NOTIFY2_SERVER_RETRIES=<count> |
| 2 | Where |
| 3 | <count> is the maximum number of retries |
| 4 | Example: |
| 5 | NOTIFY2_SERVER_RETRIES=2 |

Notify Retry Interval—

This entry specifies the time the notification system will delay between retries of a failed notification. The value is in seconds. The server will attempt to send the notification. If that fails the notification will not retry the operation for 10 seconds. The server will wait up to 10 seconds for a response from the server as shown in Table 65.

TABLE 65

| Ref | Information |
|---|---|
| 1 | NOTIFY2_SERVER_RETRYINTERVAL=<seconds> |
| 2 | Where |
| 3 | <seconds> is the time to delay between retries |

TABLE 65-continued

| Ref | Information |
|---|---|
| 4 | Example: |
| 5 | NOTIFY2_SERVER_RETRYINTERVAL=10 |

Notify Timeout—

This entry specifies the timeout used when waiting for a response from the server. The value is specified in seconds. See Table 66.

TABLE 66

| Ref | Information |
|---|---|
| 1 | NOTIFY2_SERVER_TIMEOUT=<seconds> |
| 2 | Where |
| 3 | <seconds> is the timeout value to be used |
| 4 | Example: |
| 5 | NOTIFY2_SERVER_TIMEOUT=10 |

Transaction Hash—

A notification request must include a transaction hash parameter to be valid. This parameter is an "hmac sha1" hash with selected fields from the request hashed with the device "secret". The hash fields are determined by a template specified in the configuration file.

Additional Embodiments of the Disclosure

Additional Practical Application Examples

FIG. 106 is a block diagram of a system 5-400 for implementing all or portions of any of the embodiments described herein. System 5-400 comprises at least one processor and at least one memory, the memory serving to store program instructions corresponding to the operations of the system. As shown, an operation can be implemented in whole or in part using program instructions accessible by a module. The modules are connected to a communication path 5-405, and any operation can communicate with other operations over communication path 5-405. The modules of the system can, individually or in combination, perform method operations within system 5-400. Any operations performed within system 5-400 may be performed in any order unless as may be specified in the claims. It should also be noted that the aforementioned definitions may apply within the context of the present description.

The shown system 5-400 depicts a block diagram of a system to perform certain functions of a computer system. As an option, the present system 5-400 may be implemented in the context of the architecture and functionality of the embodiments described herein. Of course, however, the system 5-400 or any operation therein may be carried out in any desired environment. As shown, system 5-400 comprises at least one processor and at least one memory, the memory serving to store program instructions corresponding to the operations of the system. As shown, an operation can be implemented in whole or in part using program instructions accessible by a module. The modules are connected to a communication path 5-405, and any operation can communicate with other operations over communication path 5-405. The modules of the system can, individually or in combination, perform method operations within system 5-400. Any operations performed within system 5-400 may be performed in any order unless as may be specified in the claims. The embodiment of system 5-400 implements a portion of a computer system, shown as system 5-400, comprising a computer processor to execute a set of program code instructions (see module 5-410) and modules for accessing memory to hold program code instructions to perform: registering a listener device to receive messages from one or more notification devices (see module 5-420); selecting a notification server from a plurality of servers to receive a notification message from at least one notification device (see module 5-430); receiving the notification message at the notification server (see module 5-440); and forwarding the notification message from the notification server to the listener device (see module 5-450).

Some embodiments receive the notification message being contained within an IP protocol message directed to a first function, which is intercepted a processor that emulates the first function, which processor then modifies the IP protocol message to emulate a second function that is different from the first function.

Further details regarding general approaches to modifying an IP protocol message to emulate a second function that is different from a first function are described in U.S. application Ser. No. 13/918,773, titled "NETWORKING SYSTEMS" filed Jun. 14, 2014, which is hereby incorporated by reference in its entirety.

Additional Embodiments of the Disclosure

Additional Practical Application Examples

FIG. 107A is a block diagram of a system for implementing all or portions of any of the embodiments described herein. As an option, the present system 6-107A00 may be implemented in the context of the architecture and functionality of the embodiments described herein. Of course, however, the system 6-107A00 or any operation therein may be carried out in any desired environment. The system 6-107A00 comprises at least one processor and at least one memory, the memory serving to store program instructions corresponding to the operations of the system. As shown, an operation can be implemented in whole or in part using program instructions accessible by a module. The modules are connected to a communication path 6-107A05, and any operation can communicate with other operations over communication path 6-107A05. The modules of the system can, individually or in combination, perform method operations within system 6-107A00. Any operations performed within system 6-107A00 may be performed in any order unless as may be specified in the claims. The shown embodiment implements a portion of a computer system, shown as system 6-107A00, comprising a computer processor to execute a set of program code instructions (see module 6-107A10) and modules for accessing memory to hold program code instructions to perform: receiving, using a network, a message from a first device connected to the network, wherein the message comprises a first URL containing a fractional subdomain portion in a fractional subdomain position (see module 6-107A20); parsing the fractional subdomain portion into a plurality of tokens comprising at least a first token and a second token (see module 6-107A30); generating a second URL, wherein the second URL comprises at least one wildcard character in the fractional subdomain position and at least one of the plurality of tokens in the fractional subdomain position (see module 6-107A40); using the second URL to configure the first device by establishing an IP connection between a first computing platform and the first device and retrieving one or more messages over the IP connection wherein at least a portion of the one or more messages comprise a provisioning file (see module 6-107A50); authenticating at least one aspect of the provisioning file (see module 6-107A60); decrypting at least one aspect of the provisioning file (see module 6-107A70); receiving, from the first device, communications directed to a first function, then modifying or creating at least one aspect of the communications for emulating a second function that is different from the first function (see module 6-107A80); receiving from the first device a first URL comprising a first top level domain, a first domain name, and a first plurality of subdomains (see module 6-107A90); and mapping the first URL to a second URL comprising a second top level domain, a second domain name, and a second plurality of subdomains, wherein the second URL is associated with a set of one or more target devices and the second URL is different than the first URL (see module 6-107A95).

FIG. 107B is a block diagram of a system for implementing all or portions of any of the embodiments described herein. As an option, the present system 7-107B00 may be implemented in the context of the architecture and functionality of the embodiments described herein. Of course, however, the system 7-107B00 or any operation therein may be carried out in any desired environment. The system 7-107B00 comprises at least one processor and at least one memory, the memory serving to store program instructions corresponding to the operations of the system. As shown, an operation can be implemented in whole or in part using program instructions accessible by a module. The modules are connected to a communication path 7-107B05, and any operation can communicate with other operations over communication path 7-107B05. The modules of the system can, individually or in combination, perform method operations within system 7-107B00. Any operations performed within system 7-107B00 may be performed in any order unless as may be specified in the claims. The shown embodiment implements a portion of a computer system, shown as system 7-107B00, comprising a computer processor to execute a set of program code instructions (see module 7-107B10) and modules for accessing memory to hold program code instructions to perform: receiving, using a network, a message from a first device connected to the network, wherein the message comprises a first URL containing a fractional subdomain portion in a fractional subdomain position (see module 7-107B15); parsing the fractional subdomain portion into a plurality of tokens comprising at least a first token and a second token (see module 7-107B20); generating a second URL, wherein the second URL comprises at least one wildcard character in the fractional subdomain position and at least one of the plurality of tokens in the fractional subdomain position (see module 7-107B25); using the second URL to configure the first device by establishing a connection between a first computing platform and the first device (see module 7-107B30); communicating one or more messages over the connection wherein at least a portion of the one or more messages comprise a provisioning file (see module 7-107B35); authenticating at least one aspect of the provisioning file (see module 7-107B40); decrypting at least one aspect of the provisioning file (see module 7-107B45); receiving from the first device a first URL comprising a first top level domain, a first domain name, and at least one first subdomain (see module 7-107B50); mapping the first URL to a second URL comprising a second top level domain, a second domain name, and at least one second subdomain, wherein the second URL is associated with a set of one or more target devices and the second URL is different than the first URL selecting a notification server from a plurality of notification servers to receive a notification message that is sent from the first device (see module 7-107B55); registering at least one notification device to receive messages from the notification server (see module 7-107B60); receiving the notification message at the notification server (see module 7-107B65); and forwarding the notification message from the notification server to the notification device (see module 7-107B70).

System Architecture Overview
Additional System Architecture Examples

Figure 108A:
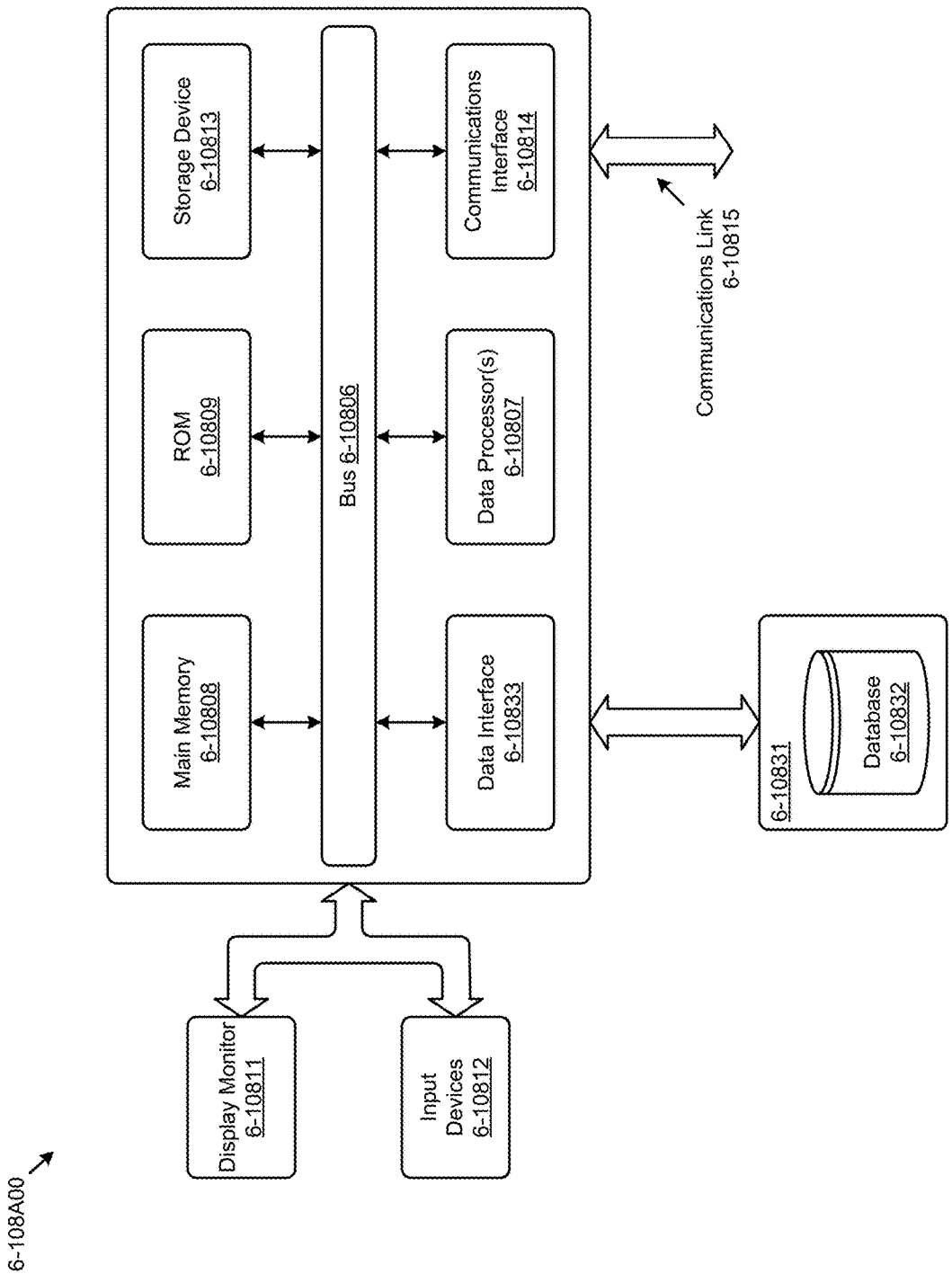

FIG. 108A depicts a block diagram of an instance of a computer system 6-108A00 suitable for implementing embodiments of the present disclosure. Computer system 6-108A00 includes a bus 6-10806 or other communication mechanism for communicating information, which interconnects subsystems and devices such as a data processor 6-10807, a system memory (e.g., main memory 6-10808, or an area of random access memory RAM), a static storage device (e.g., ROM 6-10809), a storage device 6-10813 (e.g., magnetic or optical), a data interface 6-10833, a communications interface 6-10814 (e.g., modem or Ethernet card), a display monitor 6-10811 (e.g., CRT or LCD), input devices 6-10812 (e.g., keyboard, cursor control), and an external data repository 6-10831.

According to one embodiment of the disclosure, computer system 6-108A00 performs specific operations by data processor 6-10807 executing one or more sequences of one or more instructions contained in system memory. Such instructions may be read into system memory from another computer readable/usable medium such as a static storage device or a disk drive. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to data processor 6-10807 for execution. Such a medium may take many forms including, but not limited to, non-volatile media and volatile media. Non-volatile media includes, for example, optical or magnetic disks such as disk drives or tape drives. Volatile media includes dynamic memory such as a RAM memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 6-108A00. According to certain embodiments of the disclosure, two or more instances of computer system 6-108A00 coupled by a communications link 6-10815 (e.g., LAN, PTSN, or wireless network) may perform the sequence of instructions required to practice the disclosure in coordination with one another.

The computer system 6-108A00 may transmit and receive messages, data, and instructions including programs (e.g., application code), through communications link 6-10815 and communications interface 6-10814. Received program code may be executed by data processor 6-10807 as it is received and/or stored in any instances of storage device 6-10813 or any other non-volatile storage for later execution. Computer system 6-108A00 may communicate through a data interface 6-10833 to a database 6-10832 on an external data repository 6-10831. Data items within database 6-10832 can be accessed using a primary key (e.g., a relational database primary key). A module as used herein can be implemented using any mix of any portions of the system memory and any extent of hard-wired circuitry including hard-wired circuitry embodied as a data processor 6-10807. Some embodiments include one or more special-purpose hardware components (e.g., power control, logic, sensors, etc.).

Figure 108B:
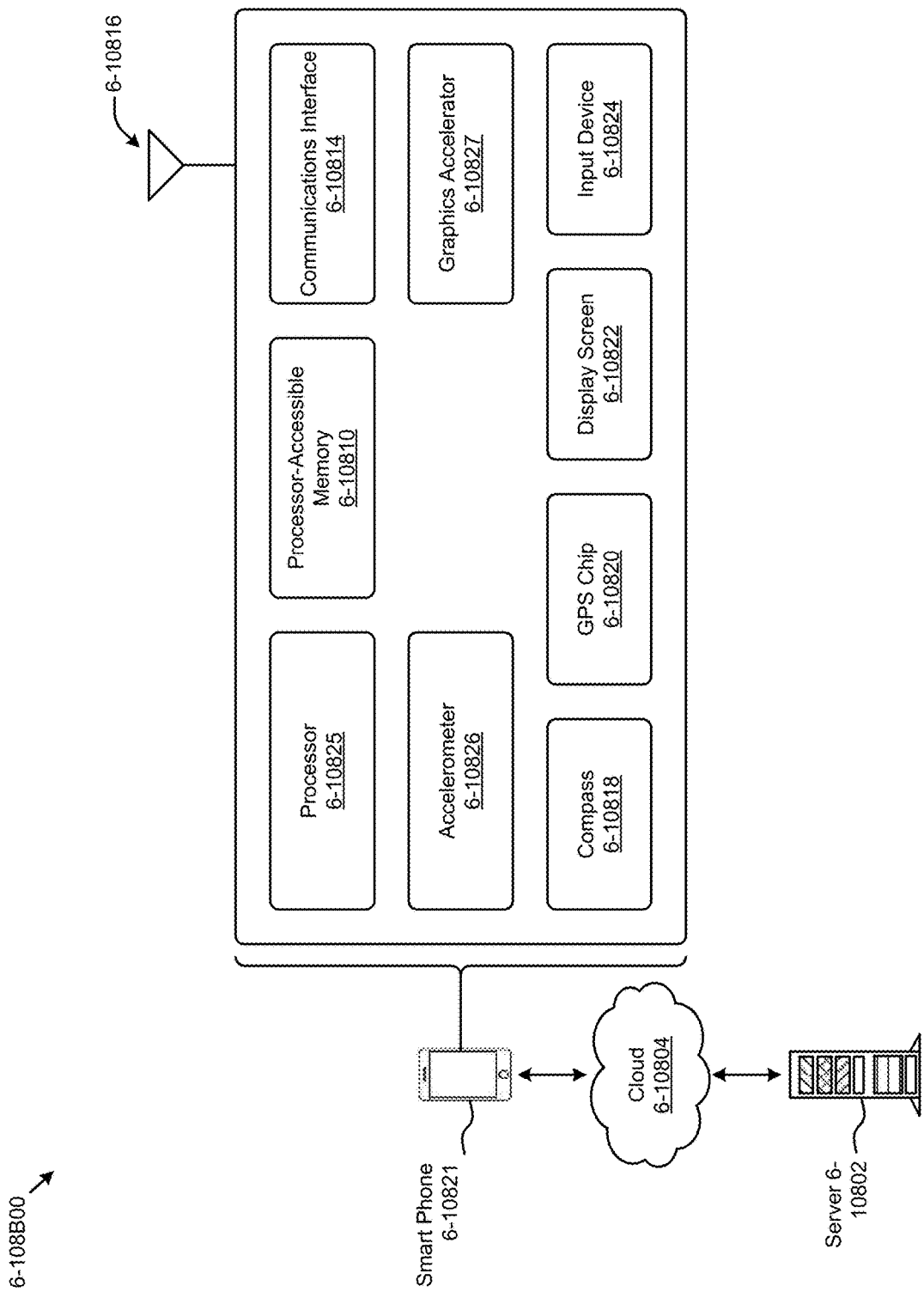

FIG. 108B is a diagram 6-108B00 illustrating a mobile terminal (see smart phone architecture 6-108A00), in one embodiment. As shown, the smart phone 6-10821 includes a housing, display screen, and interface device, which may include a button, microphone, and/or touch screen. In certain embodiments, a smart phone has a high resolution camera device, which can be used in various modes. An example of a smart phone can be an iPhone from Apple Inc. of Cupertino, Calif. Alternatively, a smart phone can be a Galaxy from Samsung, or others. It should also be noted that the aforementioned definitions may apply within the context of the present description.

In a particular example, the smart phone may include one or more of the following features (which are found in an iPhone from Apple Inc., although there can be variations).
  GSM model: UMTS/HSDPA/HSUPA (850, 900, 1900, 2100 MHz);?GSM/EDGE (850, 900, 1800, 1900 MHz)
  CDMA model: CDMA EV-DO Rev. A (800, 1900 MHz)
  802.11b/g/n Wi-Fi (802.11n 2.4 GHz only)

Bluetooth 2.1+EDR wireless technology
Assisted GPS
Digital compass
Wi-Fi
Cellular
Retina display
3.5-inch (diagonal) widescreen multi-touch display
800:1 contrast ratio (typical)
500 cd/m2 max brightness (typical)
Fingerprint-resistant oleophobic coating on front and back
Support for display of multiple languages and characters simultaneously
5-megapixel iSight camera
Video recording, HD (720p) up to 30 frames per second with audio
VGA-quality photos and video at up to 30 frames per second with the front camera
Tap to focus video or still images
LED flash
Photo and video geotagging
Built-in rechargeable lithium-ion battery
Charging via USB to computer system or power adapter
Talk time: Up to 20 hours on 3G, up to 14 hours on 2G (GSM)
Standby time: Up to 300 hours
Internet use: Up to 6 hours on 3G, up to 10 hours on Wi-Fi
Video playback: Up to 10 hours
Audio playback: Up to 40 hours
Frequency response: 20 Hz to 22,000 Hz
User-configurable maximum volume limit
Three-axis gyro
Accelerometer
Proximity sensor
Ambient light sensor, etc.
Audio formats supported: AAC (8 to 320 Kbps), protected AAC (from iTunes Store), HE-AAC, MP3 (8 to 320 Kbps), MP3 VBR, audible (formats 2, 3, 4, audible enhanced audio, AAX, and AAX+), Apple lossless, AIFF, and WAV.
Video out support with Apple digital AV adapter or Apple VGA adapter; 576p and 480p with Apple component AV cable; 576i and 480i with Apple composite AV cable (cables sold separately).
Video formats supported: H.264 video up to 1080p, 30 frames per second, main profile Level 3.1 with AAC-LC audio up to 160 Kbps, 48 kHz, stereo audio in .m4v, .mp4, and .mov file formats; MPEG-4 video up to 2.5 Mbps, 640 by 480 pixels, 30 frames per second, simple profile with AAC-LC audio up to 160 Kbps per channel, 48 kHz, stereo audio in .m4v, .mp4, and .mov file formats; motion JPEG (M-JPEG) up to 35 Mbps, 1280 by 1020 pixels, 30 frames per second, audio in ulaw, PCM stereo audio in .avi file format.

Embodiments of the present disclosure may be used with other mobile terminals. Examples of suitable mobile terminals include a portable mobile terminal such as a media player, a cellular phone, a personal data organizer, or the like. In such embodiments, a portable mobile terminal may include a combination of the functionalities of such devices. In addition, a mobile terminal may allow a user to connect to and communicate through the Internet or through other networks such as local or wide area networks. For example, a portable mobile terminal may allow a user to access the internet and to communicate using email, text messaging, instant messaging, or using other forms of electronic communication. By way of example, the mobile terminal may be similar to an iPod having a display screen or an iPhone available from Apple, Inc.

In certain embodiments, a device may be powered by one or more rechargeable and/or replaceable batteries. Such embodiments may be highly portable, allowing a user to carry the mobile terminal while traveling, working, exercising, and so forth. In this manner, and depending on the functionalities provided by the mobile terminal, a user may listen to music, play games or video, record video or take pictures, place and receive telephone calls, communicate with others, control other devices (e.g., via remote control and/or Bluetooth functionality), and so forth while moving freely with the device. In addition, the device may be sized such that it fits relatively easily into a pocket or the hand of the user. While certain embodiments of the present disclosure are described with respect to portable mobile terminals, it should be noted that the presently disclosed techniques may be applicable to a wide array of other, less portable, mobile terminals and systems that are configured to render graphical data, such as a desktop computer.

The smart phone 6-10821 is configured to communicate with a server 6-10802 in electronic communication with any forms of handheld mobile terminals. Illustrative examples of such handheld mobile terminals can include functional components such as a processor 6-10825, processor-accessible memory 6-10810, graphics accelerator 6-10827, accelerometer 6-10826, communications interface 6-10814 (possibly including an antenna 6-10816), compass 6-10818, GPS chip 6-10820, display screen 6-10822, and an input device 6-10824. Each device is not limited to the illustrated components. The components may be hardware, software or a combination of both.

In some examples, instructions can be input to the handheld mobile terminal through an input device 6-10824 that instructs the processor 6-10825 to execute functions in an electronic imaging application. One potential instruction can be to generate an abstract of a captured image of a portion of a human user. In such a case the processor 6-10825 instructs the communications interface 6-10814 to communicate with the server 6-10802 (e.g., possibly through or using a cloud 6-10804) and transfer data (e.g., image data). The data is transferred by the communications interface 6-10814 and either processed by the processor 6-10825 immediately after image capture or stored within processor-accessible memory 6-10810 for later use, or both. The processor 6-10825 also receives information regarding the display screen's attributes, and can calculate the orientation of the device, e.g., using information from an accelerometer 6-10826 and/or other external data such as compass headings from a compass 6-10818, or GPS location from a GPS chip 6-10820, and the processor then uses the information to determine an orientation in which to display the image depending upon the example.

The captured image can be rendered by the processor 6-10825, by a graphics accelerator 6-10827, or by a combination of the two. In some embodiments, the processor can be the graphics accelerator 6-10827. The image can first be stored within processor-accessible memory 6-10810 or, if available, the memory can be directly associated with the graphics accelerator 6-10827. The methods described herein can be implemented by the processor 6-10825, the graphics accelerator 6-10827, or a combination of the two to create the image and related abstract. An image or abstract can be displayed on the display screen 6-10822.

Figure 108C:
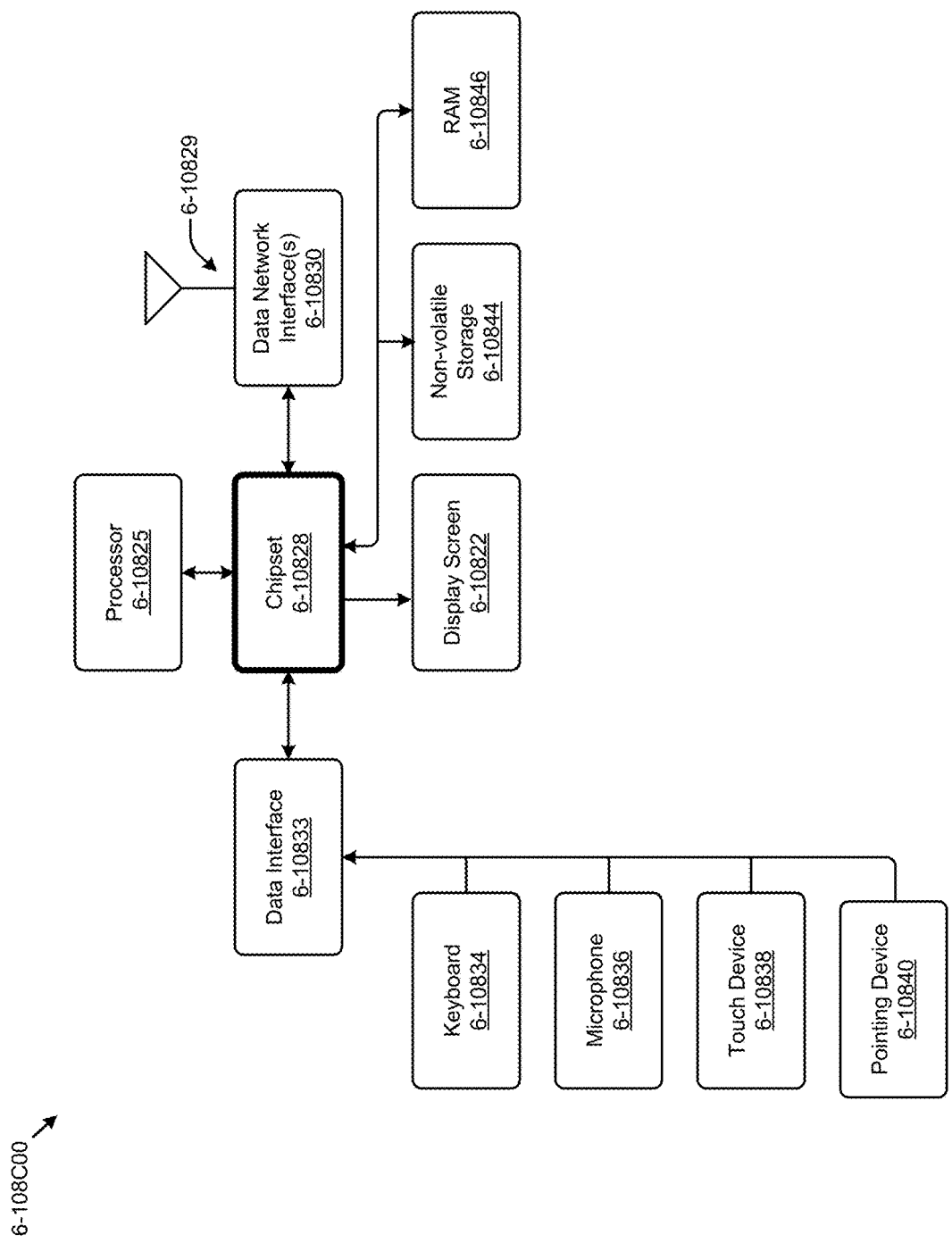

FIG. 108C depicts an interconnection of components to form a mobile terminal 6-108C00, in one embodiment.

Examples of mobile terminals include an enclosure or housing, a display, user input structures, and input/output connectors in addition to the aforementioned interconnection of components. The enclosure may be formed from plastic, metal, composite materials, or other suitable materials, or any combination thereof. The enclosure may protect the interior components of the mobile terminal from physical damage, and may also shield the interior components from electromagnetic interference (EMI).

The display may be a liquid crystal display (LCD), a light emitting diode (LED) based display, an organic light emitting diode (OLED) based display, or some other suitable display. In accordance with certain embodiments of the present disclosure, the display may display a user interface and various other images such as logos, avatars, photos, album art, and the like. Additionally, in certain embodiments, a display may include a touch screen through which a user may interact with the user interface. The display may also include various functions and/or system indicators to provide feedback to a user such as power status, call status, memory status, or the like. These indicators may be incorporated into the user interface displayed on the display.

In certain embodiments, one or more of the user input structures can be configured to control the device such as by controlling a mode of operation, an output level, an output type, etc. For instance, the user input structures may include a button to turn the device on or off. Further, the user input structures may allow a user to interact with the user interface on the display. Embodiments of the portable mobile terminal may include any number of user input structures including buttons, switches, a control pad, a scroll wheel, or any other suitable input structures. The user input structures may work with the user interface displayed on the device to control functions of the device and/or any interfaces or devices connected to or used by the device. For example, the user input structures may allow a user to navigate a displayed user interface or to return such a displayed user interface to a default or home screen.

Certain devices may also include various input and output ports to allow connection of additional devices. For example, a port may be a headphone jack that provides for the connection of headphones. Additionally, a port may have both input and output capabilities to provide for the connection of a headset (e.g., a headphone and microphone combination). Embodiments of the present disclosure may include any number of input and/or output ports such as headphone and headset jacks, universal serial bus (USB) ports, IEEE-1394 ports, and AC and/or DC power connectors. Further, a device may use the input and output ports to connect to and send or receive data with any other device such as other portable mobile terminals, personal computers, printers, or the like. For example, in one embodiment, the device may connect to a personal computer via an IEEE-1394 connection to send and receive data files such as media files.

The depiction of mobile terminal 6-108C00 illustrates computer hardware, software, and firmware that can be used to implement the disclosures above. The shown system includes a processor that is representative of any number of physically and/or logically distinct resources capable of executing software, firmware, and hardware configured to perform identified computations. A processor 6-10825 communicates with a chipset 6-10828 that can control input to and output from processor 6-10825. In this example, chipset 6-10828 outputs information to display screen 6-10822 and can read and write information to non-volatile storage 6-10844, which can include magnetic media and solid state media, and/or other non-transitory media, for example. Chipset 6-10828 can also read data from and write data to RAM 6-10846. A bridge (e.g., a data interface 6-10833) for interfacing with a variety of user interface components can be provided for interfacing with chipset 6-10828. Such user interface components can include a keyboard 6-10834, a microphone 6-10836, touch-detection-and-processing circuitry 6-10838, a pointing device 6-10840 such as a mouse, and so on. In general, inputs to the system can come from any of a variety of machine-generated and/or human-generated sources.

The chipset 6-10828 also can interface with one or more data network interfaces 6-10830 that can have different physical interfaces. Such data network interfaces 6-10830 can include interfaces for wired and wireless local area networks, for broadband wireless networks, as well as personal area networks. Some applications of the methods for generating, displaying and using the GUI disclosed herein can include receiving data over a physical interface 6-10829 or be generated by the machine itself by a processor analyzing data stored within non-volatile storage 6-10844 and/or in memory or RAM 6-10846. Further, the machine can receive inputs from a user via devices such as a keyboard 6-10834, microphone 6-10836, touch-detection-and-processing circuitry 6-10838, and pointing device 6-10840 and execute appropriate functions such as browsing functions by interpreting these inputs using processor 6-10825.

Figure 108D:
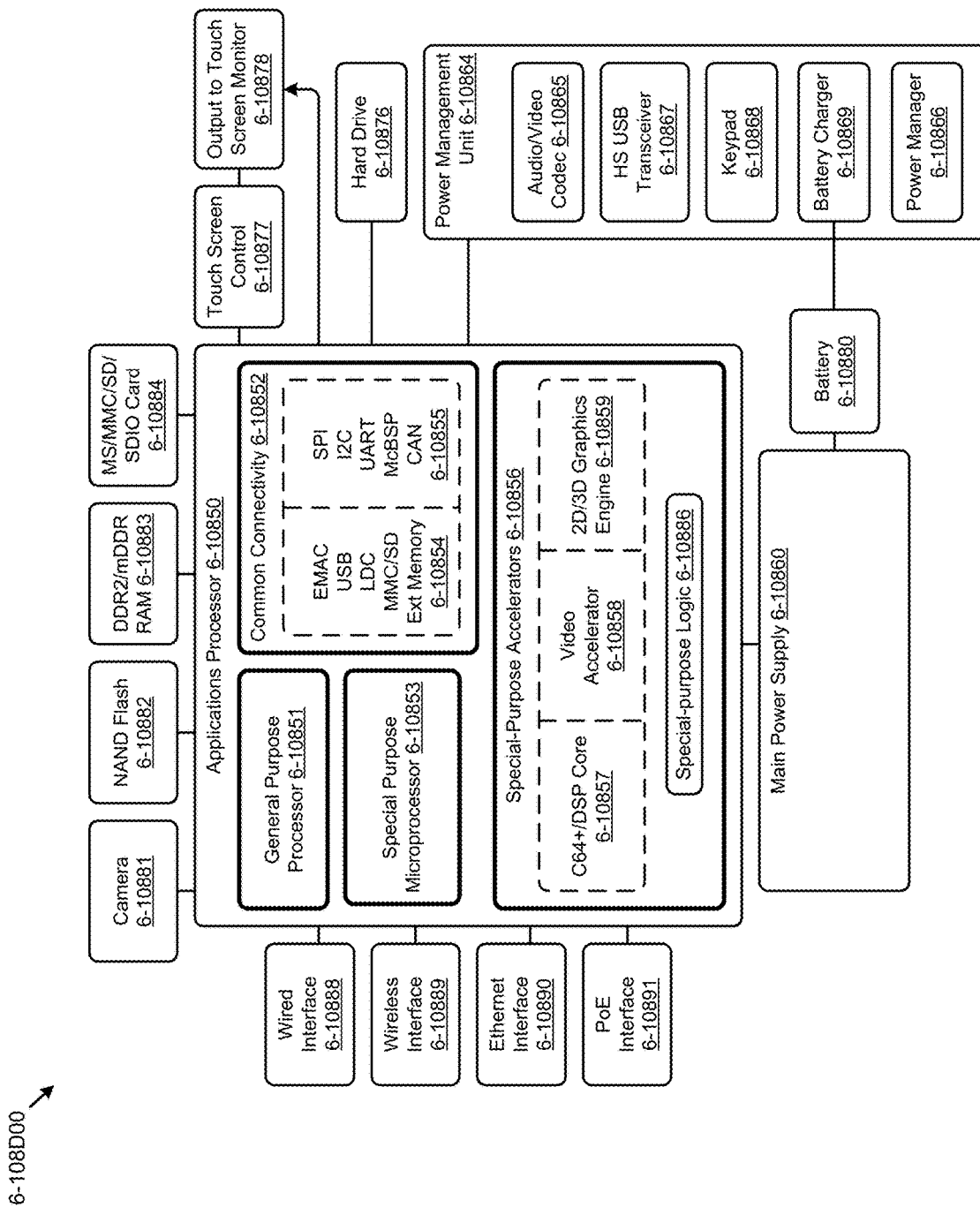

FIG. 108D depicts a deployable device architecture 6-108D00, in one embodiment. The deployable device architecture comprises an applications processor 6-10850 which in turn can comprises a general purpose processor 6-10851, a special-purpose microprocessor 6-10853, a block for common connectivity 6-10852, and any number of accelerators 6-10856, which may include one or more of a DSP core 6-10857, a video accelerator 6-10858, and a graphics engine 6-10859, and/or any forms of special-purpose logic 1-10886. Such a deployable device architecture may comprise multiple volatile and non-volatile memory segments such as NAND flash 6-10882, RAM 6-10883, one or more instances of a memory card 6-10884, and/or one or more instances of a hard drive 6-10876.

The architecture may further comprise various I/O modules such as a camera 6-10881, a touch screen controls 6-10877, a monitor 6-10878, and other I/O such as may comprise analog transducers. Any one or more components within the deployable device architecture may be powered by a power supply 6-10860 and/or a battery 6-10880. Connectivity is supported for any standard or protocols as shown in block 6-10854 and/or in block 6-10855, and can further comprise one or more instances of a wired interface 6-10888 and/or a wireless interface 6-10889.

Some architectures include a power management unit 6-10864, which in turn can manage power for submodules, such as any one or more of the shown audio/video codec 6-1165, USB transceiver 6-10867, keypad 6-10868, and a battery charger 6-10869. The power management unit might include a supervisor such as the shown power manager 6-10866 that manages and/or prioritizes power regimes.

Network access is facilitated by any one or more networking interfaces, such as any of the shown wired interface 6-10888 (e.g., powerline communications), a wireless interface 6-10889, an Ethernet interface 6-10890 and/or a PoE interface 6-10891.

It should be noted that, one or more aspects of the various embodiments of the present disclosure may be included in an article of manufacture (e.g., one or more computer program products) having, for instance, computer usable media. The media has embodied therein, for instance, computer readable program code for providing and facilitating the capabilities of the various embodiments of the present disclosure. The article of manufacture can be included as a part of a computer system or sold separately.

Additionally, one or more aspects of the various embodiments of the present disclosure may be designed using computer readable program code for providing and/or facilitating the capabilities of the various embodiments or configurations of embodiments of the present disclosure.

Additionally, one or more aspects of the various embodiments of the present disclosure may use computer readable program code for providing and facilitating the capabilities of the various embodiments or configurations of embodiments of the present disclosure and that may be included as a part of a computer system and/or memory system and/or sold separately.

Additionally, at least one program storage device readable by a machine, tangibly embodying at least one program of instructions executable by the machine to perform the capabilities of the various embodiments of the present disclosure can be provided.

The diagrams depicted herein are just examples. There may be many variations to these diagrams or the steps (or operations) described therein without departing from the spirit of the various embodiments of the disclosure. For instance, the steps may be performed in a differing order, or steps may be added, deleted or modified.

In various optional embodiments, the features, capabilities, techniques, and/or technology, etc. of the memory and/or storage devices, networks, mobile devices, peripherals, hardware, and/or software, etc. disclosed in the following applications may or may not be incorporated into any of the embodiments disclosed herein.

References in this specification and/or references in specifications incorporated by reference to "one embodiment" may mean that particular aspects, architectures, functions, features, structures, characteristics, etc. of an embodiment that may be described in connection with the embodiment may be included in at least one implementation. Thus references to "in one embodiment" may not necessarily refer to the same embodiment. The particular aspects, etc. may be included in forms other than the particular embodiment described and/or illustrated and all such forms may be encompassed within the scope and claims of the present application.

References in this specification and/or references in specifications incorporated by reference to "for example" may mean that particular aspects, architectures, functions, features, structures, characteristics, etc. described in connection with the embodiment or example may be included in at least one implementation. Thus references to an "example" may not necessarily refer to the same embodiment, example, etc. The particular aspects, etc. may be included in forms other than the particular embodiment or example described and/or illustrated and all such forms may be encompassed within the scope and claims of the present application.

This specification and/or specifications incorporated by reference may refer to a list of alternatives. For example, a first reference such as "A (e.g., B, C, D, E, etc.)" may refer to a list of alternatives to A including (but not limited to) B, C, D, E. A second reference to "A, etc." may then be equivalent to the first reference to "A (e.g., B, C, D, E, etc.)." Thus, a reference to "A, etc." may be interpreted to mean "A (e.g., B, C, D, E, etc.)."

It may thus be seen from the examples provided above that the improvements to devices (e.g., as shown in the contexts of the figures included in this specification, for example) may be used in various applications, contexts, environments, etc. The applications, uses, etc. of these improvements, etc. may not be limited to those described above, but may be used, for example, in combination. For example, one or more applications, etc. used in the contexts, for example, in one or more figures may be used in combination with one or more applications, etc. used in the contexts of, for example, one or more other figures and/or one or more applications, etc. described in any specifications incorporated by reference. Further, while various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for establishing a secure connection between a plurality of devices and a server, the method comprising:
   receiving a query from one of the plurality of devices, the query to locate a dotted quad IP address based at least in part on the query;
   synthesizing, in response to the query, a first URL containing a fractional subdomain portion that comprises at least a first token and a second token;
   forming a second URL, wherein the second URL comprises at least one wildcard character in a first fractional subdomain position and at least one of the first token or the second token in a second fractional subdomain position;
   generating a wildcard digital security certificate to serve to at least a first device of the plurality of devices;
   presenting a user interface on a display terminal, wherein the user interface includes one or more first fields for user entry of a first device type corresponding to the first device, and wherein the user interface includes one or more second fields for user entry of a second device type;
   recognizing the first device type to associate one or more aspects of the first device type;
   configuring a domain name service server using at least one aspect of the first device type;
   recognizing the second device type to associate one or more aspects of the second device type; and
   configuring the domain name service server using at least one aspect of the second device type, wherein the domain name service server is operable to initiate network communication between a first instance of a device of the first device type and a second instance of a device of the second device type.

2. The method of claim 1, further comprising sending the wildcard digital security certificate to at least one of the plurality of devices.

3. The method of claim 1, further comprising sending the dotted quad IP address to at least one of the plurality of devices, wherein the dotted quad IP address is an IP address of the server.

4. The method of claim 1, wherein the synthesizing uses a random subdomain generator.

5. The method of claim 1, wherein the wildcard character is an asterisk.

6. The method of claim 1, wherein at least one of, the first device or a second device of the plurality of devices comprises at least one of, a cellular phone, a mobile phone, a smart phone, an internet phone, a wireless phone, a personal digital assistant device, a remote communication device, a wireless device, a music player, a video player, a media player, a multimedia player, a video recorder, a VCR, a DVR, a book reader, a voice recorder, a voice controlled system, a voice controller, a camera, a social interaction device, a radio, a TV, a watch, a personal communication device, an electronic wallet, an electronic currency, a smart card, a smart credit card, an electronic money device, an electronic coin, an electronic token, an instance of smart jewelry, an electronic passport, an electronic identification system, a biometric sensor, a biometric system, a biometric device, a smart pen, a smart ring, a personal computer, a tablet, a laptop computer, a scanner, a printer, a computer, a web server, a media server, a multimedia server, a file server, a datacenter server, a database server, a database appliance, a cloud server, a cloud device, a cloud appliance, an embedded system, an embedded device, electronic eye glasses, an electronic goggle, an electronic screen, a display, a wearable display, a projector, a picture frame, a touch screen, a computer appliance, a kitchen appliance, a home appliance, a home theater system, an audio system, a home control appliance, a home control system, an irrigation system, a sprinkler system, a garage door system, a garage door control, a remote control, a remote control system, a thermostat, a heating system, an air conditioning system, a ventilation system, a climate control system, a climate monitoring system, an industrial control system, a transportation system, an industrial process and control system, an industrial controller system, a machine-to-machine system, an aviation system, a locomotive system, a power control system, a power controller, a lighting control, a light, a lighting system, a solar system controller, a solar panel, a vehicle and other engine, an engine controller, a motor, a motor controller, a navigation control, a navigation system, a navigation display, a sensor, a sensor system, a transducer, a transducer system, a computer input device, a device controller, a touchpad, a mouse, a pointer, a joystick, a keyboard, a game controller, a haptic device, a game console, a game box, a network device, a router, a switch, an internet TV box, an internet system, an internet device, a set-top box, a cable box, a modem, a cable modem, a PC, a tablet, a media box, a streaming device, an entertainment center, an entertainment system, an aircraft entertainment system, a hotel entertainment system, a car and vehicle entertainment system, a GPS device, a GPS system, an automobile and other motor vehicle system, a truck system, a vehicle control system, a vehicle sensor, an aircraft system, an automation system, a home automation system, an industrial automation system, a reservation system, a check-in terminal, a ticket collection system, an admission system, a payment device, a payment system, a banking machine, a cash point, a ATM, a vending machine, a vending system, a point of sale device, a coin-operated device, a token operated device, a gas (petrol) pump, a ticket machine, a toll system, a barcode scanner, a credit card scanner, a travel token system, a travel card system, a RFID device, an electronic label, an electronic tag, a tracking system, an electronic sticker, an electronic price tag, a near field communication (NFC) device, a wirelessly operated device, a wireless receiver, a wireless transmitter, a sensor device, a mote, a sales terminal, a checkout terminal, an electronic toy, a toy system, a gaming system, an information appliance, an information kiosk, a sales display, a sales device, an electronic menu, a coupon system, a shop display, a street display, an electronic advertising system, a traffic control system, a traffic sign, a parking system, a parking garage device, an elevator and elevator system, a building system, a mailbox, an electronic sign, a video camera, a security system, a surveillance system, an electronic lock, an electronic key, an electronic key fob, an access device, an access control, an electronic actuator, a safety system, a smoke detector, a fire control system, a fire detection system, a locking device, an electronic safe, an electronic door, a music device, a storage device, a back-up device, a USB key, a portable disk, an exercise machine, a sports equipment device, medical device, a medical system, a personal medical device, a wearable medical device, a portable medical device, a mobile medical device, a blood pressure sensor, a heart rate monitor, a blood sugar monitor, a vital sign monitor, a ultrasound device, a medical imager, a drug delivery system, a drug monitoring system, a patient monitoring system, a medical records system, an industrial monitoring system, a robot, a robotic device, a home robot, an industrial robot, an electric tool, a power tool, a construction equipment, electronic jewelry device, a wearable device, a wearable electronic device, a wearable camera, a wearable video camera, a wearable system, an electronic dispensing system, and a handheld computing device.

7. The method of claim 1, further comprising: creating an internet connection between the first device and a set of one or more target devices.

8. The method of claim 1, further comprising:
   registering the first device to receive messages from one or more notification devices;
   selecting a notification server from a plurality of servers to receive a notification message from at least one notification device;
   receiving the notification message at the notification server; and
   forwarding the notification message from the notification server to at least one of the plurality of devices.

9. A computer readable medium, embodied in a non-transitory computer readable medium, the non-transitory computer readable medium having stored thereon a sequence of instructions which, when stored in memory and executed by one or more processors causes the one or more processors to perform a set of acts for establishing a secure connection between a plurality of devices and a server, the acts comprising:
   receiving a query from one of the plurality of devices, the query to locate a dotted quad IP address based at least in part on the query;
   synthesizing, in response to the query, a first URL containing a fractional subdomain portion that comprises at least a first token and a second token;
   forming a second URL, wherein the second URL comprises at least one wildcard character in a first fractional subdomain position and at least one of the first token or the second token in a second fractional subdomain position;
   generating a wildcard digital security certificate to serve to at least a first device of the plurality of devices;
   presenting a user interface on a display terminal, wherein the user interface includes one or more first fields for user entry of a first device type corresponding to the first device, and wherein the user interface includes one or more second fields for user entry of a second device type;
   recognizing the first device type to associate one or more aspects of the first device type;
   configuring a domain name service server using at least one aspect of the first device type;

recognizing the second device type to associate one or more aspects of the second device type; and configuring the domain name service server using at least one aspect of the second device type, wherein the domain name service server is operable to initiate network communication between a first instance of a device of the first device type and a second instance of a device of the second device type.

10. The computer readable medium of claim 9, further comprising instructions which, when stored in memory and executed by the one or more processors causes the one or more processors to perform acts of sending the wildcard digital security certificate to at least one of the plurality of devices.

11. The computer readable medium of claim 9, further comprising instructions which, when stored in memory and executed by the one or more processors causes the one or more processors to perform acts of sending the dotted quad IP address to at least one of the plurality of devices, wherein the dotted quad IP address is an IP address of the server.

12. The computer readable medium of claim 9, wherein the synthesizing uses a using a random subdomain generator.

13. The computer readable medium of claim 9, wherein the wildcard character is an asterisk.

14. The computer readable medium of claim 9, wherein at least one of, the first device or a second device of the plurality of devices comprises at least one of, a cellular phone, a mobile phone, a smart phone, an internet phone, a wireless phone, a personal digital assistant device, a remote communication device, a wireless device, a music player, a video player, a media player, a multimedia player, a video recorder, a VCR, a DVR, a book reader, a voice recorder, a voice controlled system, a voice controller, a camera, a social interaction device, a radio, a TV, a watch, a personal communication device, an electronic wallet, an electronic currency, a smart card, a smart credit card, an electronic money device, an electronic coin, an electronic token, an instance of smart jewelry, an electronic passport, an electronic identification system, a biometric sensor, a biometric system, a biometric device, a smart pen, a smart ring, a personal computer, a tablet, a laptop computer, a scanner, a printer, a computer, a web server, a media server, a multimedia server, a file server, a datacenter server, a database server, a database appliance, a cloud server, a cloud device, a cloud appliance, an embedded system, an embedded device, electronic eye glasses, an electronic goggle, an electronic screen, a display, a wearable display, a projector, a picture frame, a touch screen, a computer appliance, a kitchen appliance, a home appliance, a home theater system, an audio system, a home control appliance, a home control system, an irrigation system, a sprinkler system, a garage door system, a garage door control, a remote control, a remote control system, a thermostat, a heating system, an air conditioning system, a ventilation system, a climate control system, a climate monitoring system, an industrial control system, a transportation system, an industrial process and control system, an industrial controller system, a machine-to-machine system, an aviation system, a locomotive system, a power control system, a power controller, a lighting control, a light, a lighting system, a solar system controller, a solar panel, a vehicle and other engine, an engine controller, a motor, a motor controller, a navigation control, a navigation system, a navigation display, a sensor, a sensor system, a transducer, a transducer system, a computer input device, a device controller, a touchpad, a mouse, a pointer, a joystick, a keyboard, a game controller, a haptic device, a game console, a game box, a network device, a router, a switch, an internet TV box, an internet system, an internet device, a set-top box, a cable box, a modem, a cable modem, a PC, a tablet, a media box, a streaming device, an entertainment center, an entertainment system, an aircraft entertainment system, a hotel entertainment system, a car and vehicle entertainment system, a GPS device, a GPS system, an automobile and other motor vehicle system, a truck system, a vehicle control system, a vehicle sensor, an aircraft system, an automation system, a home automation system, an industrial automation system, a reservation system, a check-in terminal, a ticket collection system, an admission system, a payment device, a payment system, a banking machine, a cash point, a ATM, a vending machine, a vending system, a point of sale device, a coin-operated device, a token operated device, a gas (petrol) pump, a ticket machine, a toll system, a barcode scanner, a credit card scanner, a travel token system, a travel card system, a RFID device, an electronic label, an electronic tag, a tracking system, an electronic sticker, an electronic price tag, a near field communication (NFC) device, a wirelessly operated device, a wireless receiver, a wireless transmitter, a sensor device, a mote, a sales terminal, a checkout terminal, an electronic toy, a toy system, a gaming system, an information appliance, an information kiosk, a sales display, a sales device, an electronic menu, a coupon system, a shop display, a street display, an electronic advertising system, a traffic control system, a traffic sign, a parking system, a parking garage device, an elevator and elevator system, a building system, a mailbox, an electronic sign, a video camera, a security system, a surveillance system, an electronic lock, an electronic key, an electronic key fob, an access device, an access control, an electronic actuator, a safety system, a smoke detector, a fire control system, a fire detection system, a locking device, an electronic safe, an electronic door, a music device, a storage device, a back-up device, a USB key, a portable disk, an exercise machine, a sports equipment device, medical device, a medical system, a personal medical device, a wearable medical device, a portable medical device, a mobile medical device, a blood pressure sensor, a heart rate monitor, a blood sugar monitor, a vital sign monitor, a ultrasound device, a medical imager, a drug delivery system, a drug monitoring system, a patient monitoring system, a medical records system, an industrial monitoring system, a robot, a robotic device, a home robot, an industrial robot, an electric tool, a power tool, a construction equipment, electronic jewelry device, a wearable device, a wearable electronic device, a wearable camera, a wearable video camera, a wearable system, an electronic dispensing system, and a handheld computing device.

15. The computer readable medium of claim 9, further comprising instructions which, when stored in memory and executed by the one or more processors causes the one or more processors to perform acts of: creating an internet connection between the first device and a set of one or more target devices.

16. The computer readable medium of claim 9, further comprising instructions which, when stored in memory and executed by the one or more processors causes the one or more processors to perform acts of:

registering the first device to receive messages from one or more notification devices;

selecting a notification server from a plurality of servers to receive a notification message from at least one notification device;

receiving the notification message at the notification server; and forwarding the notification message from the notification server to at least one of the plurality of devices.

\* \* \* \* \*